United States Patent

Kamo et al.

[11] Patent Number: 6,016,959
[45] Date of Patent: Jan. 25, 2000

[54] CARD DRIVE APPARATUS AND CARD

[75] Inventors: Masayoshi Kamo; Kazuo Hasegawa; Atsuo Onoda; Yuuji Oomura; Masao Sato; Hidetada Nagaoka; Yukio Izumi; Akira Hashimoto; Keiichi Nishikawa, all of Kanagawa; Yoichi Muratomi, Hyogo; Yasutaka Mizutani, Kanagawa, all of Japan

[73] Assignee: Mitsubishi Denki Kabushiki Kaisha, Tokyo, Japan

[21] Appl. No.: 08/862,843

[22] Filed: May 23, 1997

Related U.S. Application Data

[63] Continuation of application No. 08/383,714, Feb. 2, 1995, abandoned.

[30] Foreign Application Priority Data

Feb. 7, 1994 [JP] Japan .................................. 6-013598

[51] Int. Cl.[7] .................................................. G06K 07/08
[52] U.S. Cl. .............................................. 235/449; 360/2
[58] Field of Search ................................. 235/449; 360/2, 360/81, 101

[56] References Cited

U.S. PATENT DOCUMENTS

| | | | |
|---|---|---|---|
| 3,022,078 | 2/1962 | Hoshino et al. . | |
| 3,131,937 | 5/1964 | Nakamatsu . | |
| 3,624,311 | 11/1971 | Emden | 360/2 |
| 3,855,620 | 12/1974 | Kato | 360/101 |
| 4,020,505 | 4/1977 | Iwaoka et al. . | |
| 4,102,569 | 7/1978 | Schwartz | 360/2 |
| 4,114,181 | 9/1978 | Itoh | 360/2 |
| 4,851,929 | 7/1989 | Yang | 360/2 |
| 5,059,774 | 10/1991 | Kubo et al. . | |
| 5,107,099 | 4/1992 | Smith | 235/449 |
| 5,172,282 | 12/1992 | Ghose | 360/101 |

FOREIGN PATENT DOCUMENTS

| | | |
|---|---|---|
| 0319800 | 6/1989 | European Pat. Off. . |
| 2328257 | 10/1976 | France . |
| 19503165 | 8/1995 | Germany . |
| 1-39682 | 2/1989 | Japan . |
| 2-76124 | 3/1990 | Japan . |
| 4-47578 | 2/1992 | Japan . |
| 7114392 | 4/1973 | Netherlands . |
| WO90/11599 | 10/1990 | WIPO . |

*Primary Examiner*—Donald Hajec
*Assistant Examiner*—Mark Tremblay

[57] ABSTRACT

A head assembly moving along a long side of a magnetic card, more than one magnetic head rotating in the head assembly for reading/writing data, a rotary transformer and a carriage with a card holding mechanism for keeping a card at a predefined position are provided in a card reader of the present invention. A rotating part of the rotary transformer in the head assembly receives and sends a signal to the magnetic head and a fixing part of the rotary transformer is connected to a reading/writing circuit. On the card of the present invention, which is usually rectangular, there are tracks defined by plural arcs. The arcs are on plural same-size circles whose centers are aligned on one line along the long side of the card. A magnetic card or an optical card can be used for the present invention.

15 Claims, 113 Drawing Sheets

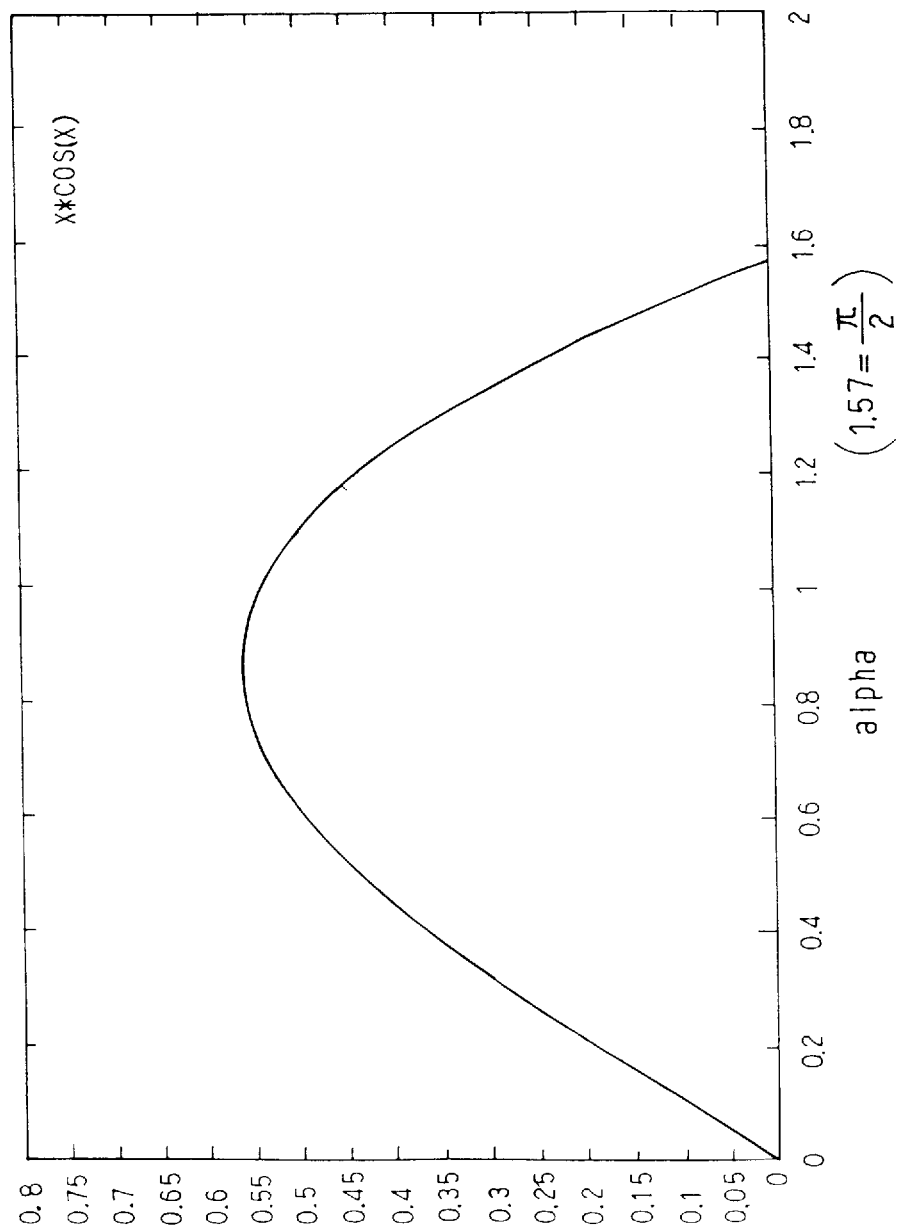

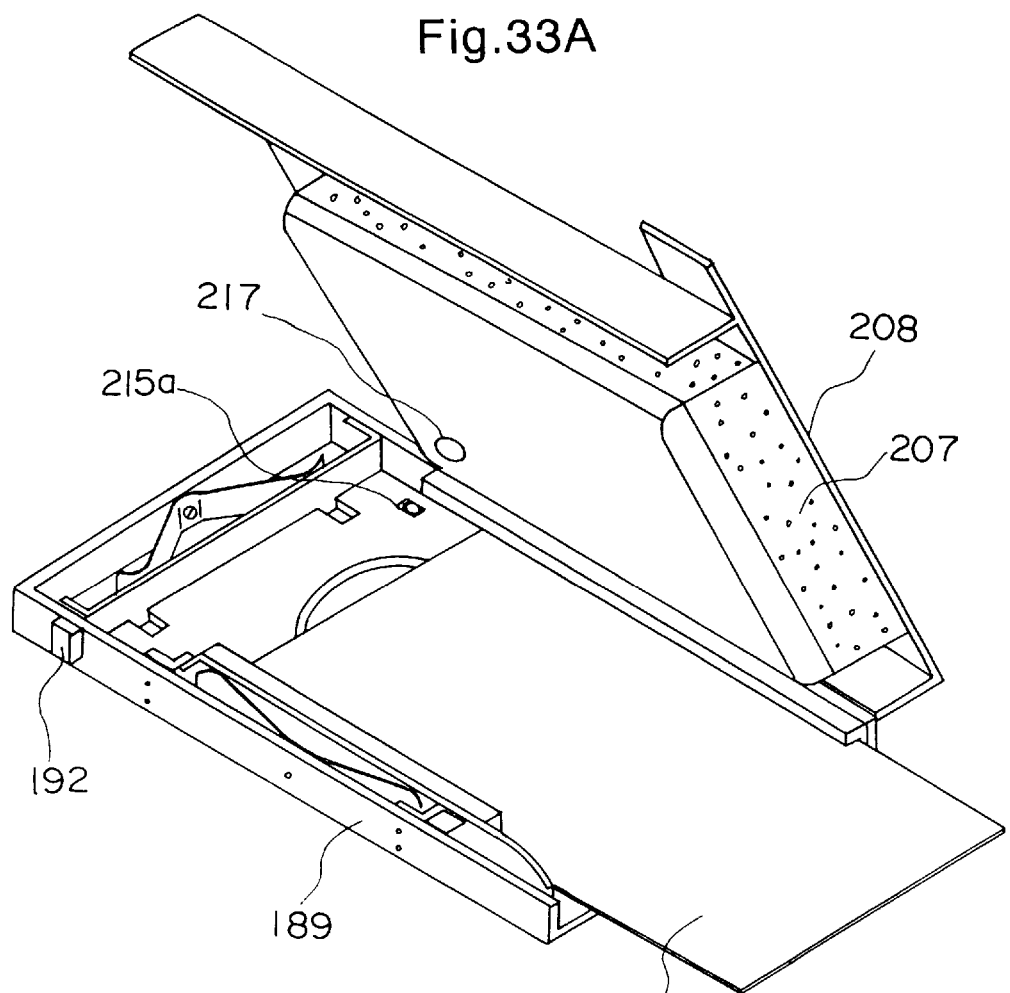
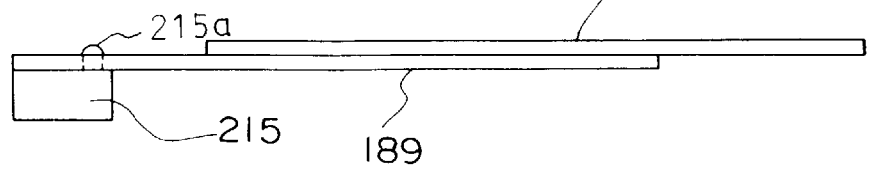
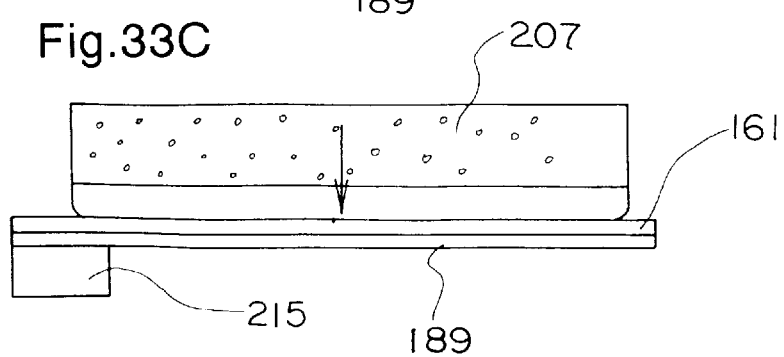

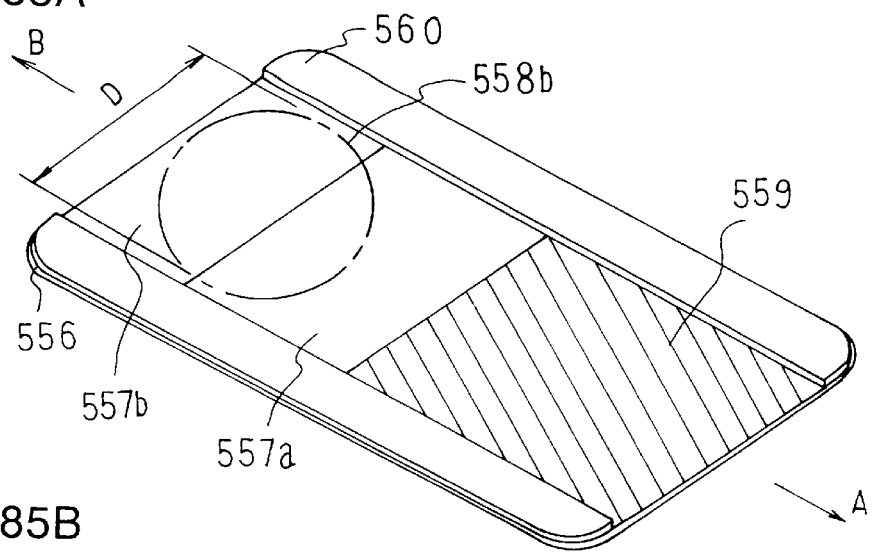
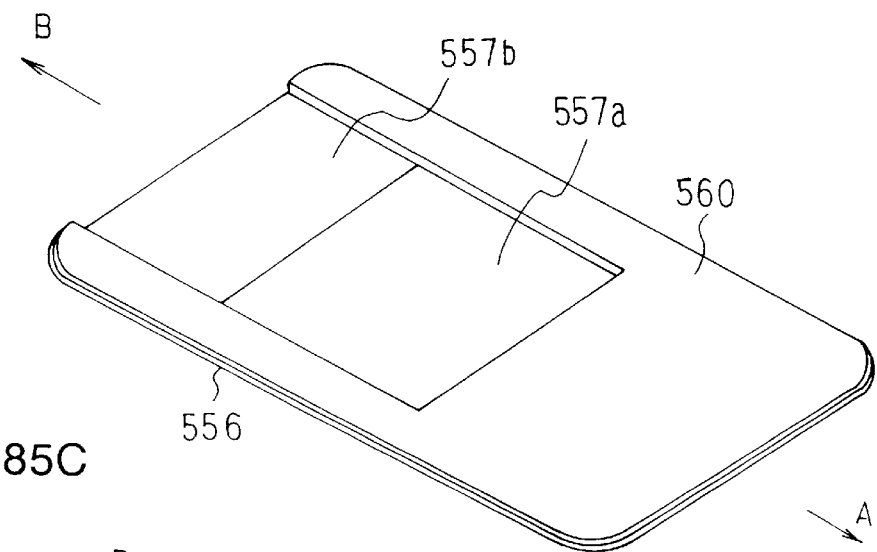
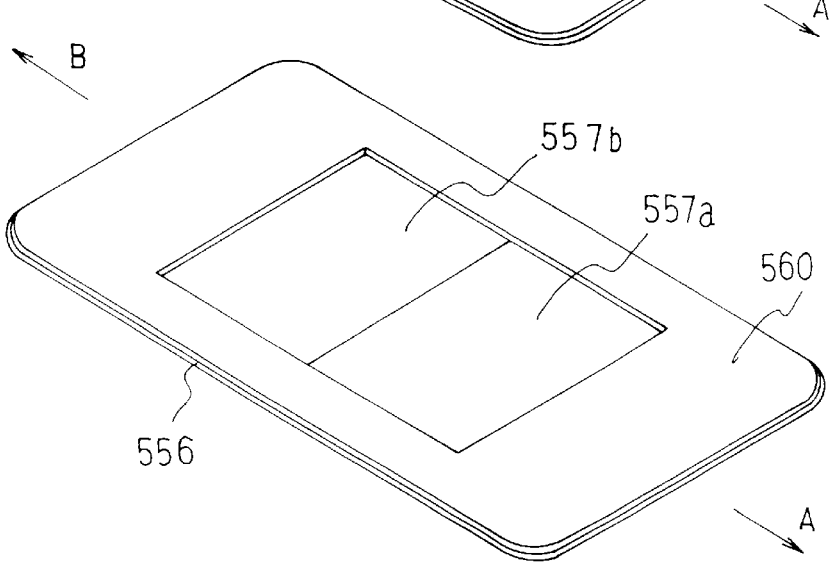

RELATED ART Fig. 120A
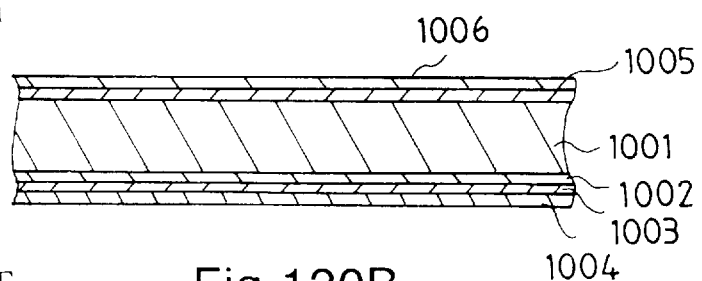
RELATED ART Fig. 120B
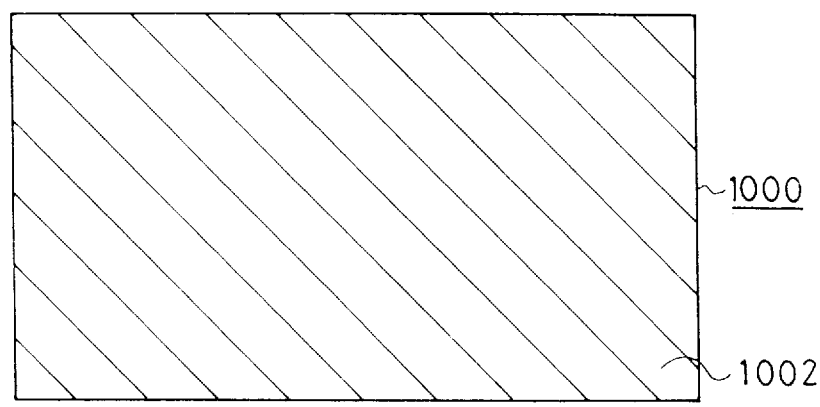
RELATED ART Fig. 120C
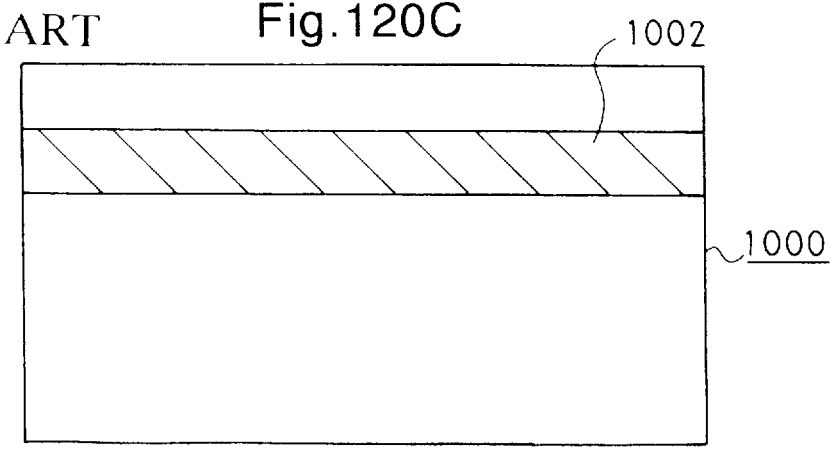

Fig.122
RELATED ART
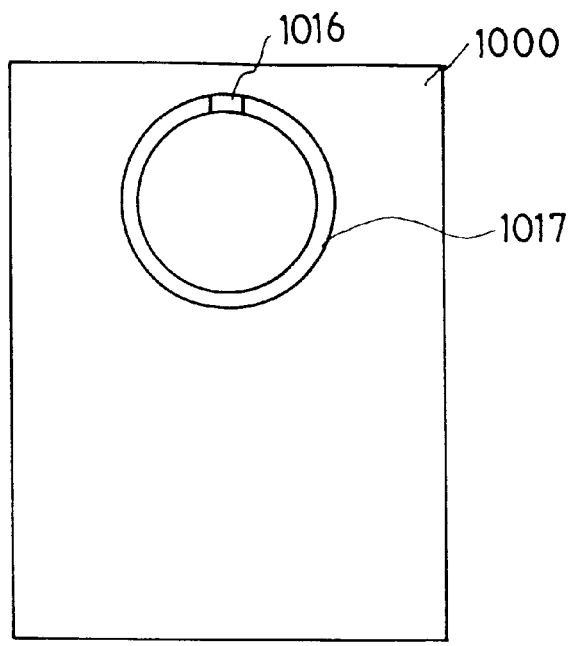
RELATED ART  Fig.123
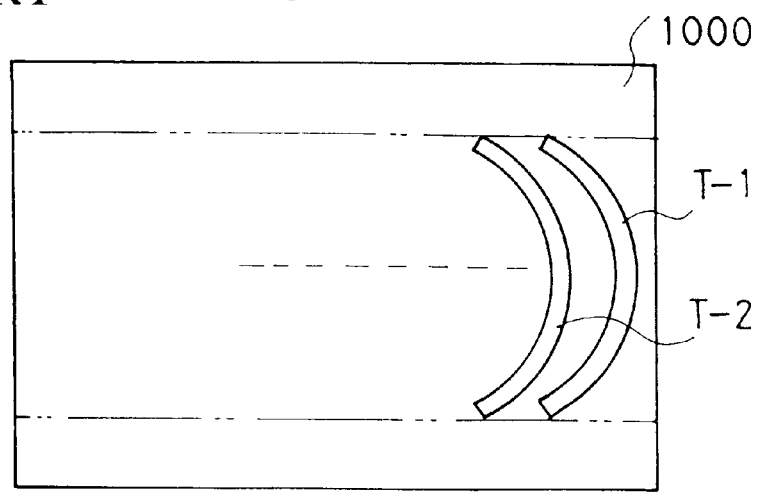

CARD DRIVE APPARATUS AND CARD

This application is a continuation of application Ser. No. 08/383,714, filed Feb. 2, 1995, now abandoned.

BACKGROUND OF THE INVENTION

1. Field of the Invention

This invention relates to data storage medium and data read and write apparatus for use in a computer, and more particularly, this invention relates to magnetic and optical cards and card readers.

2. Description of the Related Art

The external storage that has come to be widely used is divided into three major categories: the integrated circuit (IC) memory such as ROM or RAM which is being extensively applied in the field of semiconductors, the magnetic disk drives and magnetic tape drives using the techniques of magnetic recording such as hard disks or floppy disks, and optical recording techniques that include compact disks (CDs), write-once optical disks, and re-writable optical disk drives and magneto-optic disk drives. All these apparatuses feature large storage capacity and random access capability except the magnetic tape drive.

Magnetic card reader and optical card reader are the major card readers in use. Rectangular cards, which are about the size of a business card, have several longitudinally arranged recording tracks. Unlike the magnetic disk drive with which data can be repeatedly read because of the circular recording tracks, conventional card reader is disadvantageous in that data on a given track cannot be accessed repeatedly due to its linear tracks, e.g., each single track is cut off at both ends.

FIGS. 120A to 120C give general description of a conventional magnetic card. FIGS. 120A and 120B are a sectional view and a top view of a magnetic card whose surface is covered with magnetic material entirely and FIG. 120C shows another type of a magnetic card which is coated with magnetic material only partially. Underneath board 1001 are magnetic film 1002, protective layer 1003, and printing layer 1004. Board 1001 is made up of PVC, PET, and synthetic paper and coated with thin magnetic film 1002 of a few micron meter thickness. Protective layer 1003 protects the magnetic film. On printing layer 1004, letters are printed. On the board are another printing layer 1005 on which pictographs are to be printed and protective layer 1006. Magnetic card illustrated in FIG. 120C is commonly used for cash cards, telephone cards, and credit cards, to name a few.

FIG. 121 describes the basic theory of a data read and data write for a magnetic card reader carried in an article of an in-house handbook for using cards issued by one leading company in Japan. In this Figure, feed rollers 1007 and 1008 allow magnetic card 1000 to travel back and forth. Driving motor 1009 spins feed roller 1007 by means of belt 1010. When the driving motor rotates in the direction of arrow A, magnetic card 1000 placed between feed roller 1007 and pressure roller 1011 travels in the direction of arrow B to the position between magnetic head 1012 and head pressure roller 1013.

While magnetic card 1000 passes through magnetic head 1012, data is written onto or read from the magnetic layer 1002 on the magnetic card, which is then sent to feed roller 1008 and pressure roller 1014. Feed roller 1007 and feed roller 1008, both of which are identical in diameter, are linked by means of belt 1015. Thus, the magnetic card travels from feed roller 1007 to feed roller 1008 at a constant speed in the direction of arrow B, and then ejected.

After data recording or reproducing, it is also possible to reverse the motor rotation so as to back travel the magnetic card to be ejected from the insertion slot. Conventionally, two or more magnetic heads read or write data while a magnetic card is traveling in one direction. Therefore the card could store only scores of bytes. Moreover, a user had to insert a magnetic card again into a slot of a magnetic card reader whenever the user wants to re-access the same information.

Several attempts have been made to solve the above-mentioned problems by using a rotation drum found in a video tape recorder or a tape drive for storing data. They embrace a method of reading or writing data with several magnetic heads on a rotation drum by helically scanning a magnetic tape wound on the drum. The magnetic heads are mounted on the circumference of a turntable to form arc tracks on a magnetic storage medium. It is important to note that these methods aim at obtaining non-linear recording tracks, and signals are transmitted to and from magnetic head by means of a rotary transformer.

"THE MAGNETIC CARD READER" introduced in Japan Patent Application Sho 62-194717 set forth the structure that forms tracks with two or more magnetic heads on the turntable. The rotation of a turntable and the move of a carriage on which the turntable and a motor are mounted, are linked by the single motor. It is an improvement that the loci of tracks on a storage medium are not circular but continuous spirals.

"MAGNETIC CARD AND MAGNETIC CARD ISSUER" of Japan Patent Application Sho 63-228212 calls for a method of storing data on a circular track shown in FIG. 122 instead of the striped tracks in FIG. 120C. Data is recorded on a circular track 1017 with magnetic head 1016 on the recording surface of a magnetic card. When a circular track is used and magnetized at a density with 210BPI/75BPI specified by the Japanese Industrial Standard, the track length becomes 1.7 times longer than the conventional striped tracks if the diameter of the circular track is 38 mm. This method is unique in that it employs only one circular track on a magnetic card.

FIG. 123 illustrates a method presented in "DATA CARD READER" of Japan Patent Application Sho 59-66777. The tracks of this invention are arc-shaped and aligned in longitudinal direction of a magnetic card which is the size of an ID card (JISB-9560). On magnetic card 1000 having an effective length of about 80 mm, up to 3,000 arc tracks T-1, T-2, etc. measuring 55 mm in width and 26 micrometer in track width can be stored. The characteristics of this method is that magnetic heads are jumped out of a magnetic card on rear tracks (left edge of the card in FIG. 123).

Japan Patent Application Sho 62-223468 and Japan patent Application Hei 1-218020 also introduced the method of using uni-directional arc tracks as shown in FIG. 123.

FIG. 124 illustrates a method introduced in "THE METHOD OF POSITIONING MAGNETIC CARD FOR MAGNETIC STORAGE DRIVE" of Japan Patent Application Hei 2-24759. The starting track number and the ending track number of arc tracks 1018 are recorded on the header (not shown). By comparing these track numbers, the extent of track deviation is detected. After inserting locking pin 1019 to a hole on one side of the magnetic card, a card is positioned by moving adjustable pins 1020, which are inserted into two holes located on the opposite with locking pin 1019 as the center. Rotation motor 1022 that rotates magnetic head 1021 is located outside of the magnetic card and the magnetic head 1021 is placed outside of the magnetic card when it is not operating.

"MAGNETIC RECORDING CARTRIDGE" of Japan Patent Application Hei 2-157358 purports a magnetic recording cartridge. A carrier mechanism that moves a magnetic card forward and magnetic heads and several supporting arms for the magnetic heads are housed in a single storage case. A large rectangular hole is made in the center of two groups of arc tracks so that a magnetic card will be transported without being hindered by any components such as rotation shaft.

The arc recording tracks makes it possible not only to increase the number of tracks but also to re-access a certain track continuously when compared to conventional striped magnetic card.

PROBLEMS TO BE SOLVED BY THE PRESENT INVENTION

The fact that magnetic card readers have been typically incorporated into a device of substantial size that could be installed on the floor or on the desk. This fact has rarely brought the downsizing of the card reader into the focus of attention. The adoption of arc tracks could improve the storage capacity by two-digit or more compared to the conventional magnetic cards. This improvement will further serve to use magnetic cards as an external storage device of a computer. The magnetic card can supersede a floppy disk in the future. The sub-notebook type of personal computer now on the market is assumed to be the limit that can mount a 3.5" floppy disk physically. The main reason that hampers floppy disks from getting downsized from its current 3.5" inches is the size of a floppy disk cartridge. IC memory that physically fits the standardized PCMCIA dimensions or super-small hard disks are projected to become the mainstream of tomorrow. The 3.5" floppy disks can no longer keep abreast with the technological advancement in which small-portable devices are moving in the center stage. Thus, the objectives of this invention are to secure a large card size as possible, to make the most of the recording surface on the card, and to ensure the performance and environment resistance that can parallel those of conventional floppy disks.

The problems to be tackled to achieve a small card reader thus break down into the following five;

1. An apparatus should have a highly reliable data read and write mechanism with high recording density. In order to expand a storage capacity of a card, card will be widened in a transversal direction as much as possible to increase the number of recording tracks.

2. The card must be shortened in longitudinal direction so as to minimize the traveling length of a card for data access. To ensure high recording density, the distance between the head and the card has to be stable and small.

3. To protect the card from human fingerprints or dirt, the magnetic film and protective layer indicated in FIG. 120A are provided. Because the card must be inserted into the card reader by the user, it is important to design the card that is problem-free from dirt or contaminants that might be carried by the user.

4. A card reader should automatically or semiautomatically introduce a card into the card reader and farther into a designated position without hitting against any obstacle such as a head, 5. A card reader should achieve high random-access capability to a given track.

6. A card reader should overcome the problem of error-occurrence when a card has been inserted in the opposite direction. Conventionally, a card inserted in the wrong direction was ejected from the device, requiring the user to reinsert it into the device.

The magnetic head in the conventional techniques is rotated either in circles or in spirals. Of the former, the loci formed on a card can be a circle or an arc. Furthermore, the arc tracks can be aligned in one direction or faced each other in the longitudinal or transversal direction on the card. With respect to the relationship between the magnetic head and a magnetic card, the magnetic head can always exist on the surface of a magnetic card or it can exist on the card only during data read and write and otherwise placed out of the magnetic card. Also, there are two types of magnetic cards: one is directly handled by the user and the other that is not. The magnetic cards that are in a hermetically sealed container or under specially clean environment are not touched by the user.

To address the above-mentioned five challenges, the magnetic card of the present invention uses a flat card having no additional workings on the surface except punching holes of small diameter Just like the prepaid card. The card of the present invention will be problem-free under constant handling by the user. The card reader of the present invention has following characteristics:

The magnetic head forms arc loci. Tracks on the magnetic card are divided into two groups of arc tracks facing each other in longitudinal direction, and the magnetic head is always placed on the magnetic card. In addition, the storage capacity of arc tracks facing each other by far surpasses that of arc tracks aligned in one direction. Moreover, with the magnetic head existing on a magnetic card all the times, the space between the magnetic head and the card can be minimized and controlled accurately. Thus rendering the apparatus easy to operate just like the floppy disk unit.

By contrast, for magnetic head moved in from outside to make instantaneous touch with a magnetic card, the surface height of the magnetic head must match that of the magnetic card, which adds only complexity to the pressure mechanism of the magnetic head or the pad structure that supports the magnetic card.

The present invention is directed to a technique which overcomes the above-discussed disadvantages. Thus, it is the objectives of the invention to achieve a large data storage capability on a card which can be accessed randomly with the card being mounted on a card reader. Namely, the primary objectives of the present invention are to achieve a card and a card reader that are capable of continuous data write, retrieval, and read of ever-increasing amount of data, ensuring the excellent performance that parallels magnetic disk drives and almost up to optical disk drives.

SUMMARY OF THE INVENTION

A card drive apparatus according to one aspect of the present invention for accessing a plurality of recording tracks on a card includes a head assembly, a carriage and a carriage positioning mechanism.

The head assembly has at least one access head for accessing two recording tracks, wherein the two recording tracks are arc tracks located at different places on one circumference on the card. The head assembly has a turntable for mounting the access head, a shaft for rotating the turntable there around.

The carriage is for steadily holding the card therein and providing an access opening for accessing the card there through.

The carriage positioning mechanism is for positioning the carriage against the head assembly through the access opening so that the access head accesses the two recording tracks on the card at one position.

The head assembly includes a motor for rotating the shaft.

The head assembly includes a rotary transformer and a transformer holder for holding the rotary transformer.

The carriage includes a carriage base, a card feeding mechanism for feeding the card to the carriage base, a card positioning mechanism for positioning the card at a pre-defined position of the carriage base, and a card holding mechanism for keeping the card at the predefined position.

The carriage includes a card ejecting mechanism for ejecting card, wherein the card ejecting mechanism includes means for releasing the card from the card holding mechanism, means for feeding back the card and means for detecting the ejection of the card.

The card drive apparatus according to another aspect of the present invention includes an apparatus base and the carriage positioning mechanism including mechanism for fixing the carriage to the apparatus base, and mechanism for moving the head assembly so that the access head mounted on the head assembly seeks the recording track on the card through the access opening.

A card according to one aspect of the present invention is a magnetic card or an optical card or an magneto-optic card.

BRIEF DESCRIPTION OF THE DRAWINGS

By way of example, the embodiments of the invention will be described with reference to the accompanying diagrammatic drawings of which.

FIG. 14 is a diagram that indicates the relations between the angle between the center line and the end of a track and Z;

FIGS. 33A–33C show another embodiment of the pressure pad mechanism applied on the feeding mechanism of the present invention;

FIGS. 85A–85C show embodiments of the head cleaning card;

FIG. 100B shows a slanting positioning pin;

FIG. 100C shows a condition that a guide part is installed on the carriage base and the positioning pins are pressured upward by a compression spring;

FIG. 101 shows a card having positioning holes at the front of the card;

FIG. 102 shows a perspective view of the carriage base applied positioning pins corresponding to the card in FIG. 101;

FIG. 103 shows a card on which two holes are not aligned on the same line parallel to a long side of the card;

FIG. 104A shows a carriage base wherein a flat spring supporting the positioning pins can move upward by an arm;

FIG. 104B shows a side view that the flat spring supporting the positioning pins goes down by contacting the arm;

FIG. 105 shows a perspective view of the card feeding mechanism whose card holder goes up and down vertically against the carriage base;

FIG. 106A shows a side view that the card holder of the card feeding mechanism in FIG. 105 goes down;

FIG. 106B shows a side view that the card holder of the card feeding mechanism in FIG. 105 goes up;

FIG. 107 shows a side view that positioning pins of the card feeding mechanism in FIG. 105 come Just under the positioning holes;

FIG. 108 shows an enlargement of a card bias spring, whose pressure against the card can be removed, in the card feeding mechanism in FIG. 105;

Figure 108:
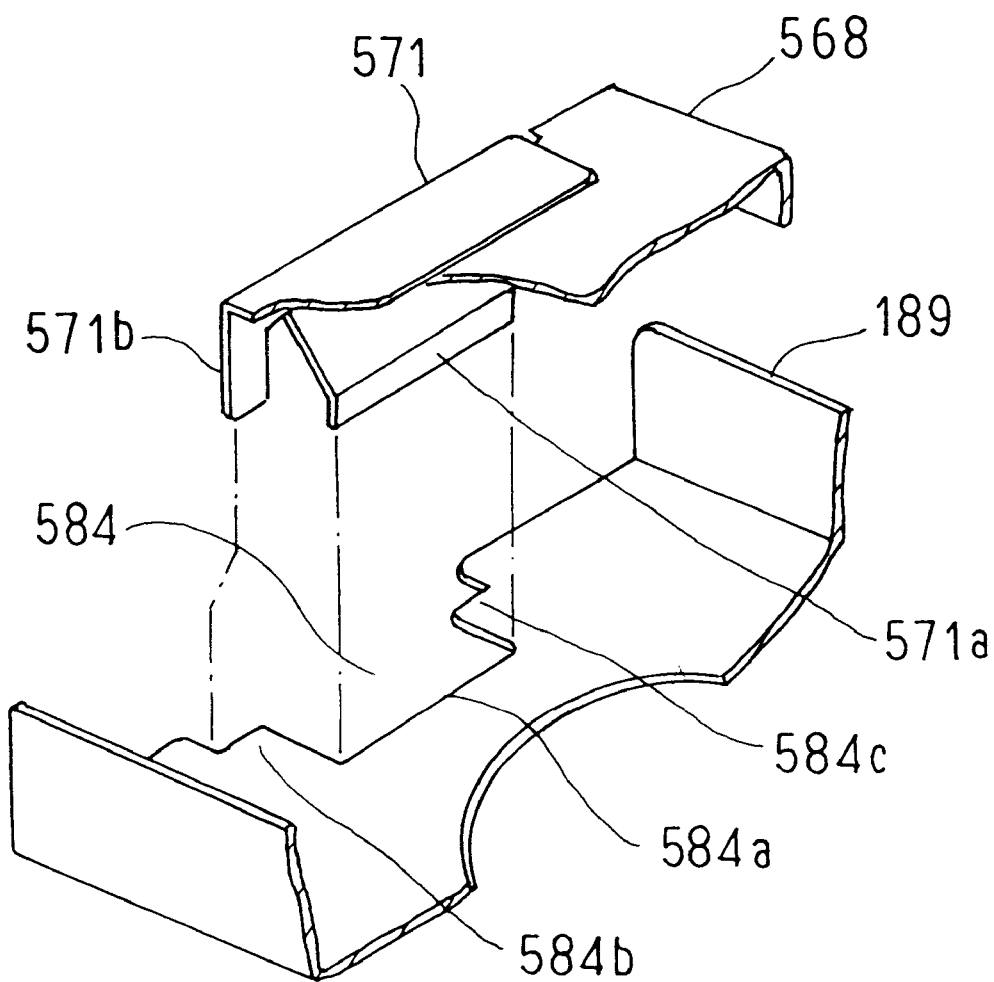
Figure 109A:
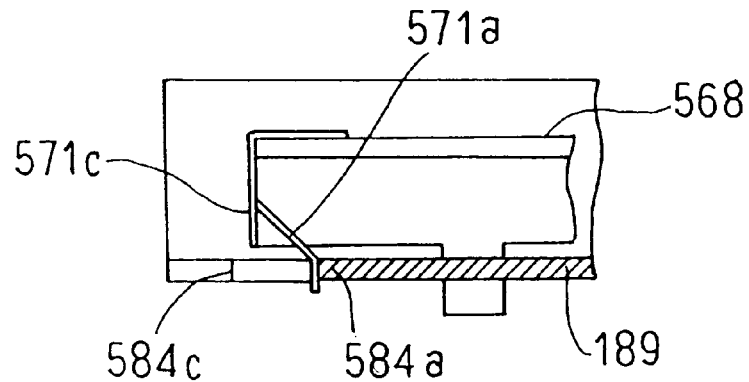
Figure 109B:
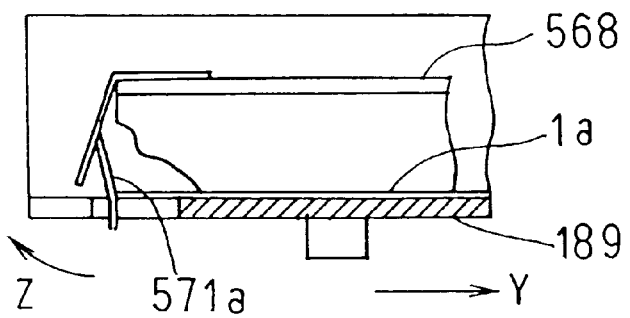
Figure 109C:
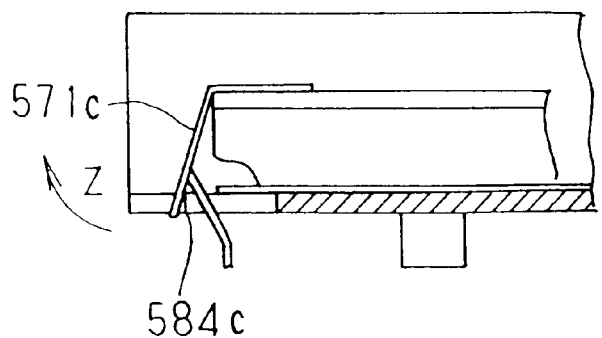
Figure 110A:
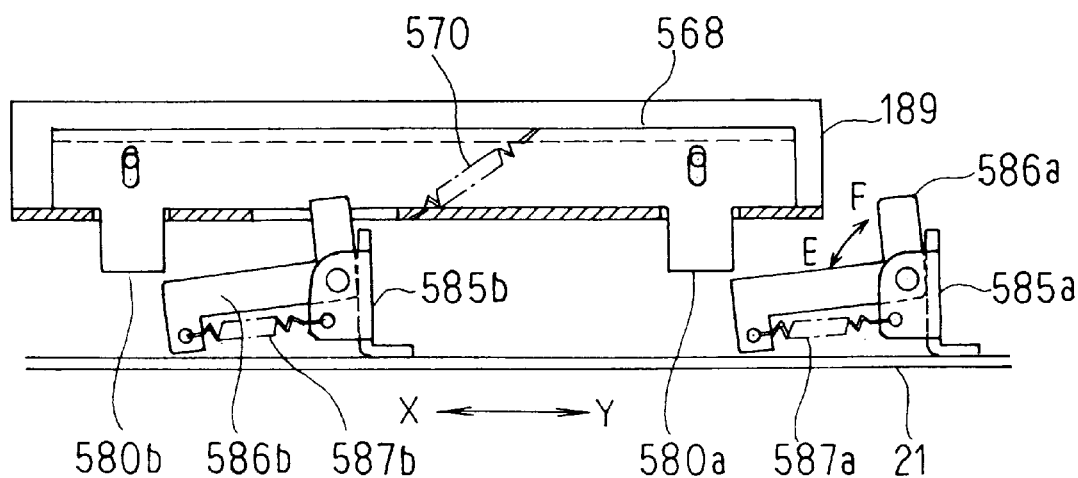
Figure 110B:
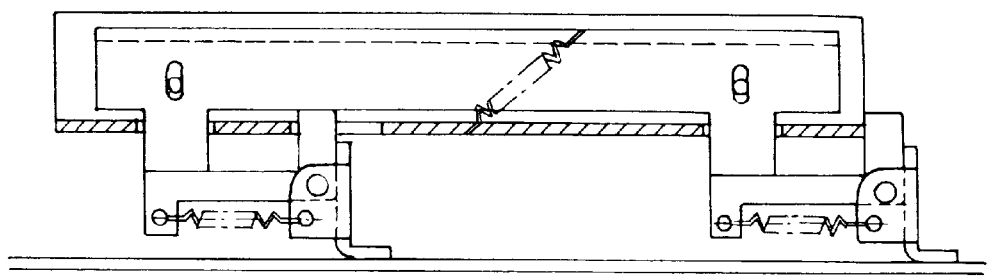
Figure 111:
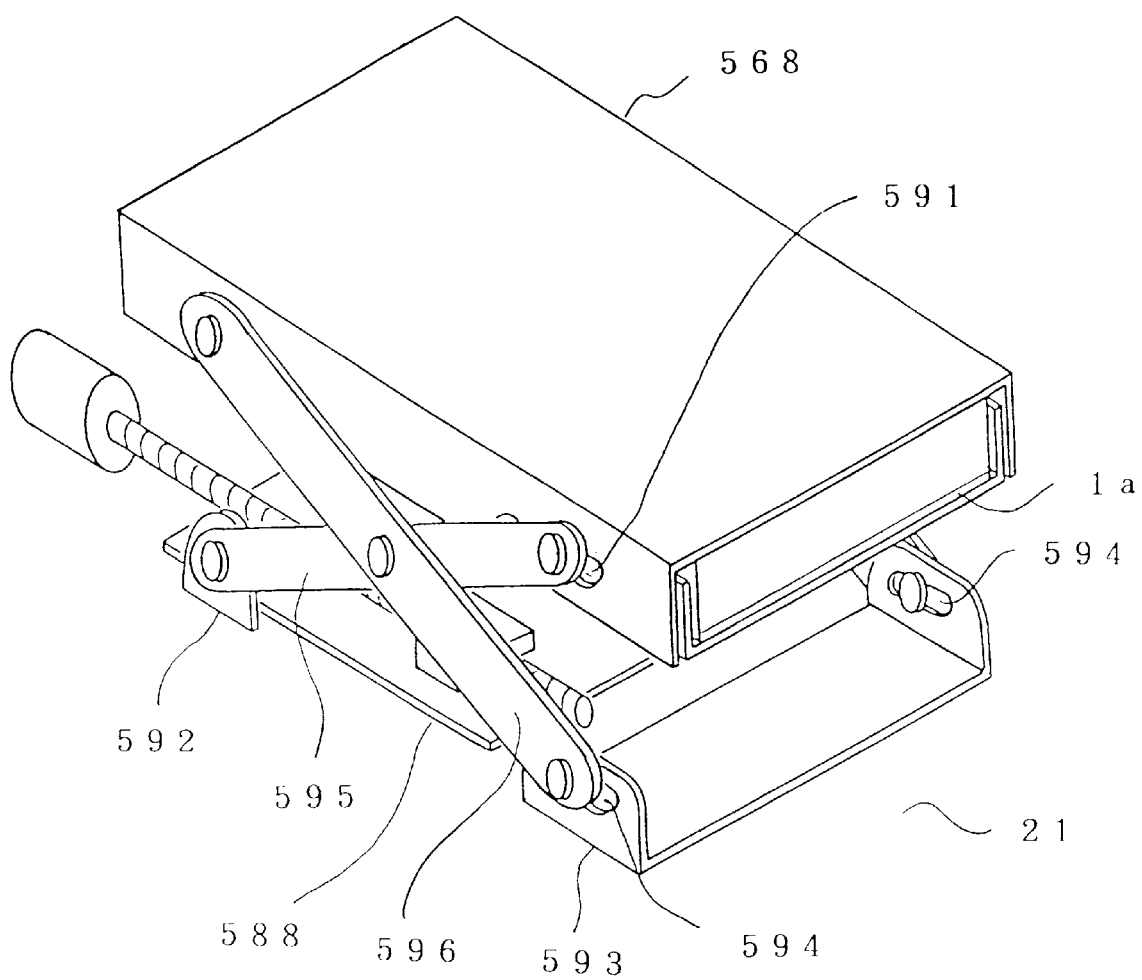
Figure 112:
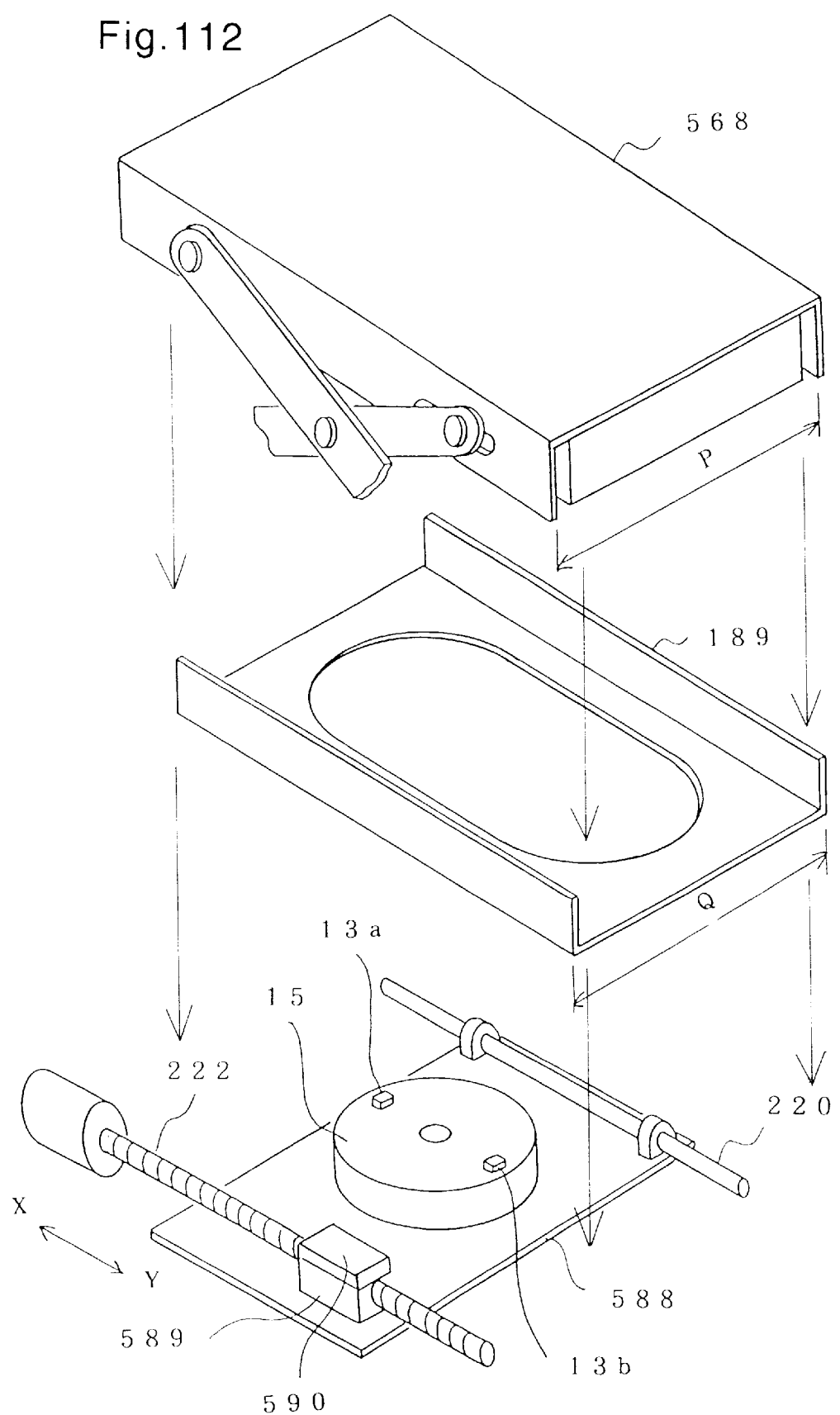
Figure 113:
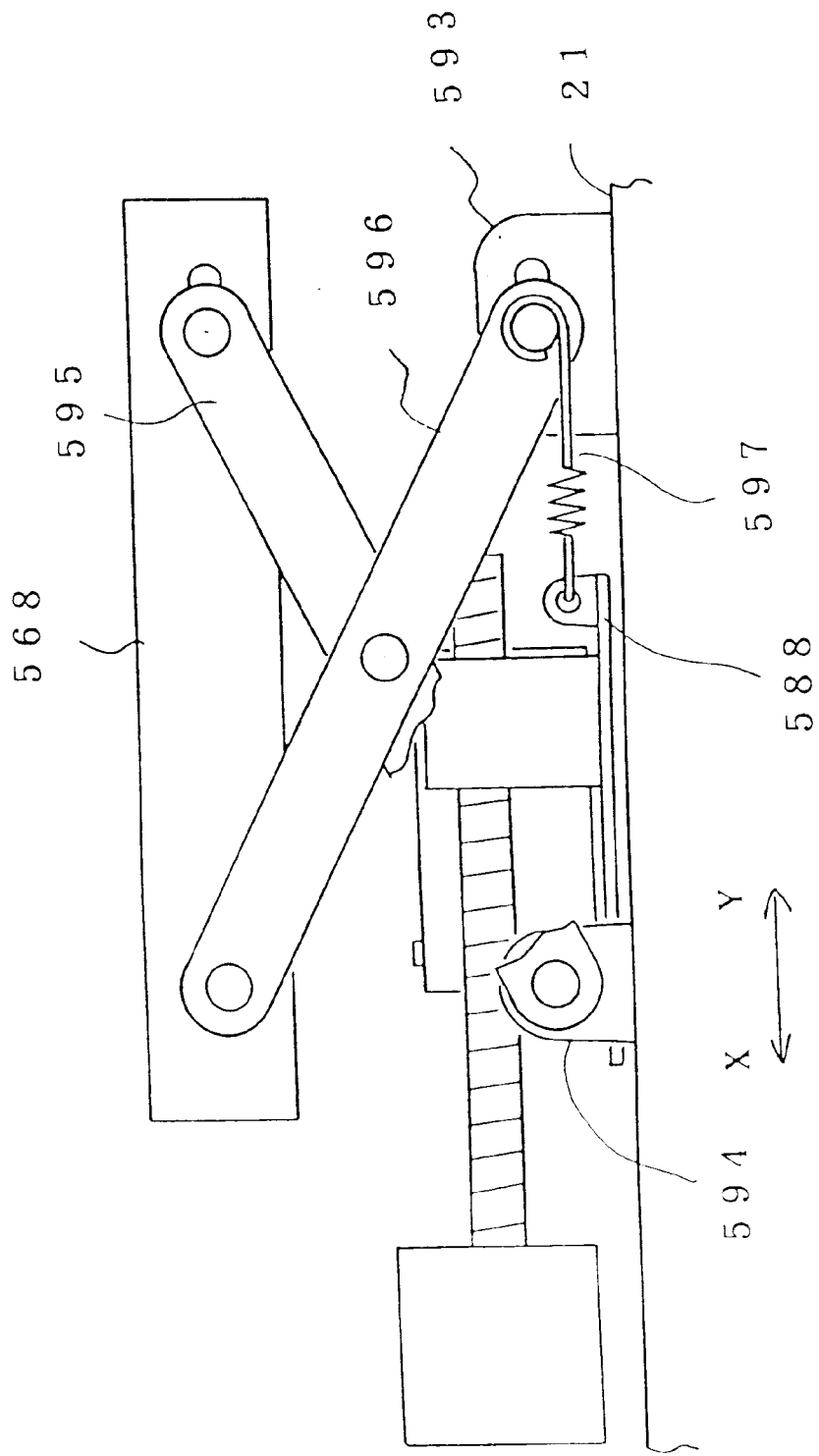
Figure 114:
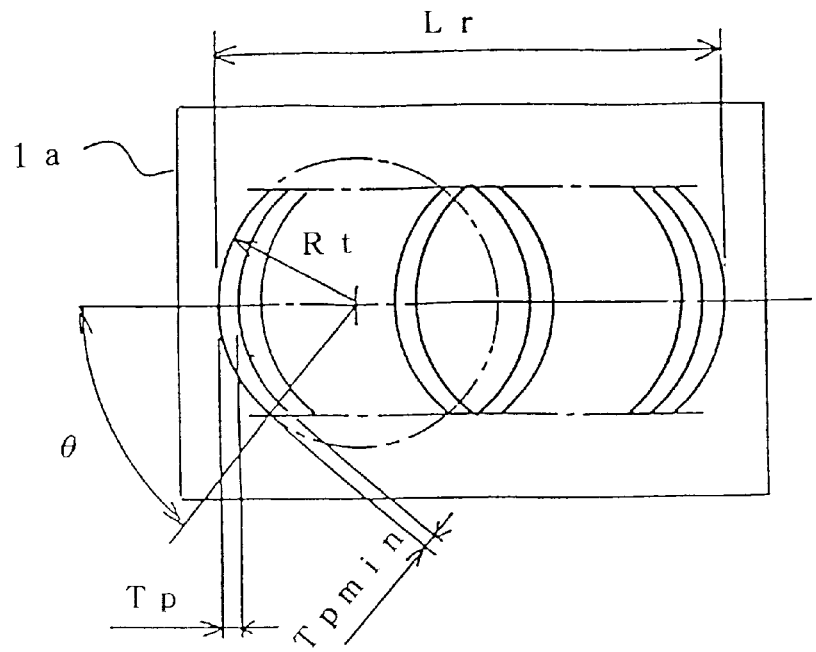
Figure 115:
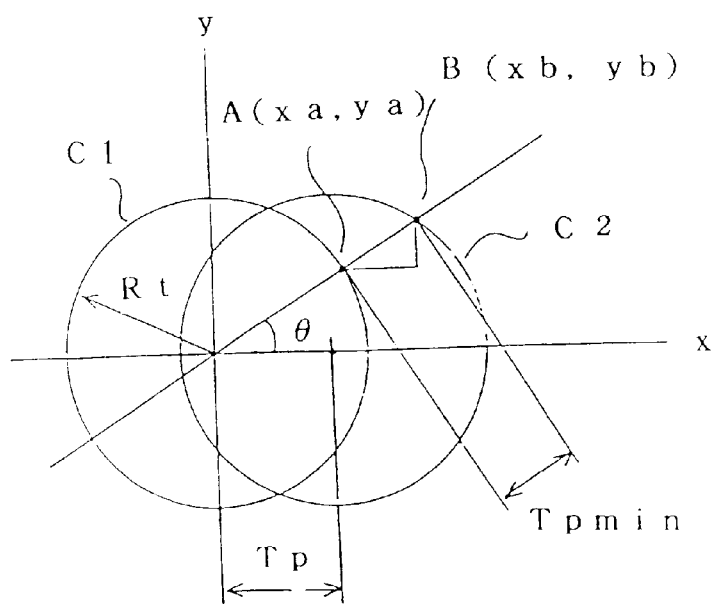
Figure 116:
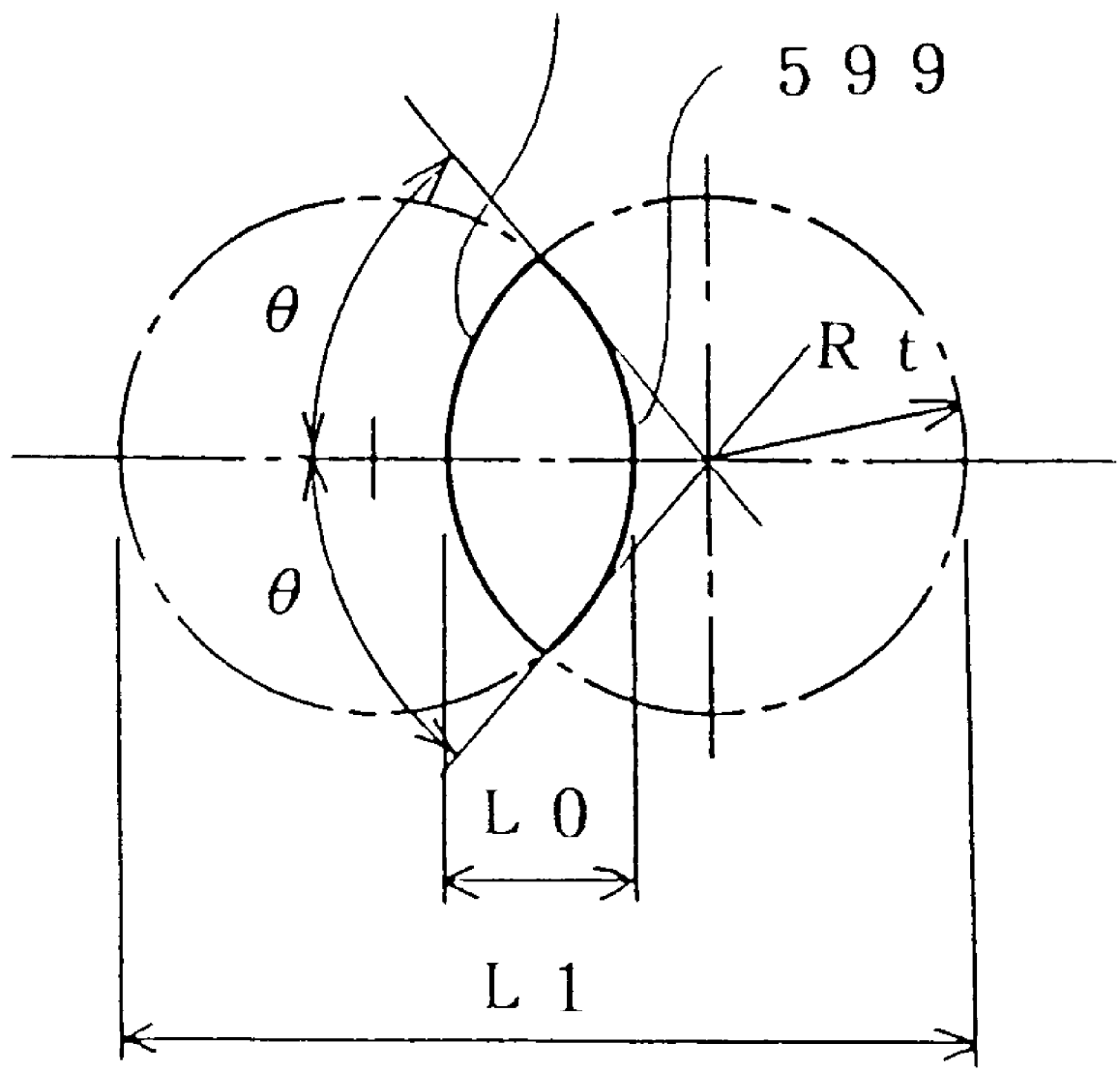
Figure 117:
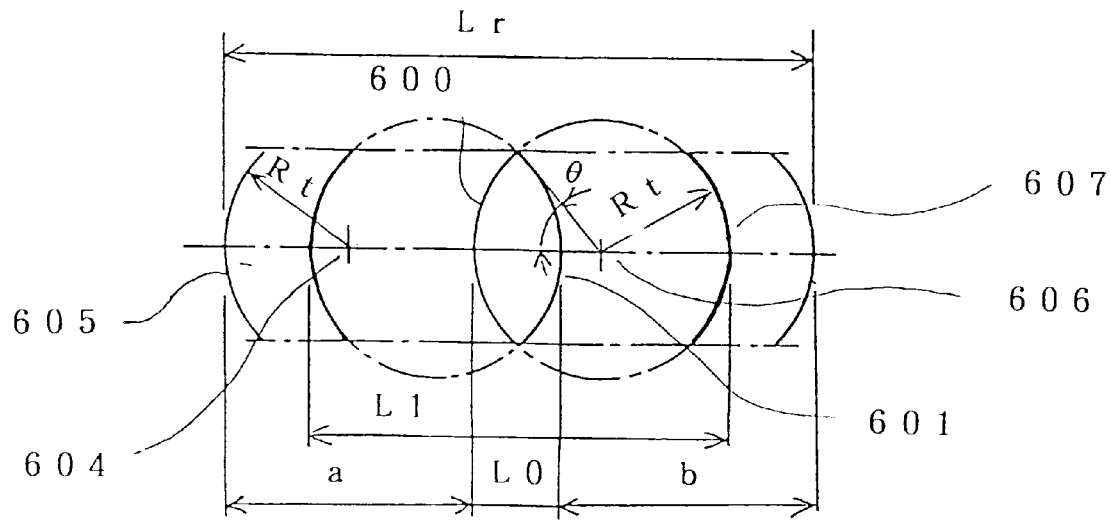
Figure 118:
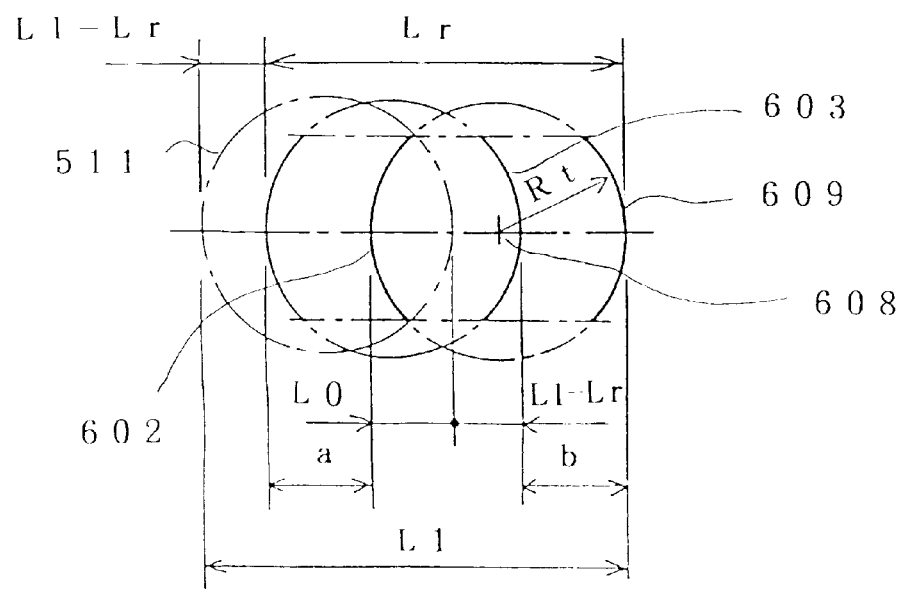
Figure 119:
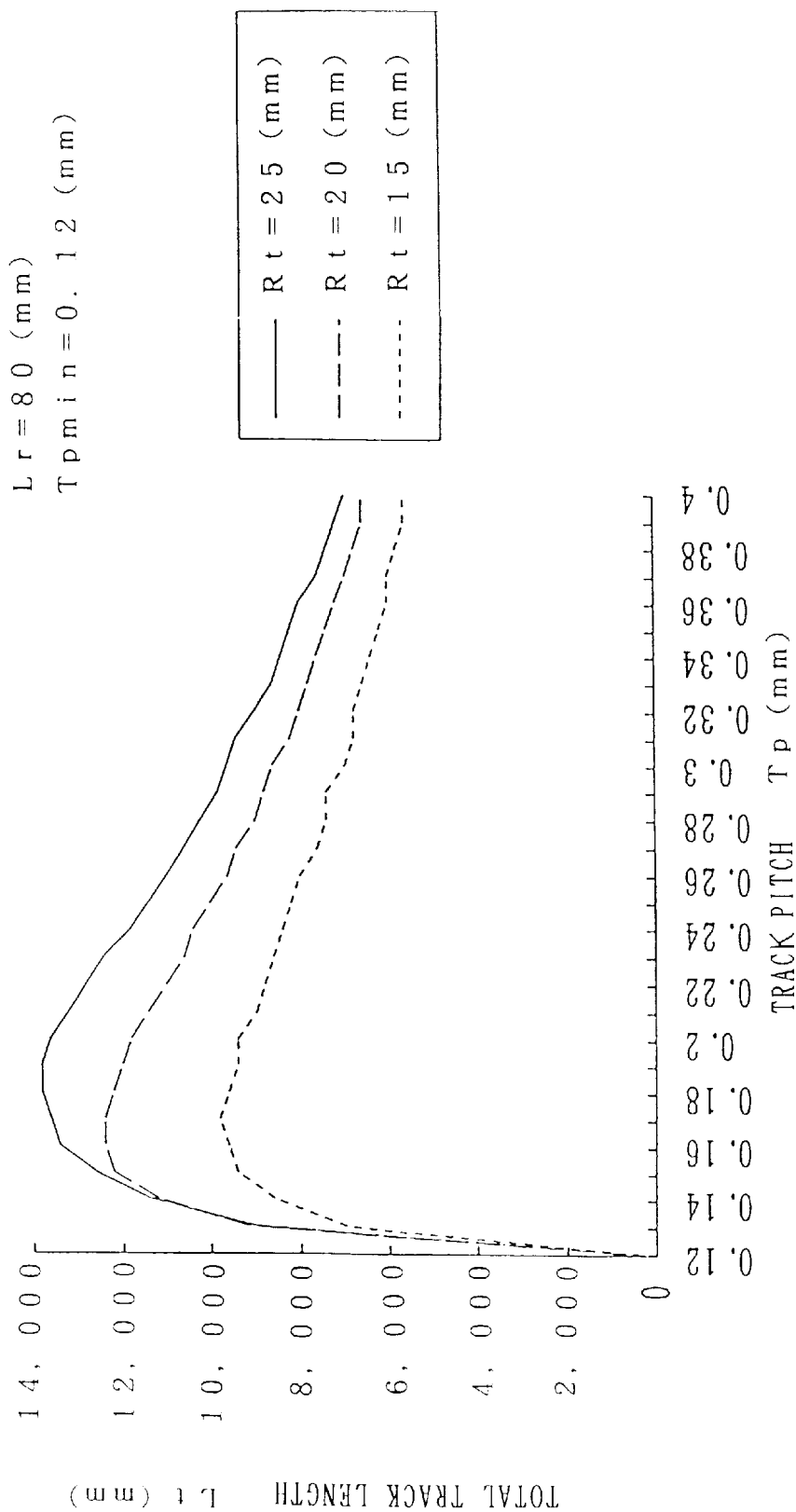
Figure 121:
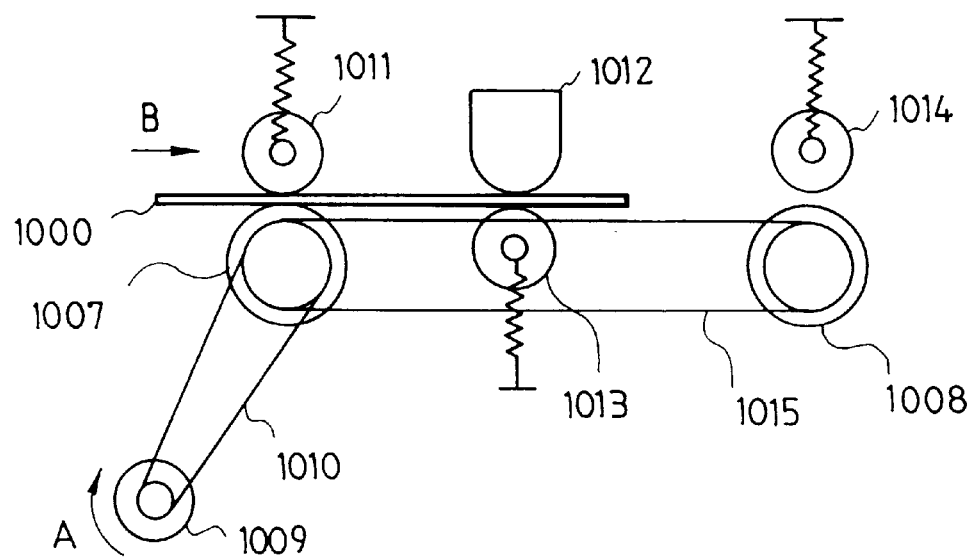

FIG. 109A shows a section that the card holder goes up against the carriage base in the card feeding mechanism applied with the card bias spring in FIG. 108;

FIG. 109B shows a section that the card contacts the card bias spring in the card feeding mechanism applied with the card bias spring in FIG. 108;

FIG. 109C shows a section that the card holder goes down against the carriage base in the card feeding mechanism applied with the card bias spring in FIG. 108;

FIG. 110A shows a condition that the card holder goes down in the card feeding mechanism wherein a link is used for making the card holder go up and down;

FIG. 110B shows a condition that the card holder goes up in the card feeding mechanism wherein a link is used for making the card holder go up and down;

FIG. 111 shows a perspective view of the card reader of another embodiment of the present invention;

FIG. 112 shows how the card reader of the present invention is assembled;

FIG. 113 shows a side view of the card reader of the present invention;

FIG. 114 shows a track layout of the card of the present invention;

FIG. 115 shows a diagram for calculating a track layout of the card of the present invention;

FIG. 116 shows a diagram for calculating a track layout of the card of the present invention;

FIG. 117 shows a diagram for calculating a track layout of the card of the present invention;

FIG. 118 shows a diagram for calculating a track layout of the card of the present invention;

FIG. 119 shows a relation between a track pitch and a total track length;

FIGS. 120A–120C show structures of conventional magnetic card;

FIG. 121 shows a basis of a conventional magnetic card reader;

FIG. 122 shows a track layout of a conventional card;

FIG. 123 shows a track layout of a conventional card; and

Figure 124:
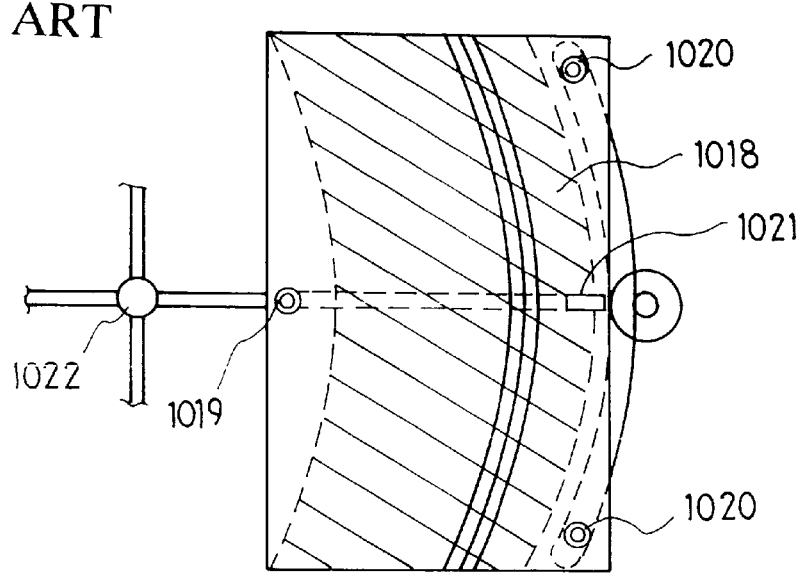

FIG. 124 shows a track layout of a conventional card.

DETAILED DESCRIPTION OF THE PREFERRED EMBODIMENT

Embodiment 1

Figure 1:
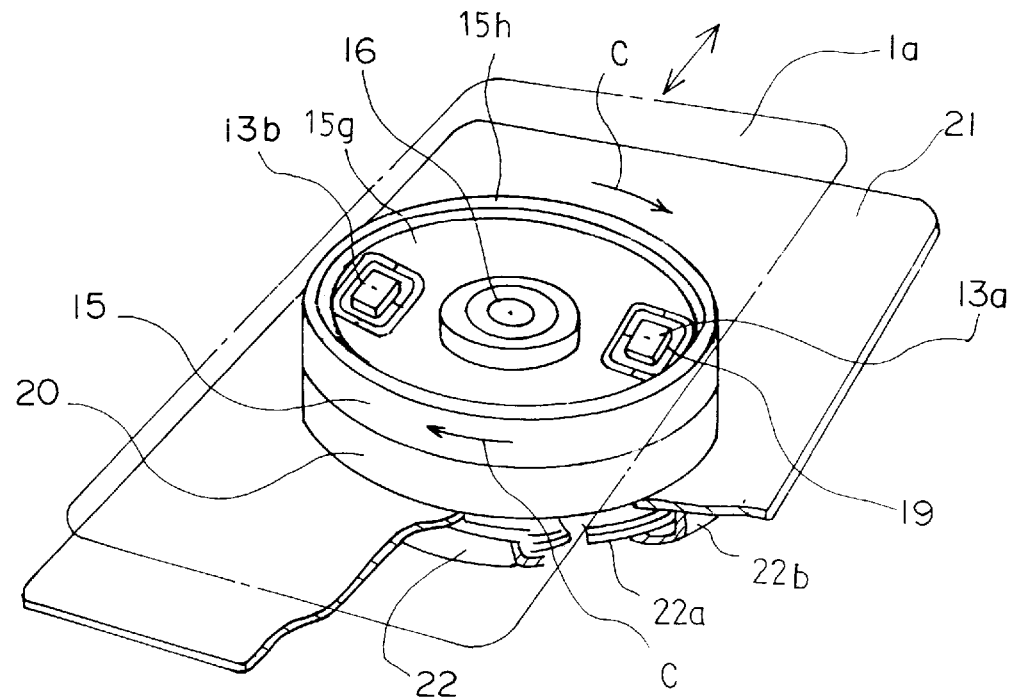
FIG. 1 depicts an example of rotational mechanism of magnetic heads of a magnetic card reader of the present invention.

With reference now to FIG. 1, the structure of a magnetic card reader will be discussed, first with focusing on the mounting mechanism of a magnetic head.

FIG. 1 depicts the rotation mechanism of magnetic heads 13a and 13b. A magnetic head is composed of a magnetic material referred to as the core and a coil wound around it. The individual magnetic heads are set into sliders which are attached symmetrically on the surface of turntable 15 with rotating shaft 16 in their center. The details of a slider are explained later. With magnetic heads set on, turntable 15 rotates at a certain speed in the direction of arrow C. If only one magnetic head is attached, one more dummy head, or a magnetic head, is attached to attain a balanced rotation of the turntable. The turntable in FIG. 1 rotates with its magnetic heads 13a and 13b on. The edge 15h on its circumference making contact with magnetic card 1a. Being attached on gimbal spring 19, which is a plane spring normally works in perpendicular motion, magnetic heads can pop up a bit higher than turntable 15. Thus the force is applied in the upward direction so as to push up magnetic card 1a.

The magnetic card reader according to the present invention can be applied to both normal horizontal magnetic recording method and perpendicular magnetic recording method. In either case, the adhesion between a magnetic head and a recording medium is the most important feature of magnetic recording. Widening of a gap between a magnetic head and a recording medium thus invariably reduces efficiency, and if worse, disables data read and write. This is particularly true for the perpendicular magnetic recording method. Gimbal springs 19 are employed specifically for the purpose of narrowing the gap between a magnetic head and a recording medium and are critical to a magnetic recorder.

Figure 31A:
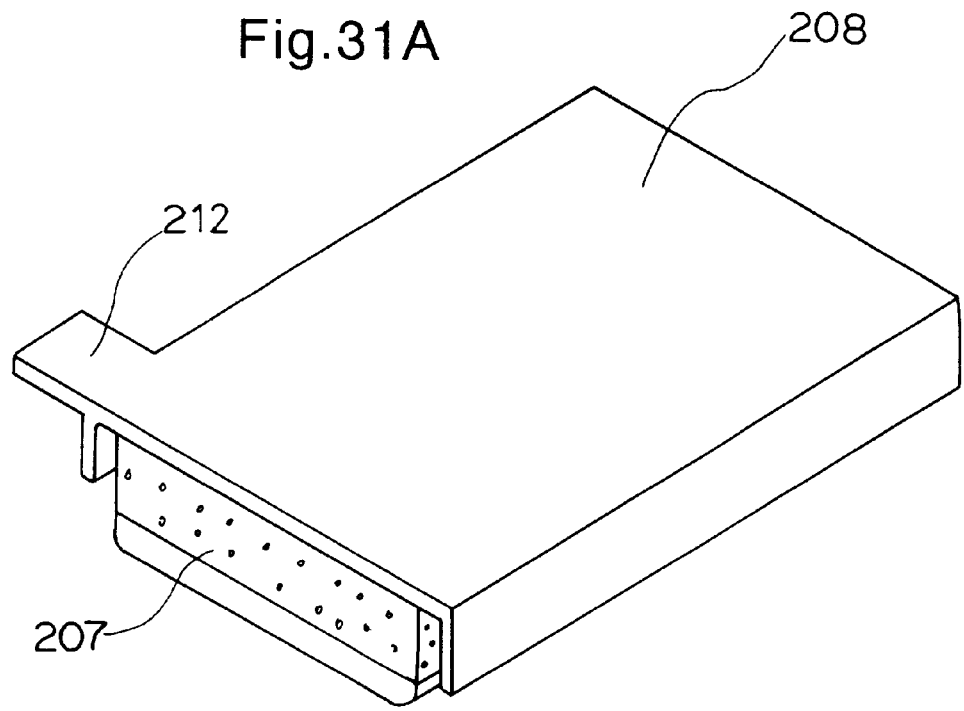
FIGS. 31A and 31B show embodiments of the pressure pad mechanism applied on the feeding mechanism of the present invention.
Figure 31B:
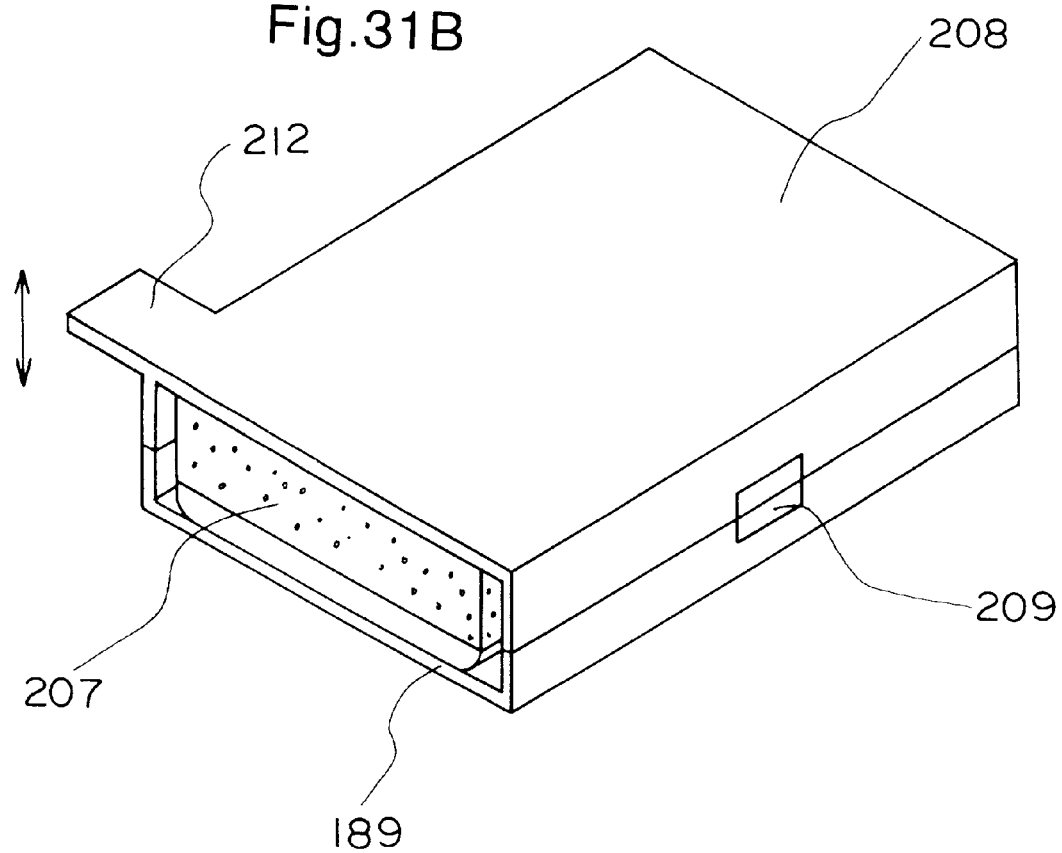

Edge 15h of the turntable 15 is protruded from base 15g onto which magnetic heads 13a and 13b are mounted in the direction of magnetic card 1a to a certain height. The edge 15h is to keep the fixed distance from the magnetic card 1a to the turntable base as well as to protect the magnetic heads. When carriage base 189 (FIGS. 27A to 27C) is provided to carry a card, the edge 15h of the turntable 15 is set lower than a base surface of the carriage base 189 because the base surface 189b of the carriage base 189 keeps the fixed distance between magnetic card 1a and magnetic heads 13a and 13b. Thus turntable 15 rotates without making contact with magnetic card 1a when the carriage base is provided. In addition, as shown in FIGS. 31A and 31B, pressure pad mechanism, which works as kind of a pad, counterpoised to the magnetic heads of a magnetic tape recorder, applies pressure evenly down on magnetic card 1a. The upward pressure of the gimbal spring 19 and the downward pressure of this pressure pad mechanism therefore counterbalance the magnetic card. The function of this pressure pad mechanism is explained in details later on.

It is difficult to electrically connect the input/output wiring of the read and write coils of magnetic heads with read and write circuits. This is because, unlike a magnetic tape unit or magnetic disk unit, magnetic heads themselves also rotate according to the present invention. To handle this problem, a rotary transformer commonly used for VTR is applied. From the read and write circuits, the recording signal flows to the coils of the magnetic heads via the rotary transformer and reproducing signal is transmitted from the magnetic head to the read and write circuits via the rotary transformer. The theory of the rotary transformer is elaborated later with reference to FIGS. 9A to 9C. The secondary coil of the rotary transformer is contained inside turntable 15 and rotates together with it. The primary coil of the rotary transformer, on the other hand, is housed inside rotary transformer holder 20, which is installed on apparatus base 21.

Direct Current (DC) motor 22 is a flat-type motor commonly used for floppy disk units, and consists of stator 22a and a rotor 22b. Stator 22a is made up of a coil and a yoke and rotor 22b is made up of a magnet and a body of rotation. Rotation shaft 16 spins rotor 22b of DC motor 22, and the rotor, in turn, rotates the turntable.

Embodiment 2

Figure 2:
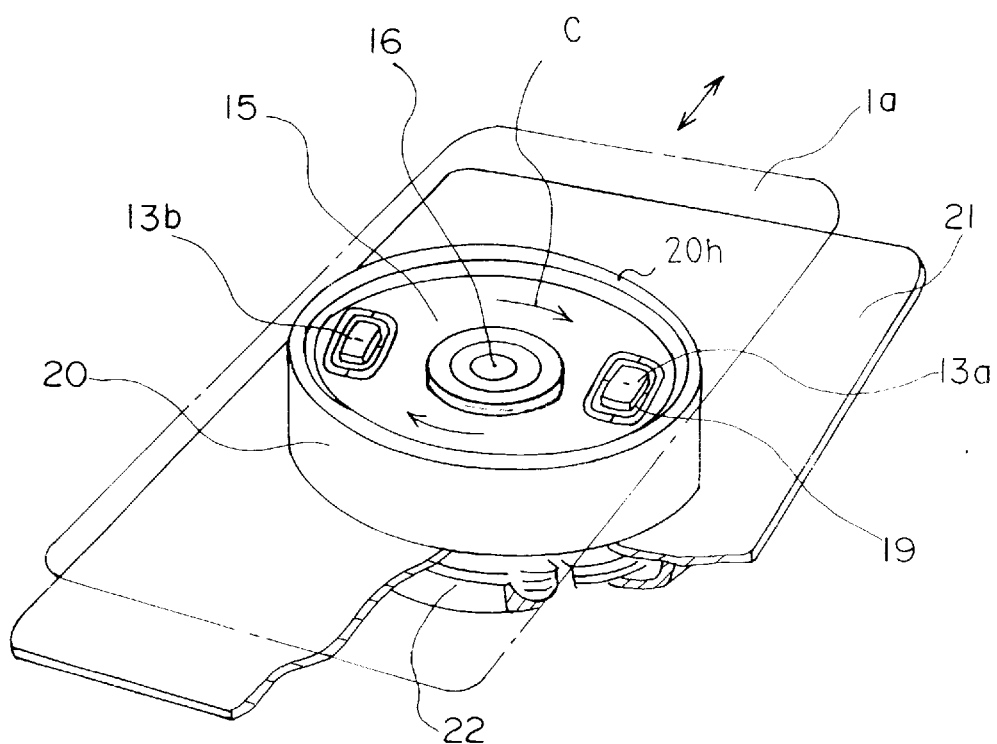
FIG. 2 gives another example of rotational mechanism of magnetic heads of a magnetic card reader.

FIG. 2 gives another example of rotation mechanism of a magnetic head. In this embodiment, a cylinder itself does not rotate but only supports a magnetic card. Rather, the turntable inside the cylinder rotates to write in data or read it from a card.

Figure 5A:
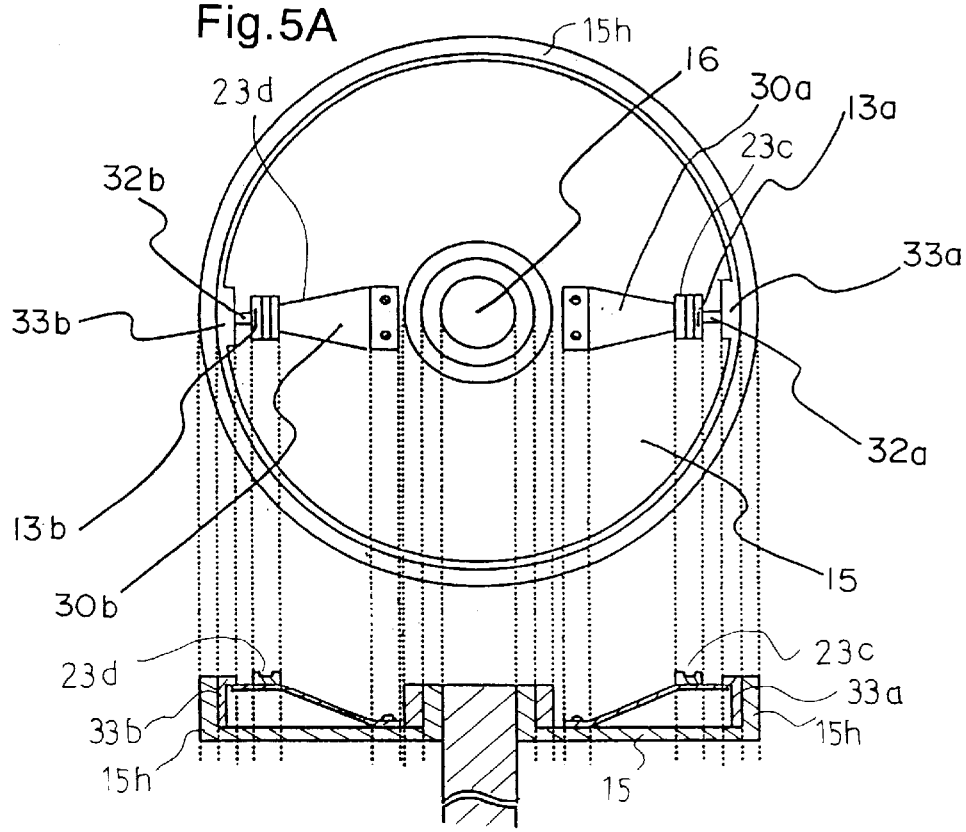
FIGS. 5A and 5B show examples of mounting magnetic heads on a turntable using long arm springs.
Figure 5B:
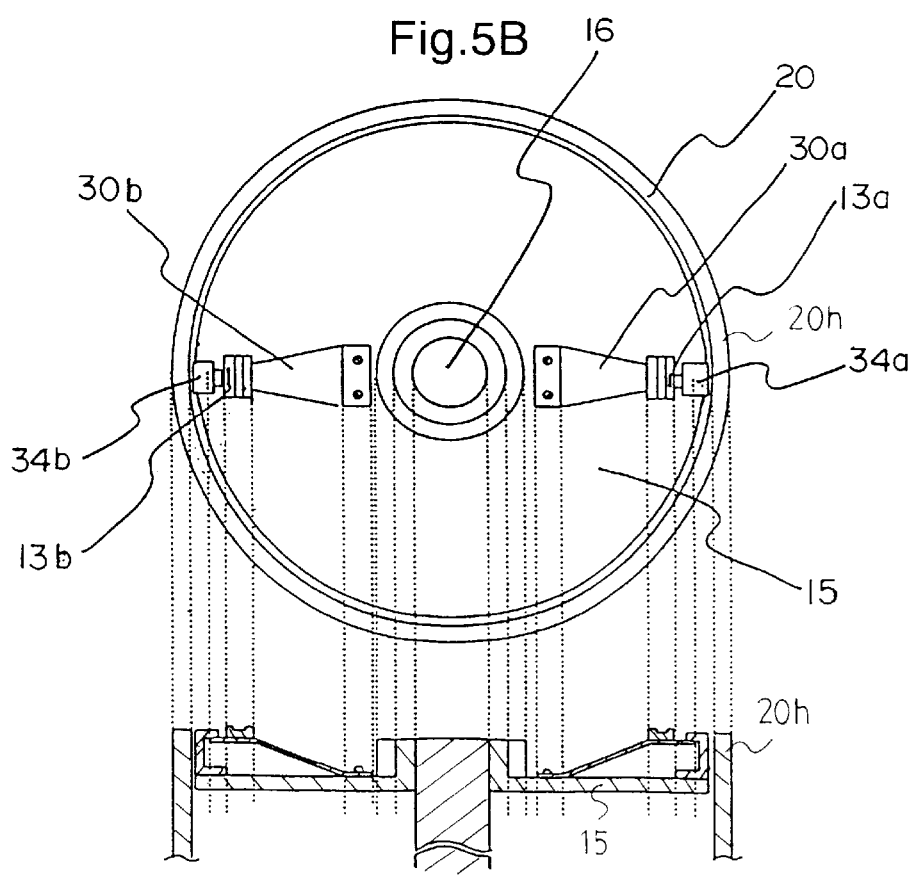

The turntable in Embodiment 2 is flat, namely edgeless, which marks the salient distinction from Embodiment 1. Instead, the turntable is surrounded by elongated frame edge 20h of rotary transformer holder 20 installed on apparatus base 21. Thus, the rotary transformer holder does not rotate. The cross sections illustrated in FIGS. 5A and 5B give the better understandings of this structure. Elongated frame edge 20h of the rotary transformer holder can be heightened or shortened. It can be set high enough to make contact with a magnetic card or set lower so as not to.

With regard to carriage base 189 provided to carry a magnetic card, its base surface 189b can be set lower than the top position of magnetic heads 13a and 13b or can be set slightly higher to make magnetic heads 13a and 13b contact with the cards depending upon purposes.

The purpose of setting the base surface 189b of the carriage base a little higher than the head top position is mainly to protect the magnetic heads from getting damaged or destroyed by the ends of a card if the carriage base runs out of control. By contrast, setting the base surface 189b of the carriage base a bit lower than the head top position helps maintain a certain distance between a magnetic card 1a and the base of the turntable 15, and remove dust brought in from outside along with the magnetic card and keep the magnetic heads from getting contaminated.

Unlike Embodiment 1, in which the magnetic surface of a magnetic card is in constant friction with the edge 15h of the rotating turntable 15, this embodiment takes effect particularly in using a thin magnetic film or a medium of low abrasion resistance for the card, or when the DC motor torque is insufficient.

Embodiment 3

Figure 11A:
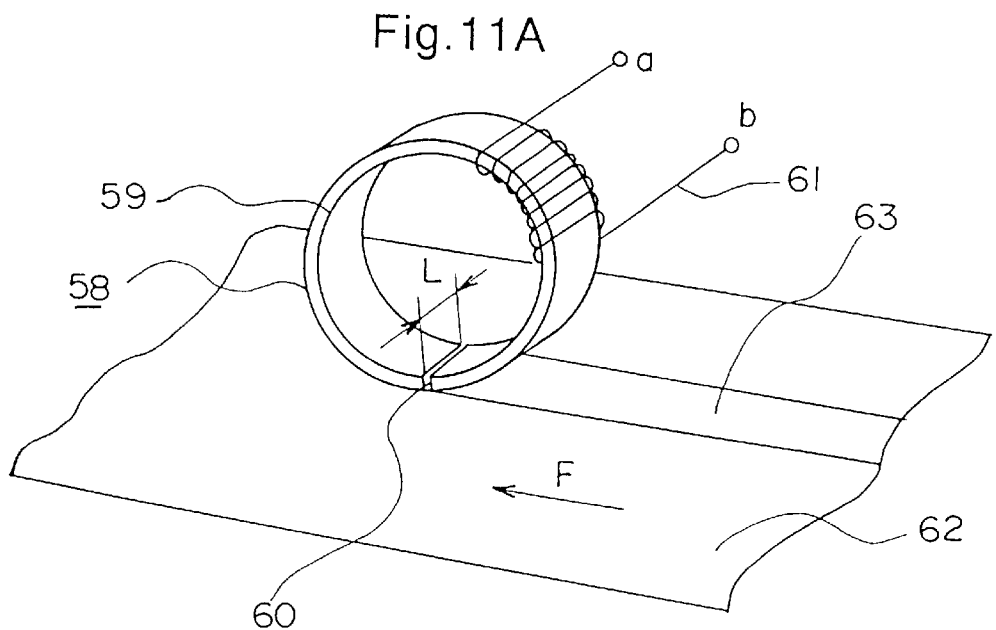
FIGS. 11A and 11B illustrate examples of using a magnetic head and its loci of the present invention.
Figures 1, 2, 3, 4, 11B:
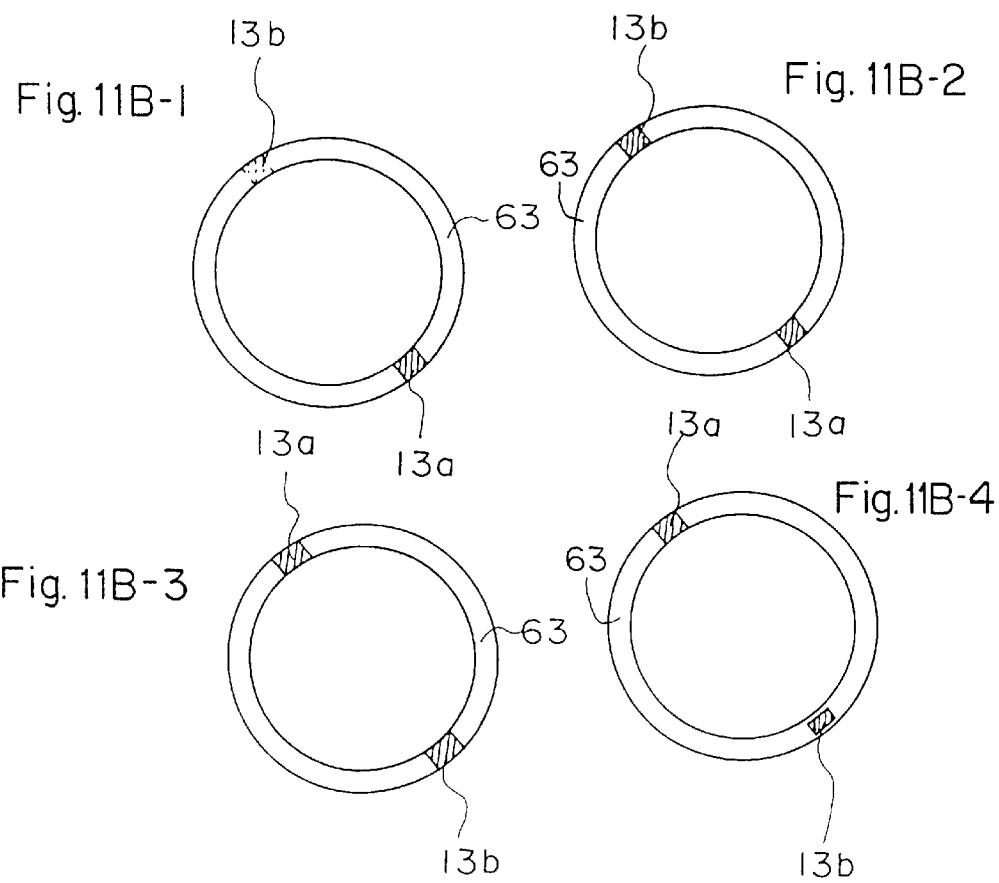

Referring now to FIG. 3, the method of protecting magnetic heads and the structure of the edge of a cylinder that works as a spacer are explained below.

Figure 3A:
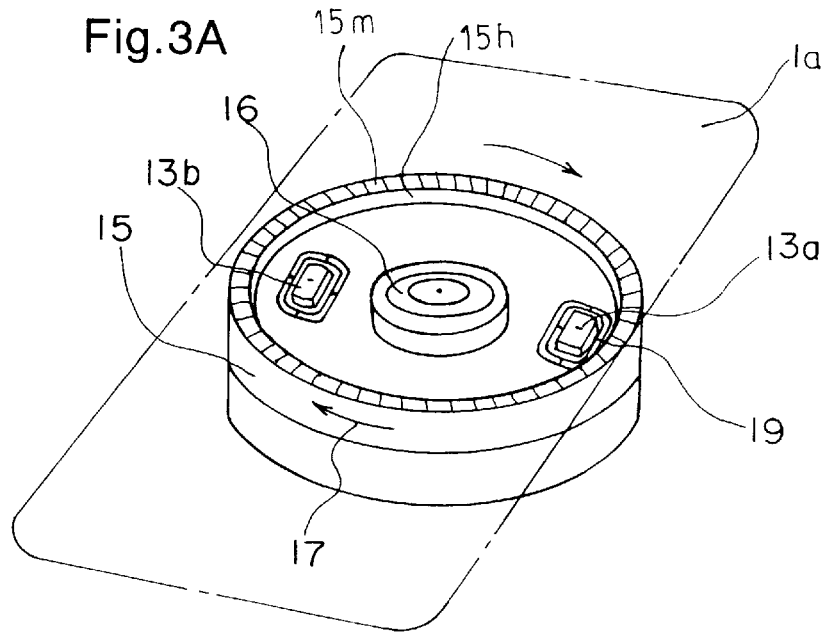
FIGS. 3A–3D show other examples of rotational mechanism of magnetic heads of a magnetic card reader.

FIG. 3A is a diagram that shows the rotation mechanism of magnetic heads for a magnetic card reader. Based on the structure of the turntable described with FIG. 1, a card flier is provided to edge face 15m, the part that makes contact with a magnetic card, of edge 15h of the turntable. The flier controls the flow of air generated near edge face 15m and generates the force with which to fly a magnetic card (in the direction of arrow E in FIG. 3B) from the edge face 15m of the rotating turntable 15. This mechanism helps reduce the friction among a magnetic card 1a and the edge 15h of the turntable 15 and the load of DC motor 22, therefore, greatly serves the purpose of prolonging the sliding life of recording media. As the peripheral speed of turntable 15 accelerates, the flying force to the magnetic card 1a grows in aerodynamic proportion.

Figure 3B:
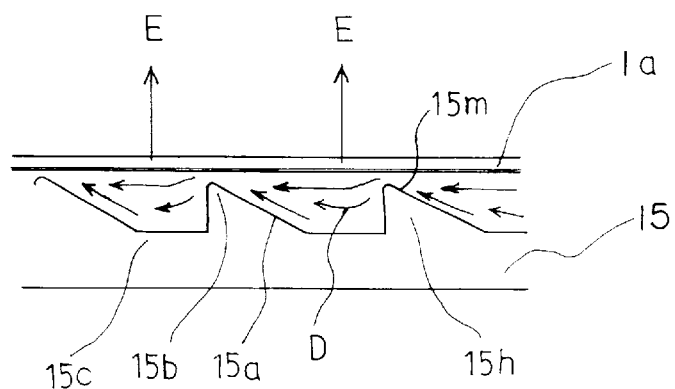
Figure 3C:
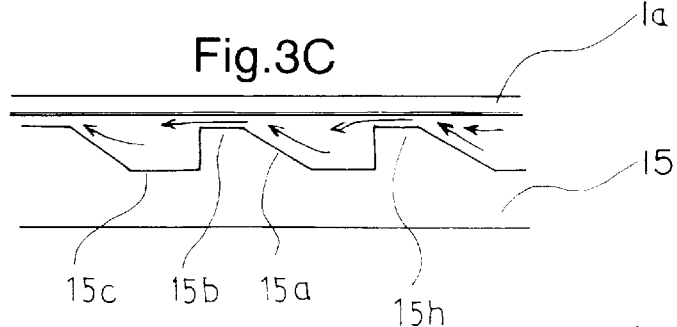
Figure 3D:
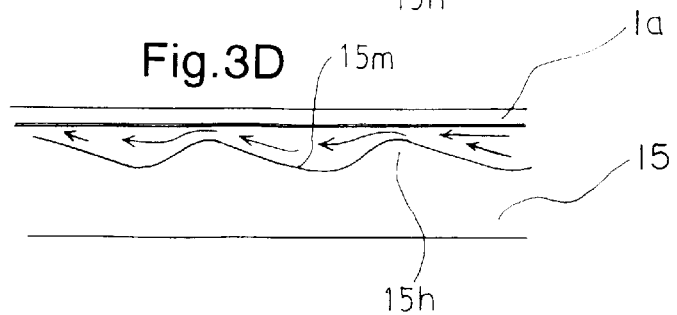

FIGS. 3B to 3D show the cross section of magnetic card 1a and edge 15h of the turntable 15. In FIG. 3B, where air is flowing in, the edge is slightly skewed 15a and the part with which a magnetic card makes contact 15b is rounded a bit so as not to damage the card. Then the edge is concaved 15c.

A serrated edge, having no flat bases, will also be very effective because it is this skewness that moves a magnetic card forward, in the direction of arrow E, through the air flow. The flying force is determined by the angle of inclination or the surface area of the skewed part of the edge, and the number of rotations of the turntable or the rotational speed of the turntable relative to a magnetic card. On the other hand, the flying distance is obtained by the balance between the own weight of a magnetic card that applies in the direction counter to arrow E and the force applied by the pressure mechanism. The edge face of the turntable is uniformly concaved and projected so that the flying force will be evenly applied onto a magnetic card.

The model in FIG. 3B, however, is advantageous if the start-up time of the turntable is short and thus a magnetic card will be up in the air in a short time. But if the rotational speed is low and the start-up time is long, the initial contacting time also becomes longer bringing a possible damage to the magnetic card. Moreover, a card tends to remain more or less touching the edge without completely flying throughout the operation. FIG. 3C therefore presents an improved model that eliminates the above problem. The top of the edge gets more flattened to prevent the surface of a magnetic card from getting damaged. The load friction is determined by balancing forces among the total area of flattened top 15b of edge 15h, the flying force, the dead weight of the magnetic card, and the pressure mechanism.

FIG. 3D gives another example of making the whole structure of FIG. 3B more smooth to rid the adverse effect that might be inflicted upon a card during contact.

Embodiment 4

Figure 4A:
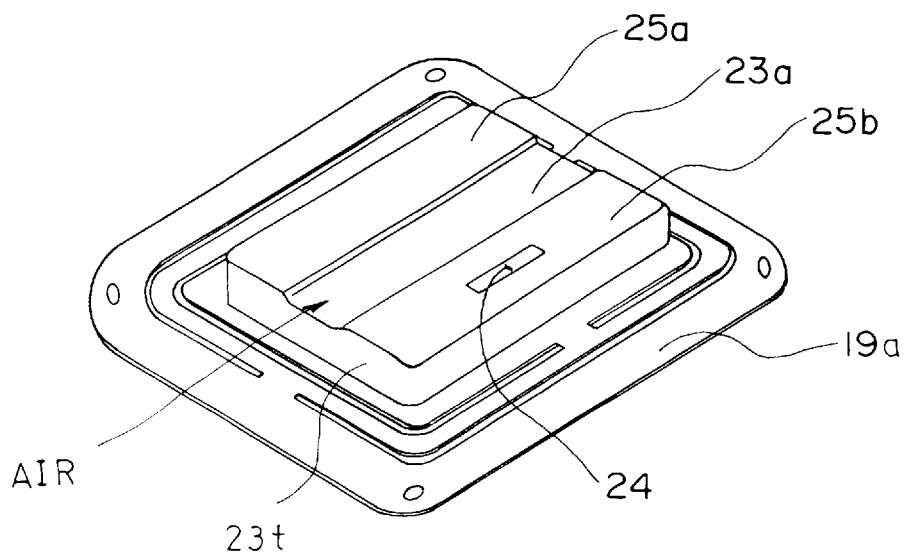
FIGS. 4A–4C depict examples of magnetic head assembly for a magnetic card reader.
Figure 4B:
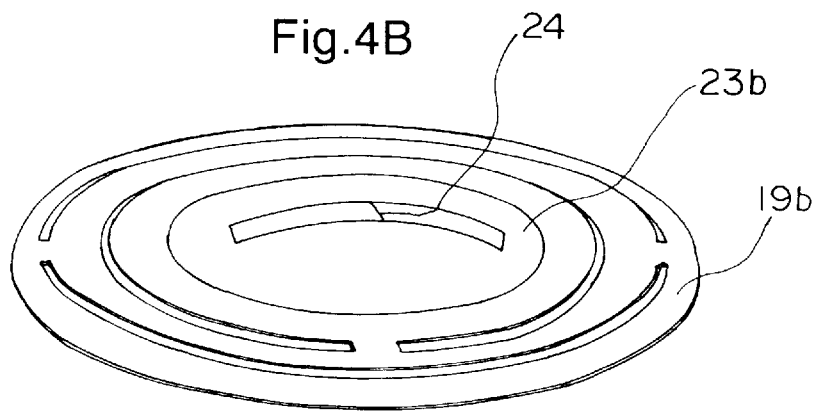
Figure 4C:
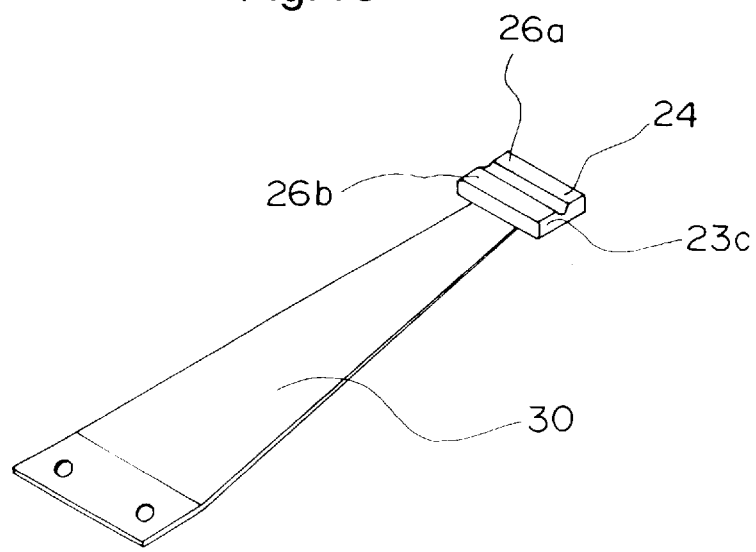

Referring now to FIGS. 4A to 4C, three types of a magnetic heads are enlarged upon below.

For all three types, magnetic heads are incorporated into sliders 23a, 23b, and 23c except head gap 24 which is exposed to make contact with a magnetic card.

Flat slider 23a shown in FIG. 4A and button-shaped slider 23b in FIG. 4B are mainly used for floppy disk drives. FIG. 4C is flying type slider 23c used for hard disk drives.

Flat-type slider 23a is a double-barrel type slider which is symmetrically divided into two contacting parts 25a and 25b to stay evenly balanced on a magnetic card. The surface areas of the slider are small to reduce the sliding friction. Head gap 24 is located outside the rotation shaft, in back of the center of one contacting parts 25b of the slider to distance itself from the air inlet. Therefore, even when front edge 23t of the slider begins to fly a bit, the distance between the recording surface of a magnetic card and the head gap is minimized.

Either square gimbal spring 19a or oval gimbal spring 19b of FIG. 4B will be used. Gimbal spring 19a is designed to make the two contacting parts 25a and 25b of the slider contact with the recording surface of a magnetic card with equal spring pressure. The gimbal spring is multi-dimensional in its movement. This versatility allows the magnetic heads to follow the movement of a magnetic card accurately. However, it is disadvantageous in that the tolerance for vertical movement is small. The contacting parts 25a and 25b are set slightly higher than edge 15h of the turntable in FIG. 1 and edge 20h of the rotary transformer holder in FIG. 2 in order to lift up a magnetic card. At the same time, a pressure pad pushes down on the magnetic card to absorb vibration or deviation which could be generated as magnetic heads rotate at a high speed. The function of a pressure pad is explained later.

The button-type slider shown in FIG. 4B has a rounded surface on top of which the head gap is positioned. This structure helps decrease the area that contacts with the recording surface of a magnetic card. Unlike the double-barrel type contacting parts 25a and 25b in FIG. 4A, which keep following the recording surface rather smoothly, a substantial amount of pressure is applied against the recording surface as this button-type slider 23b makes contact with it. Gimbal spring 19b of this example is more powerful in its elasticity than the previous one.

The model in FIG. 4C shows a flying type slider used for hard disk dives. Flying type slider 23c shares some of the structural characteristics with flat-type slider 23a in that they both have two contacting parts (26a and 26b in FIG. 4C) and in their head gap positioning (24 in FIG. 4C).

However, flying type slider 23c is attached onto the tip of thin long arm spring 30 with a flexure (not shown) made of composite metal steel, which permits the flying type slider to move in the directions of X and Y. The main feature of the long arm spring is its capability of moving in vertical direction Z freely. Thus its vertical motion can be set at a desired level.

A slider, a spring with a projection (32a, 32b, 32c, and 32d in FIGS. 5A and 5B), and magnetic heads 13a and 13b constitute a part of a magnetic head assembly that slides through the recording medium of a magnetic card.

It is also possible to rotate the magnetic heads at such a high speed that the magnetic heads keep flying on a magnetic card, using a flat-type or flying-type slider. For the double-barrel contacting parts, the design of a magnetic head slider for hard disk units will be readily adopted.

Embodiment 5

Embodiment 5 will focus on the structure of head support mechanism provided in a magnetic head assembly.

FIGS. 5A, 5B gives top views and cross sections of a magnetic head assembly being mounted on two types of turntables, one with an edge 15h (FIG. 5A) and the other without it (FIG. 5B). The top view and the cross section given in FIG. 5A illustrate the method of mounting magnetic head on turntable 15 with flying type sliders 23c and 23d connected to two long arm springs 30a and 30b, respectively. FIG. 5B shows the top view and the cross section of magnetic head being mounted on edgeless turntable 15. The magnetic head assemblies are composed of two flying-type sliders connected to long arm springs 30a and 30b.

The distance from the center of the head gap of magnetic head 13a to the center of rotation shaft 16 equals that from the center of the head gap of magnetic head 13b to the center of the rotation shaft. The line that runs straight through the center of each gap must pass the center of rotation shaft 16. The long arm springs are screwed or adhered on one end closer to the rotation shaft.

The outer ends of the long arm springs are secured in flying-type sliders 23c and 23d with a flexure (not shown). The long arm springs have projections 32a and 32b further outside of flying-type sliders 23c and 23d. These two projections 32a and 32b control the upward motion of the long arm springs by means of cylindrical stoppers, which in FIG. 5A represented as reverse L shaped stoppers 33a and 33b, just inside edge 15h of the turntable. The surfaces of flying type sliders 23c and 23d are set slightly higher than the edge of the turntable as shown in FIG. 5A. When a magnetic card has been inserted into the magnetic card reader, the magnetic head assembly will be set inside carriage base 189. As the pressure pad presses the magnetic card downward, the surfaces of flying type sliders 23c and 23d get pushed down by the magnetic card. At this point, projections 32a and 32b leave stoppers 33a and 33b for lower position, thus functioning as a leaf spring that performs up and down movement. The long arm springs therefore work as a cantilever spring, e.g. their outward motion is limited within a certain range by the two stoppers even if their elasticity has been reinforced.

FIG. 5B shows an example of using flat, edgeless turntable 15. Rather, rotary transformer holder 20 is modified as to make its outmost part elongated upward, thus forming edge 20h. Edge 20h is fixated on apparatus base 21. Attaching reverse L shaped stoppers thoroughly inside the rotary transformer holder will produce the same effect as the above example. Because a magnetic card is pressed against the surfaces of the flying type sliders, however, the clearance between the reverse L shaped stoppers and the projections becomes minuscule. It could result in a contact accident. To deal with this problem, U-shaped stoppers are set to the turntable instead of the above reverse L-shaped ones. That is, stoppers 34a and 34b attached to turntable 15 rotates together with magnetic heads 13a and 13b, which eliminates the risk of causing a contact accident between the stoppers and the projections.

The stoppers and projections employed for the long arm springs are unnecessary if a gimbal spring is applied.

Embodiment 6

Figure 6A:
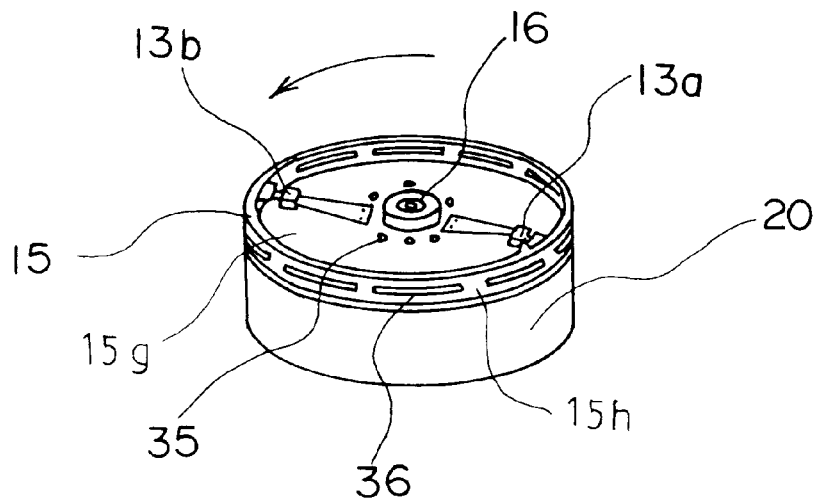
FIGS. 6A–6C show examples of attaching stoppers and cleaners to a turntable or a rotary transformer holder of this invention.
Figure 6B:
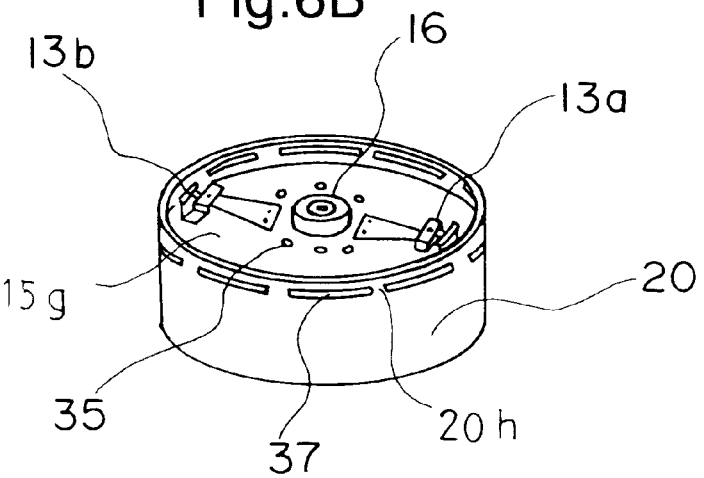
Figure 6C:
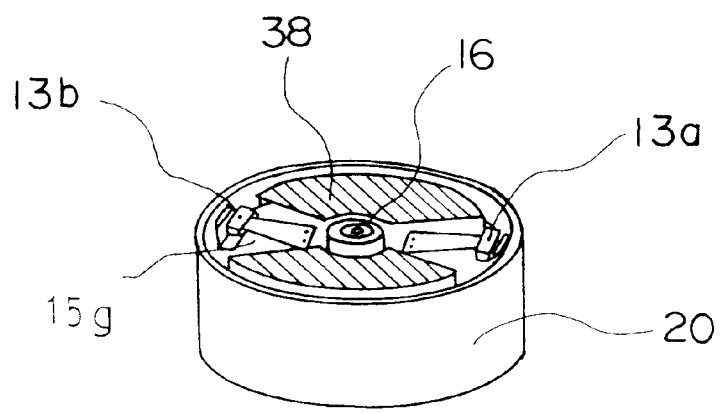

This embodiment gives methods of cleaning magnetic heads, and preventing dirt, dust or contaminants from getting accumulated on a turntable by making the best of air flow. FIGS. 6A to 6C illustrate the structure of a magnetic head assembly equipped with louvers and a cleaner on turntable 15 or on rotary transformer holder 20. FIG. 6A shows inlet holes 35 provided on base 15g of the turntable and outlet holes 36 located on the edge 15h. By contrast, FIG. 6B shows inlet holes 35 on base 15g of the turntable and outlet holes 37 located on edge 20h of the rotary transformer holder. In either case, magnetic heads 13a and 13b slide on the surface of a magnetic card to access data on the tracks. Magnetic powder, dust or dirt produced during contact or dirt or contaminants brought into the apparatus from outside could be accumulated on the turntable.

Removal of dirt, dust or contaminants from the turntable 15 involves the theory of air pressure. Air pressure at the center of a rotating body remains low while it gets higher out near the edge. As an inserted magnetic card travels over the magnetic head assemblies, the inside of the apparatus becomes airtight except a tiny clearance between the magnetic card and edge of the turntable 15. This holds true for both examples in FIG. 1 and FIG. 2.

The most effective method can be to let a larger amount of air flow in from beneath the turntable 15 by providing several inlet holes 35 around rotation shaft 16 of the turntable 15. The air is then let go of outlet holes 36 on the edge of the turntable or of outlets 37 on the edge of the rotary transformer holder 20. The dust or dirt that may have residued inside the turntable 15 can be removed in this way. Although the size of these outlet holes is arbitrary, it would be more effective to make them larger. The outlet holes presented in this example are rectangular. To prevent foreign matters from flowing in along with the air, an air filter of coarse cloth can be attached to the inlet holes. Any contaminants of substantial size can be stopped there.

FIG. 6C illustrates a more powerful method of removing dirt or dust attached to a magnetic card 1a and magnetic powders or contaminants that are produced during contact. Cleaner 38 using a cloth liner is attached to the section designated with oblique lines on the base of the turntable 15, in between two magnetic heads 13a and 13b. This type of liner has come to be widely used inside a cartridge for 3"5 floppy disks, so as to make a light contact with the surface of magnetic recording media.

In case of Embodiment 1 in FIG. 1, it is desirable to set the cleaner 38 in such a way it slightly touches the surface of a magnetic card 1a when the pressure pad pushes down on it. The cleaner can also be applied to Embodiment 2 in FIG. 2 provided that the cleaner would not touch rotary transformer holder 20 that surrounds the turntable 15.

It is highly recommended that the cleaner 38 be detachable to replace it with a new one for wear after repeated use. Attaching a cleaner 38 to the turntable 15 using screws is one possible way.

This example can be applied not only to magnetic card readers but also to optical card readers which is treated later.

Embodiment 7

Embodiment 7 elaborates the structure of a rotary transformer which is indispensable to a magnetic head assembly.

Figure 7A:
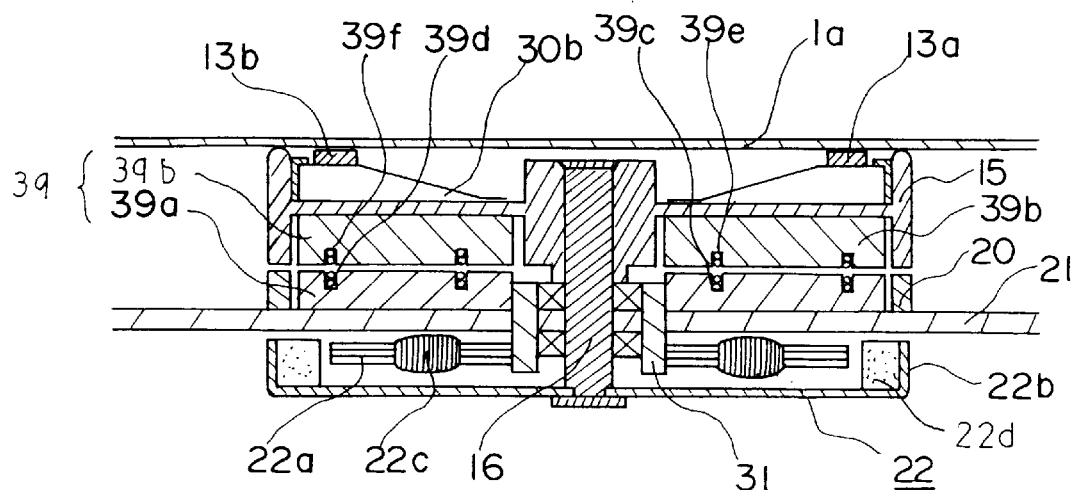
FIGS. 7A–7C depict examples of mounting a rotary transformer on the magnetic card reader of the present invention.
Figure 7B:
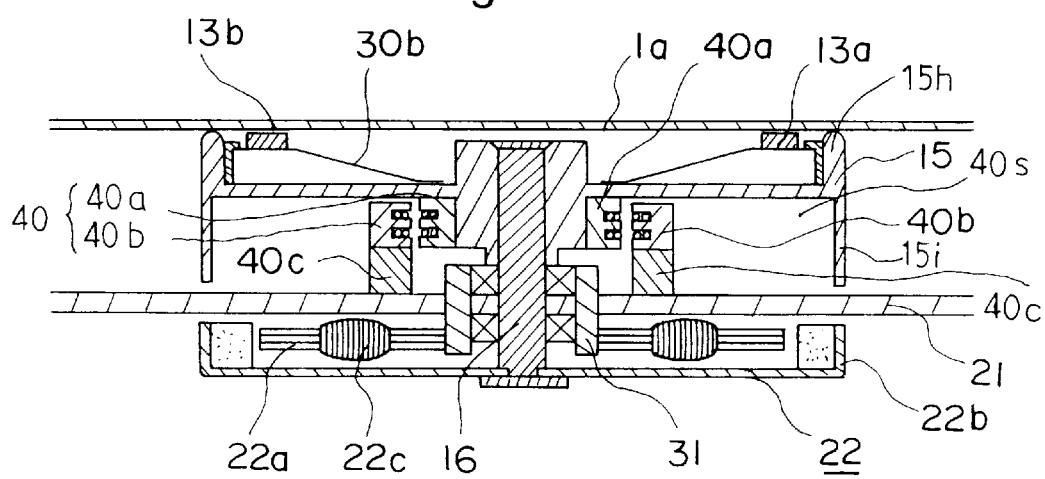
Figure 7C:
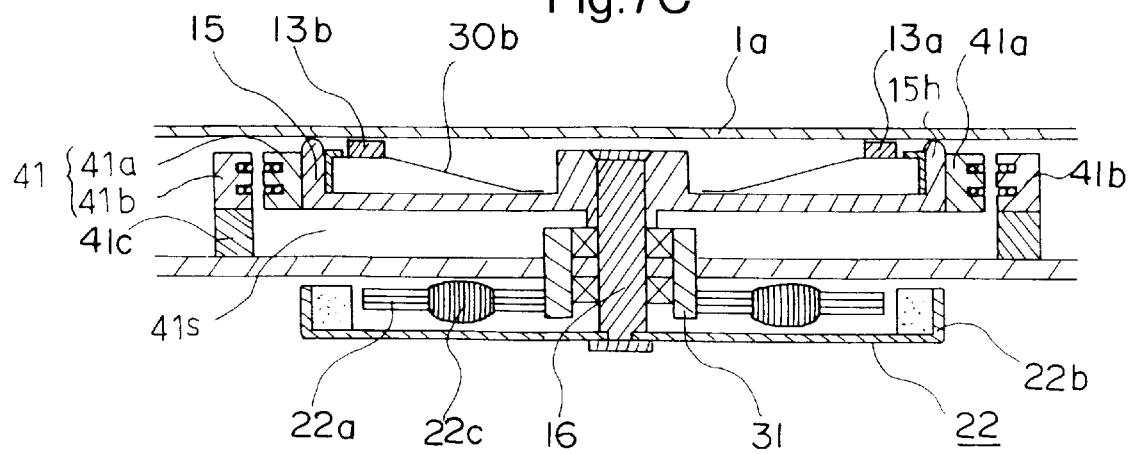
Figure 8A:
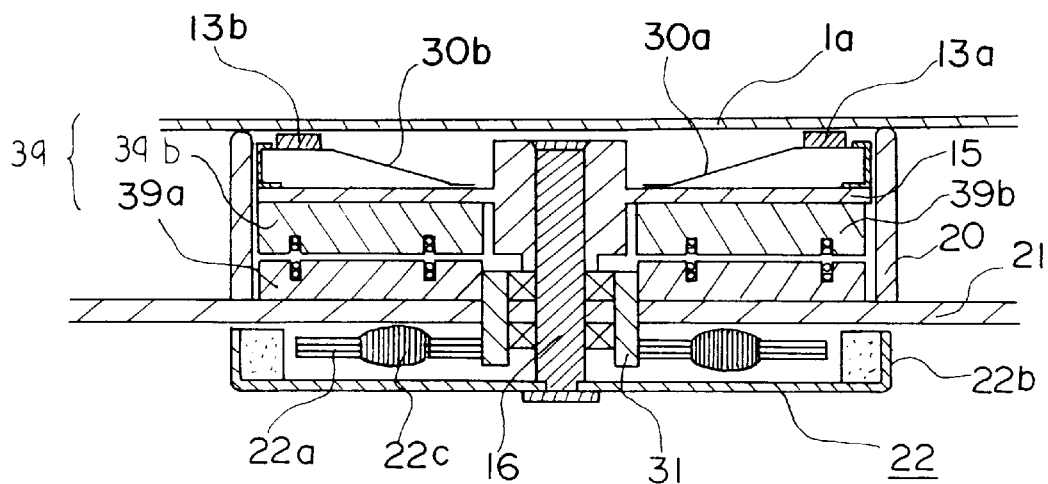
FIGS. 8A–8C depict other examples of mounting a rotary transformer on the magnetic card reader.
Figure 8B:
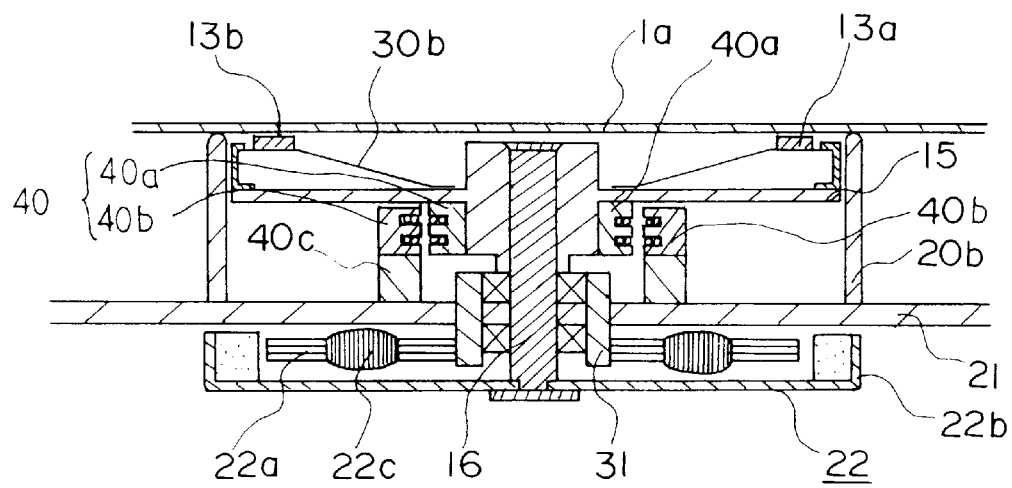
Figure 8C:
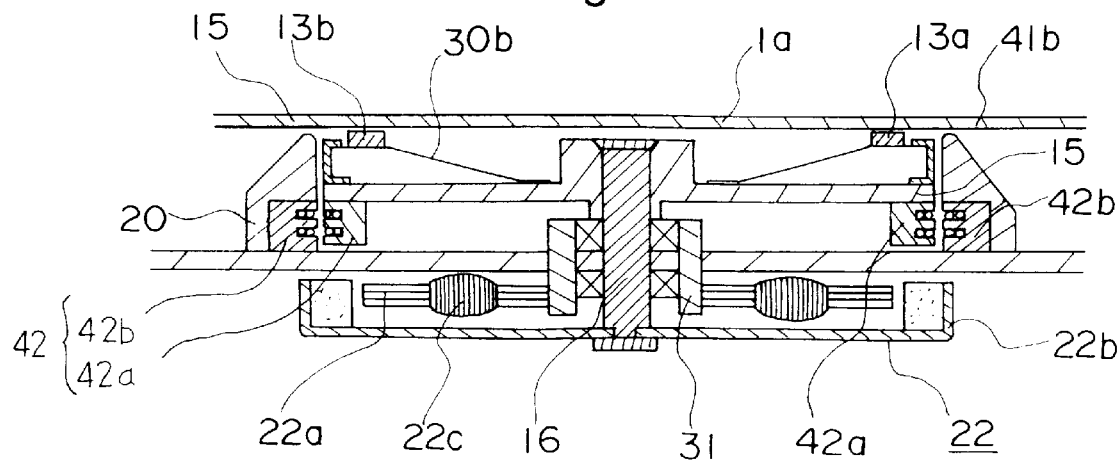

The diagrams shown in FIGS. 7A to 7C and in FIGS. 8A to 8C represent cross sections of a rotary transformer mounted on a magnetic card reader.

FIG. 7A represents an example of using rotary transformer 39 divided into two parts. One is primary core 39a secured onto apparatus base 21 and the other is secondary core 39b which is attached to the back of turntable 15.

Both primary core 39a and secondary core 39b are the disks made of magnetic materials such as ferrite. Dug on the surface of primary core 39a are two concentric winding grooves 39c and 39d. Also, two concentric winding grooves 39e and 39f are dug on the surface of secondary core 39b directly facing the surface of the primary core. These four wire-wound grooves are the basics of a transformer. The theory of a rotary transformer is explained in greater details later with reference to FIGS. 9A to 9C.

This type of transformer can be characterized in that signals can be sent and received between windings physically separated to primary core 39a and to secondary core 39b. It is typically applied to such apparatuses as a video tape recorder (VTR).

Recording current or reproducing signals are transmitted between two magnetic heads 13a and 13b on turntable 15 and the read and write circuits on a magnetic card reader via the above mentioned windings. Although secondary core 39b in FIG. 7A is using up the whole space back of the turntable 15, it can be arranged out near the edge of the turntable 15 to provide inlet holes 35 around the rotation shaft 16 as shown in FIG. 6A and 6B.

Another advantage of a divided rotary transformer facing each other is that the height can be lower-adjusted.

Supported by baring 31 attached to apparatus base 21, rotation shaft 16 of turntable 15 rotates with rotor 22b of DC motor 22. When phase current reaches driving coil 22c of stator 22a, magnetic fields are generated toward magnet 22d of rotor 22b. Because the magnet has been already magnetized circumferencially, magnetic flux leaked from these magnetic circuits of the motors may affect the signaling circuit of rotary transformer 39. To shield magnetism, iron is used for the apparatus base 21, and magnetic material or iron is used for the turntable 15 and the rotary transformer holder 20 to shield leakage flux. Although not shown in this example, different types of shielding can be added to space 40s created inside the turntable 15.

FIG. 7B shows a method of shielding the turntable 15 having edge 15h. A cylindrical rotary transformer 40 is set around rotation shaft 16. Secondary core 40a concentrically rotates with the rotation shaft 16 whereas primary core 40b is secured on fixed stand 40c. A rotary transformer according to this example can be smaller in its diameter but must be higher in its height compared to the example in FIG. 7A. In addition, providing an edge both under 15i and on 15h the turntable 15 will dispense with a rotary transformer holder 20.

FIG. 7C illustrates cylindrical rotary transformer 41 set around the turntable 15 having edge 15h. Primary core 41a is wound around edge 15h of the turntable 15 and secondary core 41b is mounted on fixed stand 41c. This example is advantageous in that the apparatus can be shortened because rotary transformer 41 can be set as high as the turntable 15. Iron is used for apparatus base 21 to shield magnetism. It is possible to add some new shielding to space 41s under the turntable.

FIGS. 8A and 8B show flat turntable 15 surrounded by rotary transformer holder 20. The rotary transformer shown in FIG. 8A is the same as the one presented in FIG. 7A. It is divided into two parts: one is primary core 39a secured on apparatus base 21 and the other is secondary core 39b attached to the back of turntable 15. Although secondary core 39b is designed to use up the whole space under the turntable 15, it can be arranged toward the end of the turntable 15 to provide inlet holes 35 near rotation shaft 16.

This dual-type rotary transformer 39 of this example renders the apparatus shorter, therefore, more compact. Iron can be used for the apparatus base 21 and iron or magnetic material can be used for the turntable 15 and the rotary transformer holder 20 to shield leakage flux.

FIG. 8B shows flat turntable 15 and cylindrical rotary transformer 40 around rotation shaft 16. Primary core 40a is set to concentrically rotate with the rotation shaft 16 whereas secondary core 40b is mounted on fixed stand 40c. The diameter of this type of a rotary transformer 40 can be shortened. The characteristics of magnetic shielding is the same as those explained in FIG. 7B.

The example given in FIG. 8C is analogous to that of FIG. 7C, in that primary core 42a is incorporated into rotary transformer holder 20 and secondary core 42b is set under the turntable 15. Although it is not shown in this diagram, it is also possible to set the secondary core to the edge of the turntable 15.

For the card reader of the present invention, a rectangular magnetic card supported by a pad travels to the head assembly. The head, which writes data on the recording tracks or reads data from it, transmits the read and write signals via the rotary transformer.

Moreover, the leakage flux from the driving motor of the head assembly is shielded, thereby eliminating any irregular, unwanted damage during data read and write.

Embodiment 8

With reference now to FIG. 9, the operation and the circuitry of a rotary transformer are given in-depth look hereinbelow.

Figure 9A:
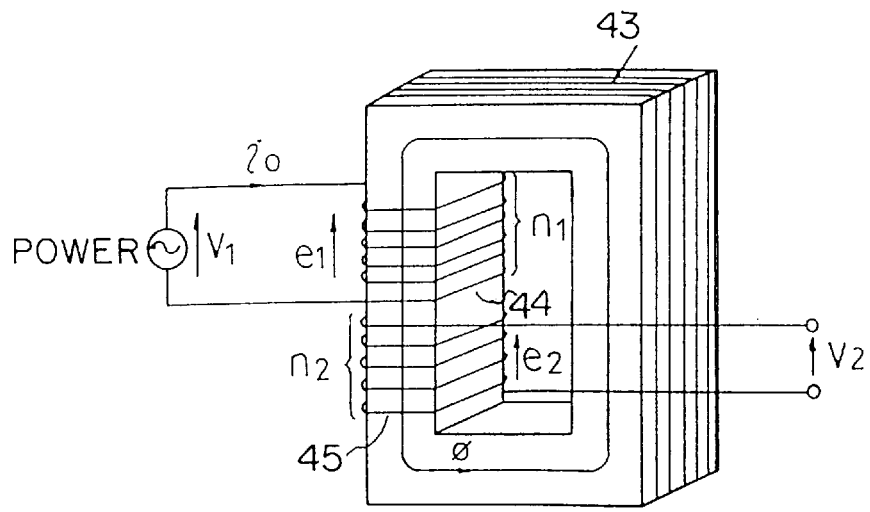
FIGS. 9A–9C show the circuitry of a rotary transformer.

FIG. 9A gives the basic concepts of a transformer. The transformer consists of a magnetic material referred to as iron core 43 and two windings wound separately on it. Of the two, the one connected to power source is called the primary winding or primary coil 44. The other connected to load is called the secondary winding or secondary coil 45.

When the terminal of secondary winding 45 is open, an alternating current generates magnetomotive force as it runs through the primary winding, thereupon generating magnetic flux within the iron core. The magnetic flux also alternates simultaneously with alternating current. The ratio between the electromotive forces that induce electricity to the primary winding $e_1$ and to the secondary winding $e_2$ is given, if loss is ignored, by the equation $$e_1/e_2 = E_1/E_2 = n_1/n_2 = a \tag{1}$$

where, $n_1$ and $n_2$ denote the number of turns of the primary winding and the number of turns of the secondary winding, respectively.

$E_1$ and $E_2$ in the above equation indicate the primary induction voltage and the secondary induction voltage. They are the effective values of $e_1$ and $e_2$, respectively, and "a" denotes the ratio of the number of turns between the primary and secondary windings. Clearly, the induction electromotive force ratio equals the number of turns ratio. Current does not flow through the primary winding unless the primary supply voltage V1 (the effective value of the alternating current) is supplied to the primary winding. Because the primary supply voltage $V_1$ roughly equals the primary induction voltage $E_1$ the ratio between the primary supply voltage $V_1$ and the secondary load voltage $V_2$ is obtained by $$V_1/V_2 = E_1/E_2 = n_1/n_2 = a \tag{2}$$

Voltage is thus transformed based on the number of turns ratio.

Figure 9B:
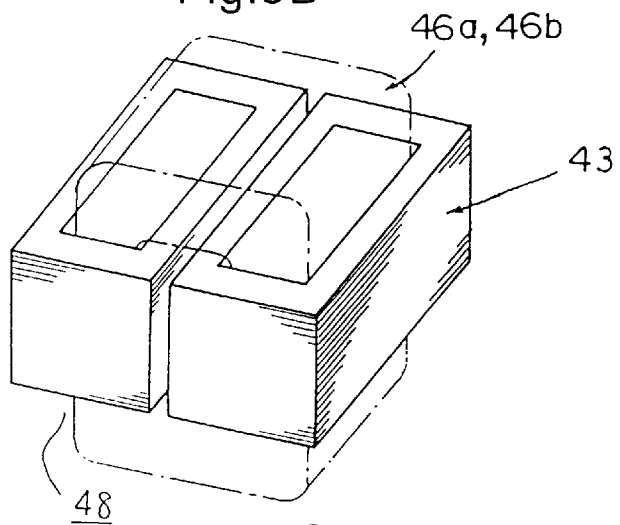

FIG. 9B is a description of a shell-type transformer commonly used for power source or communications equipment. The transformer has a structure in which the primary and secondary windings 46a, 46b are layered and an iron core 43 is formed around the primary and secondary windings 46a, 46b.

Figure 9C:
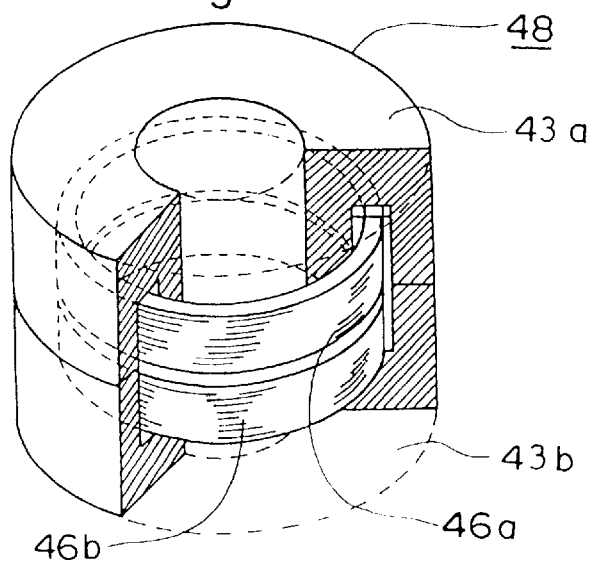

FIG. 9C shows the basic structure of a shell-type rotary transformer 48, consisting of primary core 43a and secondary core 43b. Looped up in circle, the windings 46a and 46b are covered up entirely. The primary core 43a and the secondary core 43b in this diagram correspond to primary core 39a and secondary core 39b shown in FIG. 7A. The two grooves, groove 39c on the primary core 39a and groove 39e on the secondary core 39b, are dug so as to exactly face each other. The windings are applied to these upper and lower grooves (39c, 39e), which correspond to the above-mentioned windings 46a and 46b.

Figure 10A:
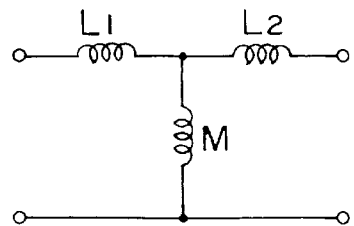
FIGS. 10A–10E are circuit diagrams that show the operation of a rotary transformer.
Figure 10B:
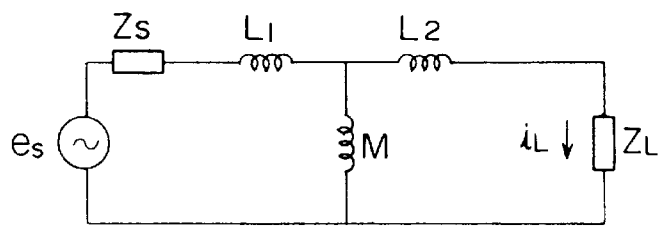
Figure 10C:
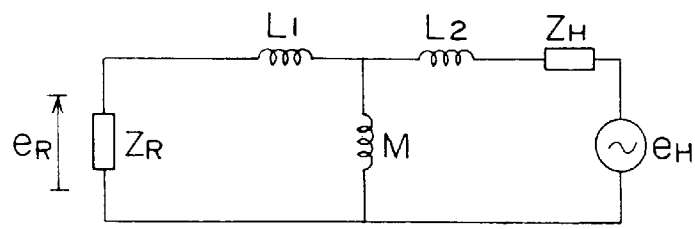

FIGS. 10A to 10C are the equivalent circuits of a transformer, where $L_1$ and $L_2$ denote leakage inductance and M denotes excitation inductance. The equivalent circuit in FIG. 10A has four terminals. FIG. 10B indicates an equivalent circuit for write operation. Signal source $e_S$ is connected to the primary winding and load impedance $Z_L$ is connected to the secondary winding of the equivalent circuit in FIG. 10A. $Z_S$ here denotes the internal impedance of signal source $e_S$. The current $i_L$ running the load can be obtained by the expressions $$i_L = e_S \cdot Z_M / (Z_1 \cdot Z_2 + Z_1 \cdot Z_M + Z_2 \cdot Z_M) \tag{3}$$

$$Z_1 = Z_S + j\omega L_1 \tag{4}$$

$$Z_2 = Z_L + j\omega L_2 \tag{5}$$

$$Z_M = j\omega L_M \tag{6}$$

Being frequency dependent, the transmission characteristics are determined by the values of $Z_1$, $Z_2$, and $Z_M$. However, only alternating signal composition is transmitted because the real part of $Z_M$ is null or almost negligible.

FIG. 10C is an equivalent circuit for data read. Signal source $e_H$ is connected to the primary winding and load $Z_R$ is connected to the secondary winding. Voltage $e_R$ that generates at both ends of the reproducing load $Z_R$ is then given by $$e_R = e_H \cdot Z_R / (Z_1 \cdot Z_2 + Z_1 \cdot Z_M + Z_2 \cdot Z_M) \tag{7}$$

The transmission characteristics in this case are also highly frequency dependent, thus resulting in transmitting only alternating composition.

Figure 10D:
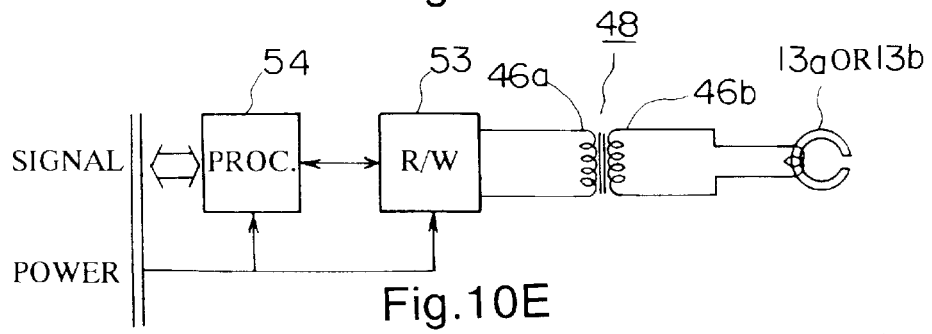

FIG. 10D gives the fundamentals of read/write circuit configuration for a magnetic card reader in accordance with the present invention. Magnetic head 13a or 13b is connected to secondary winding 46b of rotary transformer 48 while primary winding 46a is connected to read/write circuit 53. (Explanation of magnetic head components such as terminating resistors is omitted here.) The read/write circuit is connected to signal processor 54. Signal processor 54 converts data (mostly Non Return to Zero data) input via an interface connector and clock signals into modulation code such as Modified Frequency Modulation (MFM), 2–7 Run Length Limited code (RLL), 1–7 RLL, or PRML by means of the internal modulation circuit. The converted modulation code is then output to the read/write circuit 53. Conversely, the signal processor demodulates the modulation code sent from the read/write circuit 53 to the original NRZ data and clock signals.

Upon receiving the modulation code from signal processor 54, the read/write circuit 53 converts the code into write current pulse before sending it to primary winding 46a. From the primary winding 46a, the pulse, which is output as the read signal, further runs through an amplifier, low-pass filter, and differentiator, to output the signals converted to the modulation code to signal processor 54.

In the above example, in which read signal from magnetic head 13a or 13b is directly input to read/write circuit 53 via secondary winding 46b and primary winding 46a, noise from the DC motor 22 shown in FIGS. 7A to 8C or mechanical noise outside a magnetic card reader can enter the path between magnetic heads 13a or 13b and the read/write circuit 53.

Figure 10E:
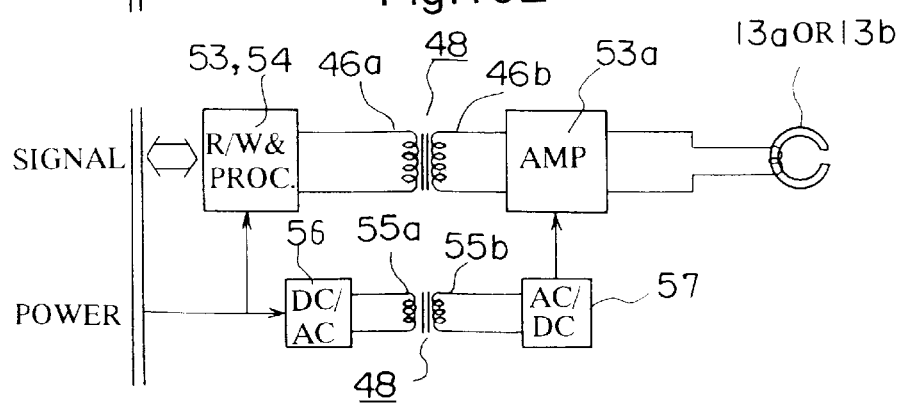

Thus, FIG. 10E shows another example of circuitry where amplifier 53a is installed between magnetic head 13a or 13b and secondary winding 46b. Greatly amplified read signal is input to the amplifier inside the read/write circuit 53 through rotary transformer 48. Amplifier 53a is activated by positive direct current voltage supplied from power source. However, it cannot be powered via cable because it is mounted on the turntable 15 shown in FIGS. 7A to 8C along with magnetic heads 13a and 13b. Hence, it is necessary to come up with a new supply method using a rotary transformer.

Rotary transformer 48 in FIG. 10E therefore is augmented with new primary winding 55a and secondary winding 55b. The primary winding 55a is connected to DC-AC converter 56 that converts direct current into alternating current, and secondary winding 55b is connected to AC-DC converter 57 which converts alternating current into direct current. The positive DC voltage generated at AC-DC converter 57 is then supplied to amplifier 53a.

Depending upon the capacity of power supply and the circuit configuration, the read/write circuit 53 can, entirely or partially, be mounted on the turntable 15 besides an amplifier 53a.

Embodiment 9

FIGS. 11A and 11B show a primary concept of a magnetic head. There are two types of magnetic heads for a magnetic card reader. One is designed only to read the data stored on a magnetic card while the other serves for both data reading and writing. In using only one magnetic head, a dummy magnetic head can be also mounted on the turntable 15 to prevent the turntable 15 from making irregular rotation. The dummy magnetic head 13b, being identical in its size and shape, is placed to counterbalance the actual magnetic head. Thus electrically flawed magnetic heads can be used as a dummy head provided that the mechanical properties are normal. Or a balancer that counterweighs the actual magnetic head and that produces friction equivalent to that between the actual magnetic head and a magnetic card 1a can be utilized.

In mounting two magnetic heads on the turntable, they must be aligned in such a way that the distance from the center of each head gap to the rotation pivot must be exactly the same on the linear line that passes through the center of the rotation shaft 16. To be precise, there must be no eccentricity at the rotation shaft 16, and the center of loci on the recording tracks made by the two magnetic heads on a magnetic card 1a must be the same.

The combination of two magnetic heads to be mounted is threefold: both magnetic heads 13a, 13b are capable of data reading and writing, one is for data read and the other for data write, and both two are for data read.

With reference now to FIGS. 11A and 11B, the basic concept of a magnetic head and the loci of recording tracks of the present invention is enlarged upon hereinbelow. Ring-shaped magnetic head 58 (magnetic heads 13a and 13b in FIG. 1) has head gap 60 at one end of its head core 59, around which head coil 61 is wound.

When a write current pulse output from read/write circuit 53 in FIGS. 10D and 10E to "terminal a" through "terminal b" of head coil 61 via rotary transformer 48 generates magnetic flux at head gap 60, data write is performed on recording medium 62. On this example, magnetic head 58 is fixed while magnetic medium 62 travels in the direction of arrow F at a predetermined speed. When data has been continuously written, recording track 63 equivalent in its width to the head gap (L) is formed. Although the recording track becomes actually slightly wider than the head gap, detailed technicality is not herein set forth.

FIG. 11B demonstrates the loci formed on the recording tracks when a magnetic head rotates with rotation shaft 16 as the pivot. Diagram (1) depicts a locus made when only one magnetic head 13a performs data reading and writing, e.g., the other one 13b is a dummy magnetic head. A good magnetic head 13b can be used as a dummy head for backup if the actual magnetic head 13a should electrically go down for some reason. However, to achieve this method, a circuitry necessary for data read and write, including a rotary transformer, must be readily available. The judgement of failure occurrence and the switching of magnetic heads are made by a control circuit (not shown) outside of a magnetic card reader.

Diagram (2) indicates that two magnetic heads 13a and 13b perform data read and write. In this method, it is imperative that the gap width, length, and the inclination against recording tracks be identical for both magnetic heads 13a and 13b. This method is advantageous in cutting rotational delay over the previous method, because data can be written in or read from with a magnetic head located closer to a particular sector on the tracks to be accessed. Moreover, two magnetic heads render simultaneous recording possible, and in addition, the data written with one magnetic head can be read by the other in half-a-turn wait instead of one full turn of the tracks.

Diagram (3) depicts the dual-purpose thin-film heads used for hard disk units. They are two-in-one type of magnetic heads consisted of a write-only thin-film head and a read-only thin-film head. The head core 59, head gap 60, and head coil 61 of the write-only thin-film head are made of thin films and those of the read-only thin-film head are made of magnetoresistance effect elements (hereinafter referred to as the MR head). The width of the magnetoresistance effect element (sensor width) of the MR head is set narrower than the gap width of the write-only head. If the maximum gap width of the write-only thin-film head is $L_{W1}+\alpha$, minimum width $L_{W1}$, the maximum sensor width of the MR head $L_{W2}+\beta$, its minimum width $L_{W2}$, the maximum deviation between the two thin-film heads $\gamma$, the maximum error from the center of a desirable track obtained by adding the estimated error from the pivot of two thin-film heads, track deviation of the recording medium due to temperature and humidity characteristics, and rotational precision is $\delta$, and the central distance from one track to the next track is $L_p$. then the expressions of applicational conditions will be $$L_{W1}+\alpha+\delta+<=L_p \quad (8)$$

$$(L_{W2}+\beta+\gamma/2+\delta<=L_{W1}/2 \quad (9)$$

In the worst case, the loci on two adjoining tracks may overlap. This does not pose any problem because data on the overlapped loci will not be read due to narrow sensor width of the MR head.

Diagram (4) represents two magnetic heads, of which 13a is write-only and 13b is read-only. The expressions (8), (9) of applicational conditions given in the previous example hold true here as well. The conditional requirement is somewhat more flexible compared to the above example of diagram (2), where magnetic heads must have exactly identical head gaps. In addition to the thin-film write-only magnetic heads and MR read-only magnetic heads, conventional ferrite magnetic heads will well serve the purpose for both write-only and read-only magnetic heads. When a recording medium with high magnetism is used, a MIG head can be used to reduce the flux saturation at the end of a magnetic head gap by applying a highly permeable thin-film substance to the gap of the write-only and read-only magnetic heads.

Embodiment 10

In conventional magnetic disk units, including hard disk or floppy disk drive units, data is written in or read from the tracks of a recording medium which rotates at a predetermined speed, forming concentric tracks at an equal pitch. High track density and high bit density are the keys to expanding the storage capacity. The former is achieved by increasing the number of recording tracks per recording medium by narrowing track pitch and track width whereas the latter is achieved by increasing data recording capability per track.

Except for the MR heads previously discussed, when a conventional magnetic head is used as a read head, the reproduction output voltage depends logically on the rotational speed of the recording medium relative to that of a magnetic head. More specifically, the reproduction output voltage increases towards the outside tracks while it reduces towards the inside tracks due to the lowering relative speed. The reliability of data reproduced with a magnetic disk unit is typically expressed with the error rate, up at least to $10^{-9}$. However, to obtain the error rate, the ratio between the signal and noise (S/N), e.g., mechanical noise or medium noise versus reproduction output voltage, must be 28 decibel or more. Thus the upper limits of the track density and bit density will be determined at the innermost track, where the ratio between the noise and signal is the hardest to obtain. Further, writing data at a preset clock frequency on a recording medium rotating at a certain speed causes the bit density to get higher on the inside tracks than on the outside tracks.

For the magnetic card reader of this invention, the relative speed between the magnetic head and recording medium can be kept consistent irrespective of the positions of tracks, thus enabling data to be reproduced from any tracks on a magnetic card with high reliability.

Figure 12A:
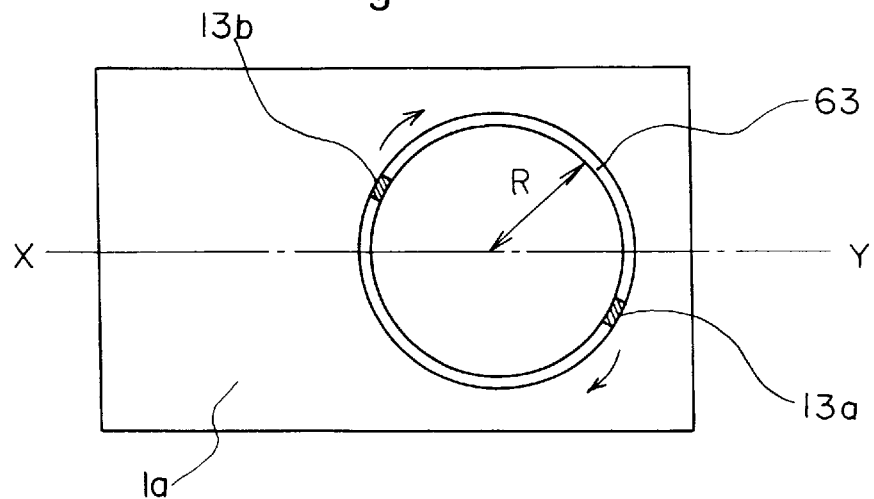
FIGS. 12A–12C depict the recording tracks on a card for the card reader of the present invention.
Figure 12B:
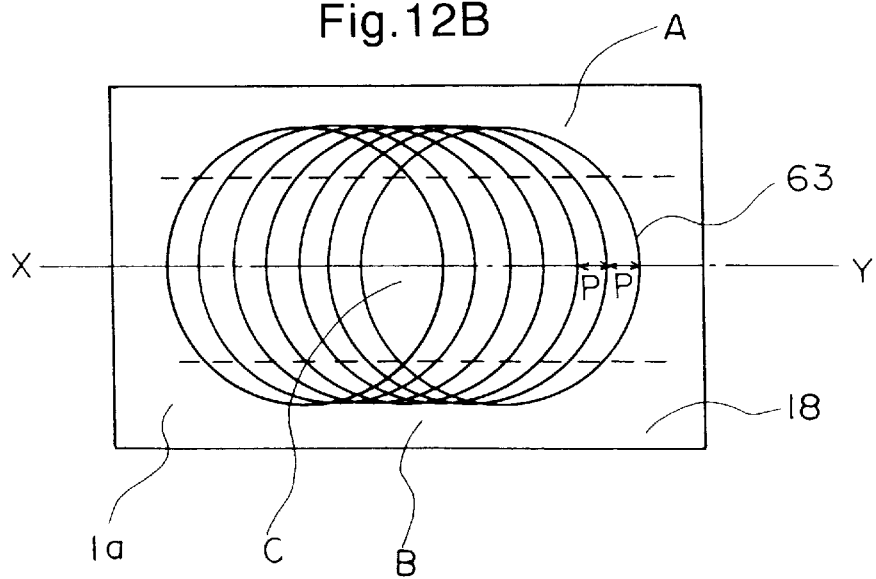
Figure 12C:
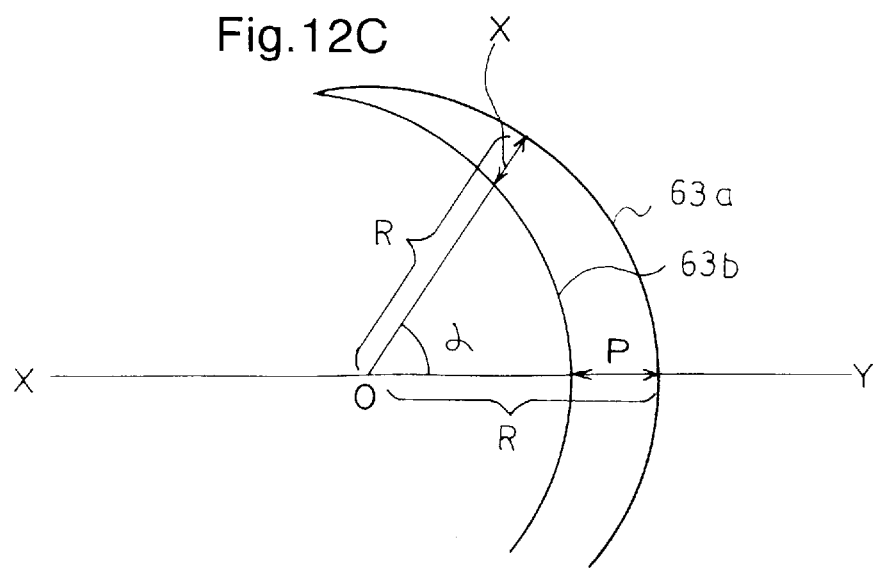

Referring now to FIGS. 12A to 12C, the method of storing data on a magnetic card according to the present invention is elaborated. FIG. 12A shows a locus of a track formed with either one or two magnetic head when data is written on the surface of a recording medium, magnetic card 1a. The center of revolution of both magnetic heads 13a and 13b must pass the horizontally center line (X-Y) of a magnetic card 1a. In addition, radius R of recording track 63 is set to be less than half of the vertical length of a magnetic card.

The reason for setting the radius R of a recording track less than half the vertical length of a magnetic card can be explained by the width of card side guide 187, card support guides 187a and 187b attached to a carriage base 189 of feeding mechanism 186, which will be discussed later with FIGS. 27A to 27C. It is also preferable not to use up the whole area of a magnetic card as the recording surface for the ends of a card can be damaged or contaminated when handled with hands.

FIG. 12B illustrates recording tracks with radius R by moving magnetic head leftward relative to magnetic card 1a at the same pitch (P). When multiple of recording tracks have been formed, technically non-readable areas A and B are created both at the top and the bottom of the magnetic card.

FIG. 12C is a magnified diagram of center lines 63a and 63b of two adjoining recording tracks. As a magnetic head moves farther from the horizontal center line X-Y, the center lines 63a and 63b on the recording tracks comes closer to each other, finally intersecting. When two tracks come closer to each other, crosstalk, a phenomenon in which a magnetic head picks up signals from the adjoining track, occurs, ending up in reproducing incorrect data.

Let X denote the space between tracks and a the angle from horizontal line X-Y. Then the larger the angle a grows, the narrower the space X between the tracks becomes by the expression $$X = P \cdot \cos \alpha \quad (10)$$

Track pitch P is then obtained by $$P = X/\cos \alpha \quad (11)$$

Figure 13:
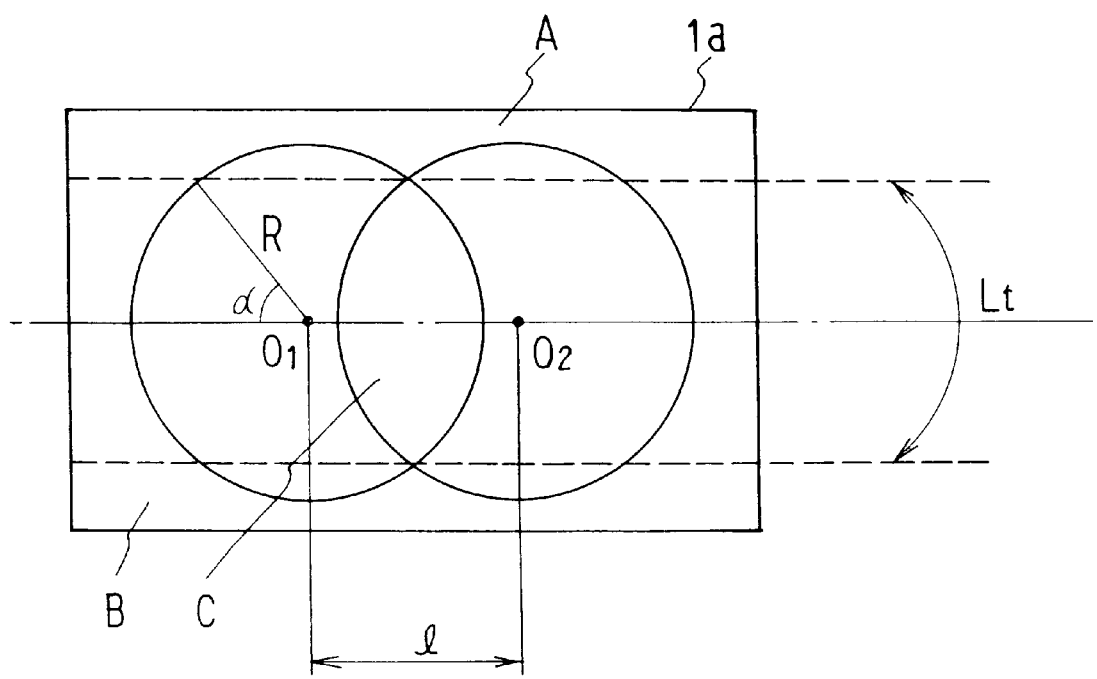
FIG. 13 shows the recording tracks and the side margins on a card of the present invention.

FIG. 13 shows the loci of leftmost and rightmost tracks recorded on a magnetic card (the use of an optical card will be elaborated later). Let 1 denote the distance between the centers of tracks $0_1$ and $0_2$, and $L_t$ the length of recording tracks on a recording surface, and N the number of tracks, then the total track length is determined by the equations $$L_t = 2\pi R \cdot 2\alpha / 2\pi = 2\alpha R \quad (12)$$

$$N = 2l/P = 2l\cos\alpha / X \quad (13)$$

$$M = 2\alpha R \cdot 2l\cos\alpha / X \quad (14)$$
$$= 4Rl / X \cdot \alpha\cos\alpha$$

Note that a is indicated by a radian. From expressions (12) through (14), the most effective way of maximizing M is to maximize "$\alpha \cdot \cos \alpha$" of expression (14). Then the result of FIG. 14 is obtained by the expression $$Z = \alpha \cdot \cos \alpha \quad (15)$$

To get at least 95% of efficiency rate, a is within the range from 0.7 to 1.0, e.g., in 40 to 57.3 degrees in angle.

Embodiment 11

For a hard disk unit or floppy disk drive unit, a single magnetic head writes on or read data from a recording medium, normally making magnetized pattern of the recording tracks at a right angle to the center line of the tracks.

On the other hand, azimuth recording method is applied to magnetic tape units. The azimuth recording is characterized in each track angulated in magnetization direction. This logically leads to the conclusion that the crosstalk between the adjoining tracks can be minimized when the angle of magnetized patterns makes 90 degrees to each other.

With two magnetic heads being available, the recording method of making each track having an azimuth angle is achieved for the present invention. The magnetic heads shown in (2) or (3) in FIG. 11B can be used for the magnetic heads. In using magnetic heads of (2), for example, head gap G1 of magnetic head 13a, which would be placed at a right angle from the center line of recording tracks, is angled at −θ degrees from the center lines of the recording tracks and head gap G2 of magnetic head 13b at +θ degrees are prepared to write data with a single repetitive current.

Figure 15A:
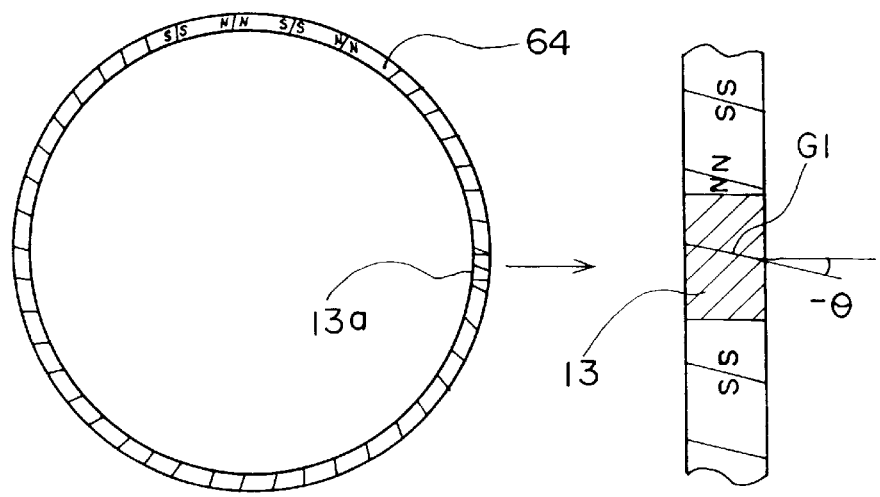
FIGS. 15A–15C show examples of azimuth recording method of the present invention.
Figure 15B:
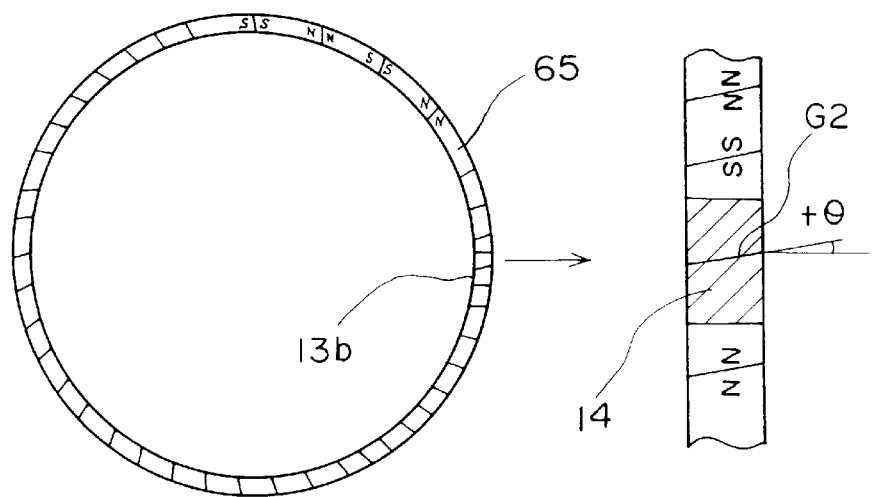

Referring now to FIG. 15A, the magnetized status of track 64 recorded with magnetic head 13a is indicated. FIG. 15B, on the other hand, shows the magnetized status of track 65 recorded with magnetic head 13b. Azimuth recording allows two magnetic heads 13a and 13b to write or read data alternately for every single track.

Figure 15C:
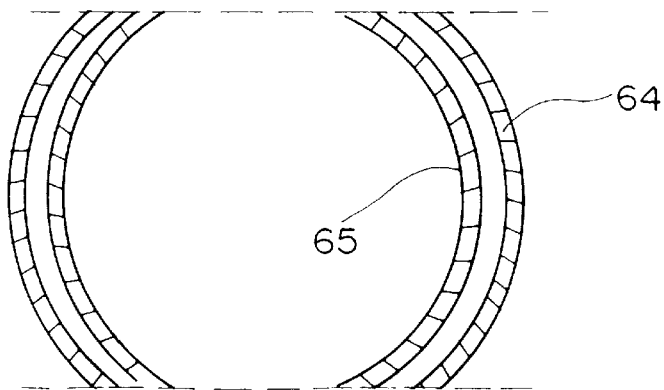

FIG. 15C shows two magnetized recording tracks 64 and 65 on a magnetic card, one on the right and the other on the left. Recording track 65 shown in FIG. 15B is placed to the left of recording track 64 shown in FIG. 65A by one track pitch, leaving out the top and bottom portion where the tracks intersect. Although not indicated in the figure, after one magnetic head carries out data writing for one track, it alternates with the other magnetic head which continues data writing for the next track. The fact that two magnetic heads alternate data writing with each other makes it possible to magnetize two adjoining recording tracks in the direction of 2θ azimuth angle when compared with the techniques in the prior art. Which, in turn, realizes to form a right angle azimuth by angulating each head gap of the two magnetic heads by +45 and −45 degrees.

Setting two magnetic heads by half a track instead of a full track is another possible method of producing azimuth on the adjoining tracks between two track groups formed on the left and right sides on a magnetic card.

Head gaps of the two magnetic heads shown in (2) and (3) of FIG. 11B angulated at different degrees can also read or write data alternately by half a track or by a full track. However, data written with magnetic head 13a cannot be read with magnetic head 13b. By extension, if data written with magnetic head 13a is overwritten with magnetic head 13b for modification, magnetic head 13a fails to read the overwritten data. Data read is enabled only with the same magnetic head that actually wrote the data or with a magnetic head having a magnetic gap of exactly the same angle. This prohibits the magnetic heads shown at(4) in FIG. 11B from achieving azimuth recording of the present invention.

The azimuth recording enables the number of tracks to be increased because track pitches can be made smaller than conventional recording. Which, in turn, realizes to increase storage capacity of magnetic cards significantly.

Embodiment 12

Embodiment 12 will discuss the methods of applying the present invention to an optical card, and further, to an optical head.

An optical card reader is different from a magnetic card reader in its head structure and its recording medium. With optical cards, data can be stored either on a single side or on both sides. When data is to be stored on both sides, two optical heads can be employed, one on the front and the other on the back of the optical card, to simultaneously access data. Or the optical card can be reversed when only one optical head is applied.

Figure 16A:
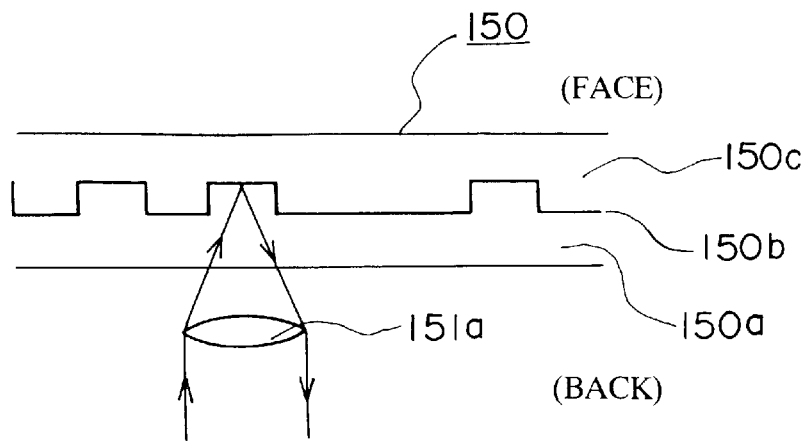
FIGS. 16A–16C indicate the cross sections of an optical card structure of the present invention.
Figure 16B:
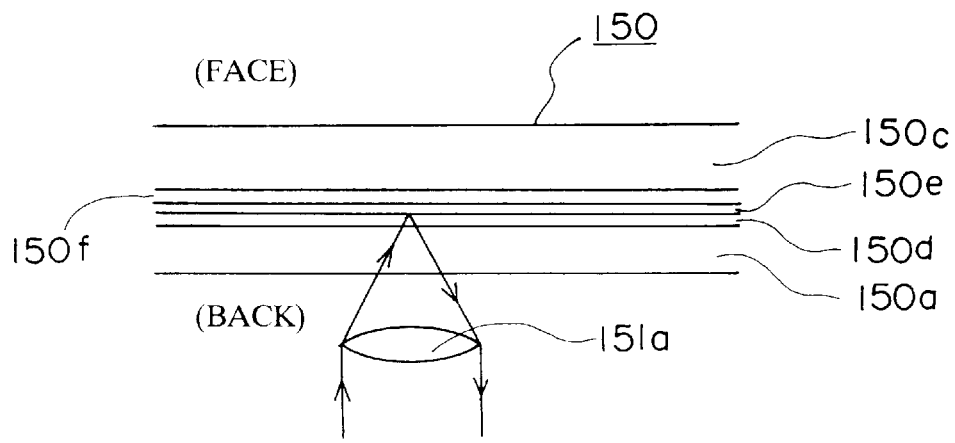
Figure 16C:
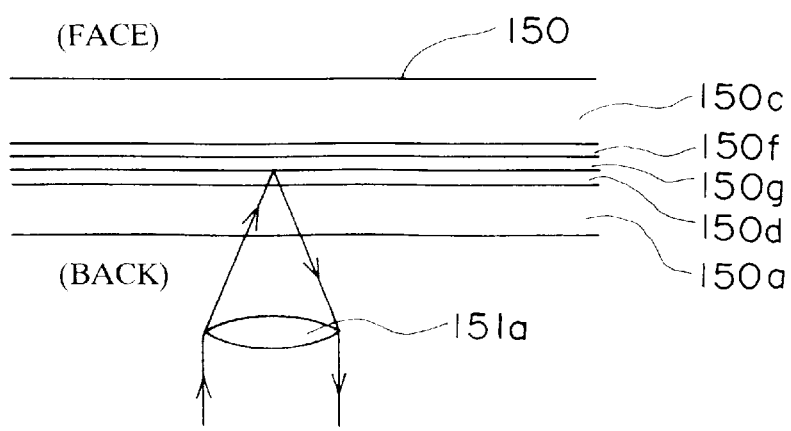

FIGS. 16A to 16C illustrate the cross sections of an optical card. Besides those recording media designed for optical disk units, there are several other types of available media, such as those for compact disks (CDs), video disks (VDs), write-once (WOs), re-writable phase-modifiers and magneto-optic (MO). Despite that these recording media are based on the same structure, they may differ slightly in their features. Most notably, the magneto-optic recording, which has already been in extensive use, differs from other structure in that an electromagnet must be set on the back of optical card 150 as a magnetization bias.

FIG. 16A represents a cross section of a read-only optical card 150, consisting of light transmission layer 150a, placed on which are reflecting film 150b and protective board 150c. The light transmission layer is usually an opaque plastics whereas the reflecting film is made of aluminum. Laser lights emitted from inside optical head 151 (not shown) are converged at objective lens 151a and irradiated to reflective film 150b. Data, which has been stored in concaved pits and in the spaces between the pits, is converted into electric signals with the electric in the optical head as the amount of the reflected light changes.

FIG. 16B is a cross section of a write-once optical card. One way of writing data is to make holes (pits) on a recording film with the laser lights. Data is then read by converting the presence or absence of pits detected by the laser lights into electric signals. Another way of data transmission is to cause materialistic change upon the irradiated part. The material is then changed into a thin film as its reflection rate changes. On the base of light transmission layer 150a, the write-once optical card is formed in the order of protective layer 150d, optical recording layer 150e, protective layer 150f, and protective board 150c.

FIG. 16C is a cross section of an optical card made of optical magnetic medium. With light transmission layer 150a as the base, it is formed in the order of protective layer 150d, magneto-optic recording layer 150g, protective layer 150f, and protective board 150c. The laser lights emitted from inside optical head 151 (not shown) are converged at objective lens 151a and then irradiated on magneto-optic recording layer 150g.

By applying reverse-magnetic fields to the medium magnetized in one direction, the magneto-optic recording uses laser lights with which the medium gets magnetized in the direction of applied magnetic fields near the Curie point. For data read, based on the Kerr effect or Faraday effect, the polarized lights is irradiated upon the recording medium which turns the polarized surface slightly depend on the magnetized direction which is then converted into electric signals.

Embodiment 13

Embodiment 13 will give a general description of the structure of head assembly of an optical card reader.

Figure 17A:
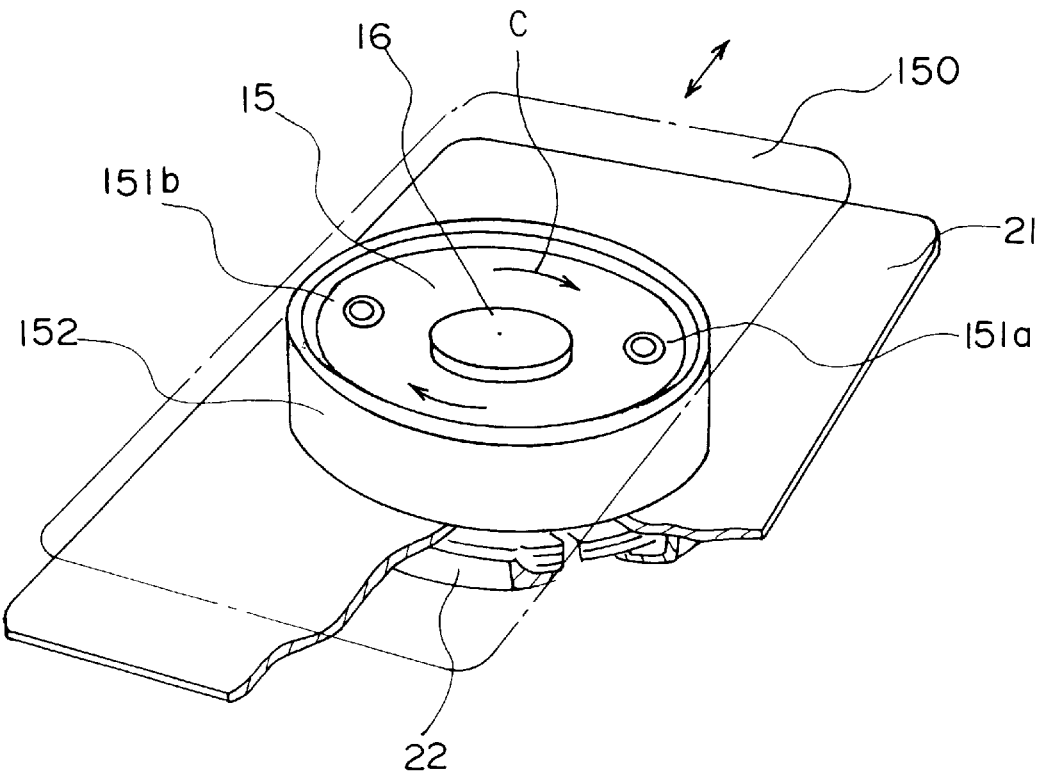
FIGS. 17A and 17B depict examples of head assembly, in which data read and write is performed, of an optical card reader of the present invention.
Figure 17B:
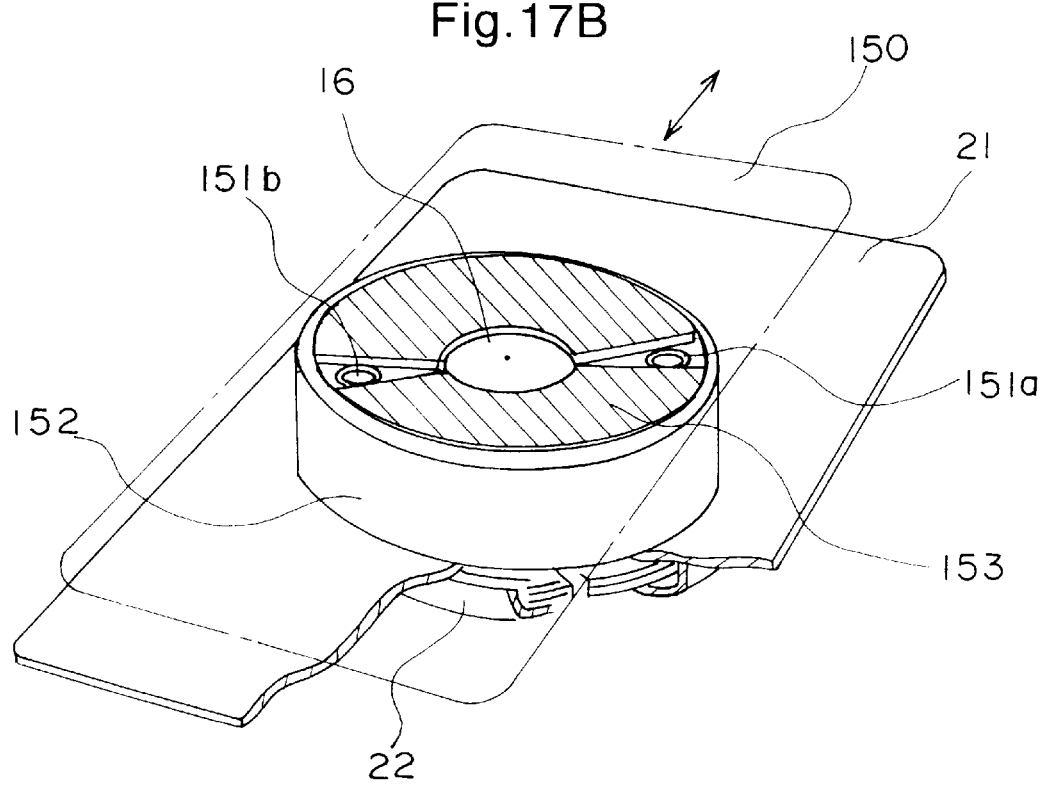

FIG. 17A and 17B show the structure of data read and write mechanism of the optical card reader. In FIG. 17A, objective lenses 151a and 151b of one or two optical head 151 (not shown) are attached on turntable 15. Being linked with rotation shaft 16 of motor 22 just as the one presented for a magnetic card reader shown in FIG. 2, the turntable rotates in the direction of arrow C at a predetermined speed. Turntable spacer ring 152 prevents foreign matters from entering and keeps a certain distance between objective lenses 151a and 151b on the turntable 15 and optical card 150.

FIG. 17B shows a head assembly equipped with a cleaning mechanism made up of cloth or soft brush so as not to damage the surface of an optical card. The cleaner is continuously touched upon light transmission layer 150a on back of the optical card as the turntable rotates. Although not included in this embodiment, it is possible to have inlet holes 35 and outlet holes 38 used for the turntable 15 and rotary transformer holder 20 shown in FIGS. 6A and 6B for turntable 15 and turntable spacer ring 152.

Embodiment 14

Figure 18A:
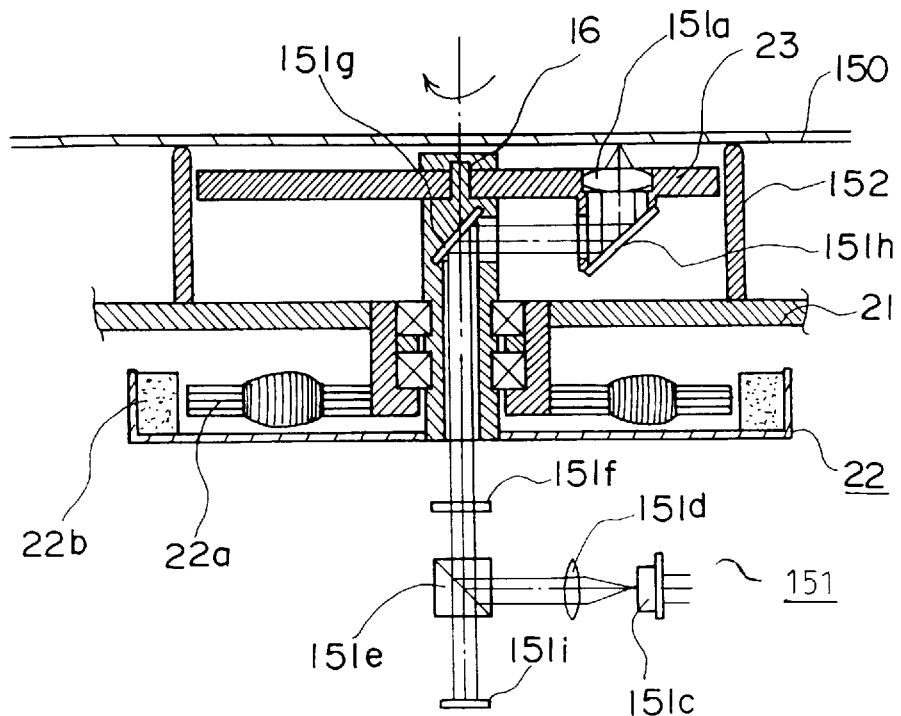
FIGS. 18A and 18B depict cross sections of data read and write apparatus of an optical card reader of the present invention.
Figure 18B:
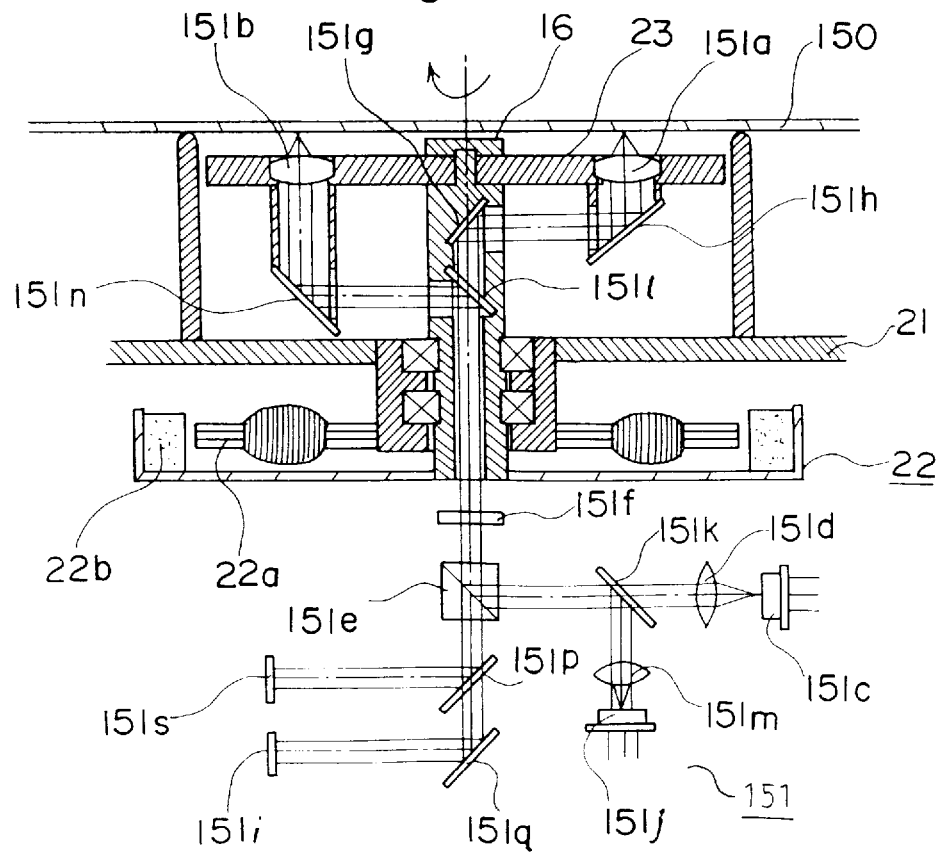
Figure 19:
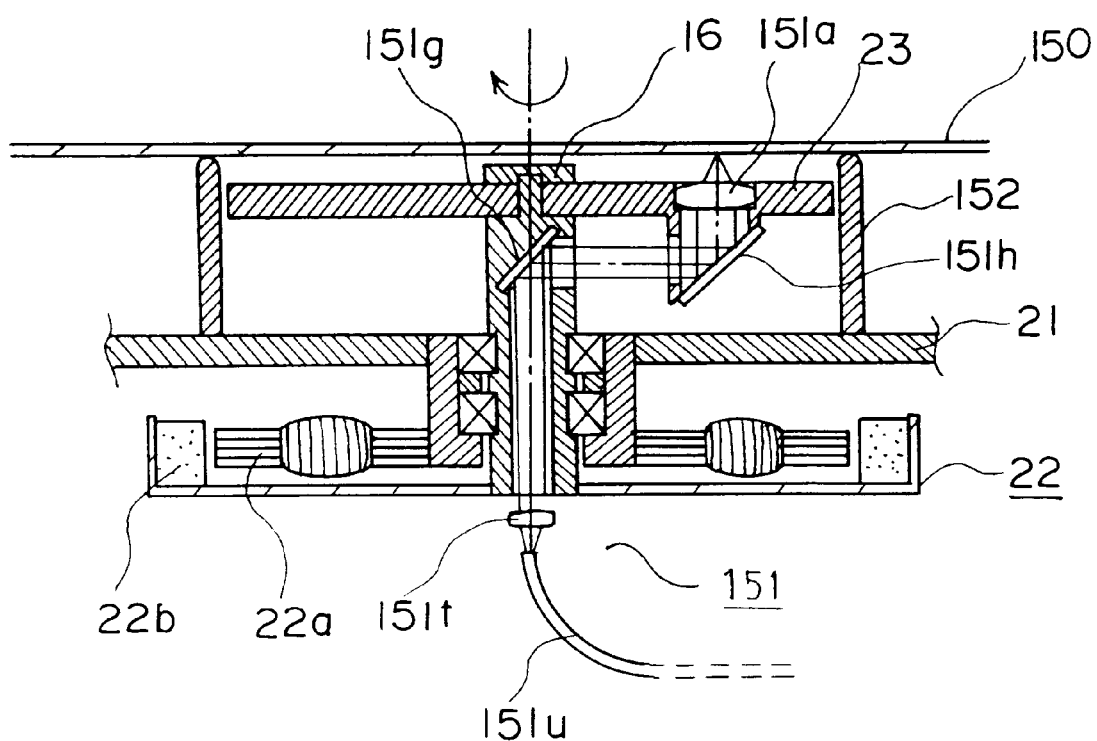
FIG. 19 is another example of data read and write apparatus of an optical card reader of the present invention.

With reference now to FIGS. 18A and 18B and 19, the structure of the optical head assembly of the present invention is set forth in details below.

The read and write mechanism of an optical card reader and a magnetic card reader shown in FIG. 8A is similar in its basic structure. For magnetic card reader, stored data is converted into electric signal with the magnetic heads 13a and 13b, and then picked up with the rotary transformer 39 in an untouched manner.

With an optical card reader, however, laser beam from a laser diode in the optical head 151 must be transmitted to the objective lenses 151a and 151b on the turntable 15 through an optical path. To read data, light signals must be transmitted to the optical sensor to be converted into electric signals. It is prohibited to put anything that could interrupt light transmission in the optical path.

To solve the above problem, rotation shaft 16 both on and under the turntable 15 and the center of rotor 22b of the DC motor 22 are made hollow to form an optical path. FIG. 18A gives an example of using one objective lens 151a on the turntable 15. In FIG. 18A, the laser beam emitted from laser diode 151c passes through collimator lens 151d, polarization beam splitter (PBS) 151e, and λ/4 plate 151f (λ being a wavelength). Then laser beam is bent at reflecting mirrors 151g and 151h placed on the upper hollow of the rotation shaft 16 and converged by objective lens 151a to be irradiated upon reflective film 150b or optical recording layer 150e.

Reflected light then passes back to objective lens 151a, reflective mirrors 151g and 151h, hollowed parts of rotation shaft 16, λ/4 plate 151f, and polarization beam splitter 151e to be converted into electric signals by optical sensor 151i.

FIG. 18B gives an example of using two objective lenses. When the wavelength of the laser beam emitted from laser diode 151c is assumed to be $\lambda_1$, the wavelength of the laser beam from laser diode 151j is assumed to be $\lambda_2$.

Emitted from laser diode 151c, the laser beam passes through collimator lens 151d, half mirror 151k, polarization beam splitter 151e, and λ/4 plate 151f. Then the laser beam is bent first at dichroic prism 151l placed in the upper hollow of rotation shaft 16 and at reflecting mirrors 151g and 151h, and then converged by objective lens 151a to be irradiated upon reflecting film 150b or optical recording layer 150e of the optical card.

The laser beam emitted from laser diode 151j passes through collimator lens 151m, half mirror 151k, polarization beam splitter 151e, and λ/4 plate 151f.

Then it is reflected by dichroic prism 151l placed at the upper hollow in rotation shaft 16 and bent by reflecting mirror 151n, and converted by objective lens 151b, to be irradiated by reflecting film 150b or optical recording layer 150e of the optical card.

The dichroic prism 151l is characterized in that it passes all light frequencies except those for the color which the prism is designed to reflect. Thus, in this example, the laser light with wavelength $A_1$ from laser diode 151c is passed while the laser beam from laser diode 151j, whose wavelength is not designed to pass, will be reflected. In addition, another polarization beam splitter can be arranged with above PBS 151e in order to input the laser beam emitted from collimator lens 151m.

The light reflected from the reflecting film or optical recording layer of the optical card, is then passes through objective lens 151a, reflecting mirrors 151h and 151g, dichroic prism 151l, the hollow in rotation shaft 16, λ/4 plate 151f, polarization beam splitter 151e, and dichroic prism 151p to reflecting mirror 151q to be finally converted into electric signal by optical sensor 151l. Meanwhile, the light that reflected at objective lens 151b passes through reflecting mirror 151h, dichroic prism 151l, the hollowed part in rotation shaft 16, λ/4 plate 151f, to polarization beam splitter 151e, and then reflected by dichroic prism 151p to be converted into electric signal with optical sensor 151s.

FIG. 19 presents another example of optical head assembly of the present invention. The components such as the λ/4 plate 151f and polarization beam splitter 151e must be installed close to the rotor 22b of DC motor 22 to pass laser beam straight to the hollow made inside the rotation shaft 16. However, they may not be mounted on a desired position due to the limitations from the height of the optical card reader or from some installation constraints. Thus, collimator lens 151t is placed right under the hollowed rotation shaft 16 so that the light can be directly sent to the λ/4 plate 151f using flexible optical fiber 151u. Combining the collimator lens 151t and optical fiber 151u will enable the above-mentioned components to be mounted on a desired place.

Embodiment 15

In magneto-optic recording, reverse magnetic fields are applied to the medium magnetized in one direction, the medium is magnetized in the direction of applied magnetic fields when it reaches close to the Curie point as it is irradiated with laser beams. Generally, on the side opposite to the recording surface, a magnet for magnetization bias is lifted to be placed right on the objective lens of the optical head right across the optical disk medium to resonate with the optical head that seeks on the optical disk medium rotating at high speed. However, because the optical head rotates and the recording medium stays or moves in horizontal direction in the present invention, conventional magneto-optic recording is difficult to apply to the present invention.

Figure 20A:
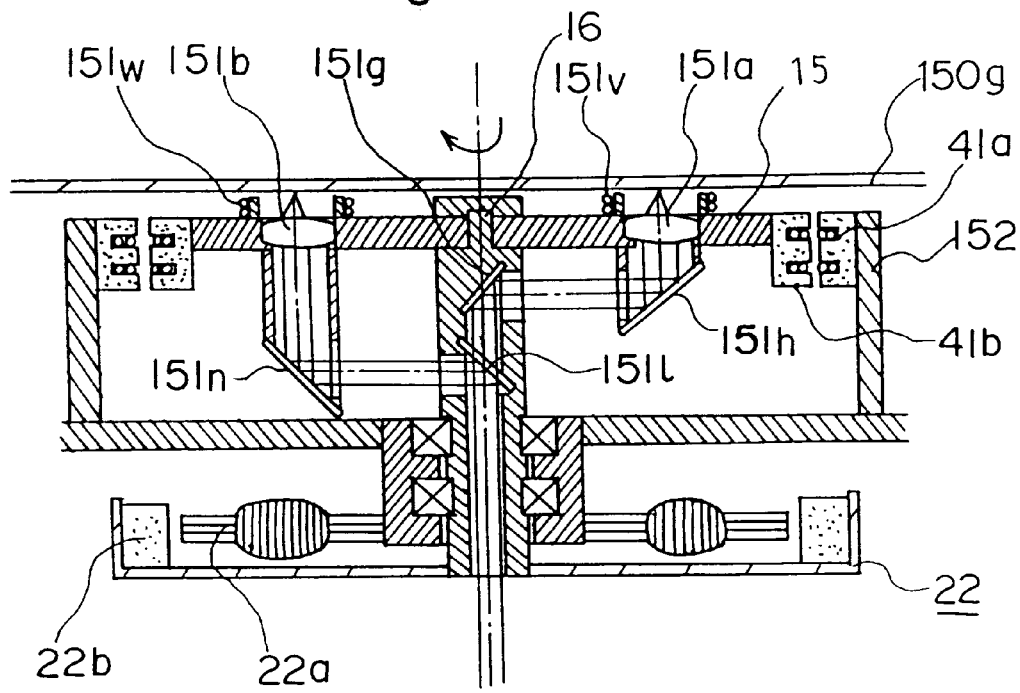
FIGS. 20A and 20B give another example of data read and write apparatus of a magneto-optic recording format of the present invention.

FIG. 20A illustrates one example of solving the above problem. When current is sent to cylindrically wound coils 151v and 151w on objective lenses 151a and 151b on the turntable 15, magnetic flux is produced toward the center line of the objective lenses 151a, 151b. Then magnetic fields are added at right angle to the parts irradiated with laser beam on the magneto-optic recording layer 150g of optical card 150. The current will be supplied from outside of the turntable 15 using secondary core 41a and primary core 41b of the rotary transformer 41 shown in FIG. 7C.

To be precise, alternating current output from the DC-AC converter of the optical card reader is sent to the wiring of the secondary core 41a and the alternating induction current generated at the primary core 41b is converted into the direct current with the circuits incorporated on the turntable 15. The circuits are set separately on the turntable 15. The direction of the current run through coils 151a and 151b dictates the direction of magnetic fields being generated. When laser lights irradiates, the data to be stored on the magneto-optic recording layer 150g will be magnetized either upward or downward of the magnetic surface. Therefore, the rotary transformer 41 must be provided with two wirings: one for power source and the other for the signals that indicate the direction of the current and the switching time.

Figure 20B:
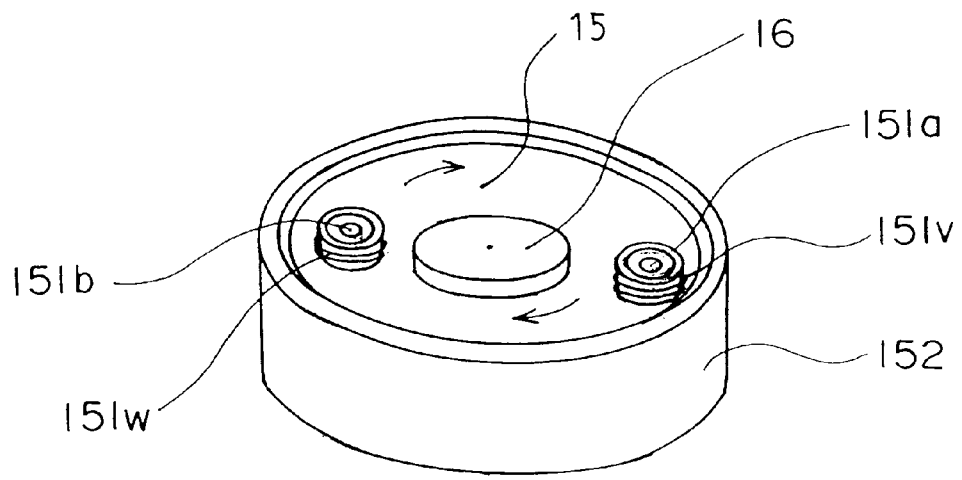

FIG. 20B gives the overview of the turntable discussed in FIG. 20A.

Figure 21A:
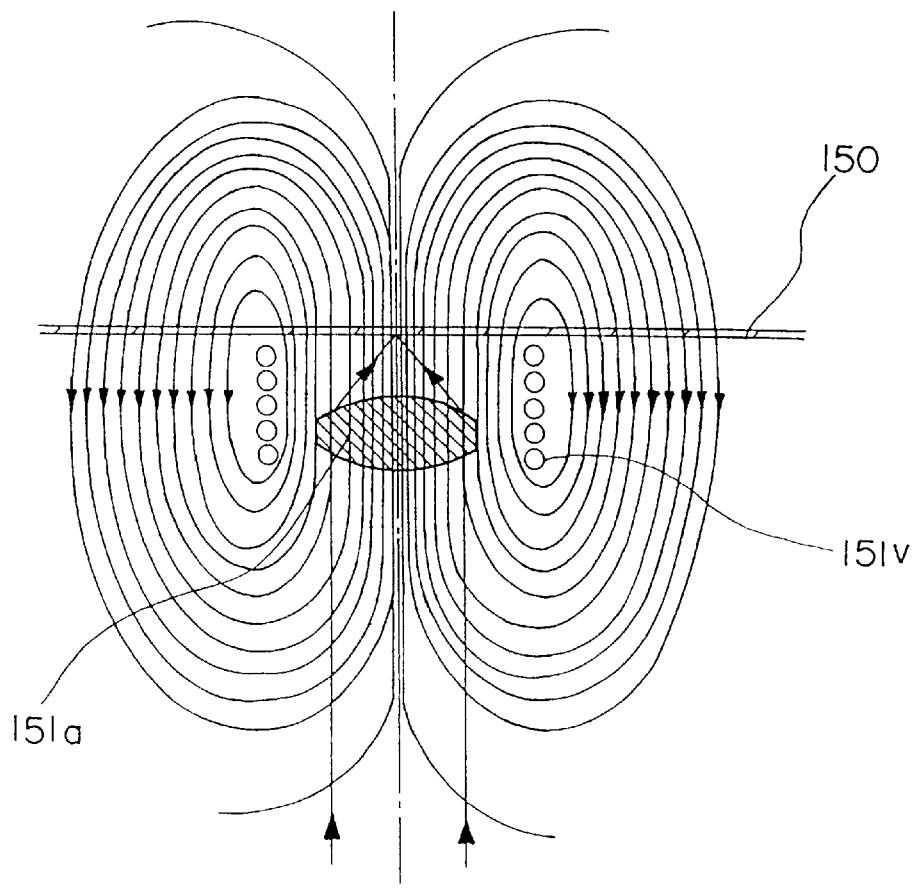
FIGS. 21A and 21B illustrate magnetic fields at the head in the optical and magnetic recording format of the present invention.

FIG. 21A indicates magnetic fields generated when current passes through coil 151v. The magnetic flux crosses almost at right angle at the center of the coil 151v where the laser beam on the magneto-optic recording layer 150 are converged.

Figure 21B:
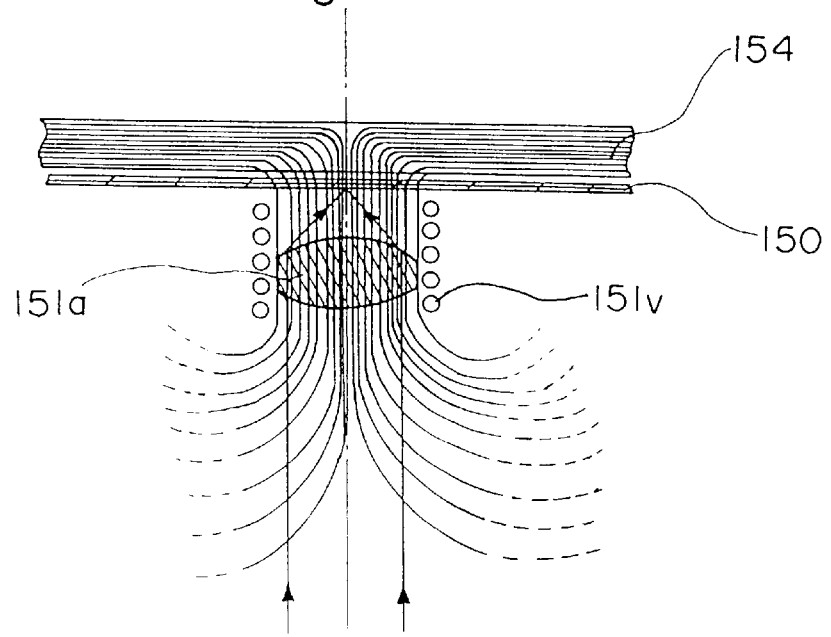

FIG. 21B shows thin iron or magnetic plate 154 added close to magneto-optic recording layer 150g. The magnetic flux generated from coil 151v can return to coil 151v through the thin plate 154 without being diffused. Furthermore, magnetic flux will cross nearer at right angle where laser beam of the magneto-optic recording layer are converged.

Embodiment 16

Referring now to FIGS. 22A to 22C and FIGS. 23A, 23B, the types and structure of magnetic cards will be discussed below.

Figure 22A:
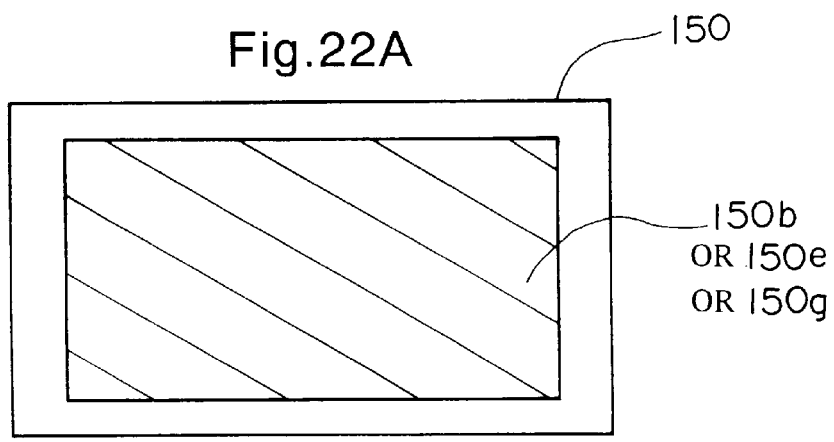
FIGS. 22A–22C show some shapes of a recording medium for an optical card of the present invention.
Figure 22B:
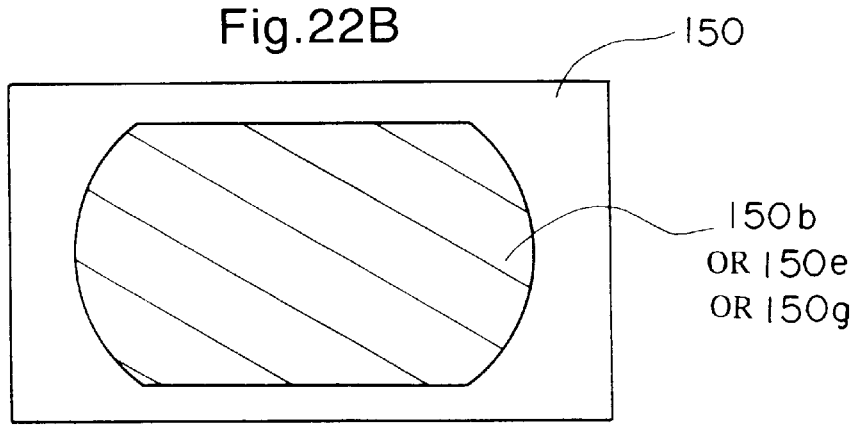
Figure 22C:
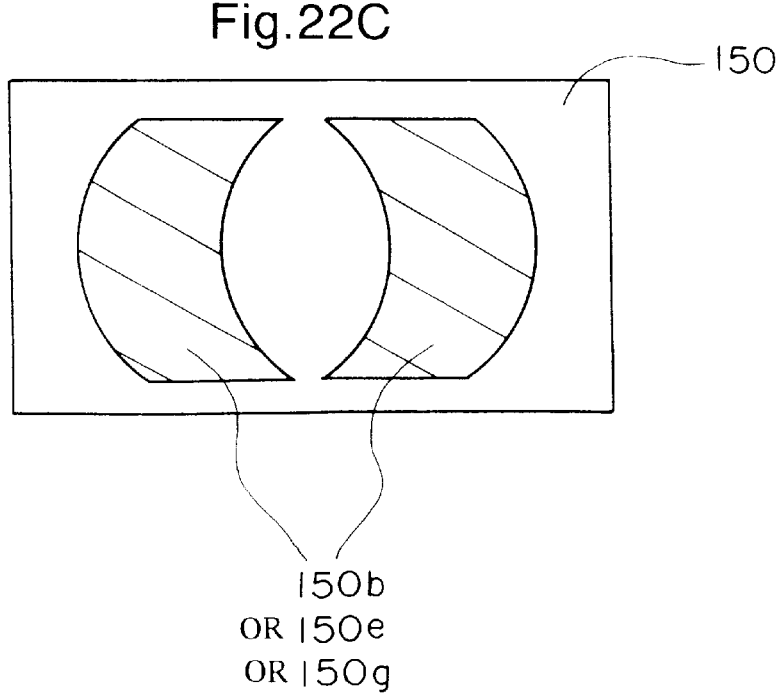

The medium shown by the oblique lines in FIGS. 22A to 22C indicate reflecting film 150b or optical recording layer 150e or magneto-optic recording layer 150g. The reason the film or the layer does not cover the entire optical card 150 is that the scope to be used as recording tracks is limited just as explained in FIGS. 12B and 12C when rotational optical head is applied. The margins, where recording tracks intersect, cannot be used. Although only three types of optical cards given in FIG. 22 are available, it is also possible to make the whole surface as the recording layer.

Figure 23A:
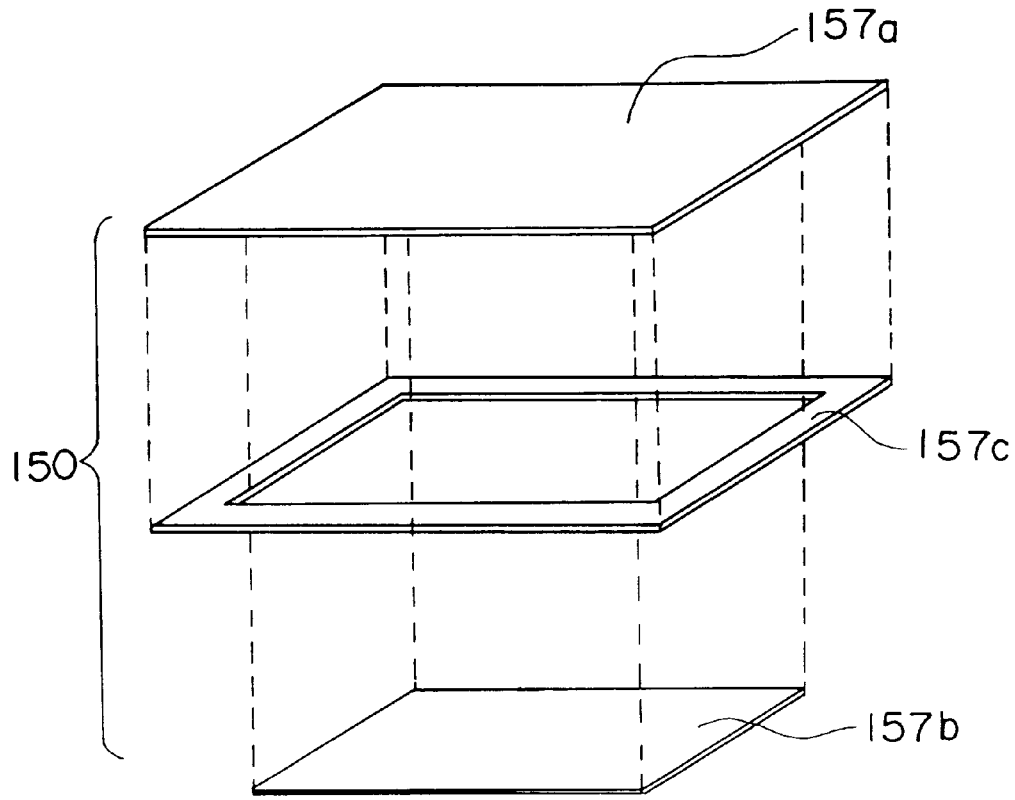
FIGS. 23A and 23B show some shapes of a recording medium for an optical card of the present invention.

FIG. 23A shows the structure of optical cards. Optical card described in FIGS. 22A to 22C are layered as illustrated in FIGS. 16A to 16C. If it is necessary to add more material to reinforce the mechanical strength of optical card 150, recording medium 157b shown by the oblique lines in FIG. 22A is adhered to thin plastic plate 157a whose surface is hard and therefore less likely to be damaged. And around the recording medium 157b, thin plastic plate 157c is framed. The material to be adhered to the recording medium per se and for the frame can be the same. Because the surface of recording medium 157b can be set a bit lower than thin pate 157c for the frame, the light transmission layer 150a can be protected from being damaged by the surface of carriage base 189 when an optical card is introduced into the optical card reader.

Figure 23B:
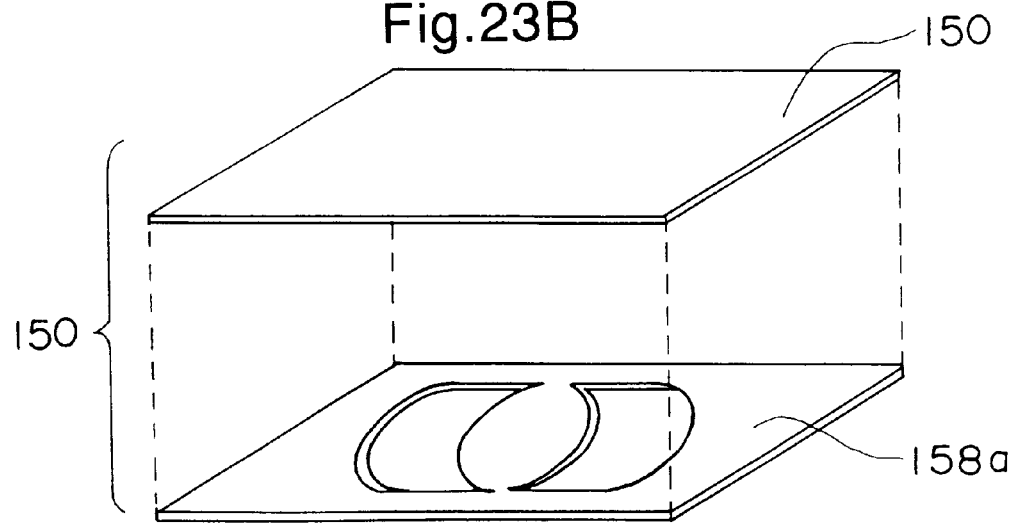

FIG. 23B shows another method which is as effective as FIG. 23A. Thin plate 158a, which is cut out for the part for the recording layer and of the same material as thin plastic plate 157a, is adhered to the surface of optical card 150 shown in FIG. 22C.

Embodiment 17

Now, structure of the apparatus using these elements will be explained. The "card reader" of the present invention is a total name of a magnetic card reader and an optical card reader. A card reader 160 indicates both the card readers, hereinafter. The "card" is a total name of a magnetic card and an optical card. A card 161 indicates both the cards. The card reader of the present invention appears like an interchangeable type hard disk drive or a floppy disk drive. The card reader is a memory drive paid attention to respects of portability, dustproof, vibration and such in order to be used not only in a disk top type computer on desks but also in an apparatus used outdoors.

Figure 24A:
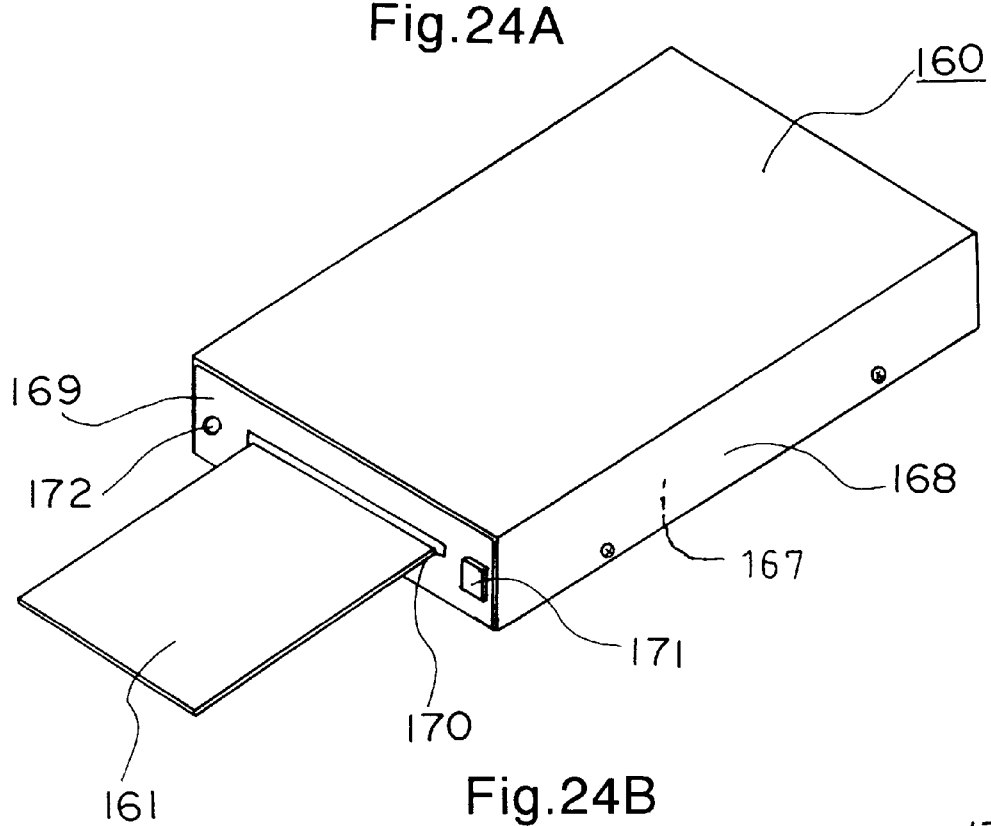
FIGS. 24A and 24B show embodiments of a card reader of the present invention.
Figure 24B:
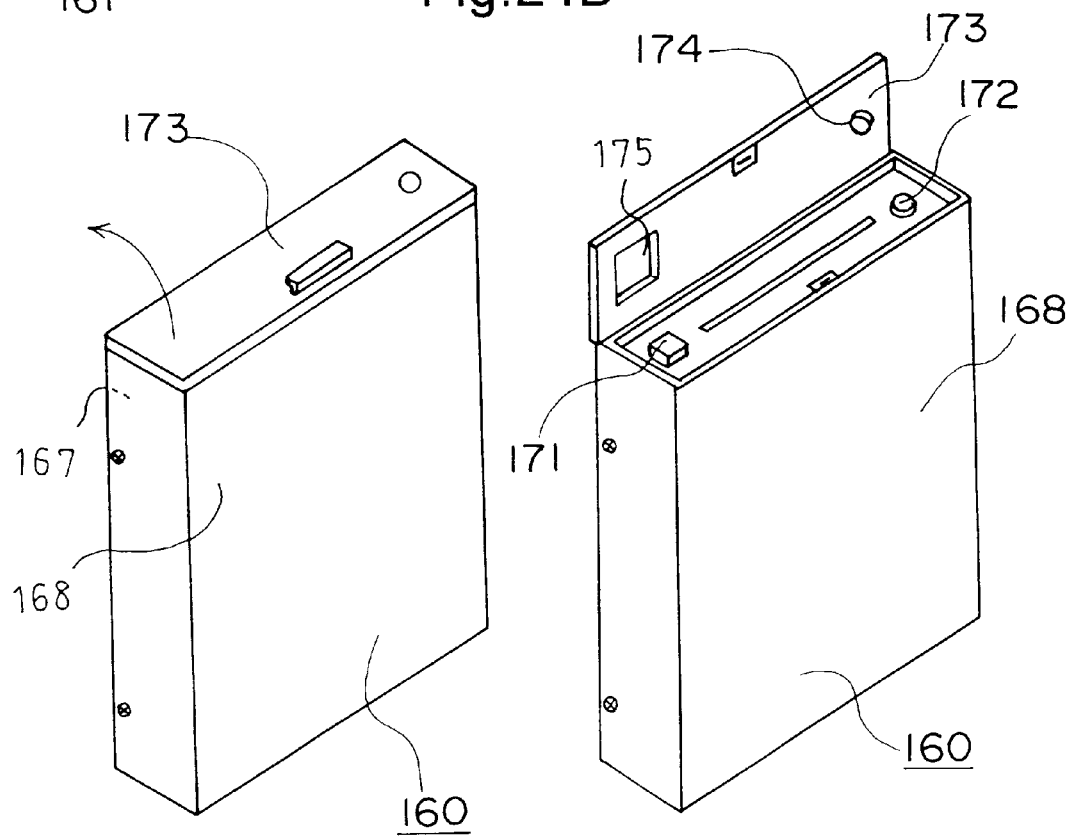

FIG. 24A and FIG. 24B show the card readers of the present invention. FIG. 24A shows a device having no door at the front panel 169. The card reader 160 is composed of a frame part including a base 167 and a cover 168, and a front panel 169. The front panel 169 includes a card inlet 170, an eject button 171 and a display lamp 172. There are a power connector (not shown) for connecting a power source and an interface connector (not shown) for connecting a controller at the back side of the apparatus.

FIG. 24B shows one embodiment of the front panel door of the card reader. An overhung door 173 with a hinge (not shown) is on the front panel 169 and opens towards arrow. The opening angle is 90 degrees or 180 degrees. If the opening angle is less than 90 degrees, the door shuts by a spring (not shown) placed between the base 167 and the overhung door 173. There is a hole 174 on the overhung door 173 for passing a light from the display lamp 172. The hole 174 is filled with transparent glass or plastic. It is possible to have a concave 175 at the back side of the overhung door 173 when the eject button 171 comes out largely from the front panel 169.

Embodiment 18

A card detect mechanism for inserting/extracting card will now be explained in detail.

FIGS. 25A, 25B, 25C, 25D and 25E show a conceptive motion of one embodiment of the card detect mechanism. When the card 161 is inserted through the card Inlet 170 shown in FIG. 24A, the card detect mechanism detects the card insertion and generates a signal being the original of following sequent operations. One edge of a detecting element 176 is fixed to the upper part of the front panel 169. The detecting element 176 is made of spring metal whose edge is crooked like a fishhook. Otherwise, the detecting element 176 is made of broad and thin spring metal panel whose edge is crooked like a fishhook. The other edge of the detecting element 176 contacts a sub-base 167a made of conductive material, such as iron or aluminum. The detecting element 176 and the sub-base 167a are connected to a logic circuit 179 (2 input NOR gate in this embodiment) through lead wires 177 and 178. The lead wire 177 is connected to a direct current power source of +5 volts through a pull-up resistance 180. When the detecting element 176 contacts the sub-base 167a, output of the logic circuit is H (High) logically since voltage of the two inputs are 0 volt (logically, L(Low)).

Figure 25A:
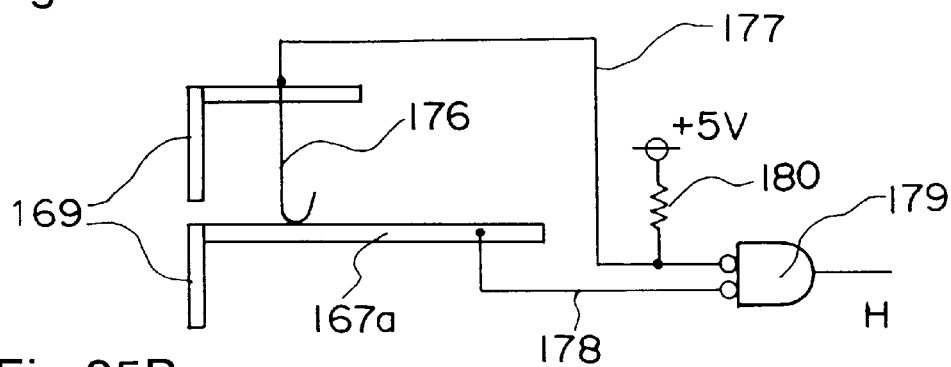
FIGS. 25A–25E show one embodiment of a card detect mechanism of the present invention.

FIG. 25A shows a situation that the card 161 has not been inserted through the card inlet 170. The output of the logic circuit is H logically as stated the above.

Figure 25B:
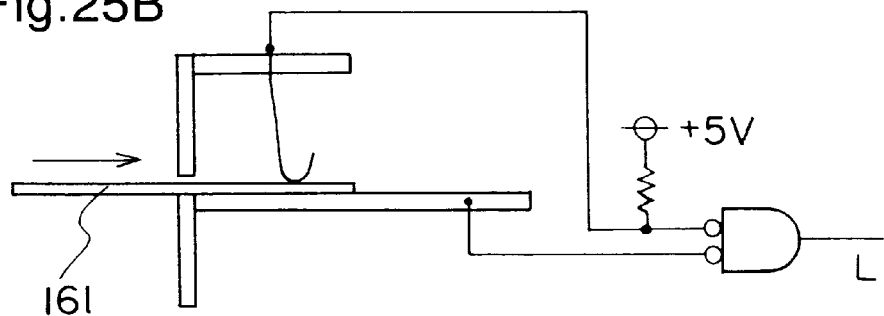

FIG. 25B shows a situation that the card 161 is inserted along the direction of arrow. Since the detecting element 176 is on the card 161 made of nonconductive material, the lead wire 177 becomes H and the output of the logic circuit 179 becomes L logically.

Figure 25C:
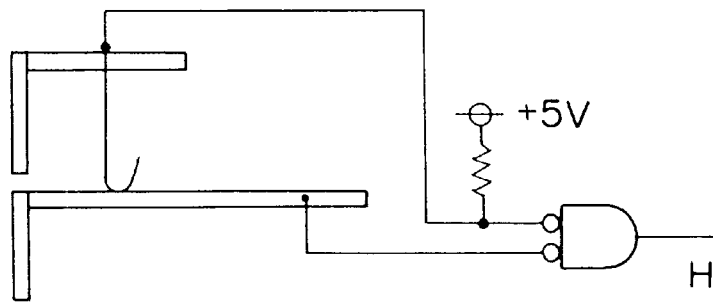

FIG. 25C shows a situation that the card 161 has passed the detecting element 176. Namely, this situation is the same as the situation in FIG. 25A. The output of the logic circuit 179 becomes H logically.

Figure 25D:
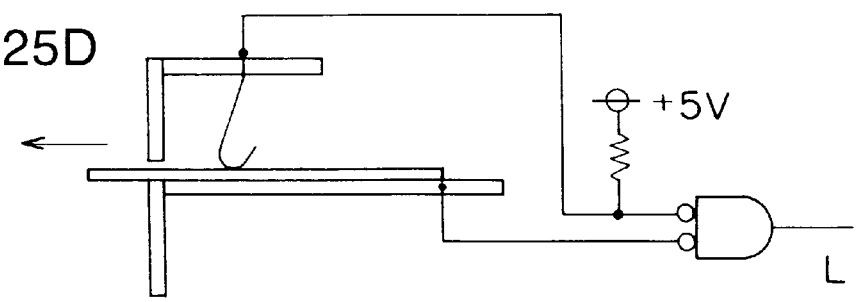
Figure 25E:
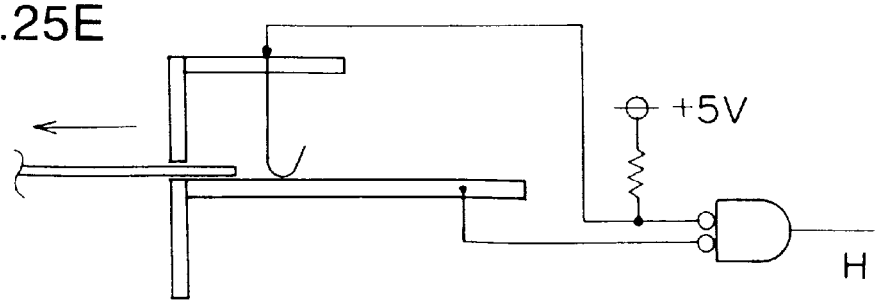

FIGS. 25D and 25E show situation of the card 161 being extracted towards the arrow. The output of the logic circuits 179 become L and H each. The situation of the card 161 being inserted or being extracted can be judged from the output of the logic circuit 179. By using the above stated method, it is possible to maintain the present situation of the card, even when the card is not sustained by hand. Since the card 161 entered through the card inlet 170 is pushed onto the sub-base 167a by the spring of the detecting element 176, it is possible to prevent the card 161 from dropping even when the card 161 is entered from up to down with the card reader 160 standing.

Embodiment 19

Figure 26A:
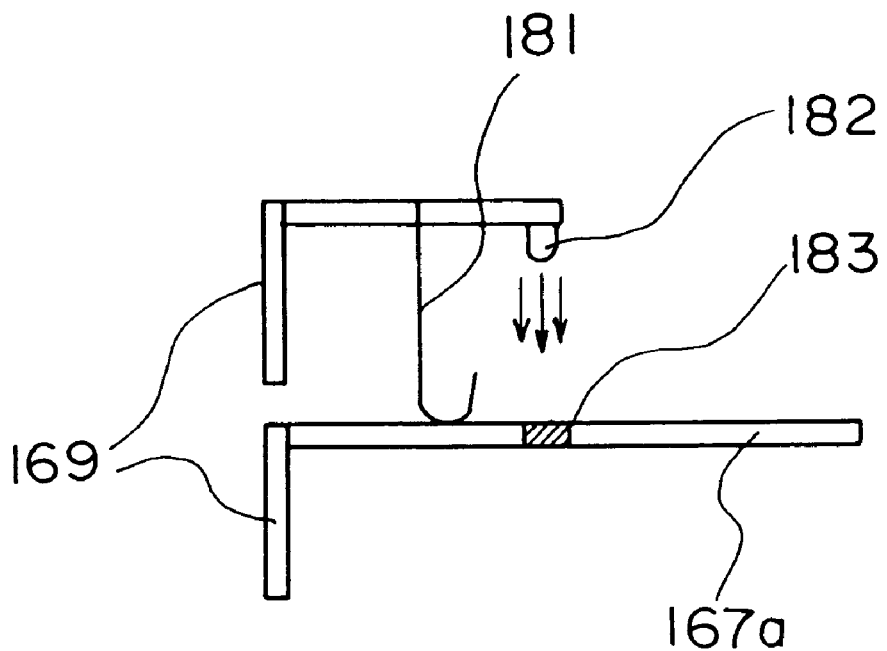
FIGS. 26A and 26B show one embodiment of the card detect mechanism using an optical detector, of the present invention.
Figure 26B:
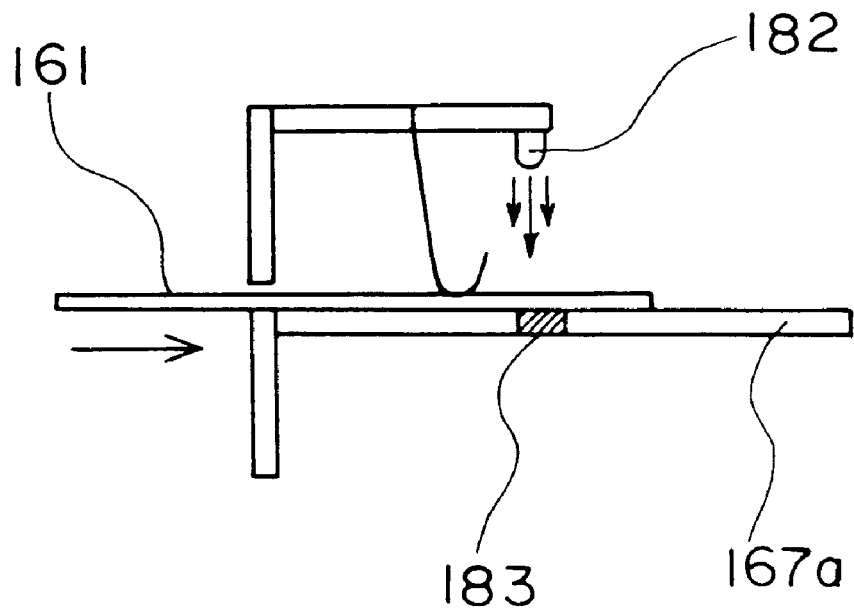

Another method of detecting the card insertion/extraction will now be explained in this embodiment. The existence of the card 161 was detected electrically by using the detecting element 176 in FIGS. 25A to 25E. It is also possible to detect optically. FIGS. 26A and 26B show one embodiment of using an optical detector. In FIGS. 26A and 26B, there is a support spring 181 for pushing the card 161 onto the sub-base 167a. The support spring 181 is constructed similarly as the detecting element 176 shown in FIGS. 25A to 25E. A light emitting element 182 and a light receiving element 183 are located close to the support spring 181.

FIG. 26A shows a situation that the card 161 is not inserted. There is nothing for blocking between the light emitting element 182 and the light receiving element 183.

In FIG. 26B, a light from the light emitting element 182 is blocked by the card 161. It is possible to convert two situations of FIGS. 26A and 26B into electric signals and logic signals by using the light receiving element 183 like FIGS. 25A to 25E. This method can be used when the sub-base 167a is made of nonmetal or the sub-base 167a is covered with nonconductive resin.

Embodiment 20

A mechanism of feeding and ejecting the card will now be explained.

Figure 27A:
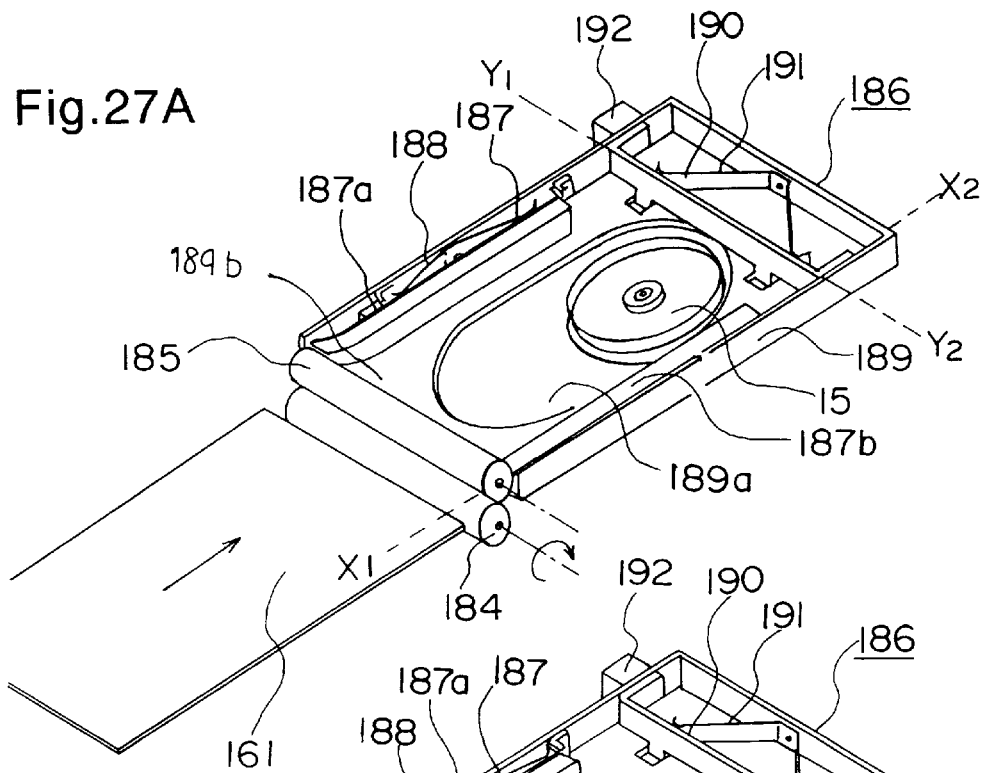
FIGS. 27A–27C show one embodiment of a feeding mechanism for feeding a card into the card reader of the present invention.
Figure 27B:
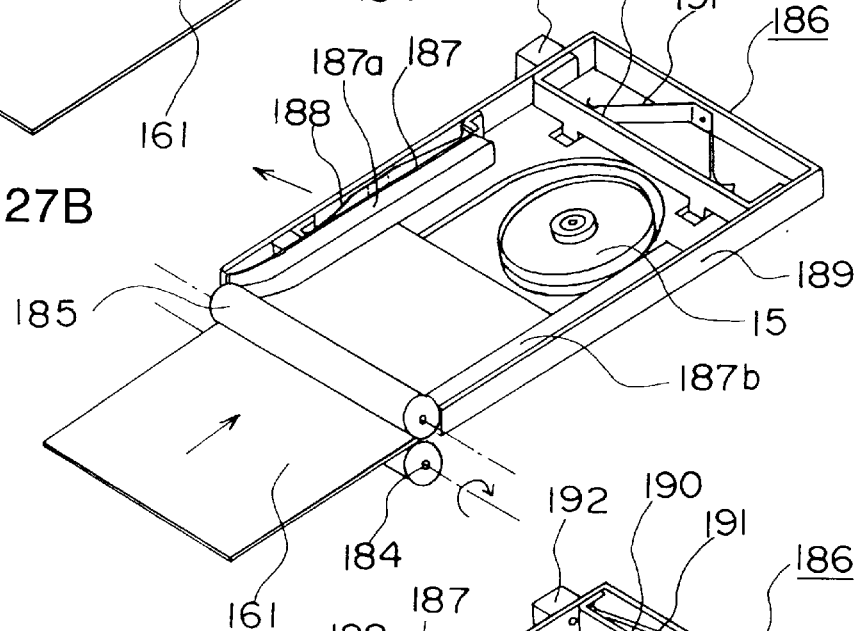
Figure 27C:
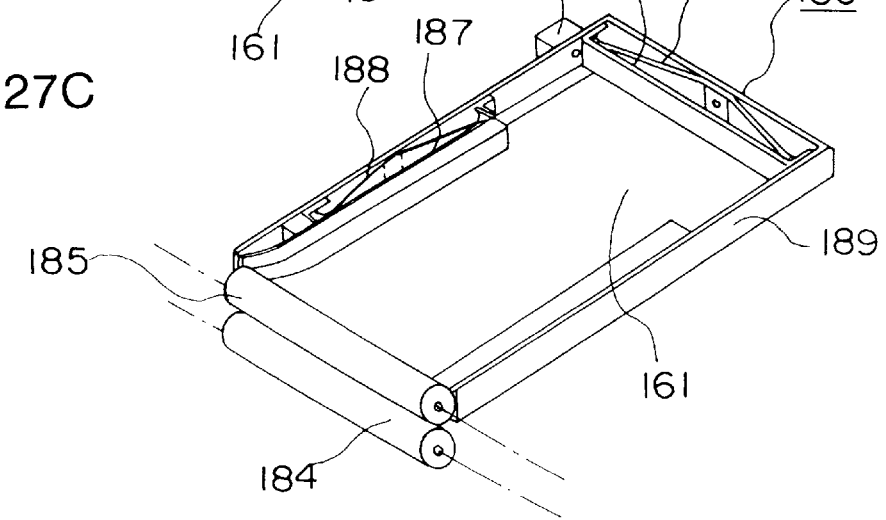

FIGS. 27A, 27B and 27C show one embodiment of the card feeding mechanism for transmitting the card into the card reader. The card 161 is inserted through the card inlet by hand. When the card passes the card detect mechanism shown in FIGS. 25A to 25E and FIGS. 26A and 26B, a feeding mechanism 186 at the back of the card detect mechanism starts preparation corresponding with the card insertion.

Driving part of the feeding mechanism 186 of the present embodiment is composed of a driving roller 184 and a guide roller 185. The driving roller 184 is made of hard material and the guide roller 185 is made of soft material. These two rollers are fixed to a base 167 (not shown). It is possible to separate the two rollers from the feeding mechanism 186. The driving roller 184 is rotated by a direct current motor (not shown) or a stepping motor (not shown) fixed to the base 167 (not shown). The driving roller 184 and the guide roller 185 are interlocked with the logic circuit 179 of the card detect mechanism shown in FIGS. 25A to 25E and FIGS. 26A and 26B. When the card 161 is not inserted into the card reader 160 and the output of the logic circuit 179 is H, the two roller are halted. When the logic circuit 179 becomes L, rotation is started and the driving roller 184 rotates towards the arrow. The guide roller 185 contacts the driving roller 184. First, the card 161 is inserted through the card inlet 170 by hand. When the card 161 comes between the two rollers, the card is transmitted into the inside of the feeding mechanism 186 automatically.

When the card 161 comes into the inside of the feeding mechanism 186, the card 161 contacts a card side guide 187. The card side guide 187 is fixed to a carriage base 189 through a flat spring 188. The card side guide 187 is for setting the card 161 in the carriage base 189 in the feeding mechanism 186 accurately. There is a possibility of the card 161 being distorted a little when the card is first led into the inside of the feeding mechanism 186 because of restraints of the driving roller 184 and the guide roller 185. Therefore, the card side guide 187 does not give inappropriate power to the card 161 when the card 161 is transmitted into the inside by two rollers. Then the card 161 is set along a line X1-X2 by the card side guide 187 when the card 161 is away from the two rollers.

FIG. 27A shows the whole of the feeding mechanism 186.

FIG. 27B shows a situation of the card 161 being led into the inside of the carriage base 189 by the two rollers in the direction of the arrow. Because of bending of the flat spring 188, the card 161 is transmitted into the inside of the feeding mechanism 186 appropriately. Even when the card 161 is led distortedly, the card 161 is led into the inside of the feeding mechanism 186 smoothly because the card side guide 187 moves a little in the direction of the arrow.

A card end guide 190 which is like the card side guide 187 is fixed by the flat spring 191. The card end guide 190 can be pushed a little by a pushing power of the card 161 led into the inside. A optical sensor 192 is fixed to the edge of the card end guide 190. The optical sensor 192 generates a signal telling the card transmission finish when a light is blocked by a part of the metal of the card end guide 190. After the driving roller 184 rotating for a while, the roller is halted by the signal. This is for removing the card 161 from the restraints of the two rollers. Then, the card side guide 187 pushes the side edge of the card 161 by power of the flat spring 188 and the card 161 is set along the line X1-X2. The card end guide 190 sets the card 161 along a line Y1-Y2 by power of a flat spring 191.

FIG. 27C shows a situation that the card 161 is inside the feeding mechanism 186 and the driving roller 184 is halted. The above stated is a sequence of operations for transmitting the card 161 into the feeding mechanism 186. The card 161 can be set along the X-axis which is basis on the carriage base 189. However, since installing accuracy of the driving roller 184 is not clear and a positional relation between edges of the card 161 and the two rollers is not clear, positioning along Y-axis is not accurate. It is needed to correct the positioning accurately by using a track seek mechanism described later. If the carriage base 189 is moved by the track seek mechanism in this situation, the card 161 is extracted out of the carriage base 189 by power of the flat spring 191. Therefore, it is necessary to push the card 161 onto a base surface 189b of the carriage base 189 by a pressure pad mechanism stated later. After the card 161 is pushed not to generate a slippage, a movement operation of the carriage base 189 by the track seek mechanism is started.

In FIG. 27A, a shape of an access opening 189a for turntable on the carriage base 189 is the same as an outline of a track locus of the magnetic card 18 shown in FIG. 12B or as a shape of the optical recording layer 150e of the optical card 150 shown in FIG. 22B. The access opening 189a is shaped to have a space not to contact a turntable 15, rotary transformer holder 20 and a turn table spacer ring 152 when the carriage base 189 moves.

When the magnetic heads 13a and 13b need to contact with a surface of the card 161, the magnetic heads 13a and 13b are placed to be projected out of the base surface 189b of the carriage base 189. When the base surface 189b of the carriage base 189 needs to be a standard plane of the magnetic heads 13a and 13b for reading/writing or to be a standard plane of the optical card 150 for reading/writing, the upper part of an edge 15h of the turntable 15, the upper part of an edge 20h of the rotary transformer holder 20 or the upper part of the turntable spacer ring 152 are made to be lower than the base surface 189b of the carriage base 189.

A card support guide 187a made of plastic is fixed to a metal fitting of the card side guide 187 and a card support guide 187b made of plastic is fixed to a X-axis basic side of the carriage base 189. A space a little larger than the thickness of the card 161 is between the card support guides 187a, 187b and the carriage base 189. The card support guides 187a and 187b are for the card 161 not to be slipped from the carriage base 189 when the card is led in.

Embodiment 21

Another card feeding mechanism is explained in detail in this embodiment.

Figure 28:
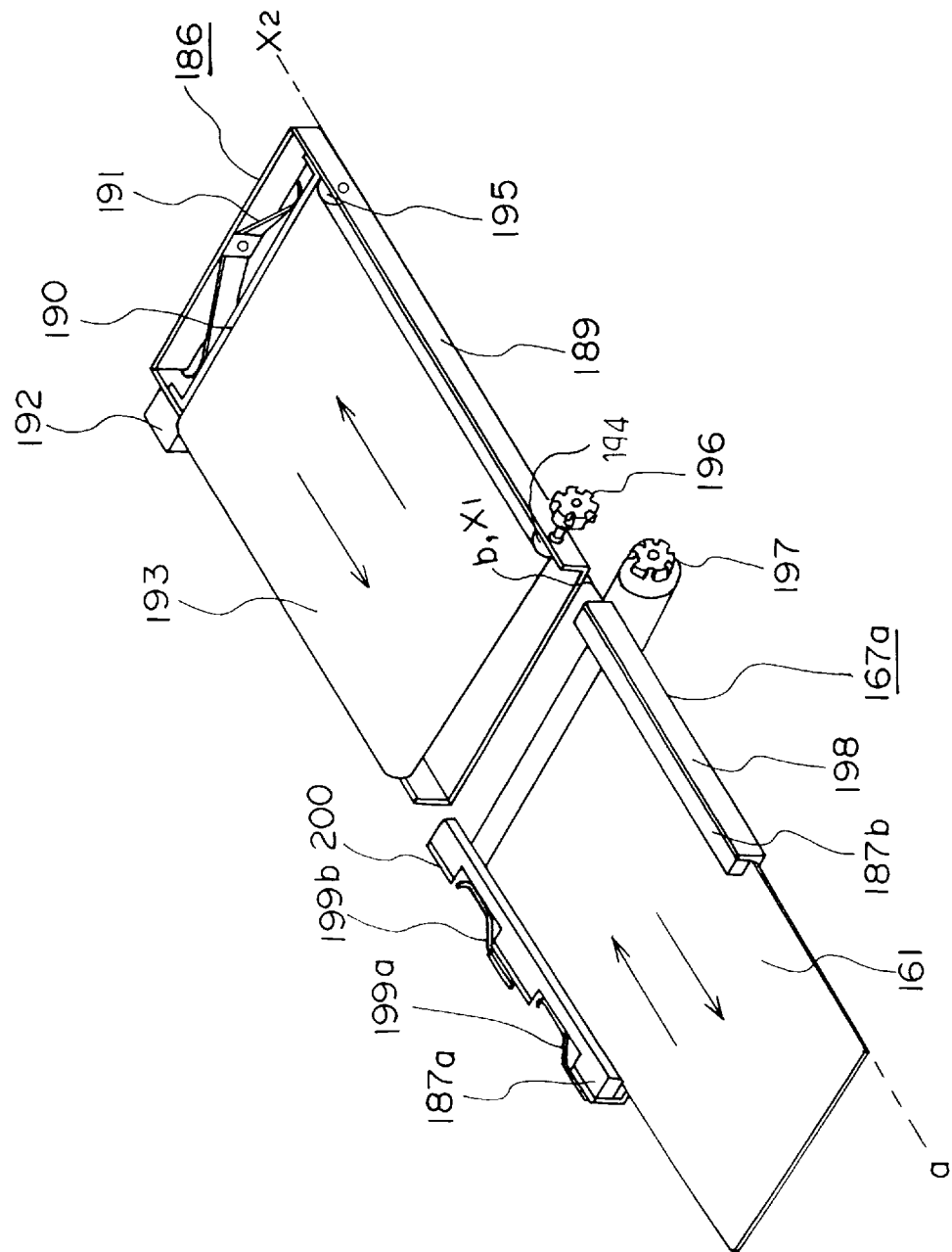
FIG. 28 shows another embodiment of the feeding mechanism of the present invention.
Figure 29A:
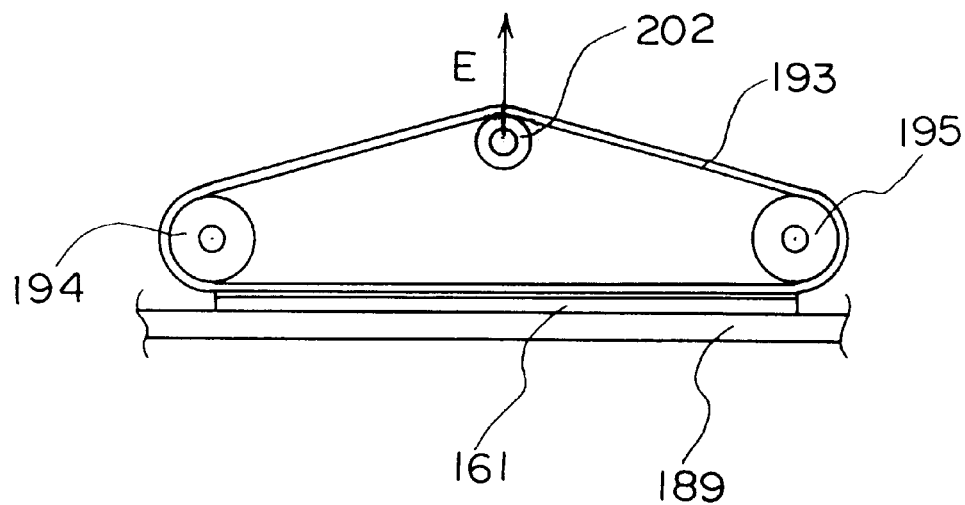
FIGS. 29A and 29B show other embodiments of the feeding mechanism of the present invention.
Figure 29B:
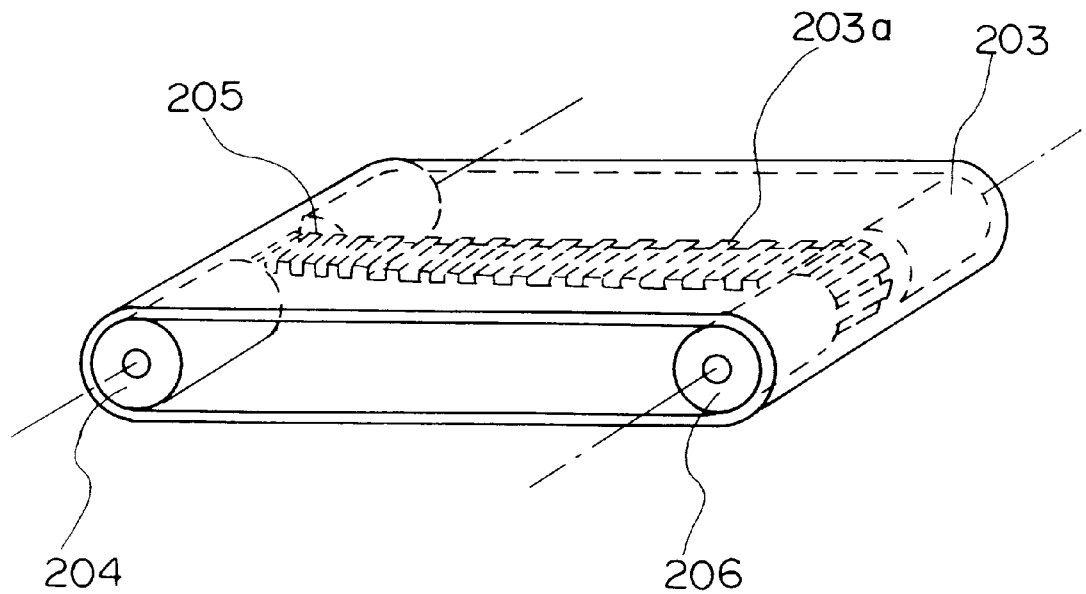

FIG. 28 and FIGS. 29A and 29B show another embodiment of the feeding mechanism. In FIGS. 27A to 27C, the card 161 is led into the inside of the feeding mechanism 186 by two rollers. In this embodiment, the card 161 is led into the inside of the feeding mechanism 186 by a broad belt 193.

The broad belt 193 is installed between a belt driving roller 194 and an auxiliary roller 195 attached to the carriage base 189. Rotations of a stepping motor and a direct current motor placed at the apparatus base are conveyed to a gear 196 through a gear 197. The gear 196 fixed to a rotation shaft of the belt driving roller 194 moves the belt 193. In this way, the card 161 can be led in and led out from the carriage base 189. There are the card end guide 190, the flat spring 191 and the optical sensor 192 in this method as well as the cases in FIGS. 27A to 27C. The way of setting the card 161 along Y-axis in this embodiment is the same as FIGS. 27A to 27C. However, it is difficult to correct the setting of the card 161 along the X-axis since there is a restraint of the belt 193. Therefore, it is necessary to insert the card 161 through the card inlet 170 by hand in order to keep the card setting along the X-axis accurately before the card 161 contacts the belt 193.

FIG. 28 shows a way of setting the card along the X-axis. An X-axis reference guide 198 on the sub-base 167a is for solving the above problem. A line a-b of the X-axis reference guide 198 is the base for the X-axis. Two flat springs 199a and 199b are fixed to a side plate 200. The two flat springs push the card 161 being transmitted to the line a-b of the X-axis reference guide 198.

Card support guides 187a and 187b made of plastic are set at the X-axis reference guide 198 and the side plate 200. There is a space a little wider than the thickness of the card 161 between a base surface of the sub-base 167a and the card support guide 187a, 187b. This is for the card 161 not to come off from the sub-base 167a and the carriage base 189 when the card 161 is led in. The line a-b of the X-axis reference guide 198 on the sub-base 167a and the line X1-X2 on the carriage base 189 are aligned on the same line in this embodiment.

FIG. 29A shows a side view of the belt and the card. An advantage of using the belt 193 is that the card 161 is pressed uniformly from the above when the card 161 is led in and out from the carriage base 189. This means that the belt 193 also has a role of a pad stated later. Speaking generally, an elastic material which can somewhat extend and contract is good as the material of the belt. The material of the belt should also have durability and much friction with the card 161. Of course, the material of the belt driving roller 194 gives effect on the material of the belt. Depending upon the material of the belt, there is a case of a distortion being generated between the belt driving roller 194 and the auxiliary roller 195. If the distortion is generated, a tension roller 202 shown in FIG. 29A should be installed. By pulling the tension roller 202 in the direction of the arrow, the belt 193 always gets a specific tension.

FIG. 29B shows one embodiment of another method of using the belt. An advantage of this method is that dynamic range at right/left and front/back of the belt 203 is small when the belt 203 rotates. Therefore, rotation of the belt driving roller 204 can be conveyed effectively to the belt 203. There is an uneven rack portion 203a in the middle of the belt 203. The rack portion 203a meshes with an unevenness of a gear portion 205 in the middle of the belt driving roller 204. Diameter of central part of the auxiliary roller 206 is smaller than the other not to contact the rack portion 203a of the belt 203.

It is also acceptable for the shape of the auxiliary roller 206 to have a gear shape portion like the gear 205 as the belt driving roller 204. It is also acceptable for not only having the rack portion 203a at one part of the belt 203, but also having the rack portion 203a all over the belt 203 and defining the whole part of the belt driving roller 204 and the auxiliary roller 206 as the gear portion like the gear 205.

Embodiment 22

FIGS. 30A to 30E and FIGS. 31A and 31B show one embodiment of a pressure pad mechanism applied on the feeding mechanism. As the belts are used in the feeding mechanism 186 in FIG. 28, the pressure pad mechanism is not needed necessarily. However, in the feeding mechanism 186 in FIGS. 27A to 27C, the pressure pad mechanism of the present invention is necessary as well as the setting mechanism of the X-axis and the Y-axis of the card 161.

Figure 30A:
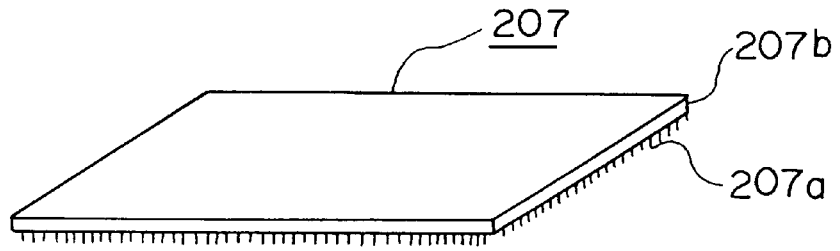
FIGS. 30A–30E show embodiments of a pressure pad mechanism applied on the feeding mechanism of the present invention.
Figure 30B:
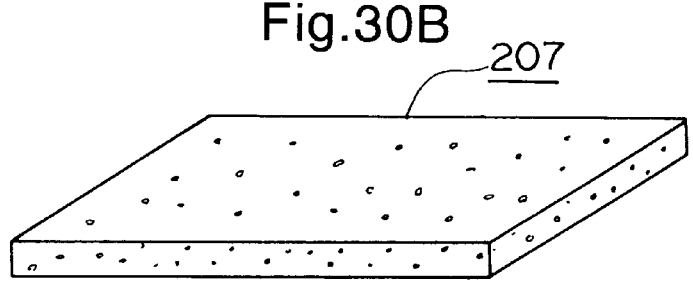

FIGS. 30A to 30E show embodiments of the pressure pad 207. The material of the pressure pad 207 in FIG. 30A has lots of small stings 207a on the base 207b. Heads of the stings are fine and roots of them are thick, or the shape of the stings are like brush of same thickness. The stings are made of elastic material, such as rubber or plastic. The heads of the stings are elastic enough to bend when the pressure pad 207 pushes the card 161 from the upper side. Material of the pressure pad 207 of FIG. 30B is made of styrene foam like a sponge. The pressure pad 207 contracts when the pressure pad 207 pushes the card 161 from the upper side and the pressure pad restores when the pressure on the card is removed.

Figure 30C:
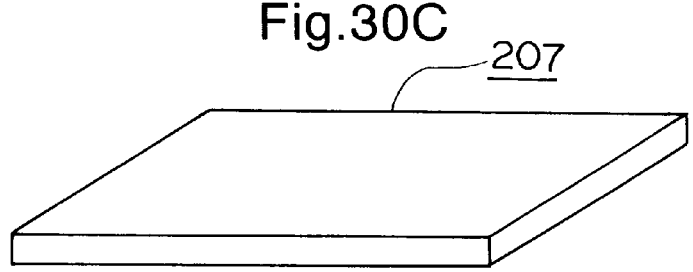

Material of the pressure pad 207 in FIG. 30C is made of the same material of the belt 193 in FIG. 28. The material of the pressure pad 207 of FIG. 30C contracts less than the cases of FIGS. 30A and 30B when the pressure pad is pushed. However, the material of the pressure pad 207 of FIG. 30C generates a large friction against the movement of the card 161.

Figure 30D:
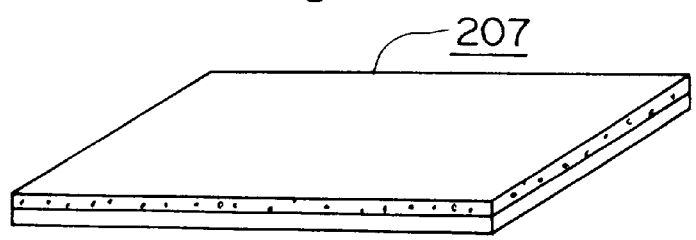

Regarding material of the pressure pad 207 of FIG. 30D, the side contacting the card 161 is made of the same material as that of FIG. 30C, and the other side is made of the material of FIG. 30B. Namely, the pressure pad 207 of FIG. 30D has each character of FIG. 30B and 30C.

Figure 30E:
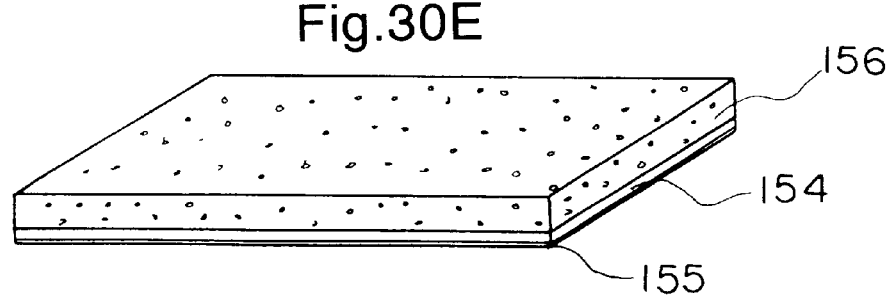

In the case of FIG. 30E, the thin plate 154 of FIG. 21B is used as a part of the pressure pad 207. In the case of the magnetic card reader, contact condition of the magnetic heads 13a, 13b with the magnetic card 1a is emphasized. In the case of the optical card reader, a distance accuracy between the optical card 150 and objective lenses of the optical head 151 is emphasized, because the object lenses 151a and 151b of the optical head 151 are set away from the optical card 150 and the optical card 150 is made of harder material than that of the magnetic card 1a. Accordingly, it is possible to have a structure of the pressure pad 207 wherein the elasticity with respect to up and down is lessened. In FIG. 30E, the thin plate 154 and a thin material 155 is used at the side contacting the optical card 150. A material 156 which is the same as the elastic pressure pad 207 used in FIG. 30B is combined.

FIG. 31A shows a structure of a pad frame 208 for setting the pressure pad. The pressure pad 207 is set inside of the pad frame 208. (In this case, the material of FIG. 30D is used.)

FIG. 31B shows a situation that the pad frame 208 is fixed to the carriage base 189. The pad frame 208 and the carriage base 189 are connected by a hinge 209 and it can be opened and closed by a lever 212 in the direction of the arrows. In the card reader 160 of the present invention, after leading the card 161 to the carriage base 189 of the feeding mechanism 186 and pushing the card by the pressure pad 207, the carriage base 189 is moved and information writing/reading operation is started as stated later. Then, the carriage base 189 is returned to the original position to extract the card 161 out of the apparatus and the extracting operation is executed by moving the pressure pad 207.

In the present invention, the pad frame 208 is always down onto the carriage base 189 except the time of operations of leading the card in and out, for the purpose of making the harmful influence of dust from the outside as little as possible.

Figure 32A:
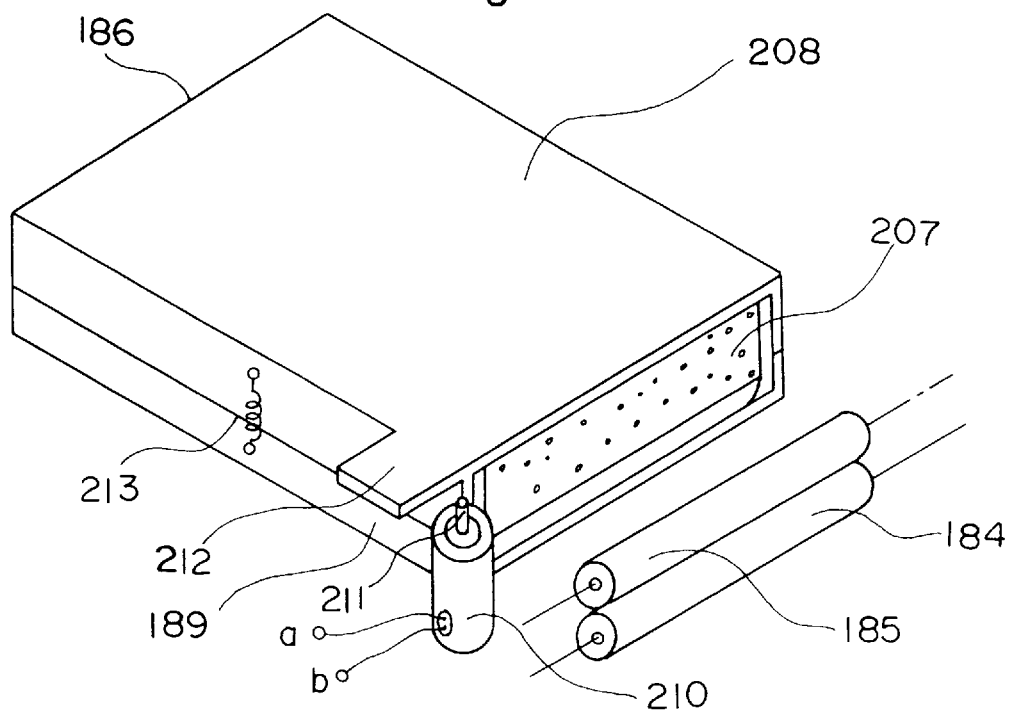
FIGS. 32A and 32B show another embodiment of the pressure pad mechanism applied on the feeding mechanism of the present invention.
Figure 32B:
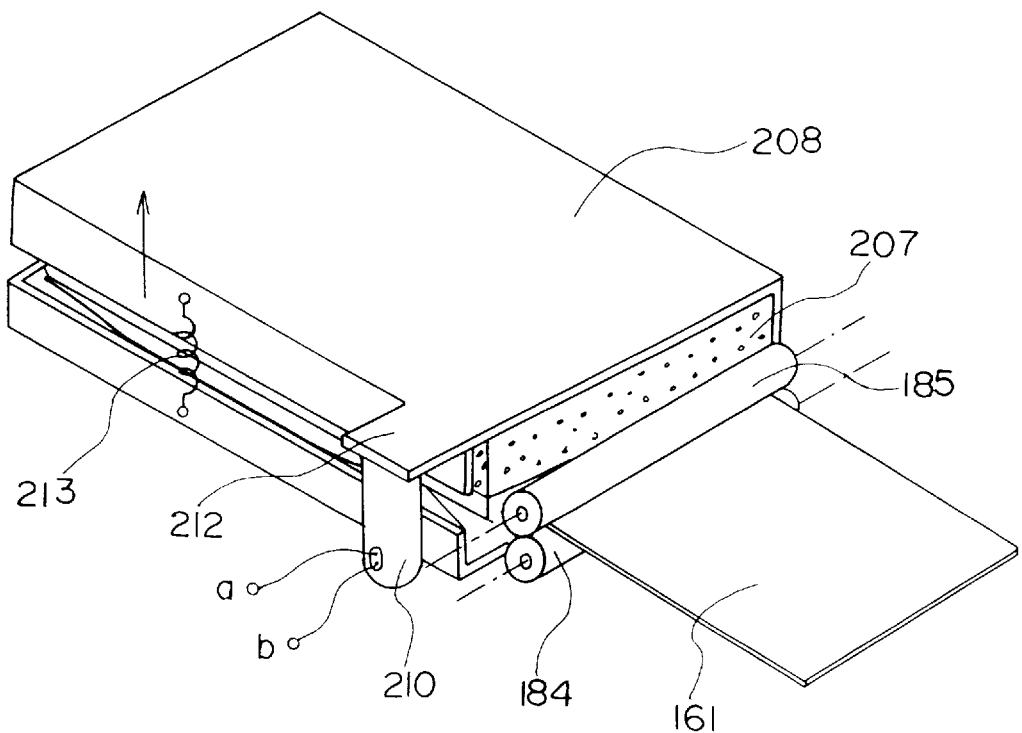

FIGS. 32A and 32B illustrate operation of the pad frame of the feeding mechanism. FIG. 32A shows a situation that data writing/reading operation is ready to start with the card 161 in the feeding mechanism 186. In FIG. 32A, the feeding mechanism 186 is moved away from the driving roller 184 and the guide roller 185 placed at the apparatus base by the track seek mechanism described later. FIG. 32B shows a situation that the driving shaft 211 is moved upwards, the lever 212 is lifted and the pad frame 208 is open, by sending direct current to terminals a and b of a solenoid 210. After the card is led in, the pad frame 208 can be closed by the power of an extension spring 213 since upward power of the driving shaft 211 becomes zero by turning off the direct current of the terminals a and b of the solenoid 210.

FIG. 33A shows a detecting sensor for judging whether the card 161 is between the carriage base 189 and the pad frame 208 or not. A small micro switch 215 is fixed to the back side of the carriage base 189 in FIG. 33B. As shown in FIG. 33B, a detective end 215a is a little protrudent from the carriage base 189. There is a through hole 217 in the pressure pad 207. When the card 161 is not inside, the detective end 215a of the micro switch 215 is protrudent and its electrical output is off. As shown in FIG. 33C, when the card 161 is led in, the detective end 215a becomes hollow since the card 161 is pushed by the pressure pad 207 and its electrical output becomes on.

Embodiment 23

A track seek mechanism for moving the feeding mechanism 186 against the head assembly of the card reader will now be explained in detail.

Figure 34:
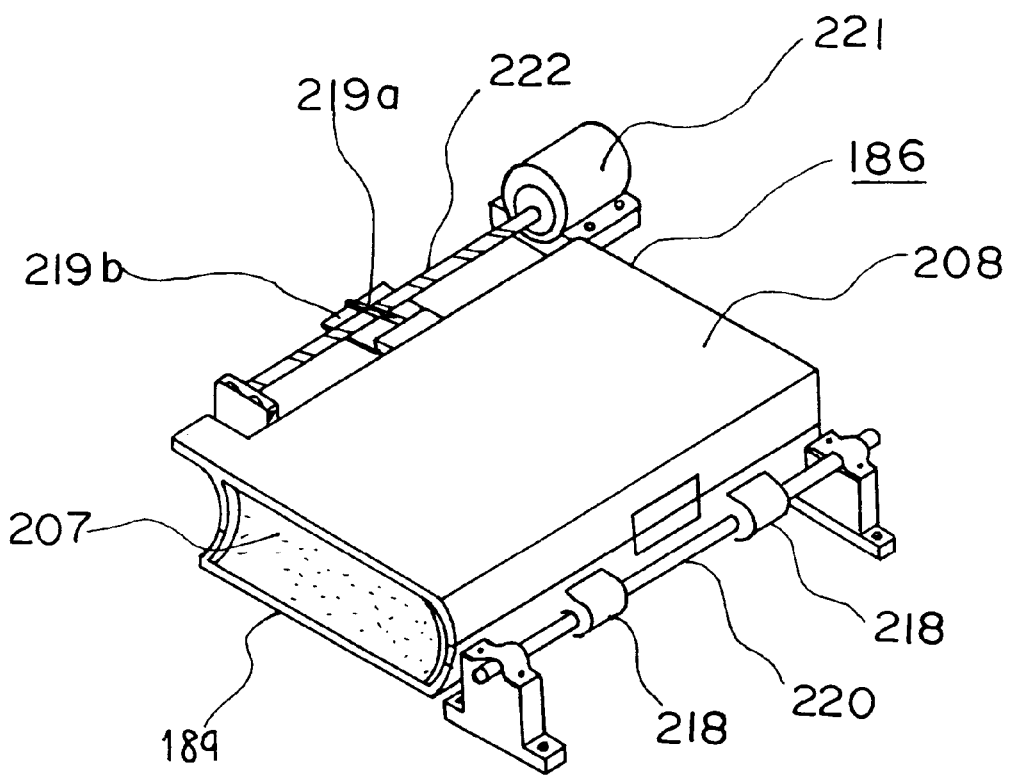
FIG. 34 shows one embodiment of a track seek mechanism of the card reader of the present invention.

FIG. 34 shows one embodiment of the track seek mechanism of the card reader. In the track seek mechanism, a plurality of linear guide bearings 218 are installed at the side of the carriage base 189 shown in FIGS. 27A to 27C. A needle 219a and a pre-load spring leaf 219b are installed at the other side of the carriage base 189. The linear guide bearings 218 assist front and rear seek operation of the feeding mechanism 186 through a guide rod 220. A stepping motor 221 is used as a driving power of the feeding mechanism 186 in this embodiment. The stepping motor 221 includes two parts, a stator and a rotor. By sending phase pulse current into plural coils in the stator, a rotating power is generated between the stator and the magnet in the rotor. Then, the stepping motor can rotate right and left as much as the angle corresponding to value of pulse. As the rotor of this invention is unified with a lead screw 222, the rotation of the rotor is conveyed to the lead screw 222. A needle 219a is buried diagonally in the spiral root of the lead screw 222. A pre-load spring leaf 219b at opposite of side of the lead screw 222 assists the mesh of the lead screw 222 and the needle 219a. The basis of the track seek mechanism is to convert the rotation of the lead screw 222 to a direct movement of the needle 219a. Accordingly, the right and left rotation of the stepping motor 221 makes the feeding mechanism 186 move forwards and backwards.

Although a voice coil motor good for high speed is used in the conventional hard disk device to shorten access time, the voice coil motor has a defect that it gets shock easily and consumes a lot of electricity. The reason for using the stepping motor 221 in the embodiment of the track seek mechanism of the present invention is that the stepping motor does not get a shock easily nor consume a lot of electricity. However, a moving speed of the stepping motor 221 is slower than that of the voice coil motor. The stepping motor is appropriate for a recording device in an apparatus driven by battery, such as a portable information apparatus. It is possible to use the voice coil motor which is high speed in this card reader 160 when it is not necessary to be portable and it is important to shorten the access time. A turntable with some heads (magnetic head or optical head) for writing/reading data on the card 161 is rotated in high speed to make the access time shorter. Some obstacles caused by the above high speed rotation in the magnetic card reader for example, can be removed by applying a float mechanism which floats a magnetic head 13a or 13b above the magnetic card 1a. Because a friction and an injury are not generated. Although the case of recording by contact is explained in the above embodiments, the case of the magnetic card reader having the float mechanism can be also acceptable.

The pressure pad in the pad frame 208 shown in FIG. 34 is hollowed roundly. Because the height of the base surface of the carriage base 189 (wherein the card 161 is led in) should be coincident with the line where the driving roller 184 contacts with the guide roller 185 shown in FIGS. 27A to 27C. Besides, the line where the two rollers contact should be close to the base edge of the carriage base 189. The round hollow is curved largely for the pad frame 208 opening and closing.

Embodiment 24

Now, card positioning mechanism for positioning the card on the specific position of the card reader accurately will be explained.

Figure 35A:
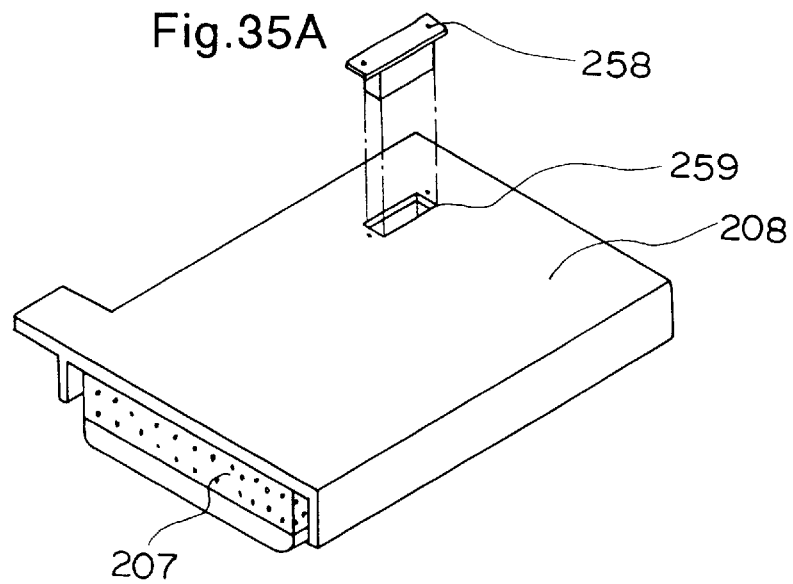
FIG. 35A shows an assembly structure of a pad frame and a pressure pad of the card reader of the present invention.
Figure 35B:
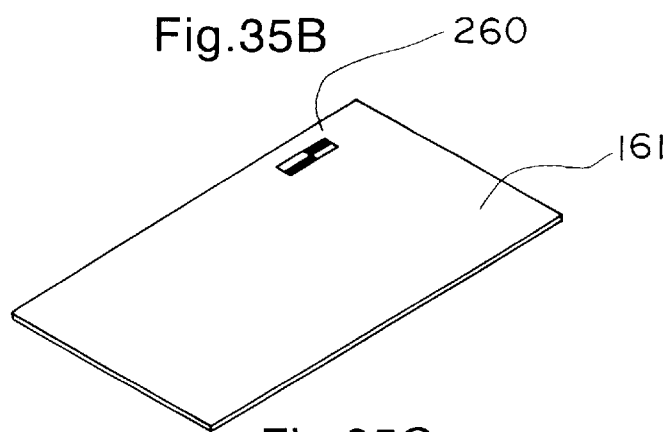
FIG. 35B shows a positioning mark printed on the card of the present invention.
Figure 35C:
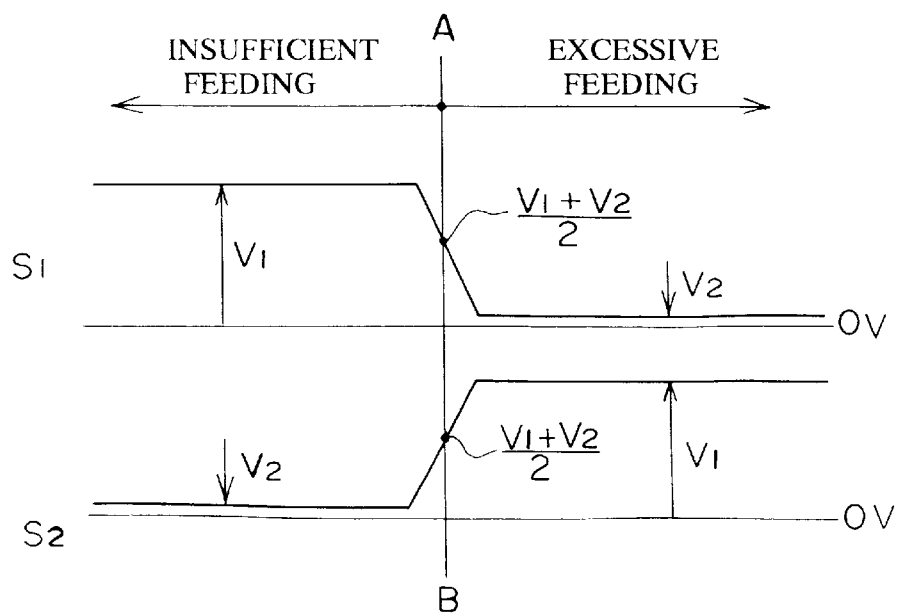
FIG. 35C shows signals detected by an optical sensor of the present invention.

FIGS. 35A to 35C show how the card of the card reader of the present invention is set on the carriage base. FIG. 35A shows an assembly structure of the pad frame 208 and the pressure pad 207. A optical sensor 258 is inserted and fixed into a through hole 259 in the pad frame 208 and the pressure pad 207.

The pad frame 208 is fixed to the carriage base 189. When the card 161 is led in, the optical sensor 192 on the carriage base 189 shown in FIG. 33A detects the card. In this case, the pad frame 208 comes down and the pressure pad 207 fixes the card. However, it is sometimes difficult to position the card accurately because such an accuracy depends on accuracies of the rotation of the driving roller 184, positioning by the card side guide 187 and detection of the optical sensor 192. In this embodiment, an accurate positioning of the card is executed by using the optical sensor 258. FIG. 35B shows a positioning mark 260 having white areas and black areas printed on the card 161. The optical sensor 258 detects this positioning mark 260 and figures out the setting position.

FIG. 35C shows signals detected when the optical sensor 258 detects the positioning mark 260. The optical sensor 258 has two channels, namely has two pairs of reflection type sensor made of photo diode and optical transistor. Each output from each optical sensor is defined as $S_1$ or $S_2$. It is also defined that an output voltage of white area is $V_1$ and that of black area is $V_2$. Outputs of $S_1$ and $S_2$ depending upon the detected position of the positioning mark 260 are shown in FIG. 35C. The most appropriate point for positioning by each sensor is on the border between the white area and black area of the positioning mark 260. The border lies on the point where the output voltage of $S_1$ or $S_2$ is $V_1/2$ plus $V_2/2$. Accordingly, when the optical sensor 258 comes to A-B shown in FIG. 35C, the most appropriate position is set.

The card positioning mechanism of the card 161 of the present invention uses the stepping motor 221 as an embodiment. Generally, the stepping motor is mainly used in the positioning mechanism whose track density is low, for recording device such as floppy disk drive. Based on a servo signal recorded in a recording medium in advance for positioning, servo control method is adopted. A high accurate positioning operation is executed by controlling phase current of the stepping motor 221 based on the output voltage of $S_1$ and $S_2$ of the optical sensor 258 in the present invention.

Now, one of the card holding mechanism, whose pad can be open, will be explained.

Figure 36:
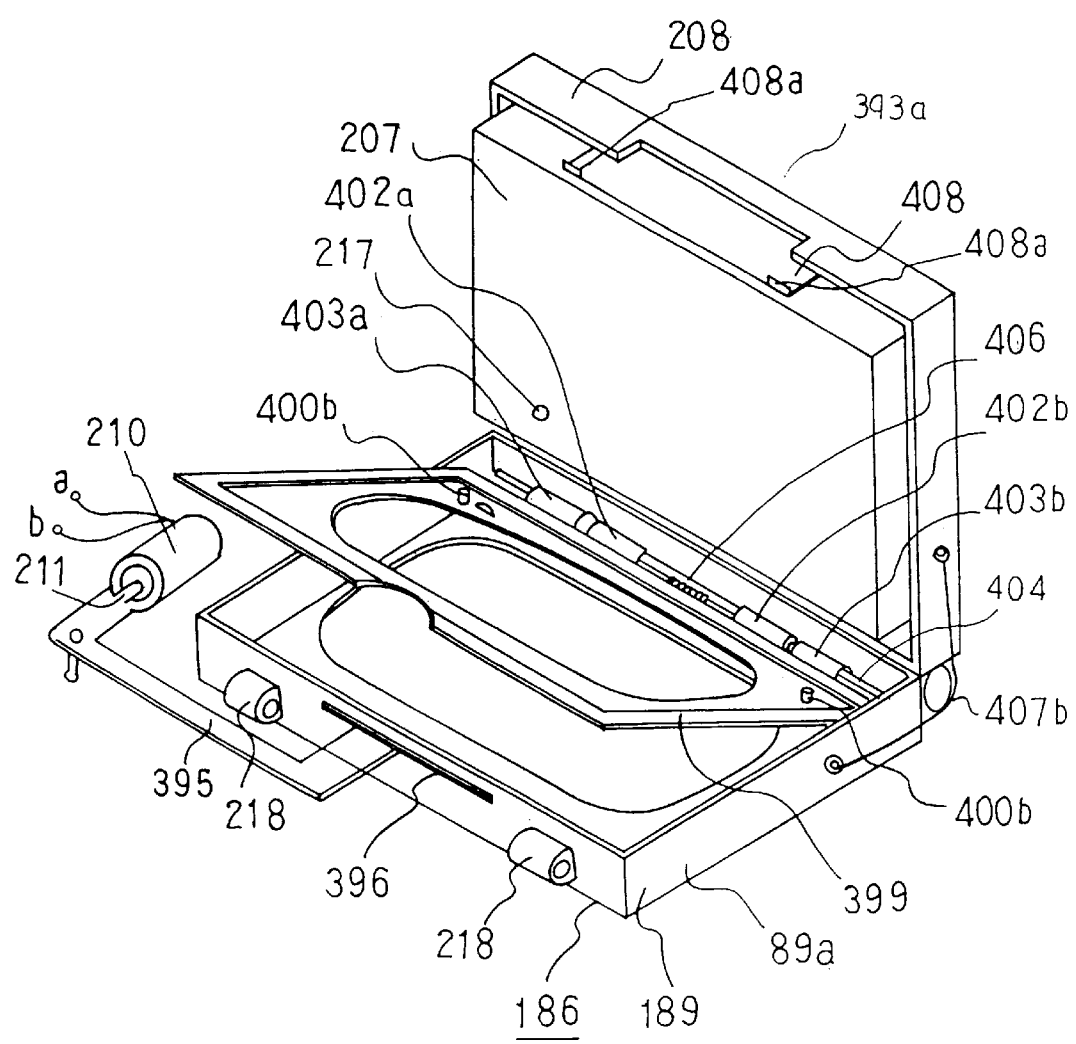
FIG. 36 shows one embodiment of the feeding mechanism of the card to a carriage base of the present invention.

FIG. 36 shows another embodiment of the feeding mechanism. A card holder 399 is installed between the pressure pad 207 and the carriage base 189. The card holder 399 is for positioning the card 161 onto the carriage base 189 accurately.

Figure 37A:
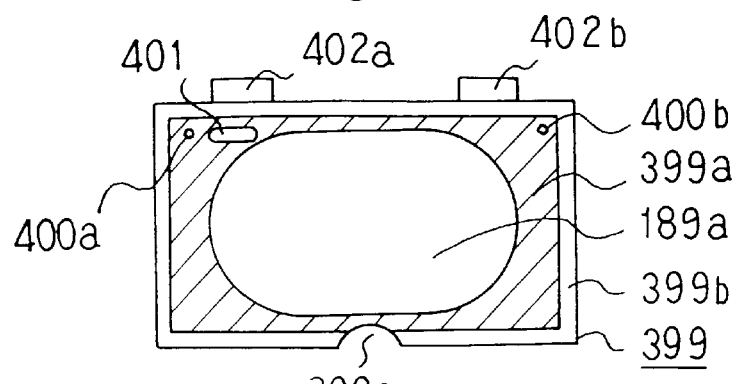
FIG. 37A shows a card holder of the present invention.

FIG. 37A shows the card holder 399. A flat portion 399a, shown shaded in the figure, is for putting the card 161 on. The flat portion 399a is lower than a frame portion 399b and has a notch 399c. Positioning pins 400a and 400b are placed where the pressure pad 207 fixed to a cover 393a does not cover the positioning pins 400a and 400b in assembling. In the center of the card holder 399, there is an access opening 189a for turntable. There also is a through hole 401 for sensor part of the micro switch 215 (not shown) on the card holder 399. Cylindrical Joints 402a and 402b for connecting with the carriage base 189 are installed at the side.

Figure 37B:
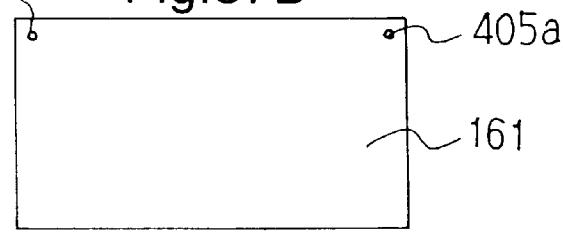
FIG. 37B shows a card of the present invention.
Figure 37C:
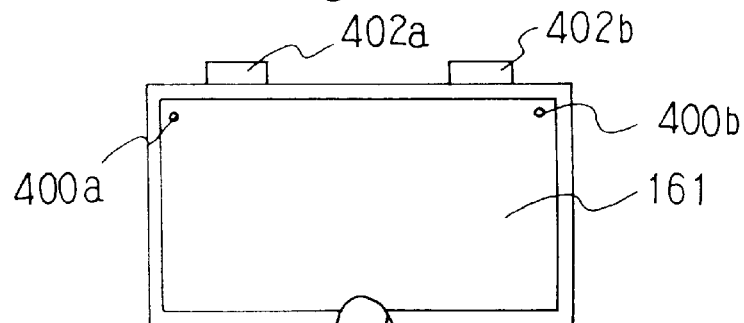
FIG. 37C shows the card in the card holder of the present invention.

FIG. 37B shows the card 161 used in the present invention. The card 161 has holes 405a and 405b for positioning, at the upper right and left. FIG. 37C shows a situation that the card 161 is in the card holder 399. The card 161 can be put and taken easily by using the notch 399c.

Figure 37D:
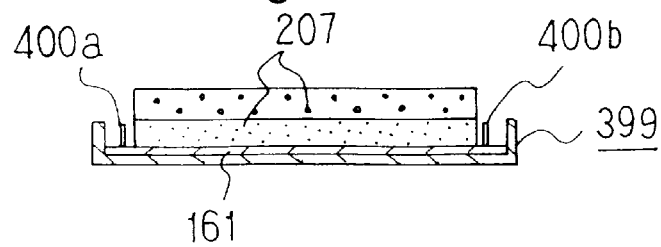
FIG. 37D shows a section of the card holder of the present invention.

FIG. 37D shows a section in the situation that the cover 393a is pushed onto the card holder 399. This card holder 399 is fixed to the carriage base 189 by the pressure pad 207. The joints 402a and 402b shown in FIG. 37A are hinged through a cylindrical pole 404. The card holder 399 can open around 45 degrees from the surface of the carriage base 189, with one or two torsion springs 406. Torsion springs 407a (not shown) and 407b are fixed to the inside or the outside of the pad frame 208 and the carriage base 189. The pad frame 208 and the carriage base 189 are usually closed together. The driving shaft 211 of the solenoid 210 drives a lock release lever 395. The lock release lever 395 gets into a side slit 396 of the carriage base 189. A projection 408a at the top of a latch 408, made of material of spring and inside of the pad frame 208, comes apart from the concave (not shown) of the carriage base 189. The pad frame 208 can be open by lifting the cover 393a.

When the pad frame 208 is closed, the projection 408a of the latch 408 meshes with the concave of the carriage base 189. A direct current motor 22, a turntable 15, and a rotary transformer holder 20 under the carriage base 189 are omitted in FIG. 36. Magnetic heads 13a and 13b in the case of the magnetic card reader, objective lenses 151a and 151b in the case of the optical card reader are also omitted. Regarding structure of the track seek mechanism, there are the stepping motor 221 and the lead screw 222 which move the carriage base 189, on one side, which is the same as FIG. 34. The lead screw 222 is between the needle 219a and the pre-load spring leaf 219b. The linear guide bearing 218 and the guide rod 220 are on the other side.

In FIGS. 32A and 32B, one side of the pad frame 208 and the carriage base 189 is lost in order to feed the card 161 by the driving roller 184 and the guide roller 185. The pressure pad 207 can be seen from the outside. Method of feeding the card 161 in FIGS. 37A to 37D is different from FIGS. 32A and 32B. In FIGS. 37A to 37D, the pad frame 208 and the carriage base 189 have all the sides like a box and the box can be opened. The respects of having the micro switch 215 on the carriage base 189 and the through hole 217 on the pressure pad 207 for detecting the card 161 shown in FIGS. 33A to 33C are the same in FIGS. 37A to 37D.

Embodiment 25

In this embodiment, one example of a recording format of the track for reading and writing on the card will be explained. Each recording track is composed of plural sectors.

Figure 38A:
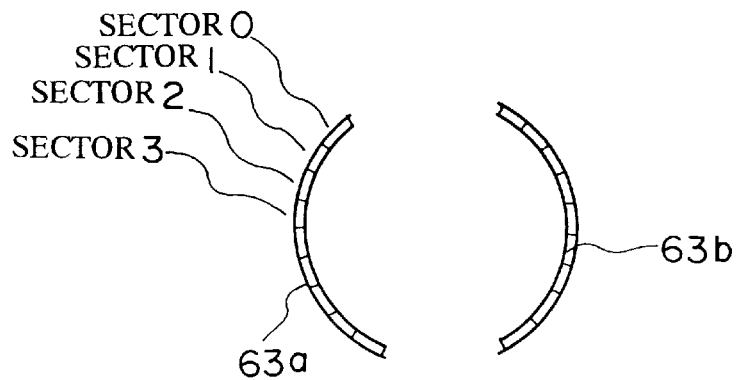
FIGS. 38A and 38B show one embodiment of the sector format.
Figure 38B:
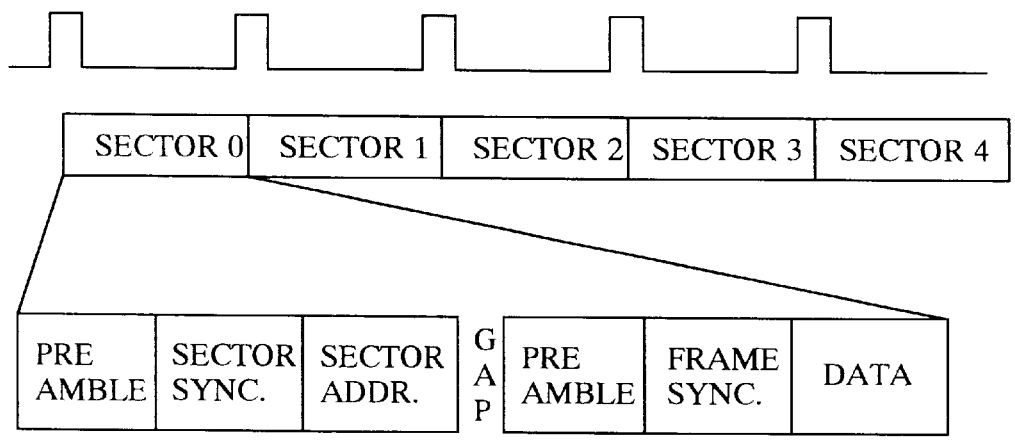
Figure 38C:
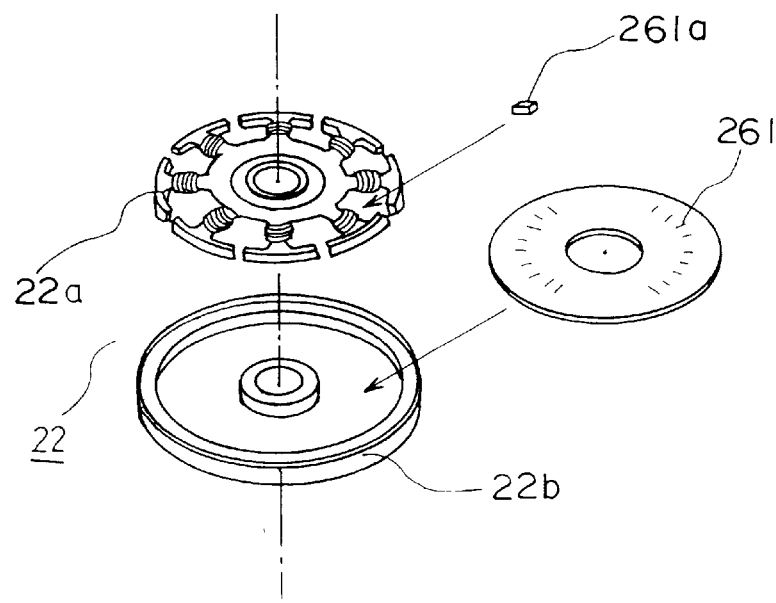
FIG. 38C shows a rotor and an optical encoder.

FIGS. 1 to 37D explain the card readers 160 and the card 161 of the present invention mainly. FIGS. 38A to 38C show one embodiment of the sector format. The card reader 160 has a plurality of two arc tracks on the concentric circle which are symmetry in right and left. The card reader 160 performs data reading and writing by one or two magnetic head or optical head. Recording tracks 63a and 63b are divided into plural sectors as shown in FIG. 38A. Format shown in FIG. 38B is applied in each sector. This format is almost the same as the format used in floppy disk drive, optical disk drive and hard disk drive. However, the format can be different depends upon the used system.

In the case of the magnetic card of the present invention, the magnetic card reader can itself write preamble, sector synchronization, sector address and preamble, frame synchronization, data. In the case of the optical card, the preamble, sector synchronization and the sector address should be stored in advance depending upon the medium and then the preamble, frame synchronization and data are written by the optical card reader.

In this invention, sector pulse showing the original point of each sector is not generated from data on the medium. An optical encoder 261 is installed in a rotor 22*b* in the direct current motor 22 shown in FIG. 38C. The optical encoder 261 is made of round paper or round plastic and has slits. An optical sensor 261*a* of reflection type is installed in the magnetic circuit of a stator 22*a*. Slit data of the optical encoder 261 is converted to pulse signal by the optical sensor 261*a*. This converted signal is used as the sector signal.

Figure 39:
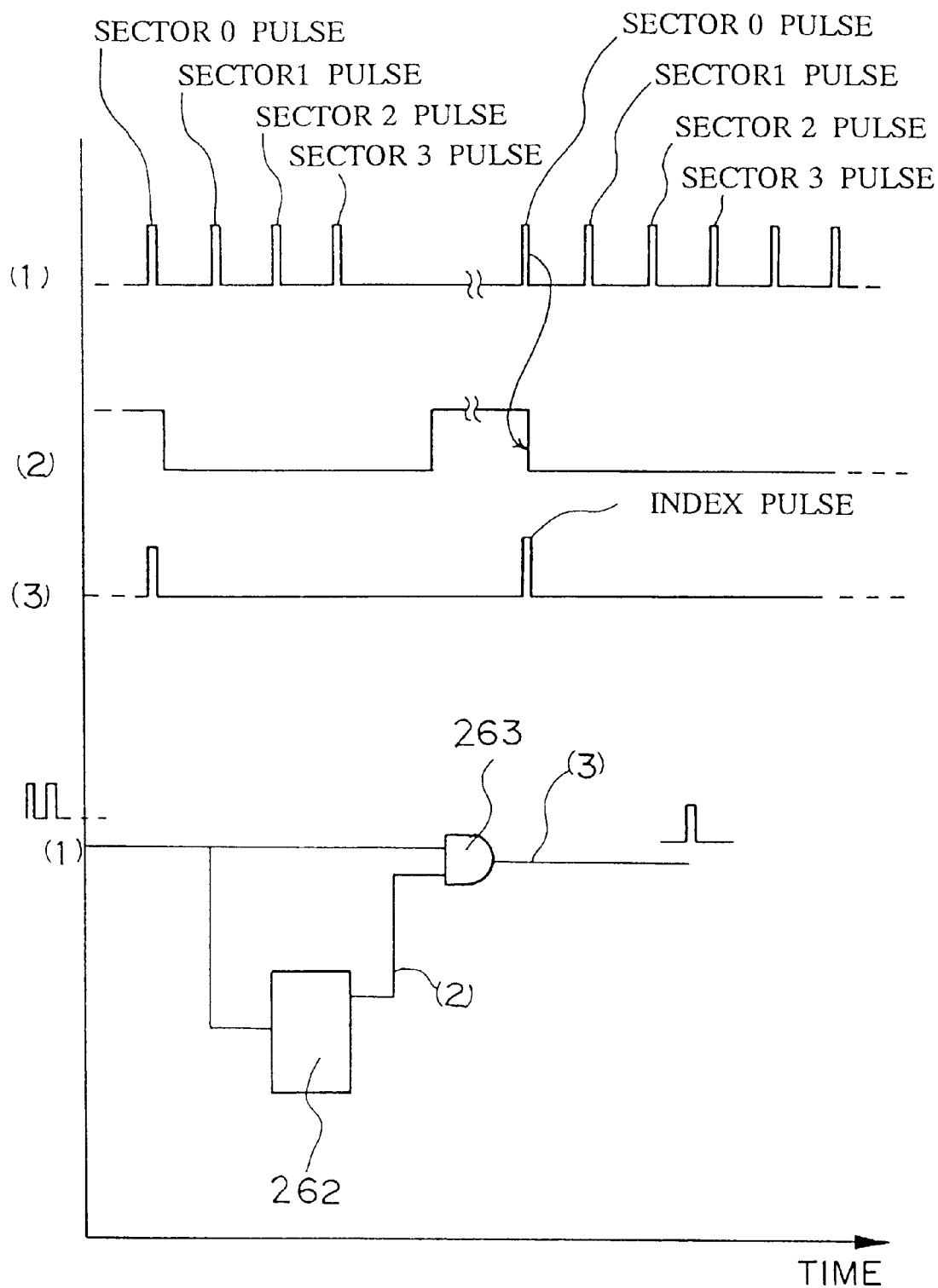
FIG. 39 shows a relation between a sector pulse and an index pulse.

FIG. 39 shows the way of making index signal from the sector signal in FIG. 38B. The (1) in FIG. 39 is a sector pulse signal stream. When the pulse signal becomes down, a retrigger type one-shot circuit 262 is activated. Supposing that a time constant of one-shot circuit 262 is a time width obtained by adding the time width between the sectors to the time width of the sector pulse, output of the retrigger type one-shot circuit 262 can be shown as (2) in FIG. 39. The pulse in (3) shows output of an AND circuit 263 of the signal in (1) and signal in (2). This pulse is called the index pulse and emerges at the head of the recording tracks 63*a* and 63*b*. The above sector pulse and the index pulse are used for operation timing of the card reader 160 or used as a reference signal for writing/reading operation when sent to the controller (not shown) of the card reader.

Embodiment 26

The relation between the whole apparatus of the card reader after assembling stated in the above embodiments and the card installation will now be explained.

Figure 40:
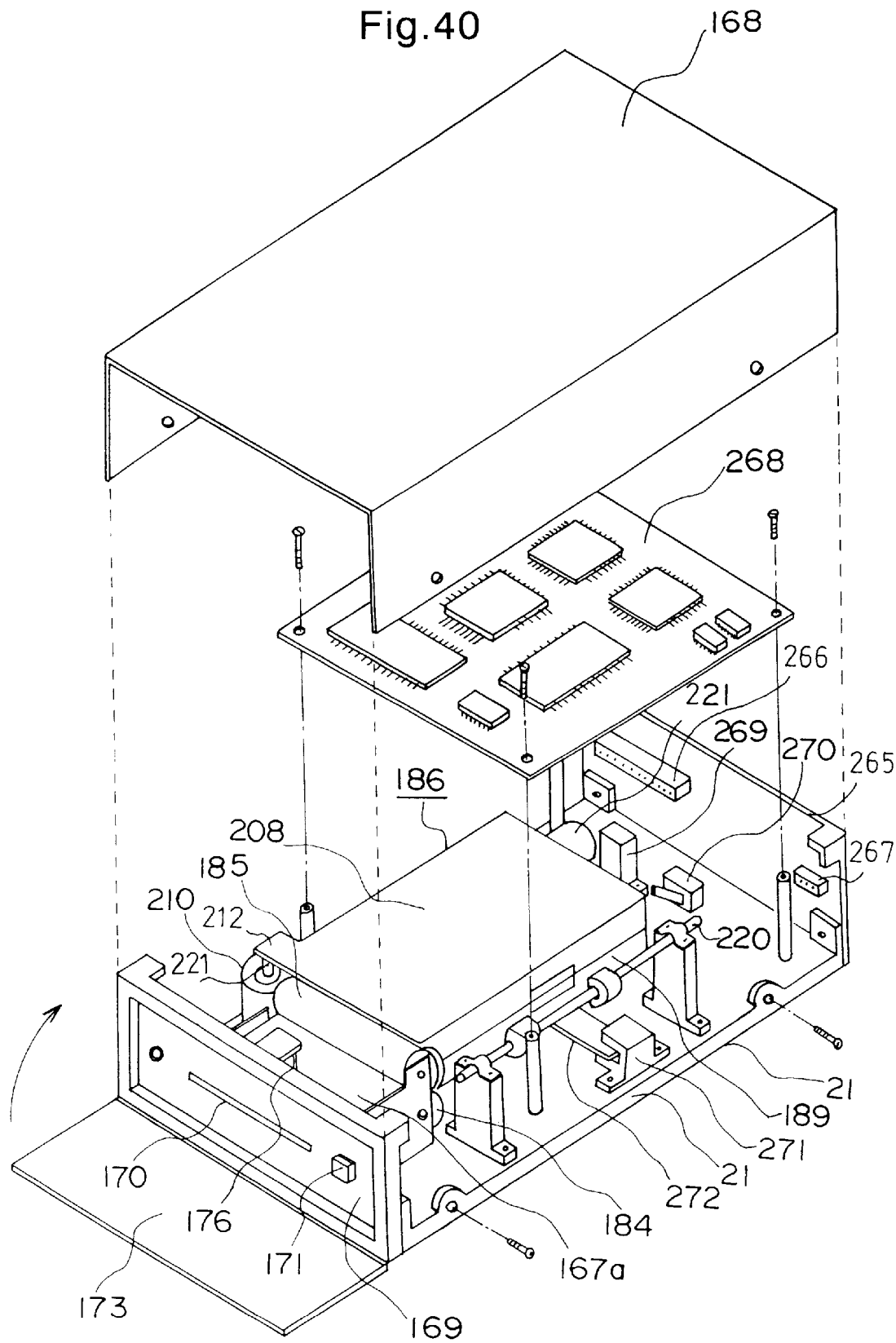
FIG. 40 shows one embodiment of the card reader of the present invention.

FIG. 40 shows the whole structure of the card reader of one embodiment of the present invention. The sequence of the card inserting and extracting, and the outline structure of the card reader 160 of the present invention without a cover 168 are explained as follows.

(i) Case of feeding the card into the card reader

First, the overhung door 173 is opened and the card 161 (not shown) is inserted along the sub-base 167*a*, through the card inlet 170 of the front panel 169. When the card 161 made of insulator is led in, the sub-base 167*a* is contacted by the card 161 and the detecting element 176 in conduction becomes nonconductive. An inside control circuit of the card reader detects this situation. Then, the solenoid 210 is moved to push up the lever 212 of the pad frame 208 and an opening for passing the card 161 is made between the carriage base 189 and the pad frame 208.

Secondly, the direct current motor (not shown) or the stepping motor (not shown) is rotated. The driving roller 184 receives the above rotation and rotates with the guide roller 185. Then, the card 161 is led into the inside of the carriage base 189. The card positioning along the X-axis and Y-axis is fixed at this time by the card side guide 187*a*, the card end guide 190 and the optical sensor 192 of the carriage base 189 shown in FIG. 27. When the solenoid 210 becomes off, the card 161 is stuck between the carriage base 189 and the pressure pad 207 in the pad frame 208.

The above operations are under control of the inside of the card reader 160. After feeding the card is finished, signal telling the finish is sent to a controller outside of the card reader 160. These are what done until the card 161 is led into the inside of the card reader 160.

(ii) Case of the card already being inside the card reader

If the power switch is turned on again after turning it off at the end of the data reading or data writing of the card 161, the card 161 is still inside the card reader 160. In this case, the inside controller circuit does not make the driving roller 184 and the solenoid 210 move even though the detecting element 176 tells a detection of a new card. Because the micro switch 215 shown in FIGS. 33B, 33C has already detected the card 161 being installed.

(iii) Case of leading the card out

The card 161 can be led out of the card reader 160 when an eject button 171 of the front panel 169 is pushed by hand or an order of card ejection is sent from the controller.

The solenoid 210 shown in FIG. 32A is operated based on the order of card ejection. The driving shaft 211 goes up and makes the pad frame 208 open. As nothing restrains the card 161, the card 161 is pushed forwards by power of the flat spring 191 at the back of the card end guide 190 on the carriage base 189. When the solenoid 210 operates, the direct current motor (not shown) rotates and makes the driving roller 184 and the guide roller 185 rotate. Since the card 161 is pushed forwards by the card end guide 190, the card 161 is put between the driving roller 184 and the guide roller 185. The card 161 is led out through the card inlet 170 by the two rollers.

Whether the card is led out or not is detected by the detecting element 176 at the back of the card inlet 170. When the card 161 passes under the detecting element 176, no electrical conduct can be made between the detecting element 176 and the sub-base 167*a*. Then, rotation of the driving roller 184 is stopped after rotating for a while. Speed of leading the card out is set at slow in the present invention. The card 161 is set to stop at the place a little away from the driving roller 184 and the guide roller 185 based on spring power of the detecting element 176 even when the card reader 160 is put sideways. The nonconductive situation lasts until the card 161 at the card inlet 170 is pulled out.

To start again, taking the card 161 out by hand, making the detecting element 176 be in the original situation and putting the card again through the card inlet 170 are necessary. The conductive and unconductive signals are used in circuits inside the card reader 160 and sent to the controller.

Now, necessary structure elements in the card reader 160 which have not been explained will be described in reference to FIG. 40. An interface connector 266 and a power connector 267 are installed in a back panel 265 and they are connected with a circuit board 268 in FIG. 40. Circuits for writing/reading data, controlling the stepping motor, controlling the direct current motor, controlling the solenoid and controlling the inside including output process of various sensors are on the circuit board 268.

A stopper 269 for stopping a wrong motion of the carriage base 189 by misoperation is installed on an apparatus base 21. A micro switch 270 next to the stopper 269 detects the wrong motion. A optical sensor 271 for detecting home position is also installed on the apparatus base 21. The optical sensor 271 generates a signal when an optical shield plate 272 at the side of the carriage base 189 passes. Leading the card 161 in and out of the apparatus can be possible at the position where the above signal is generated.

The optical card reader of the present invention gets the card into the inside with the card holding mechanism when the card is put through the card inlet by hand. Then, the card is set at the specific position to be prepared for writing and reading.

When extracting the card is directed, the card holding mechanism releases the card and leads the card out through the card inlet.

Embodiment 27

Outlines of circuits for controlling the card reader and writing/reading data are described as follows.

Figure 41:
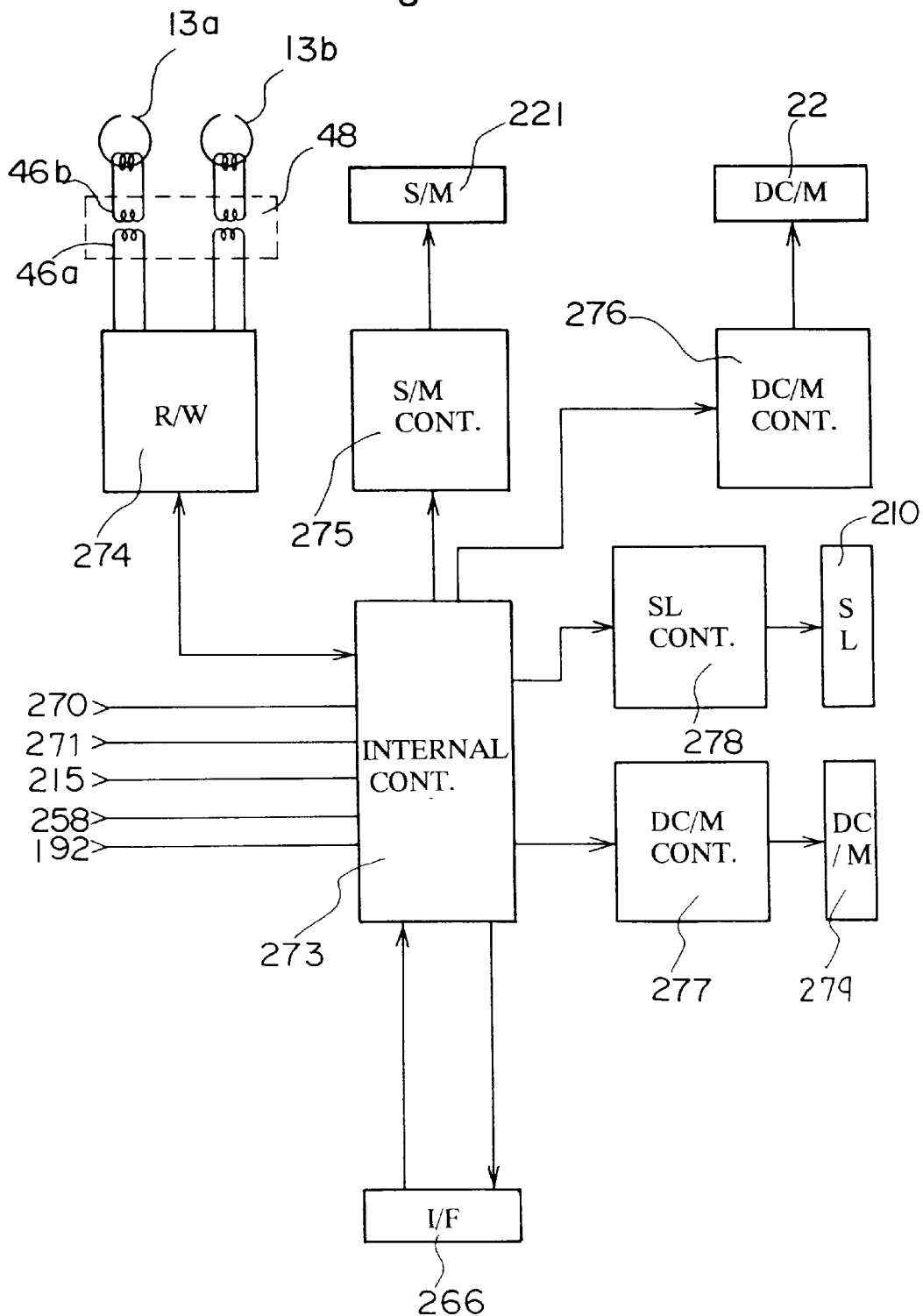
FIG. 41 shows a block diagram of circuits in the card reader of the present invention.

FIG. 41 shows a block diagram of circuits in the card reader. An internal controller 273 receives a track address, sector address, head number, clock signal, read/write command and recording data, from an external card reader control circuit 312 (not shown), through the interface connector 266. The internal controller 273 sends a clock signal for reproducing data and a signal for detecting error, towards the external card reader control circuit 312. The internal controller 273 sends encoded recording data generated inside, a read/write control signal and a head selection signal to a read/write circuit 274. The internal controller 273 receives an encoded data from the read/write circuit 274 and decodes it into the original data. A direction signal for the stepping motor 221 going forward or backward and pulse numbers are sent to a stepping motor controller 275. An on/off signal for the direct current motor 22 is sent to a DC motor controller 276. A rotation direction signal and an on/off signal for the direct current motor 279 are sent to a DC motor controller 277 for driving roller 184. An on/off signal for the solenoid 210 is sent to a solenoid controller 278. Outputs from a micro switch 270, an optical sensor 228, a micro switch 215, a photo sensor 258 and an optical sensor 192 are necessary signals for controlling the sequence in the internal controller 273. The micro switch 270 arranged inside the card reader is for detecting an overrun. The optical sensor 271 is for detecting a home position. The micro switch 215 is for detecting the card on the carriage base 189. The optical sensor 258 is for detecting a positioning mark of the card 161. The optical sensor 192 is for detecting a position of Y-axis of the card 161 on the carriage base 189.

Embodiment 28

Feature of the card 161 of the present invention will be described.

The card reader 160 of the present invention as well as a 3.5 inch floppy disk drive which is mainly used as a recording media interchangeable type of recording device, can be used as a file of a computer and a wordprocessor. The card reader 160 can be also used for recording medium of a card used in shopping, game, getting information, studying, understanding operation of a machine and so on. The getting information includes information on traffic, hotels, geographical and historical background of some place, news, books, companies, advertisement and so on.

(A) Card Operation

The conventional prepaid card, such as telephone card has a magnetic recording track along the long side of the magnetic card. Since access of a specific direction along the long side of the card is only acceptable conventionally, it is necessary to insert the card in a correct direction if the card has been inserted wrongly into the magnetic card reader. However, the card 161 used in the card reader 160 of the present invention can be acceptable independent of the direction of the long side with respect to front or rear as long as the card is inserted into the card reader 160 with data recording side below. Namely, data reproducing operation can be started even when the card is inserted oppositely with respect to front and rear.

The locus of the magnetic recording track has been explained in FIG. 12B. The format of right and left arc recording track of the magnetic recording track is almost same as a format for hard disk drive, floppy disk device and optical disk drive. Even when the magnetic card 1a is inserted into the magnetic card reader oppositely, data on the track can be read accurately since rotation direction of a recording track 63 with respect to a magnetic head 13a or 13b is always relatively the same. The address alignment of the track and the direction of the magnetic card 1a can be detected in the magnetic card reader. In this case, the direction of the magnetic card 1a is known from address information of the outermost tracks. The track detecting operation responsive to a direction on track address from the outside controller is performed. By having data on track address in the magnetic card 1a converted reversely with respect to front and rear, the track detecting operation can be performed. The track detecting operation can be performed without changing the direction of the magnetic card even when the magnetic card is inserted oppositely. It is necessary to have another positioning mark 260 shown in FIG. 35B on the card 161 for realizing the above.

When sector information including servo information is recorded in each recording track of recording medium in advance, positioning of the card can be performed without using the above positioning mark 260. For example, when servo information which extends to a neighboring track is put in a region of preamble, sector synchronization, sector address information in a sector format as shown in FIG. 38B, positioning the card can be performed without using the above positioning mark 260. The above servo information includes servo pattern for sector servo used for a hard disk drive.

(B) Facility in Data Detection

As described in FIG. 12B, the recording tracks are aligned at regular intervals along the long side of the card 161. Access operation of forward and backward along the long side of the card 161 is needed to get contiguous data. Sentences of a book are extended continuously, for example. When the contents of the book is stored in one card, It is possible to reproduce data on the book from the card 161 sequentially by following tracks one by one from the first track of the card 161 like a floppy disk drive or disk drive.

(C) Multiplexed Magnetic Recording Method

Magnetic writing/reading methods using one or two magnetic heads have been explained in the above. Common respects in the above methods are to record data at surface of the magnetic recording medium and to write new data over the old data. By writing the new data over the old data, the old data can be deleted and only the new data can be stored. As long as gap length and gap depth, material character of magnetic core, core width and such of magnetic head are the same in drives, such drives can be compatible. This means that new data can be recorded in a track of the magnetic card 1a where another data was already recorded in other drive. What described above is an essential condition for a drive whose medium is interchangeable.

The card reader 160 and the card 161 of the present invention meet the above condition. It is also acceptable to apply a multiplexed magnetic recording method for the purpose of multiplying functions and usages. In magnetic tape drives and such, method of recording data at deep place of medium by magnetic head of long gap length and then recording data at surface of the medium by magnetic head of short gap length is used. Generally, it is difficult to delete data recorded by the magnetic head of long gap length, using the magnetic head of short gap length. In this case, if there is a big difference between the long gap length and the short gap length, only a partial magnetic condition at the surface changes. The magnetic card where data recorded in advance by special recording drive for deep place is used in this invention. Otherwise, method of making gap length of one of two magnetic heads 13a and 13b long and making the gap length of the other of the two short is acceptable in the present invention.

There are two methods for reproducing data recorded multiplexly. When data was recorded at deep place in other drive and gap length of magnetic head used in reproducing is short, one of the above two methods is applied. The one of two methods is to produce data at deep place and surface simultaneously and to separate two signals by filter. As frequency of data recorded at surface is generally defined to be more than ten times as much as data recorded at deep place, it is easy to separate them at signal reproducing process. The other method is to reproduce data using two magnetic heads, one of which is the same magnetic head used in recording at deep place and the other of which is a magnetic head for surface recording. Since the magnetic head whose gap length is long does not have a good characteristic for high frequency, output signals read from surface become small. Further, it is possible to take out data recorded at deep place finely by using low-pass filter. On the other hand, signals of low frequency recorded at deep place can be removed from output of the magnetic head fit for surface recording, by using high-pass filter.

By using this procedure, it is possible to apply a method which is the same as servo method used in hard disc drive, for example. The servo method is reproducing servo information recorded in servo plane by servo head and positioning head based on the reproduced servo information. There is a method that a magnetic head having long gap length is used as one of the two magnetic heads 13a and 13b for reproducing servo information and a magnetic head having short gap length is used as the other of the two magnetic heads for writing/reading data. There is another method of reproducing servo information and data simultaneously by two magnetic heads having short gap length and separating them into two signal sources by signal process circuit. There is another method that one of the two magnetic heads is exclusively used for writing/reading servo information and the other magnetic head is used for writing/reading data. Namely, in this case, the drive has a function of writing and reading the servo information itself.

Another method that speech and sound are recorded at the deep place and data and image information which are rewritten frequently are recorded at the surface can be applicable. Method of recording information seldom rewritten at the deep place and information frequently rewritten at the surface can be also applicable.

(D) Combination with Image Information

Prepaid card in market, such as telephone card and ticket machine card, shows image information by color print or picture and necessary information on issue, price and usage, on the surface of the card. Such image information is useful for identifying kinds of cards. Regarding important information such as price information, amount is shown at the edge of the card and consumed price is recorded by punching the card and storing data on consumption in a stripe magnetic recording medium of the card back side.

On the top side of commuter pass issued by Japan Railway, section, period, name and age of user are shown and in back side magnetic recording medium, data on the above information is recorded in code.

The magnetic card and the optical card of the present invention as well as the above prepaid card and commuter pass can show image information for identifying card kind and can show any number and any language together. The most characteristic respect of the magnetic card and the optical card of the present invention is that information shown on the top side of the card and information recorded in the recording medium in the back side of the card are indivisible. Namely, consistent information composed of the above two information can be provided. Titles of plural information recorded in the back side, chart, picture, position of recorded information and important points of the contents are shown on the top side. Information recorded in the back side can be known based on the information shown on the top. The magnetic card and the optical card of the present invention can be also used as a speech recording/reproducing device through a card recorder.

Embodiment 29

Mechanism of reading/writing with the card holding mechanism staying and with head rotating and moving sideways will now be explained.

Figure 42:
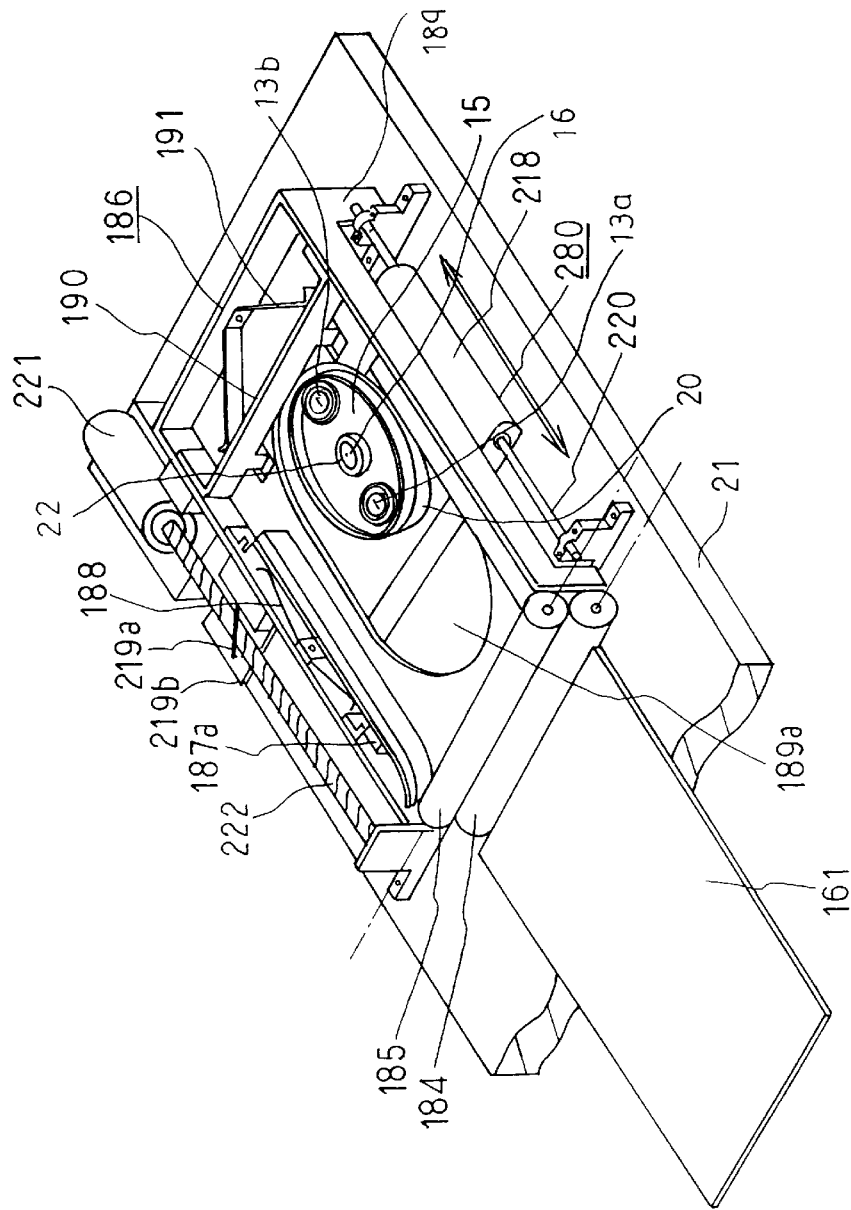
FIG. 42 shows a sideway moving mechanism of a card holding mechanism of the present invention.

FIG. 42 shows another embodiment of the card reader.

In FIG. 34, the carriage base 189 of the feeding mechanism 186 was moved by the stepping motor and the turntable 15 and the direct current motor 22 are fixed to the apparatus base 21. On the other hand, the carriage base 189 of the feeding mechanism 186 is fixed to the apparatus base 21, and the turntable 15, the direct current motor 22 and other attachments are moved in this embodiment. In FIG. 42, the stator 22a (not shown) of the direct current motor 22 is fixed to a head assembly mechanism 280. The rotor 22b (not shown) and the rotation shaft 16 move together. The turntable 15 is attached to the rotation shaft 16 and the turntable 15 rotates with the rotation shaft 16. A rotary transformer holder 20 is fixed on the head assembly mechanism 280.

Mechanism of movement of the head assembly mechanism 280 is the same as that of the carriage base 189 in FIG. 34. A guide rod 220 penetrates through a linear guide bearing 218 at one edge of the head assembly mechanism 280. The guide rod 220 can move back and forth. A needle 219a and a pre-load spring leaf 219b are fixed to the other edge of the head assembly mechanism 280 firmly. A lead screw 222 is fixed to the rotation shaft of the stepping motor 221 and a needle 219a is fixed to root of the lead screw 222. There is the pre-load spring leaf 219b at the opposite side of the lead screw 222. Rotation of the lead screw 222 is converted to a direct movement by the needle 219a.

Feature of this embodiment is that the head assembly including the turntable 15 and magnetic heads 13a and 13b moves rotating on the head assembly mechanism 280 within an access opening 189a for turntable. Comparing with the driving method of FIG. 34, the driving method in this embodiment has an advantage that depth of the drive can be shorter since it is not necessary to move the carriage base 189.

Embodiment 30

In the following, it will be explained how the thickness of the protect layer, which provided above the magnetic layer of the magnetic card, influences to the reading performance of each of two kinds of heads; the magnetic head, e.g., the coil-type magnetic head 13a or 13b on the turntable 15 and the MR head (Magnetic Resistive head) shown in FIG. 11B.

Figure 43A:
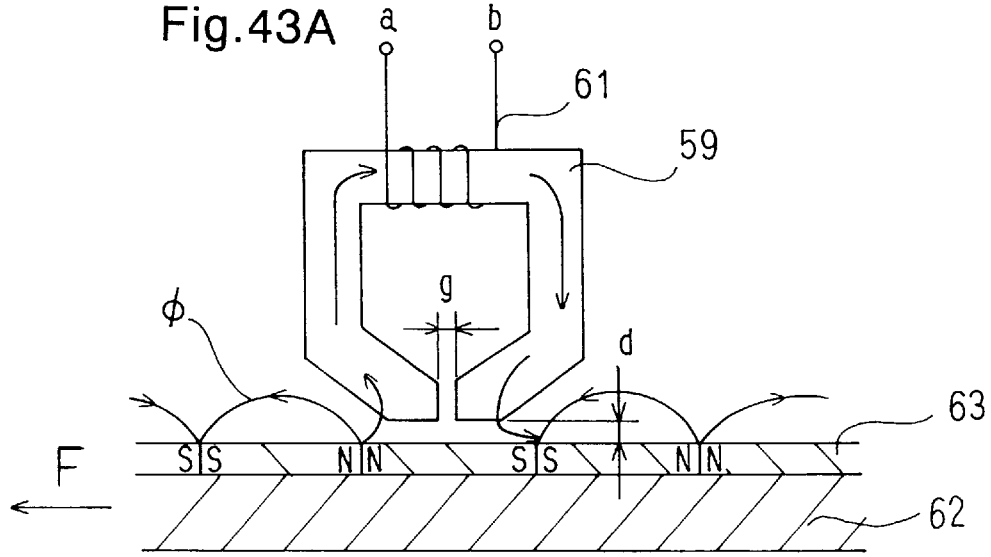
FIG. 43A shows the relationship between the coil-type magnetic head and the reading track.

FIG. 43A shows the relationship between the coil-type magnetic head and the reading track. In FIG. 43A, the information has been already written in the recording track 63 on the magnetic recording medium 62 and the magnetic flux $\Phi$ is always generated between magnetized S pole and N pole. By moving the magnetic recording medium 62 to the direction shown by the arrow F in the figure, a part of magnetic flux $\Phi$ flows from the edge of the head core 59 of the coil-type magnetic head, and the magnetic path is generated between the edge of the head core 59 and the magnetic recording medium 62. The magnetic flux Φ crossing the head coil 61 changes as time passes, and the change is detected as the reading signal by the terminals a and b. The reading performance of the coil-type magnetic head is determined based on the magnetic material of the head core 59, the length of the magnetic path and the length or the width of the head gap. The greatest cause is the distance d between the head core 59 and the magnetic recording medium 62 which determines the amount of the flow of the magnetic flux Φ from the magnetic recording medium 62.

FIG. 43A shows the MR head and the recording track. The magnetic flux Φ generated from the recording track 63 crosses the MR element 501 and the resistance corresponding to the amount of the magnetic flux Φ is generated between the terminals 501c and 501d. The difference between the resistance value at that time and the resistance value of the case when the magnetic flux Φ is zero is used as the reading signal.

The MR element 501 is easily influenced by the outside magnetic field, not only by the magnetic recording medium 62. Accordingly, the MR element 501 is usually covered with the thin magnetic shield film to eliminate the influence of the outside magnetic field except the magnetic flux Φ from the recording track 63 on the magnetic recording medium 62. Recently, a huge MR element which can obtain higher output than the conventional MR element has been in a practical use, in which a thin metal film is inserted between the thin MR films of NiFe/Co, Co/NiFe to generate a little magnetic field.

Figure 43B:
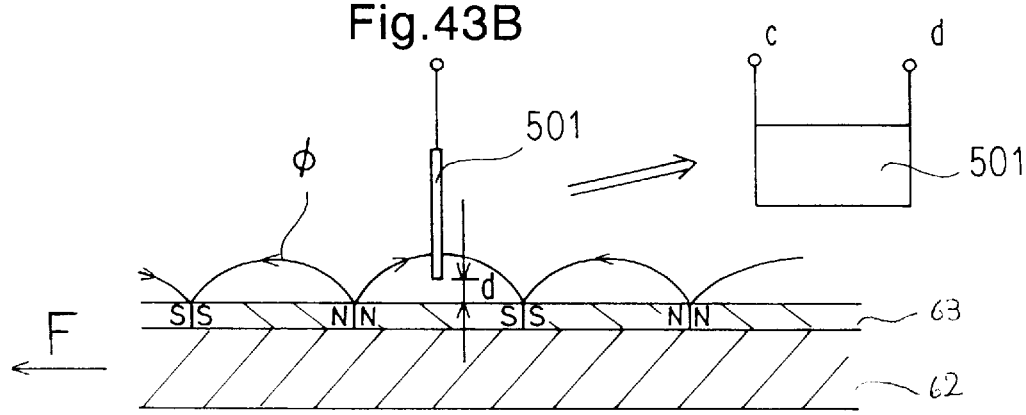
FIG. 43B shows the MR head and the recording track.
Figure 43C:
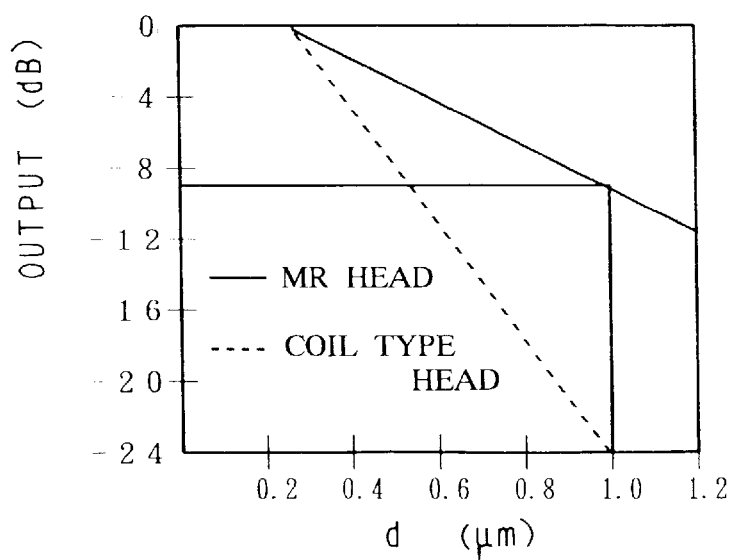
FIG. 43C is an experimental result showing the loss of the distance of the magnetic heads shown in FIGS. 43A and 43B.

FIG. 43C is an experimental result showing the relationship between the standardized output of the coil-type magnetic head and the MR head, which are shown in FIG. 43A and 43B, and the distance d between the head and the magnetic recording medium. In the experiment, the standardized output of the above two kinds of the magnetic heads are compared on the same track on which the information has already written using the same magnetic recording medium with the same distance d. The standardized output of each head is noted while the distance d changes. The declining ratio is obtained by plotting the experimental result. Generally, if the medium is magnetized with an ideal sine-wave, the distance loss (dB) is obtained by the formula −K·d/λ when the distance is d, the recording wave length λ, and the loss constant K. The loss constant K is determined based on the characteristics of the medium and the head. As shown in FIG. 43C, the MR head has smaller loss constant K and is influenced by the distance d less than the above-mentioned coil-type magnetic head. Therefore, the MR head is suitable for the magnetic card with thin non-magnetic film overcoated on the surface of the magnetic recording medium. The magnetic card of the invention will be explained in the following.

Generally, there are two kinds of magnetic cards; a magnetic card without an overcoat on the surface of the magnetic recording medium and a magnetic card with a thin non-magnetic film overcoated on the surface of the magnetic recording medium. Two cases will be explained on using the coil-type magnetic head against these magnetic cards. In case of the former magnetic card, the reading performance of the head is influenced only by the roughness of the surface and the lubricating layer of the magnetic recording medium, and the distance d between the magnetic recording medium and the head can be almost ignored as well as the case of the magnetic tape. The magnetic card of this kind can be used as a recording medium of huge capacity which has a high recording density and a good reading output. However, in the latter case, the thicker the non-magnetic film becomes, the bigger the distance d is. The card thus cannot get a high recording density and a good reading output as well as a telephone card or a commuter pass of Japan Railway Co. which are commonly used today. The use of the overcoated magnetic card is thus limited.

When the MR head is used as a reading head, a high recording density and enough distance d can be got, which is difficult to get using the conventional coil-type magnetic head. In the experiment, a magnetic recording medium holding 1500 oersted is used. The experiment resulted in good enough for practical use in respect of SN ratio; 7500 frpi/100 tpi when the distance d is 0.5 μm (including a slight roughness of the surface of the magnetic recording medium), 2500 frpi/100 tpi when the distance d is 1 μm. The above result is obtained by only one experiment, however, it is expected that the higher recording density could be obtained by further improvement of the magnetic recording medium and the MR head.

It is the main purpose of using MR head provided with the magnetic card reader in the present invention to minimize the output loss caused by distance d by the overcoat. While, the magnetic tape drive or the fixed magnetic disk drive uses the MR head for a different purpose, that is, to get a high bit density and a high track density for increasing the recording capacity, since the MR head could be manufactured with thin film technology and possible to manufacture finely and precisely.

Embodiment 31

Figure 44:
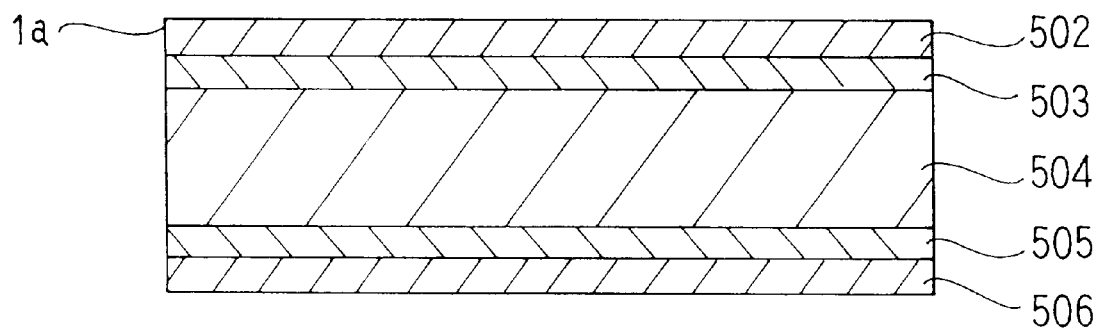
FIG. 44 is a sectional view of the magnetic card of the invention.

FIG. 44 is a sectional view of the magnetic card for using the MR head of the invention as a reading head.

The conventional prepaid card, which is commonly used, consists of protective layer, print layer, base (milk-white colored PET (polyethylene terephtalate)), magnetic recording layer, silver layer and print layer (layers are noted from the surface of the card). In the present invention, the overcoat of non-magnetic film of the magnetic card corresponds the above silver layer. The conventional silver layer has an overcoat of non-magnetic film having more than some μm thick, while the magnetic card 1a of the invention has an overcoat of non-magnetic film having only less than 1 μm thick, which is lubricant enough for long-time sliding of the head. In FIG. 44, protective layer 502, print layer 503, base (milk-white colored PET) 504, magnetic recording layer 505, and protective layer 506 of non-magnetic film are layered in order. In the magnetic card 1a of the invention, another print layer to cover the protective layer 506 could be provided. However it is not recommended because it expands the distance d between the head and the magnetic recording layer 505. If another print layer is need, the area except the accessible area of the head can be used. For example, outside area of the area 150b, 150e and 150g which are shown by oblique lined part of the optical card in FIGS. 22A to 22C can be used. Areas A and B of the magnetic card which are shown in FIG. 13 can be used. As described above, the magnetic card of the invention can obtain two-digit as large recording capacity as the conventional prepaid card by providing the MR head and the protective layer 506 of less than 1 μm on the magnetic recording layer 505.

Embodiment 32

The distance d between the head and the magnetic recording layer 505 influences greatly both recording density and output, so that the head is better to be configured as to contact directly with the magnetic recording medium as well as the magnetic tape to get a large recording capacity by one magnetic card. However, the magnetic card can not be used practically for a long time without an overcoat on the magnetic recording layer 505 because it is easy to get a failure caused by a flaw by careless handling or by sticking dust.

The present invention will provide a new method, by which the magnetic recording layer 505 contacts directly with the head on writing/reading, and on the other cases, the surface of the magnetic layer 505 is prevented from flaw or dust. The method will be explained in detail referring to the drawings.

Figure 45A:
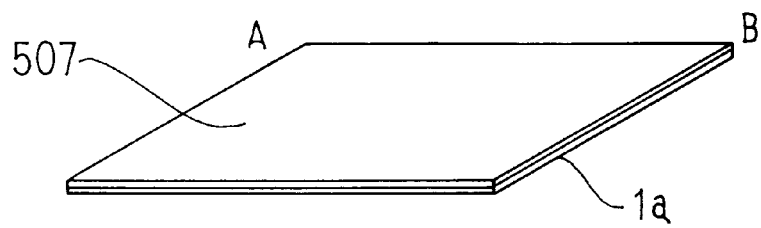
FIGS. 45A–45D show a principle of the magnetic card with a protective cover.
Figure 45B:
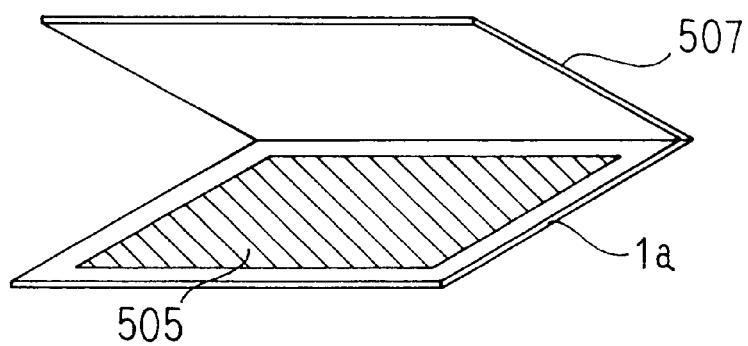
Figure 45C:
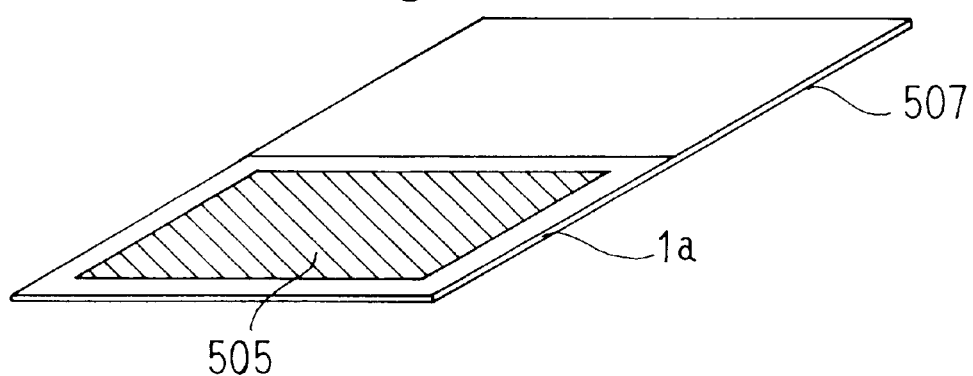
Figure 45D:
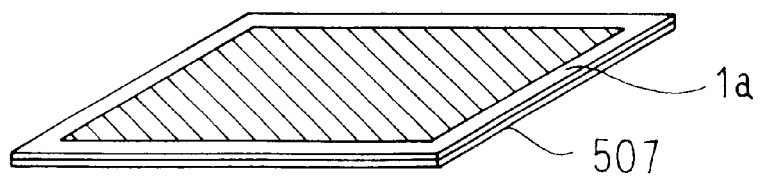

FIGS. 45A to 45D show a principle of the magnetic card with a cover. The magnetic card 1a has a protective cover 507 attached to the side AB. The length and the width of the protective cover 507 is equal or less than that of the magnetic card 1a. The protective cover can rotate 360 degrees. The card and the protective cover are combined with a thin sheet such as cellophane tape. On keeping or carrying the card, the protective cover 507 covers the magnetic layer 505 of the magnetic card 1a as shown in FIG. 45A, so that the surface of the magnetic layer 505 is protected from flaw and dust. When the magnetic card reader accesses the card, the protective cover 507 is opened as shown in FIGS. 45B to 45C. The cover 507 turns to the back of the magnetic card 1a as shown in FIG. 45D and the magnetic recording layer 505 can be contacted by the head directly. After pulling out the card from the card reader, the protective cover should be turned back to the original place as shown in FIG. 45A.

Not illustrated in the figures, the present invention provides the magnetic card configured as follows:

(1) the protective cover 507 includes a protective layer and a print layer;

(2) the protective cover 507 is made of elastic material and has the function as the pressure pad 207;

(3) a little adhesive material is put on a part of one side of the protective cover 507 or the magnetic card 1a to keep the protective cover not to open easily as shown in FIG. 45A. It is also possible that either of the protective cover 507 or the magnetic card 1a has physical shape to keep the protective cover not to open easily;

(4) a card assembly including the magnetic card which has the magnetic card 1a and the protective cover 507 and the case which is configured as to be possible to take in and out the card and to show the front side surface of the magnetic card 1a and the back side of the surface of the protective cover 507.

Embodiment 33

Another example of the magnetic reading circuit of Embodiment 8 will be explained as Embodiment 33.

In the circuit shown in FIG. 10E, the primary coil 55a and the secondary coil 55b of the new rotary transformer 48, the DC-AC converter 56 and the AC-DC converter 57 generate plus DC voltage to drive the amplifier 53a inserted between the magnetic head 13a or 13b and the secondary coil 46b.

However, another method to supply electric power may be required because the noise from the oscillator, etc installed. inside of the DC-AC converter 56 or the AC-DC converter 57 may pile up on the path from the magnetic head 13a or 13b to the amplifier 53a and the primary coil 46a or the secondary coil 46b.

Figure 46:
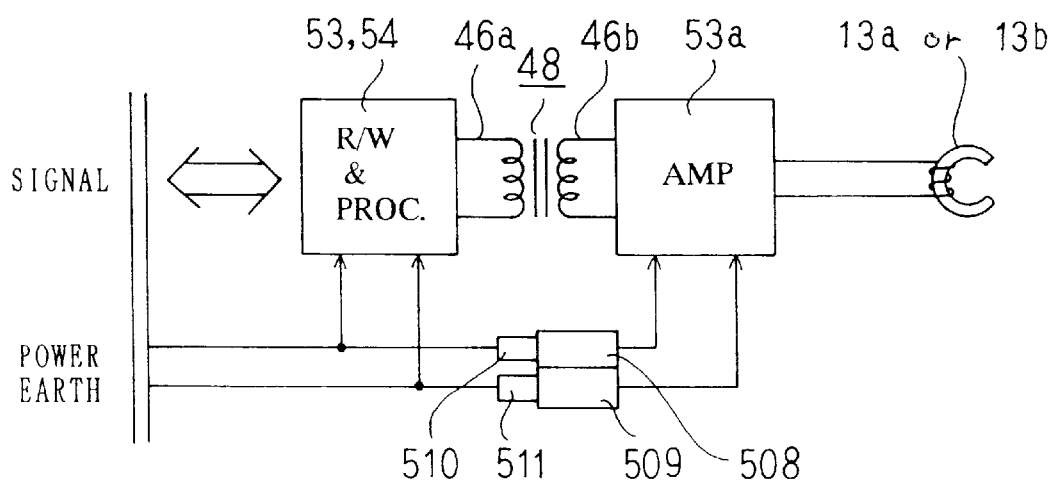
FIG. 46 shows a read/write circuit using a new method for electric power supply.
Figure 47A:
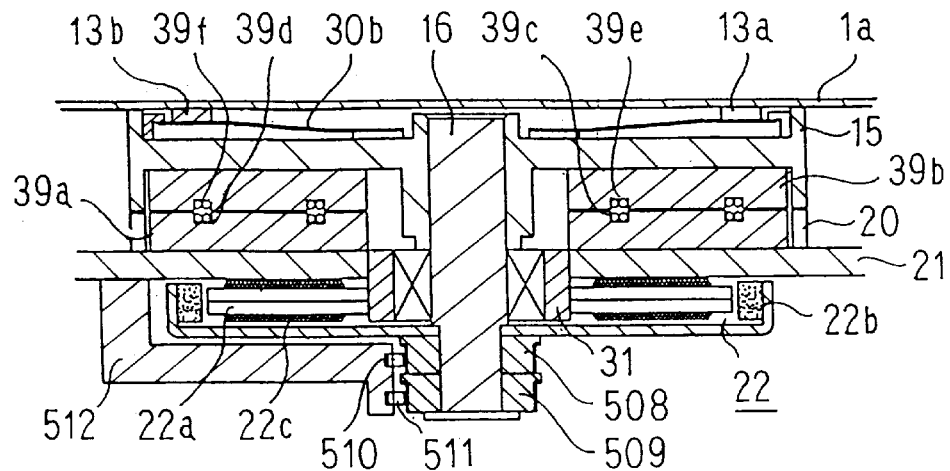
FIG. 47A–47C show examples of configurations using a plurality of the slip rings.

FIG. 46 shows a read/write circuit using a new method for electric power supply. FIG. 47A shows a configuration using slip rings. In the figures, the same reference numerals are used for the same elements shown in FIGS. 10E and 7A. The following is described in relation to FIGS. 46 and 47A.

Slip rings 508, 509 are cylindrical. An extended part of the rotation shaft 16 is inserted to the inside of the slip rings to fix with the rotation shaft. The slip rings 508, 509 are connected to the amplifier 53a by the lead wire (not shown in FIG. 47A). Brushes 510, 511 are set as to contact with each of the slip rings 508, 509 and are connected to the electric power source and the ground with the lead wire (not shown in FIG. 47A). The contacting parts of the slip rings 508, 509, and the brushes 510, 511 are made of conductive metal, e.g., an alloy of gold and silver, an alloy of silver and palladium or titanium nitride. A fastener 512 fastens the brushes 510 and 511 to the apparatus base 21.

In this configuration, when the turntable 15 rotates, the slip rings 508, 509 turn and the brushes 510, 511 always contact with the slip rings 508, 509. Accordingly, direct current voltage flows to the amplifier 53a from the electric source through the brushes 510, 511 and the slip rings 508, 509. The slip rings 508, 509, the brushes 510 and 511 become more abrasion-fast by putting conductive grease on the contacting points of the slip rings 508, 509 and the brushes 510, 512, which also reduces the load of the DC motor 22 for driving the turntable 15.

Figure 47B:
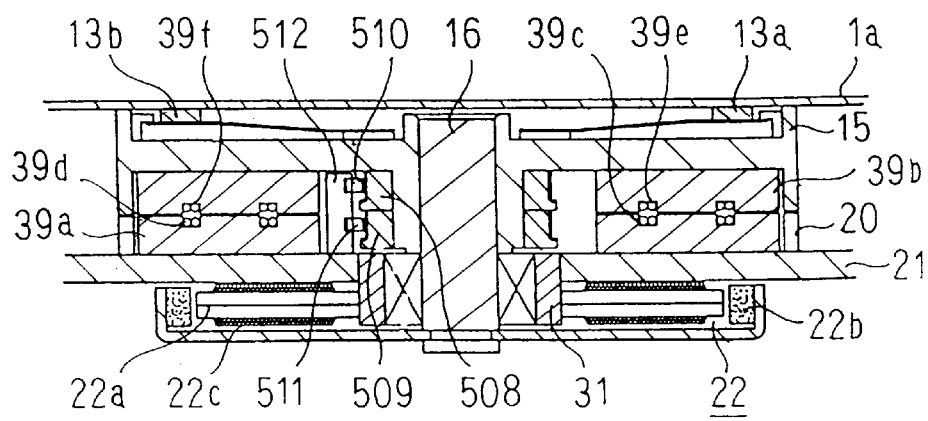

FIG. 47B shows another example using the slip rings according to the invention. In this example, the slip rings 508, 509 and the brushes 510, 511 and the fastener 512 are included inside of the apparatus. In FIG. 47B, the same reference numerals are used for the same elements shown in FIG. 47A. The slip rings 508, 509 are cylindrical. The rotation shaft 16 and the inside rib of the turntable 15 are inserted to the inside of the slip rings. The slip rings 508, 509 are fixed to the inside rib of the turntable 15. The brushes 510, 511 are set between the rotary transformer 48 and the slip rings 508, 509 as to contact with the slip rings 508, 509. The brushes 510, 511 are set by the fastener 512 on the apparatus base 21. In this configuration, the apparatus becomes thinner than the above embodiment. The slip rings 508, 509 and the brushes 510, 511 are prevented from sticking dust, which enables stable supply of the DC voltage.

The above supplying method of direct current voltage is provided for driving the amplifier 53a in the secondary coil 46b. The method can be applied to supplying DC bias between the terminals c and d of the MR element 501 shown in FIG. 43B. The method can be also applied to supplying DC voltage of the MR element 501 and transferring the reading signal. If a coil-type DC magnetic eraser head which erases the record on the magnetic card is provided, the above method can be applied by connecting the coil-type DC magnetic eraser head to the slip rings. In this embodiment, two sets of the slip rings 508, 509 and the brushes 510, 511 are used for the electric source and the ground. When an amplifier which requires plus and minus electric sources, three sets of the slip rings and brushes can be used.

Figure 47C:
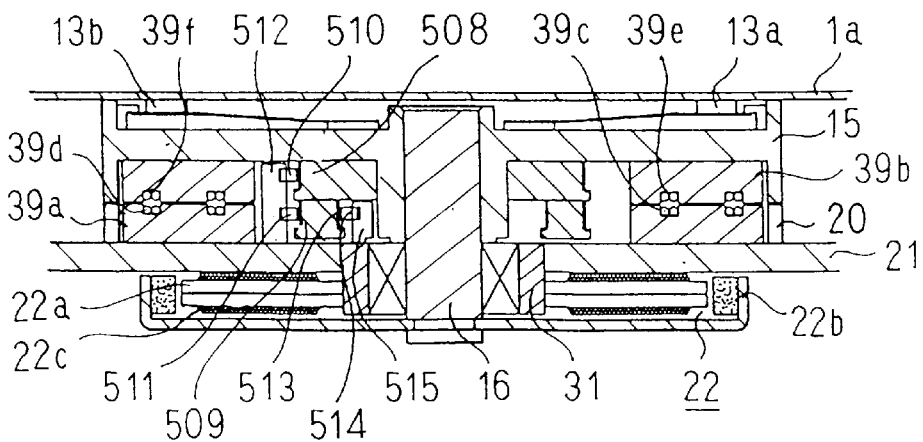

However, in the configuration as shown in FIG. 47B, the more the number of the slip rings 508, 509 and the brushes 510, 511 increases, the thicker the apparatus becomes. To solve the above problem, another example of the configuration will be explained. FIG. 47C is a sectional view of a card reader as another example according to the embodiment. In FIG. 47C, the same reference numerals are used for the same elements shown in FIG. 47A. In this example, three sets of the slip rings and the brushes are used in the apparatus. The inside diameter of the slip ring 509 is expanded as to include the slip ring 513 inside of the slip ring 509. The slip rings 509, 513 are fixed to the slip ring 508 and the slip ring 508 is fixed to the inside rib of the turntable 15. The brushes 510, 511 are set between the rotary transformer and the slip rings 508, 509 by the fastener 512 on the apparatus base 21 as to contact with the slip rings 508, 509 as well as the above embodiment. The brush 514 is set between the slip ring 513 and the inside rib of the turntable 15 by the fastener 515 on the apparatus base 21 as to contact with the slip ring 513. In the above configuration, three sets of the slip rings and brushes can be used in the apparatus, though the apparatus is as thick as the example shown in FIG. 47B.

Another slip ring and brush can be used as follows (not illustrated in the figure); a new additional brush can be set between the fastener 515 shown in FIG. 47C and the rotation shaft 16 and a new slip ring can be fixed to the inside rib of the turntable 15.

Embodiment 34

Another embodiment will be described using the primary coil and the secondary coil of the rotary transformer. In the configuration as shown in FIG. 10D, when the coil ratio of the primary coil 46a and the secondary coil 46b is set as 2:1, the primary coil 46a can get twice as much voltage of reading signal as the voltage of reading signal of the secondary coil 46b.

In the configuration as shown in FIG. 10D, the coil ratio of the primary coil 46a and the secondary coil 46b is set as 2:1. When the number of coils of the primary coil 46a is large, the transition period of current on changing the recording signal in the primary coil 46a becomes long because of the increase of the inductance of the primary coil 46a. Therefore, it is difficult to reproduce high frequency recording signal through the magnetic head 13a or 13b. When the coil ratio of the primary coil 46a and the secondary coil 46b is set as 2:1 and the number of coils of the secondary coil 46b is small, the inductance of the secondary coil is decreased. The inductance of the magnetic head 13a or 13b should be set smaller to match the impedance. Accordingly, the number of coils of the magnetic head 13a or 13b should be small, which decreases the voltage of the reading signal. Thus, the voltage of the reading signal input to the write/read circuit 53 cannot be increased in case of the coil ratio is set 2:1 compared with the case that the coil ratio of the primary coil 46a and the secondary soil 46b is set 1:1.

Figure 48:
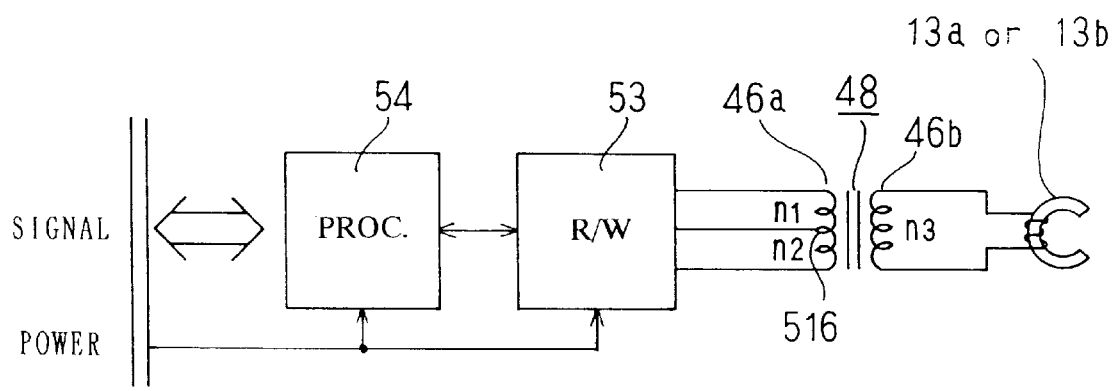
FIG. 48 shows a configuration of the read/write circuit of the invention.

This embodiment is provided to solve the abovementioned problem and is explained in relation to the figures. FIG. 48 shows a configuration of a write/read circuit of the embodiment. In FIG. 48, the same reference numerals are used for the same elements shown in FIG. 10D. A center tap 516 is provided with the center part of the primary coil 46a and is connected with the write/read circuit 53. The winding number n1 of coils between the center tap 516 and one of the terminals of the primary coil 46a equals to the winding number n2 of coils between the center tap 516 and the other terminal of the primary coil 46a. In this configuration, on writing the information, the writing electric current flows from the center tap 516 to one or the other of the terminals of the primary coil 46a as to transmit to the secondary coil 46b. On reading the information, the reading electric current does not flow through the center tap 516, but the reading signal is transmitted from the secondary coil 46b to the primary coil 46a.

The case in which the winding number n3 of the coils of the secondary coil 46b is set as n1=n2=n3 is compared with the case in which the winding number of the primary coil equals to the winding number n3 of the secondary coil 46b and the center tap is not used as shown in FIG. 10D. On writing the information, the writing electric current flows from the center tap 516 to one or the other of the terminals of the primary coil 46a as to transmit the writing signal to the secondary coil 46b. The transition period of the electric current on switching to the writing electric current is the same as the case shown in FIG. 10D. The writing signal is transmitted in the rotary transformer in the same way as the case shown in FIG. 10D. On reading the information, the reading signal from the secondary coil 46b is transmitted to the primary coil 46a without using the center tap 516, so that the coil ratio of the primary coil 46a and the secondary coil 46b becomes 2:1. This enables the reading signal transmitted to the write/read circuit 53 to increase its voltage to twice as high as the case shown in FIG. 10D.

As described above, by providing the center tap with the primary coil, the reading signal from the head can be transmitted without any influence to the writing electric current. This method can be applied to the case in which the distance from the primary coil of the rotary transformer to the write/read circuit 53 is long, in order to improve the SN ratio which is influenced by the increased outside noise caused by the long distance.

Embodiment 35

The following is an adjusting mechanism of the magnetic head on the turntable according to the invention.

In the conventional magnetic card has only low recording density and the card reader has a single magnetic head. The written information on the magnetic card can be read even if the head gap is not well positioned in the apparatus.

In order to get a large recording capacity of the card, the recording density should be higher and a plurality of the magnetic heads are needed in the card reader. When the magnetic head is positioned without adjusting, the head gap may be wrong-positioned, which causes the apparatus uninterchangeable with others. In this embodiment, the head adjusting mechanism enables the apparatus interchangeable.

Figure 49:
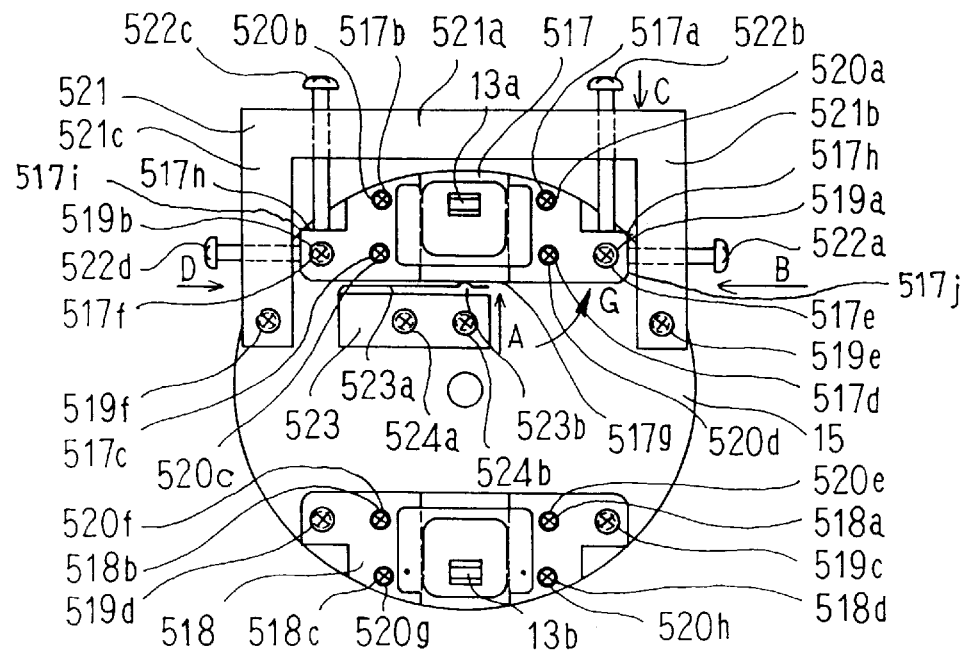
FIG. 49 is a plan showing the magnetic head adjusting mechanism according to the invention.
Figure 50:
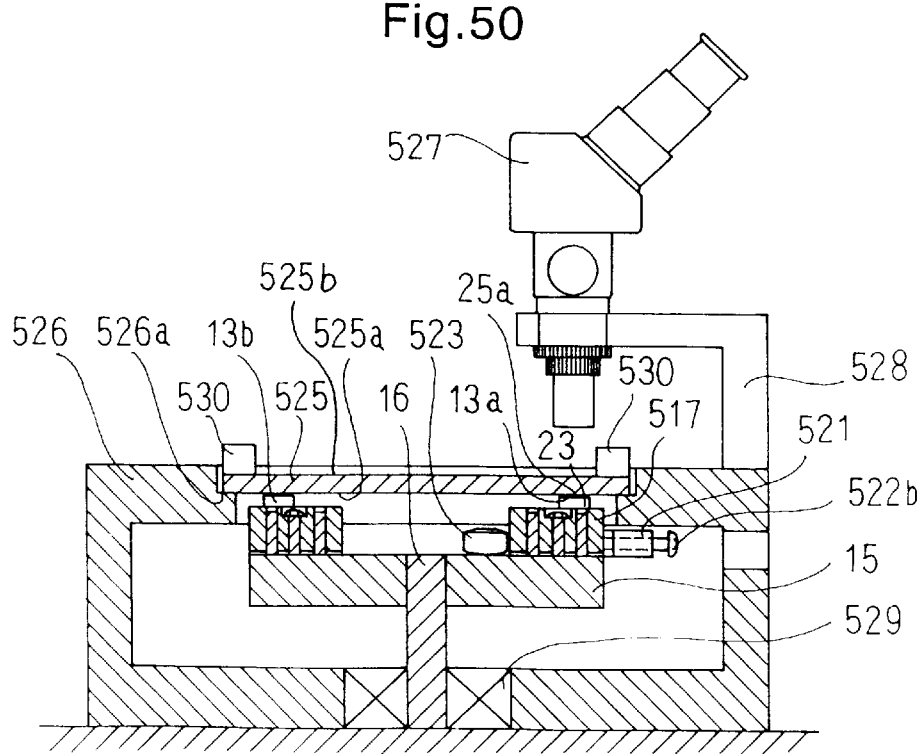
FIG. 50 is a sectional view showing the magnetic head adjusting mechanism.
Figure 51:
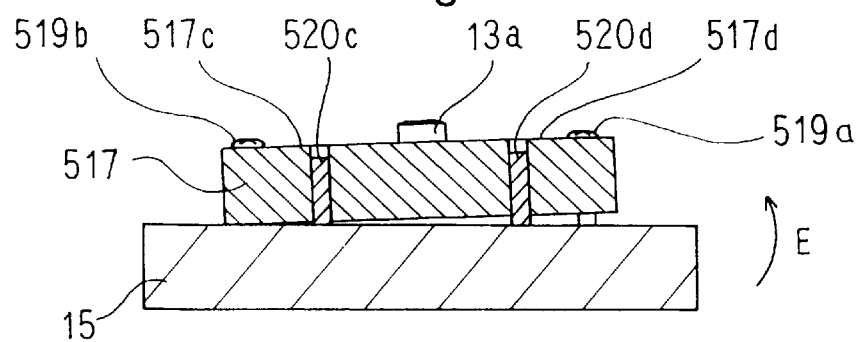
FIG. 51 is a sectional view showing the magnetic head adjusting mechanism in the pitching direction.
Figure 52:
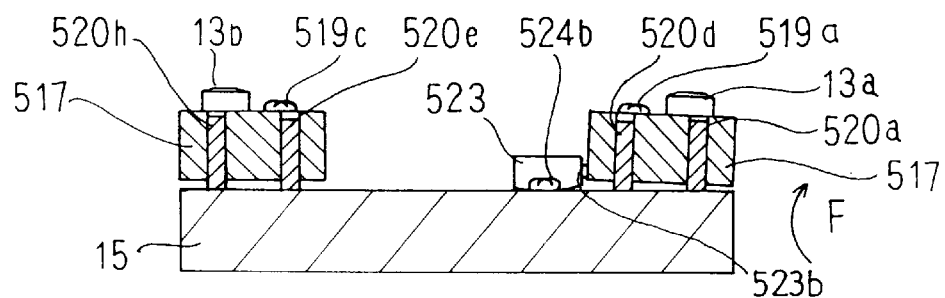
FIG. 52 is a sectional view showing the magnetic head adjusting mechanism in the rolling direction.
Figure 53:
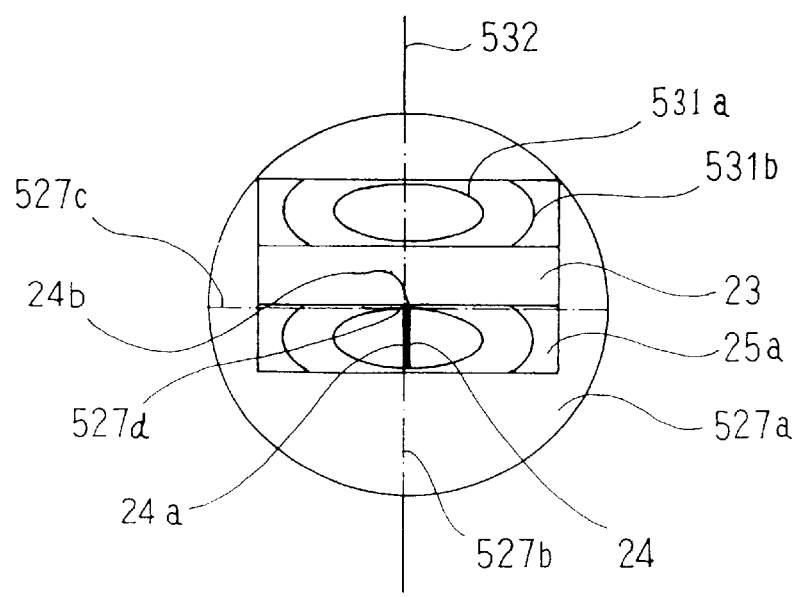
FIG. 53 shows interference stripes which appear when the contacting part of the slider of the magnetic head and the glass plate.
Figure 54:
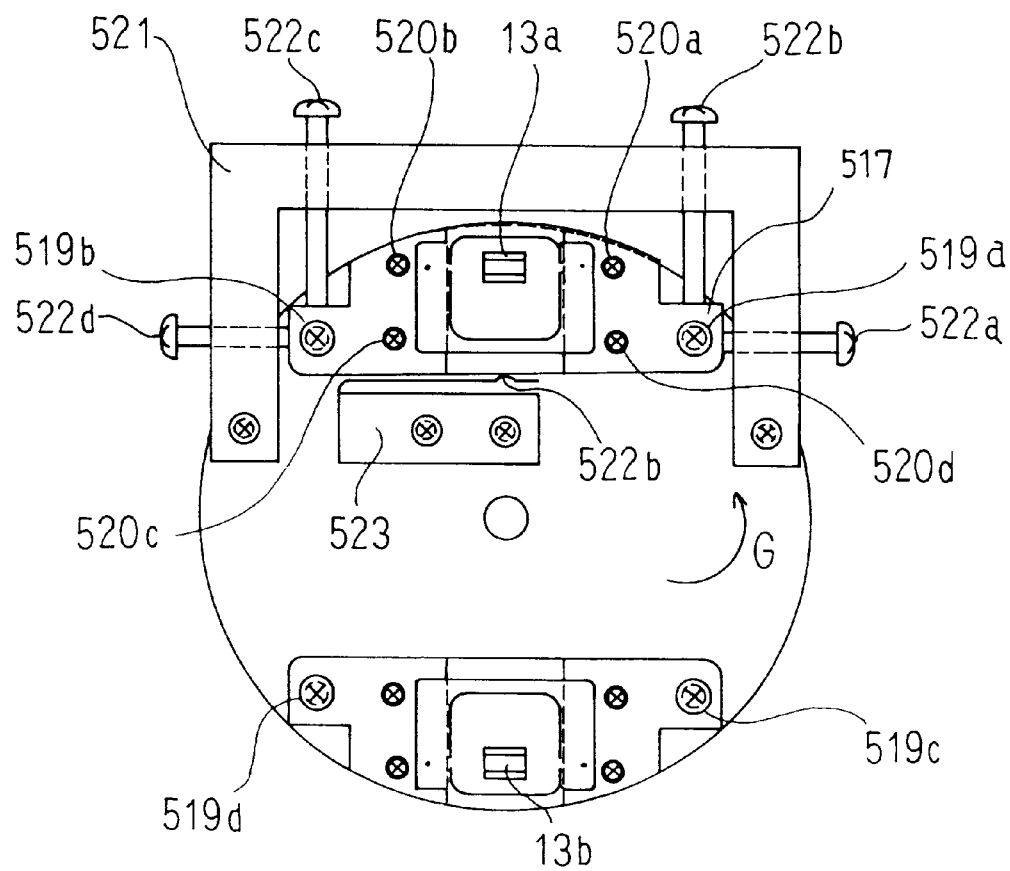
FIG. 54 is a plan showing the magnetic head adjusting mechanism in moving on the plane.

An adjusting mechanism of the magnetic head will be explained in the following. The same reference numerals are used for the same elements in the previously mentioned mechanism. FIG. 49 shows a plan of the magnetic head adjusting mechanism according to the invention. FIG. 50 shows a sectional view of the magnetic head adjusting mechanism of the invention with a microscope provided. FIG. 51 shows a sectional view of the adjusting mechanism for adjusting a pitching direction. The pitching direction is a rotation direction having the radius direction of the turntable as the rotation axis. FIG. 52 shows a sectional view of the adjusting mechanism for adjusting a rolling direction. The rolling direction is a rotation direction having the sliding direction of the magnetic head as the rotation axis. FIG. 53 shows an interference stripe which appears when the contacting part of the slider of the magnetic head contacts with a glass plate. FIG. 54 shows a plan of the magnetic head adjusting mechanism for adjusting the head position.

In FIG. 49, a head holder 517 holds the magnetic head 13a positioned and fixed by an adhesive and the like. A head holder 518 holds the magnetic head 13b set in the opposite side of the head holder 517. Screw holes 517a, 517b, 517c, and 517d are not aligned and provided with the head holder 517. Screw holes 518a, 518b, 518c, and 518d are provided with the head holder 518. Screw holes 517e, 517f are fit for fastening screws 519a, 519b and the diameter of the holes 517e, 517f are a little longer than the diameter of the screws 519a, 519b, 519c, 519d, 519e, and 519f also denote fastening screws. 520a, 520b, 520c, 520d, 520e, 520f, 520g, and 520h denote adjusting screws. 521 denotes a U shaped part. 521a denotes an extended part of the U shaped part 521, 521b denotes a right hand part of the U shaped part 521, and 521c denotes a left hand part of the U shaped part 521. 522a, 522b, 522c, and 522d are adjusting screws. A flat spring 523 biases the head holder 517 to the direction shown by an arrow A. 523a denotes an L shaped hand part of the flat spring 523. A projected engaging part 523b contacts with a side 517g of the head holder 517. The flat spring 523 is fixed by screws 524a, 524b.

In FIG. 50, 525 denotes a glass plate, 525a denotes a back of the glass plate, 525b denotes a face of the glass plate, and 526 denotes a glass plate holder. A standard plane 526a is provided with the glass plate holder 526 to be the standard of the height of the magnetic heads 13a, 13b. 527 denotes a microscope, 528 denotes a microscope holder, 529 denotes a bearing, and 530 denotes a weight.

A head positioning method using the magnetic head adjusting mechanism of the invention will be explained in the following. As shown in FIG. 50, the shaft 16 projected from the turntable 15 is penetrated through the bearing 529 fixed to the glass plate holder 526 as to enable the turntable 15 to rotate. The glass plate 525 is set on the standard plane 526a, which standards the height of the magnetic heads 13a, 13b, of the glass plate holder 526. The weight 530 is set on the face 525b of the glass plate 525 to fasten the glass plate 525. In another way, the glass plate can be fastened by a screw, etc. The microscope holder 528 for holding the microscope 527 for observing is set on the glass plate holder 526. The microscope holder 528 should be set in the place where the contacting part 25a of the slider 23 of the magnetic head 13a can be observed by the microscope 527. FIG. 53 shows interference stripes which appear when the contacting part of the slider of the magnetic head contacts to the glass plate. Primary interference stripe 531a and secondary interference stripe 531b appear in a little clearance between the contacting part 25a of the slider 23 of the magnetic head 13a and the back 525a of the glass plate. The position of the magnetic head should be adjusted with observing these interference stripes.

The head holder 517 holding the magnetic head 13a is provided with the turntable 15 as shown in FIG. 49. The fastening screws 519a, 519b are penetrated the two screw holes 517e, 517f provided with the head holder 517. The fastening screws 519a, 519b are fastened temporally to the turntable 15 so that the head holder 517 can move a little vertically against the turntable but cannot remove from the turntable. The adjusting screws 520a, 520b, 520c and 520d are fit for the four screw holes 517a, 517b, 517c and 517d provided with the head holder 517, and the four adjusting screws 520a, etc. are fastened so that the four tips of the adjusting screws can contact with the surface of the turntable 15.

The U shaped part 521 is fixed to the turntable 15 by the fastening screws 519e, 519f. The adjusting screw 522a is penetrated through the right hand part 521b of the U shaped part 521 from the direction shown by the arrow B as to contact with the right wing side 517j of the head holder 517. In the same way, the adjusting screws 522b, 522c provided with the extended part 521a of the U shaped part 521 are fastened as to contact with the wing sides 517h in the direction shown by the arrow C. The adjusting screw 522d is fastened as to contact with the left wing side 517i of the head holder 517 in the direction shown by the arrow D.

The projected engaging part 523b provided with the L shaped hand part 523a of the flat spring 523 is contacted with the side 517g of the head holder 517, and biases the head holder 517 to the direction shown by the arrow A to give the preload to the head holder 517. The projected engaging part 523b is set between the adjusting screws 522b and 522c, and the flat spring 523 is fixed to the turntable 15 with the screws 524a, 524b.

An adjusting method for the magnetic head position will be explained in the following. The magnetic head 13a is shown FIGS. 49 and 50. When the glass plate 525 is set at the standard plane 526a, the back 525a of the glass plate 525 becomes the standard for adjusting the magnetic head 13a.

For example, each tip of the four adjusting screws 520a, 520b, 520c, and 520d is contacted with the surface of the turntable 15, and the head holder 517 is fastened as to have some room vertically. To adjust the position of the magnetic head 13a, the four adjusting screws 520a, 520b, 520c, and 520d should be tightened. When the adjusting screws 520a, etc. are tightened, the head holder 517 rises making the vertical room. The head holder 517 can be inclined by changing how much tighten each of the four adjusting screws 520a, etc. Thus, the position of the magnetic head 13a held by the head holder 517 can be adjusted.

On adjusting the magnetic head 13a in the pitching direction, the head holder 517 is inclined to the direction shown by the arrow E by tightening the adjusting screw 520d more than the screw 520c as shown in FIG. 51. On adjusting the magnetic head 13a in the rolling direction, the head holder 517 is inclined to the direction shown by the arrow F by tightening the adjusting screw 520d more than the screw 520a as shown in FIG. 52.

The four adjusting screws 520a, 520b, 520c, and 520d are tightened the same for adjusting the height of the magnetic head 13a itself.

After adjusting the magnetic head 13a in the above way, the head holder 517 is fastened temporally by the fastening screws 519a, 519b. The glass plate 525 is set on the standard plane 526a of the glass plate holder 526 so that the contacting part 25a of the slider 23 of the magnetic head 13a can be observed by the microscope 527.

On observing by the microscope, the position should be adjusted so that the interference stripe can be seen in a little clearance between the contacting part 25a of the slider 23 of the magnetic head 13a and the back 525a of the glass plate 525 as shown in FIG. 53. Until both of the primary interference stripe 531a and the secondary interference 531b can be seen simultaneously, the contacting part 25a of the slider 23 of the magnetic head 13a should be adjusted in a plurality of times as to contact the back 525a of the glass plate 525 with a proper position.

After adjusting one of the magnetic heads, the magnetic head 13a, in height direction, rolling direction, and pitching direction, the head holder 517 is fastened temporally by the fastening screws 519a, 519b. Then, the turntable 15 is rotated around the rotation shaft 16, the magnetic head 13b held by the other head holder 518 is set as to be observed by the microscope 527. The position of the magnetic head 13b is thus adjusted in the same way as the magnetic head 13a.

The position of the head gap 24 is adjusted after adjusting the position of the head. In this embodiment, the head on the flat double-barrel slider, which is shown in FIG. 4A, is used. First, the center of the turntable 15 is detected. The microscope 527 is positioned so that the crossing line 527b of the lens 527a of the microscope 527 should be on the radius line 532 through the center of the turntable 15 as shown in FIG. 53. The microscope 527 is also positioned so that the crossing point 527d should match the predetermined radius from the center of the turntable 15. To adjust the position of the head gap, the magnetic head is moved so that the crossing line 527b should match the edge plate 24a of the head gap 24, and the crossing line 527c, which crosses the crossing line 527b, should also match the edge part 24b of the head gap 24. The above procedure will be explained in detail in the following.

The head holder 517 can be moved in the direction of B within the room between the hole 517c and the screw 519a, and the hole 517f and the screw 519b by tightening the adjusting screw 522a provided with the right hand part 521b of the U shaped part 521 and by loosing the adjusting screw 522d provided with the left hand part 521c as shown in FIG. 49. By tightening and loosing the screws 522a, 522d to the opposite direction, the head holder 517 can be moved in the direction of D. By tightening the adjusting screws 522b, 522c provided with the extended part 521a the same amount, the head holder 517 is moved to the direction of C against the flat spring 523 for biasing the head holder 517 and the holder 517 is moved in the radius direction to the center of the turntable 15. When the adjusting screw 522c is tightened more than the adjusting screw 522b, the head holder 517 is turned to the direction G as shown in FIG. 54 because a moment toward direction G generated with the projected engaging part 523b of the flat spring 523 which works as a pivot.

As described above, the position of the head gap can be moved in the plane. The flat spring 523 always gives preload to the head holder 517 to the direction of A, so that the head holder 517 can be moved a little without any backlash.

When the height, the inclination, and the position of the head gap of the two magnetic heads have been adjusted, the adjusting screws 519a, 519b, 519c, and 519d are tightened to lock. The flat spring 523 for biasing and the U shaped part 521 are removed, and then the whole procedure of adjusting the magnetic head has finished by removing the turntable 15 from the bearing 529.

Embodiment 36

Another magnetic head adjusting mechanism will be explained in the following. The mechanism includes a sphere provided under the head holder.

Figure 55:
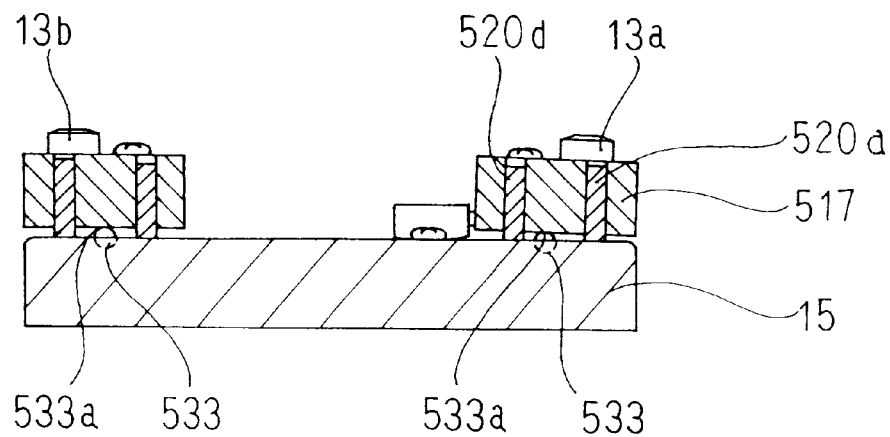
FIG. 55 is a sectional view showing the magnetic head adjusting mechanism in the rolling direction.

A sphere 533 is provided as to contact the head holder within the room for adjusting by the adjusting screws 520a, 520b, 520c, and 520d for adjusting the head in the rolling direction as shown in FIG. 55. The head holder 517 is mounted on the sphere and the position of the head is adjusted in the same way as the case shown in FIG. 54. On adjusting the magnetic head 13a, each of the four adjusting screws 520a, 520b, 520c, and 520d is tightened from the upper side of the head holder 517. For adjusting the head in the rolling direction, the adjusting screw 520d is tightened more than the screw 520a. The head holder 517 is inclined by turning around the contacting part 533a of the sphere 533.

Figure 56:
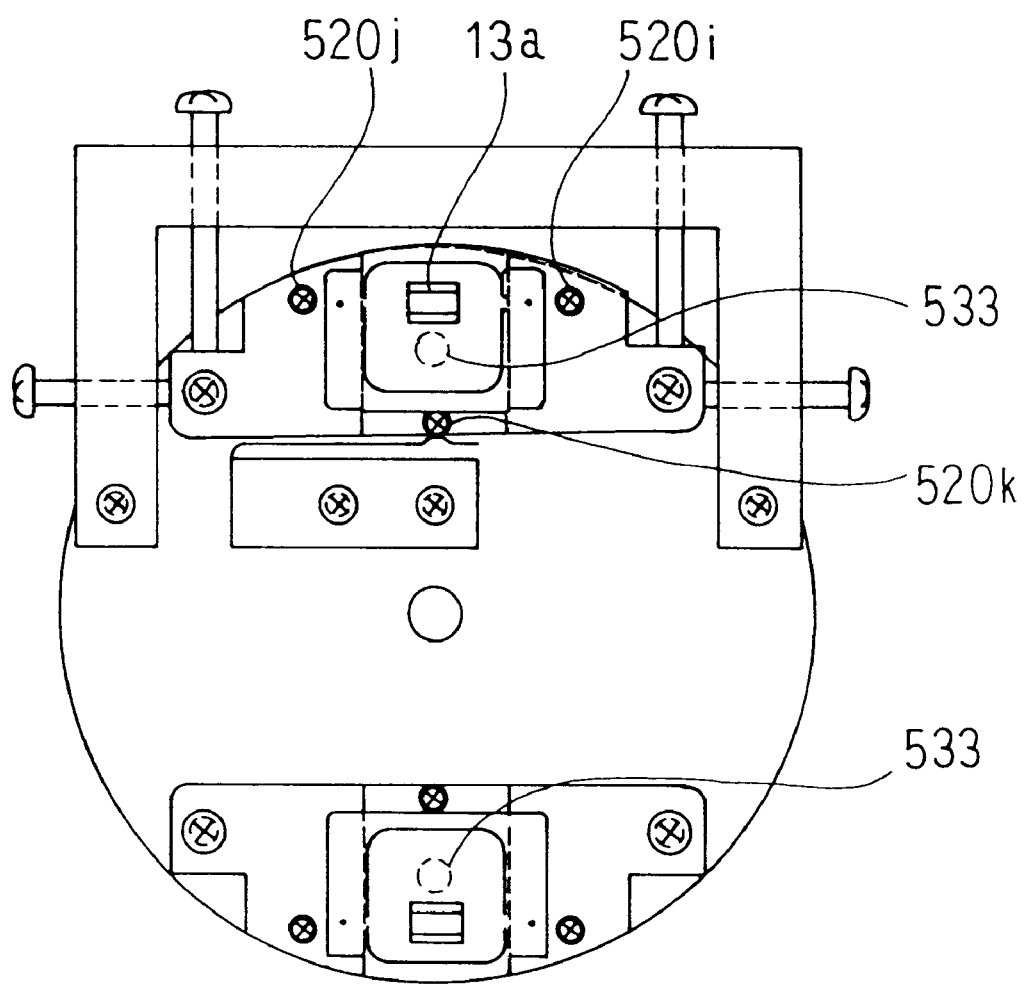
FIG. 56 is a plan showing the magnetic head adjusting mechanism.

For adjusting the head in the pitching direction, the head holder 517 can be inclined by turning around the contacting part 533a of the sphere 533 in the same way as adjusting in the rolling direction. When the height of the contacting part 533a of the sphere 533 is adjusted previously, the magnetic head 13a does not need to be adjusted in the height direction. The head can be adjusted using only three adjusting screws as follows: The adjusting screws 520i, 520j, and 520h are placed as shown in FIG. 56, the sphere 533 is placed among the screws. The head can be adjusted in the same way as the configuration using four adjusting screws as shown in FIG. 49.

Embodiment 37

Figure 57:
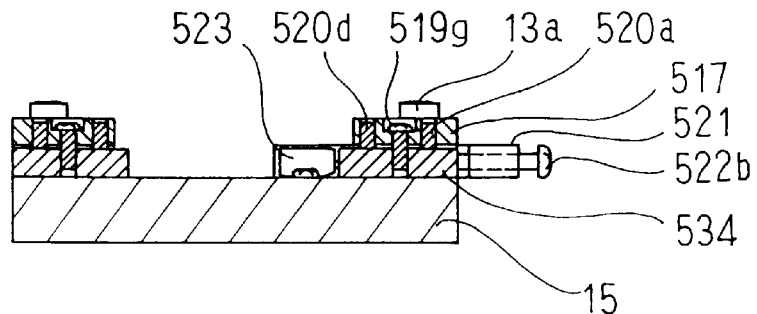
FIG. 57 is a sectional view showing the magnetic head adjusting mechanism in the rolling direction.
Figure 58:
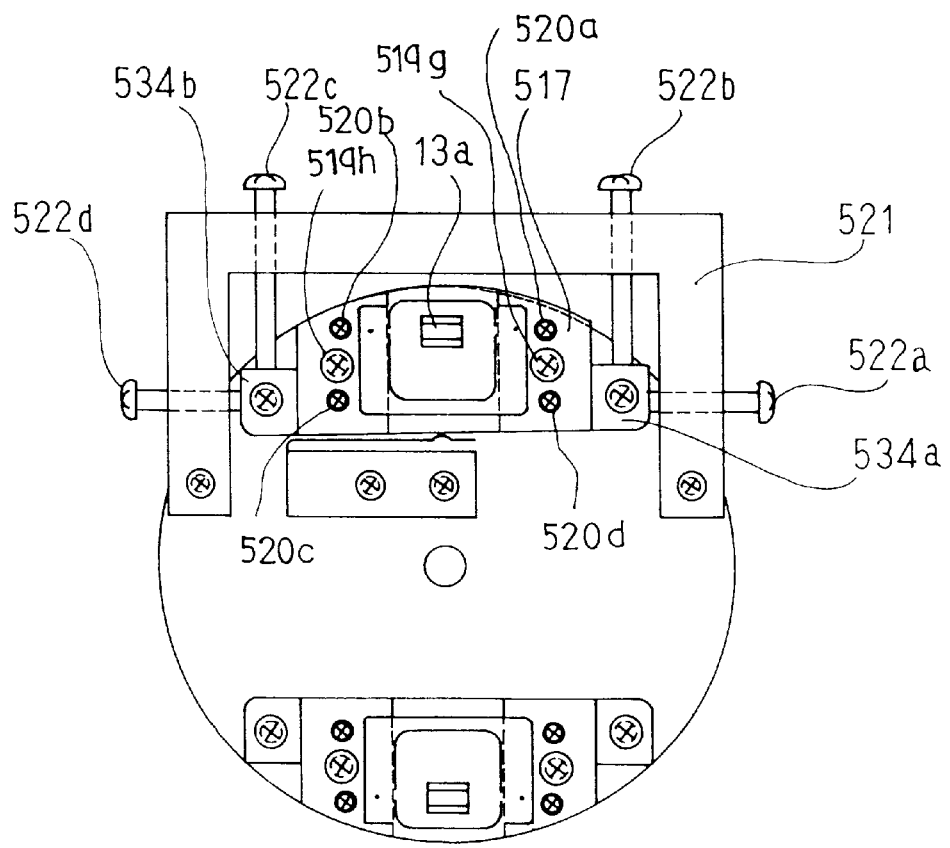
FIG. 58 is a plan showing the magnetic head adjusting mechanism.

Another head adjusting mechanism using a head holder carriage will be described referring to FIGS. 57 and 58.

The position of the head of the head holder 517 is adjusted on a head holder carriage 534 provided under the head holder 517. The head holder carriage 534 can be positioned on the turntable by tightening the four adjusting screws 522a, etc.

The position of the head is adjusted by tightening the four adjusting screws 520a, etc. with contacting the head holder 534, then the head holder 517 is fastened to the head holder carriage 534 by the fastening screws 519g, 519h. Then, the position of the head gap is adjusted. Wing parts 534a, 534b of the head holder carriage 534 are pressured by tightening each of the adjusting screws 522a, 522b, 522c and 522d.

Embodiment 38

Figure 59:
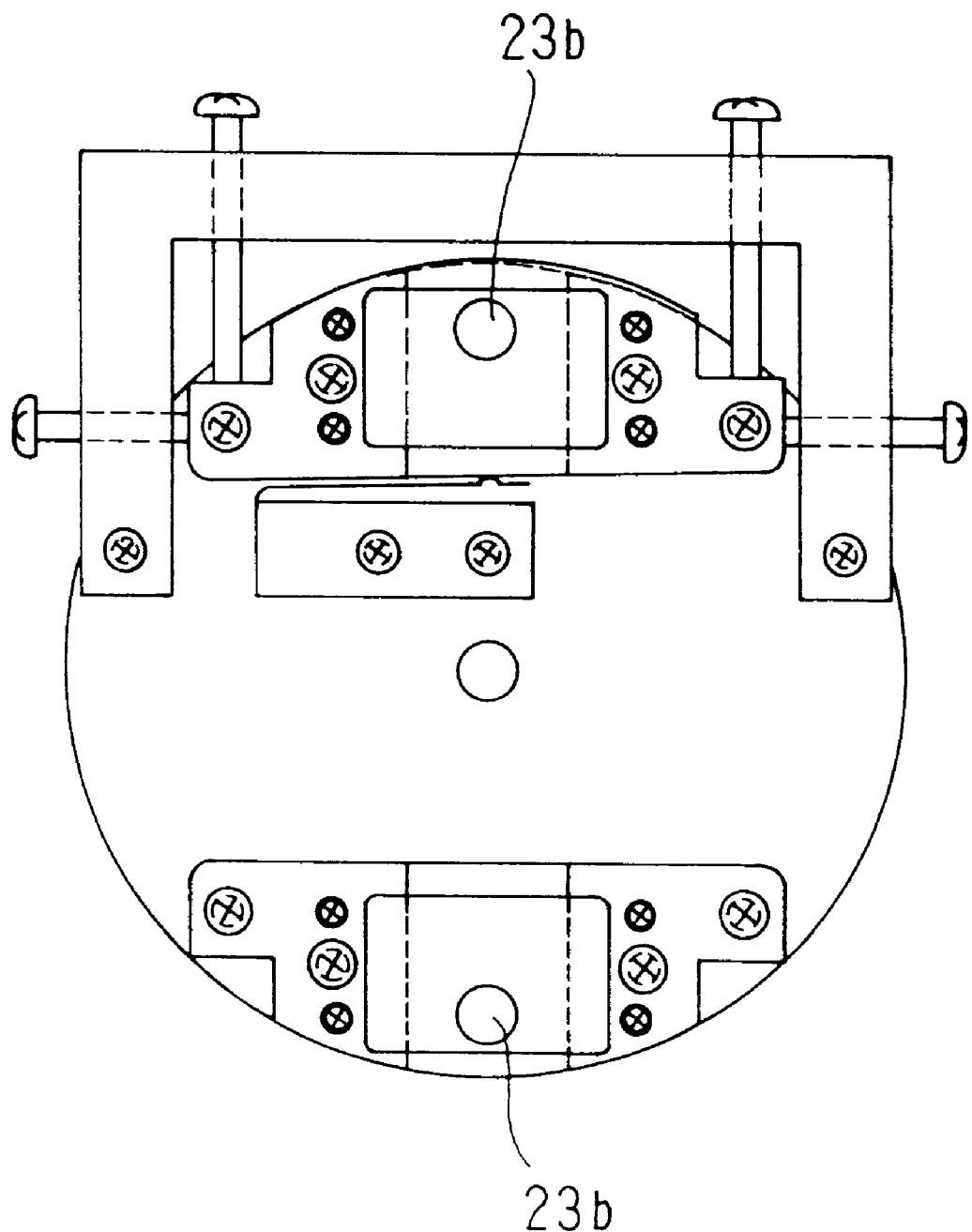
FIG. 59 is a plan showing the magnetic head adjusting mechanism.

In the above embodiment, the head adjusting mechanism has been explained for the head mounted on the flat double-barrel slider 23a. As shown in FIG. 59, the position of the head mounted on the button slider 23b can be also adjusted by observing the interference stripe, and the head gap can be adjusted in the same way as Embodiment 35.

Embodiment 39

A contact mechanism of the magnetic head and the magnetic card will be explained in this embodiment.

Figure 60:
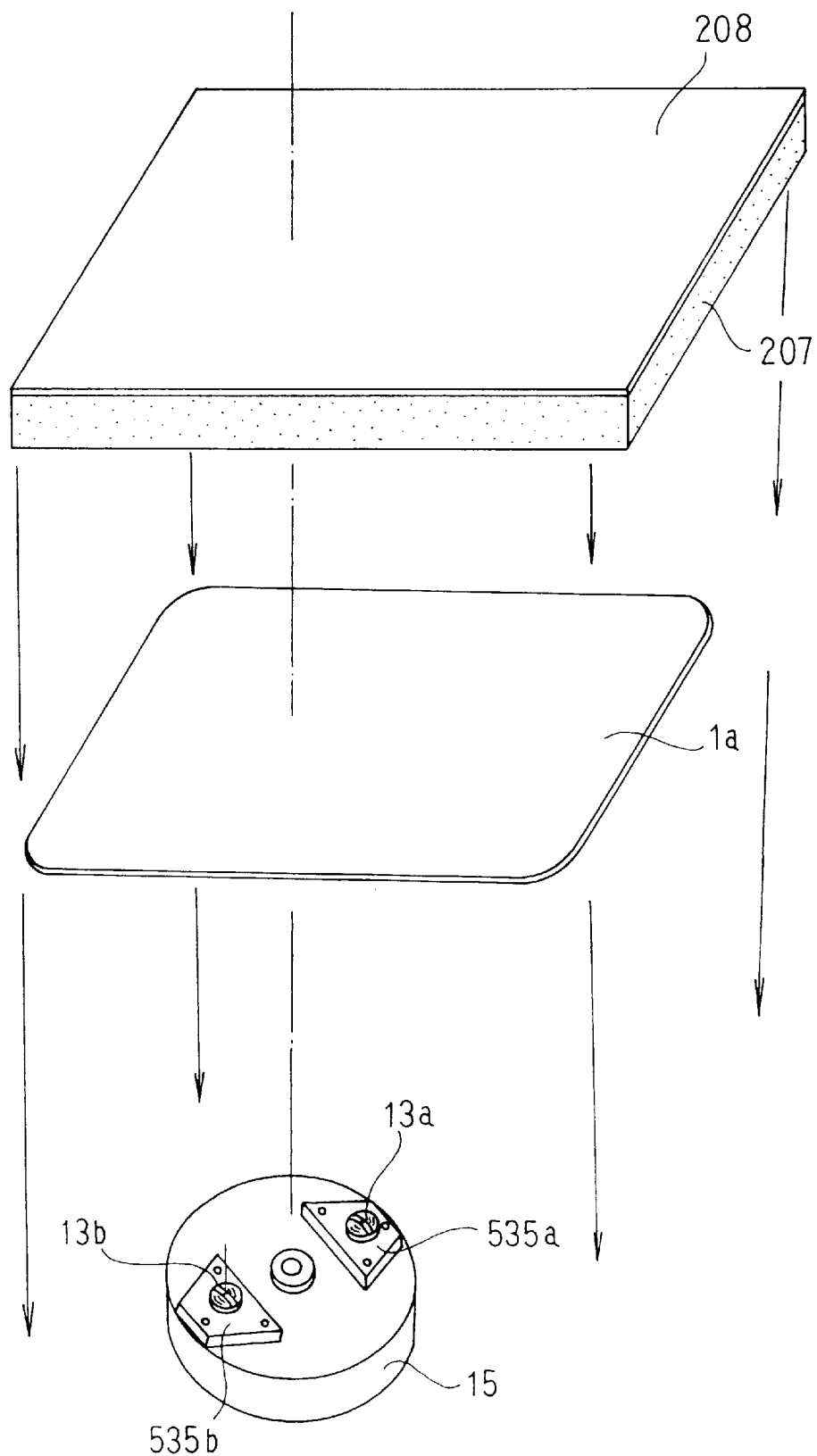
FIG. 60 is a sketch showing the magnetic head and a card holding mechanism according to one embodiment.

The magnetic head and the card holding mechanism according to the invention will be explained in relation to FIG. 60. In FIG. 60, magnetic head holders 535a, 535b are fastened on the turntable 15 by the screws, etc. The magnetic heads 13a, 13b are fixed on the magnetic head holders 535a, 535b. As described in Embodiment 38, the button-type magnetic heads 13a, 13b have spherical contacting part or projected engaging part as the contacting part, which includes the head gap (not shown in the figure). This has been explained in Embodiment 38.

A pressure pad 207, which faces the magnetic card and presses the card to the magnetic heads 13a, 13b, is fixed on a pad frame 208. The side of the pressure pad 207 faced to the magnetic head is adjusted by the pad frame 208 as to be almost vertical with the rotation shaft of the turntable 15. In the card reader, the scanning locus of the rotation of the magnetic head should match with the information track on the card. Therefore, the card 1a, the pressure pad 207, and the pad frame 208 are stationary relatively except inserting or removing time of the card 1a. For example, when the card 1a is carried to the direction of the long side for changing the information tracks on the card, the pressure pad 207, the pad frame 208 are also moved with the card 1a in the same direction. The pressure pad 207 is made of porous polymeric materials as sponge, or textile materials as furfelt, the rigidity of which is far lower than the magnetic card 1a.

The following is contacting operation with the magnetic card.

In this embodiment, the magnetic card 1a is contacted with the magnetic heads 13a, 13b locally by being pressed by the pressure pad 207 forming the plane of the rotation as a standard plane which includes the tips of the magnetic heads 13a, 13b. The magnetic card 1a is contacted with the tips of the magnetic heads 13a, 13b, which have spherical or projected surface, by being pressed by the pressure pad 207 and by pressure force from the magnetic heads 13a, 13b. The vertical displacement of the tips of the magnetic heads 13a, 13b is absorbed by the elasticity of the pressure pad 207. The vertical position of each tip of the magnetic heads 13a, 13b is kept almost the same during the operation.

The tips of a plurality of the magnetic heads 13a, 13b are set on the plane vertical with the rotation shaft of the turntable 15, and each head gap is placed on the top of the chips. The pressure pad 207 is set on the plane, which is parallel with the vertical plane of the rotation shaft of the turntable 15. Therefore, when the magnetic card 1a is pressed enough for contacting the magnetic head 13 by the pressure pad 207, the head gap always contact the magnetic card 1a.

On using a gimbal spring, which is commonly used for a floppy disk drive or a hard disk drive, the magnetic heads 13a, 13b are likely to incline because of centrifugal force of the magnetic heads 13a, 13b given by the rotation of the turntable. In this case, the position of the magnetic heads 13a, 13b is hard to be adjusted. In the configuration according to this embodiment, the magnetic heads 13a, 13b are hard to incline even if the magnetic heads are given centrifugal force. The position of the magnetic heads 13a, 13b can be adjusted easily because the turntable 15 is set stationary. Even if the turntable 15 rotates, geometrical position of the magnetic heads and the turntable keeps the same positional relation as the stationary condition. Thus, the magnetic card 1a always contacts the magnetic heads 13a, 13b, which enables the card reader to have a good write/read performance.

Embodiment 40

Another improved configuration, in which the magnetic card contacts better with the magnetic head, will be explained as another embodiment.

Figure 61:
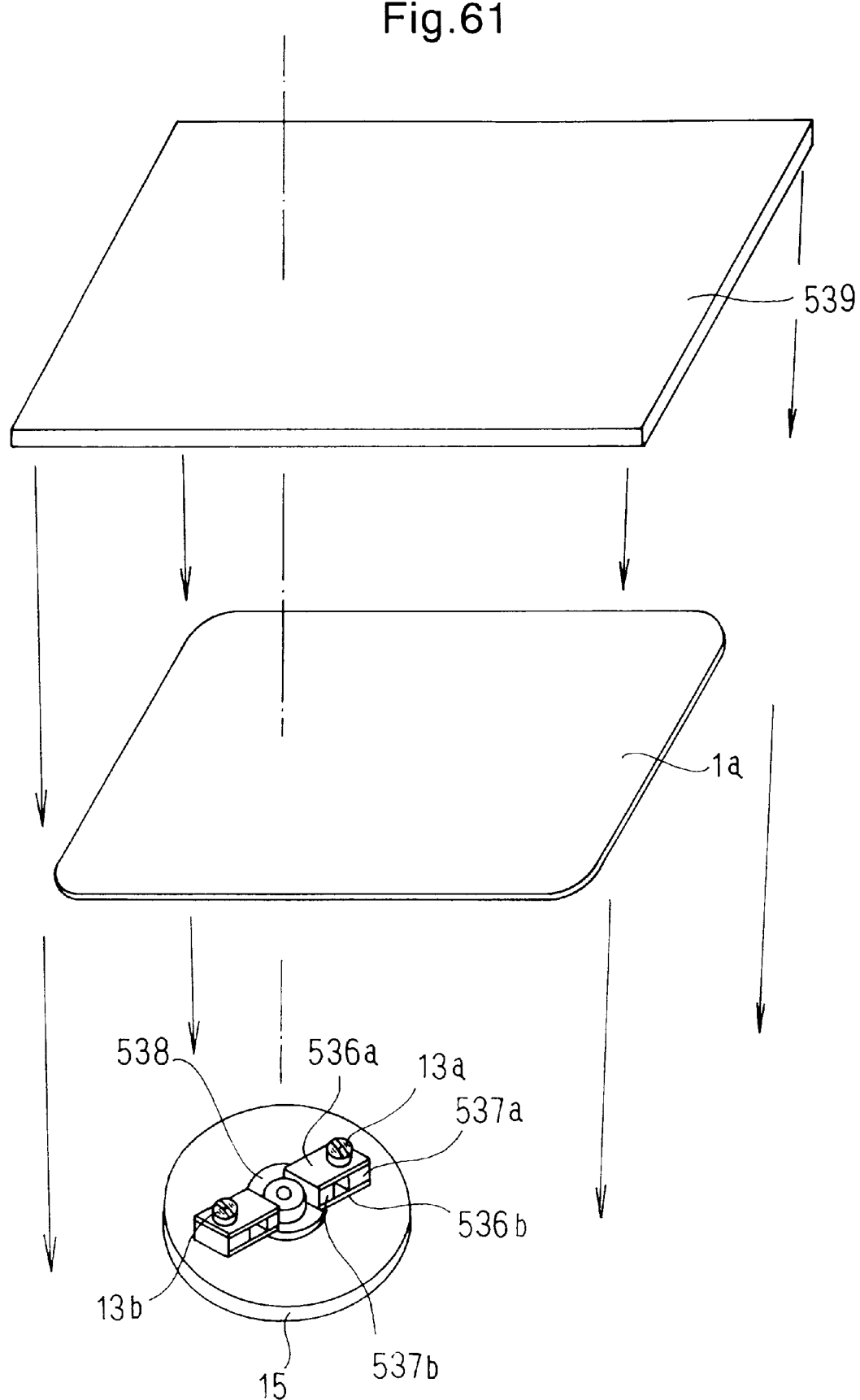
FIG. 61 is a sketch showing the magnetic head and another card holding mechanism according to another embodiment.

FIG. 61 shows the magnetic heads and the card holding mechanism according to the invention. In FIG. 61, flat springs 536a, 536b have the same shape. A spacer 537a at the magnetic head side and a spacer 537b at the fixing part side are placed with a predetermined interval. The flat springs 536a, 536b are fixed on the top sides and the bottom sides of the two spacers 537a, 537b. The magnetic heads 13a, 13b are fastened on the edge of the flat spring 536a, to which the spacer 537a at the magnetic head side is fixed. The bottom of the flat spring 536b, to which the spacer 537b at the fixing part side is fixed, is fastened by a spacer 538. The spacer 538 makes a space between the bottom of the flat spring 536b and the turntable 15 so that the flat springs 536a, 536b can change the form vertically.

The magnetic heads 13a, 13b have spherical or projected contacting part for contacting the magnetic card 1a as well as Embodiment 39, each of which includes the head gap. When a plurality of the magnetic heads are mounted, the bottom of the flat spring 536b, to which the spacer 537b at the fixing part side is fixed, can be adjusted by tightening the adjusting screws (not shown) as well as Embodiment 39. However, in this embodiment, the flat springs 536a, 536b which mount the magnetic heads 13a, 13b can move up and down, so that the position of the head can be adjusted within the desired accuracy. Namely, each tip of the magnetic heads is not required to be in the same plane, which is different from Embodiment 39. The apparatus of the embodiment is characterized as follows:

1) each tip of the magnetic heads is placed on a vertical plane with the rotation shaft of the turntable 15, however, is not required to be in the same plane;
2) each head gap is placed on the top of the tip;
3) the center line of the locus of each magnetic head (that is, the center of the track width) is on the same circle; and
4) the azimuth angle of each magnetic head can be adjusted to be the same.

A support pad 539, which is fixed to the pad frame 208 (not shown in the figure), faces and supports the magnetic card 1a when the magnetic heads 13a, 13b are pressed by the flat springs 536a, 536b with predetermined pressure force. In this configuration as well as Embodiment 39, the relative position of the magnetic card 1a and the support pad 539 is kept stationary during the operation excepting the feeding time and the ejecting time of the magnetic card. In another configuration, in which the pad frame 208 serves as the support pad 539, the same effect can be obtained. Far higher rigidity is required for the support pad than the magnetic card 1a or the flat springs 536a, 536b. The contacting plane with the magnetic card 1a is set almost parallel with the vertical plane of the rotation shaft of the turntable 15. However, when dust, etc. sticks to the magnetic card 1a and comes between the magnetic card 1a and the support pad, the shape of dust is easily printed on the card surface because of the high rigidity of the support pad 539. The magnetic heads 13a, 13b thus do not contact well with the magnetic card 1a, which reduces write/read performance. Therefore, the support pad 539 should be made of conductive materials, which prevents electrostatic adsorption of dust, or Tefron coated materials, which is hard to adsorb dust.

The magnetic card 1a is locally contacted with the support pad 539 by pressing the magnetic heads 13a, 13b with the flat springs 536a, 536b using the support pad 539 as the standard plane. As a different aspect from Embodiment 39, the magnetic heads 13a, 13b are moved to follow the surface of the magnetic card 1a. The magnetic card 1a is pressed to the support pad 539 by the contact pressure from the magnetic heads 13a, 13b caused by the flat springs 536a, 536b, and the magnetic card 1a is held between the magnetic heads 13a, 13b and the support pad 539. Each of the tips of the magnetic heads 13a, 13b having spherical or projected contacting part are located at the center of the contacting area where the pressure force is generated. The two parallel flat springs 536a, 536b make the magnetic heads 13a, 13b move only vertically with the support pad 539. The vertical displacement of the magnetic heads 13a, 13b can be absorbed by the flat springs. The magnetic heads 13a, 13b do not incline, so that the positions of the tips of the magnetic heads 13a, 13b do not change.

As described above, each tip of the magnetic heads 13a, 13b is placed on the vertical plane with the rotation shaft of the turntable 15, and each head gap is placed on the top. The support pad 539 is placed in almost parallel with the vertical plane with the rotation shaft of the turntable 15. When the magnetic card 1a is pressed as to contact the support pad 539, the head gap always contacts with the magnetic card 1a.

The magnetic heads 13a, 13b are moved only vertically with the turntable 15 because of the two parallel flat springs 536a, 536b. When a plurality of magnetic heads are used, only pressure force needs to be changed even if each of the magnetic heads has vertical displacement. If the geometrical relationship of the turntable 15, the magnetic heads 13a, 13b, and the support pad 539 is kept the same, the head gap of each magnetic head always contacts with the magnetic card 1a, which provides good write/read performance. The magnetic heads 13a, 13b are hard to incline by using the two parallel flat springs 536a, 536b even if centrifugal force is given. Once the positions of the magnetic heads 13a, 13b are adjusted when the turntable 15 is stationary, the geometrical relationship of the stationary condition is kept even if the turntable 15 rotates, which provides the same effect as Embodiment 39.

Embodiment 41

Another embodiment, in which the magnetic card effectively contacts the magnetic head, will be explained.

Figure 62:
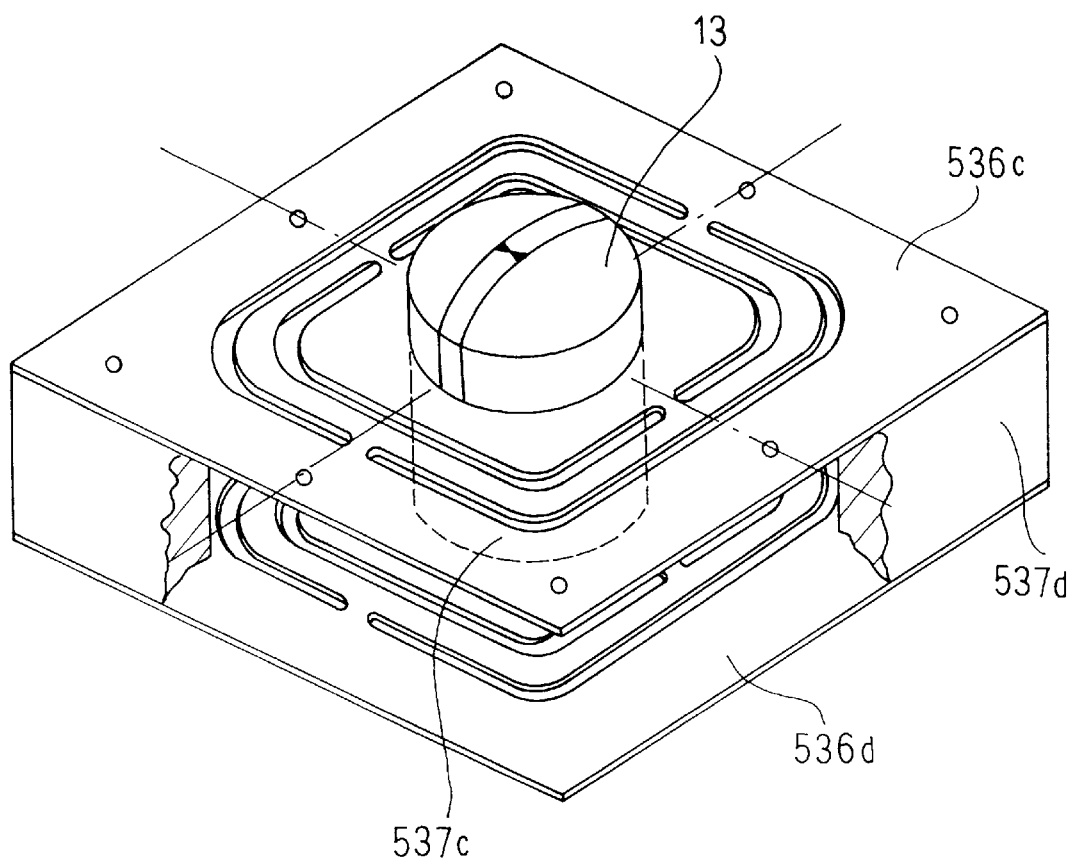
FIG. 62 shows another embodiment using two parallel flat springs.

FIG. 62 shows the embodiment using another kind of spring instead of using the two parallel flat springs as described in Embodiment 40. In FIG. 62, two gimbal springs 536c, 536d are provided, which are popularly used for a floppy disk drive, etc. A spacer 537c at the magnetic head side and a spacer 537d at the fixing part side are fixed respectively between the gimbal springs 536d, 536d. The spacers 537c, 537d support the gimbal springs 536c, 536d as to keep them parallel, so that the magnetic heads 13a, 13b are moved only vertically with the turntable 15. In Embodiment 40, the cantilever flat springs are used, and the configuration using gimbal springs also brings the same effect as Embodiment 40 as well as reducing the apparatus size even when the spring constant is low.

Embodiment 42

Another embodiment will be explained, in which the card holding mechanism with a pressure pad for getting effective contact of the magnetic head and the card.

Figure 63:
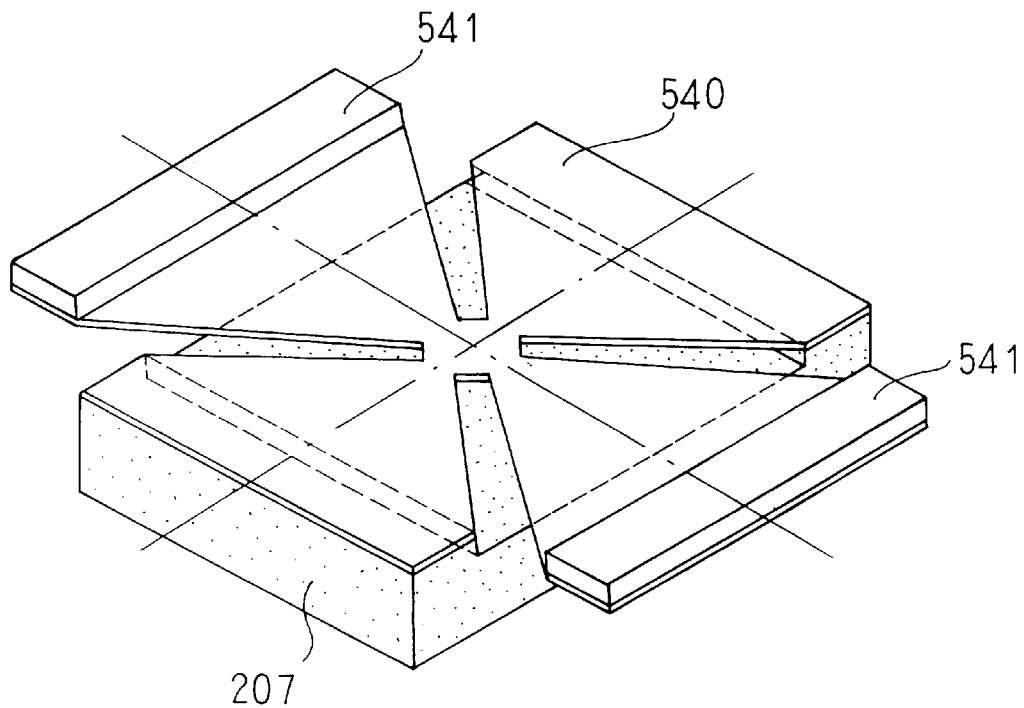
FIGS. 63A and 63B show another embodiment using another supporting mechanism for the pressure pad of Embodiment 42.
Figure 63:
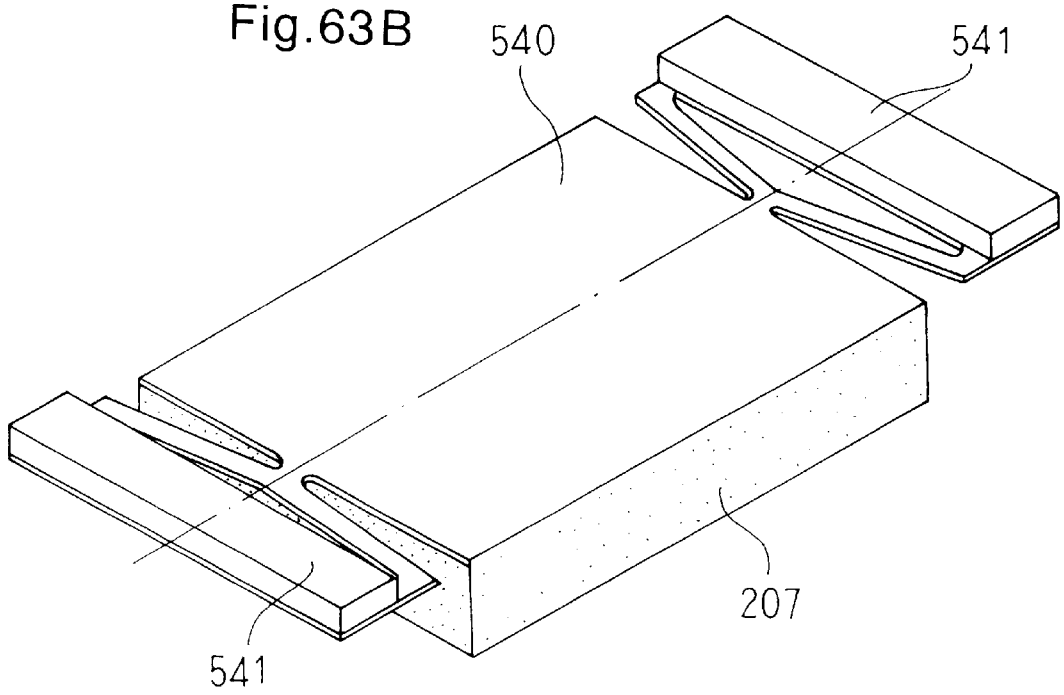

FIGS. 63A and 63B show a supporting mechanism for the pressure pad 207. As shown FIGS. 63A, 63B, a pad gimbal 540 supports the pressure pad 207 as to have the degree of freedom of rotation. The pad gimbal 540 gives the pressure pad 207 degree of freedom of rotation around both of the long side and the short side directions of the card. The pad gimbal 540 is connected to the pad frame 208 (not shown in the figures) through the pad spacer 541. In the card reader, the scanning locus of the rotation of the magnetic head should match the information track on the card. Therefore, after inserting the magnetic card 1a, the pressure pad 207 is kept stationary with the pad frame 208. For example, when the card is moved in the long side direction for changing the information track on the card, the pressure pad 207, the pad frame 208 are required to move in the same direction together with the card. Therefore, the rigidity of the pad gimbal 540 should be high in the long side and the short side direction. And the pressure pad 207 should have far lower rigidity using porous polymeric materials like sponge or textile materials like furfelt. The pressure pad 207 changes its form as to cover and contact the card. The pressure force of the pressure pad 207 is determined according to distance between the pad frame and the magnetic head. When the vertical rigidity of the pad gimbal 540 in the vertical direction with the contacting surface of the pressure pad is low, the elastic change of the pressure pad 207 is small, which causes the magnetic head not to contact with the magnetic card well enough for keeping a normal operation. Therefore, the vertical rigidity of the pad gimbal 540 should be higher than the vertical rigidity of the pressure pad 207.

Two types of the pad gimbals 540 are shown in FIGS. 63A, 63B. As described above, the rotating rigidity of the pad gimbal around the long side and the short side directions is set low. The vertical rigidity is set higher than the vertical rigidity of the pressure pad 207 in the depth direction, and the horizontal rigidity in the horizontal direction can be set higher.

In this embodiment, the pressure pad 207 is supported by the pad gimbal 540 as to rotate freely only around the long side and the short side direction. In case of using a plurality of the magnetic heads, even if each magnetic head fixed on the turntable has an error in adjusting the height, or if the pressure pad 207 is not set exactly vertical with the rotation shaft of the turntable, the pressure pad is controlled to make a desired plane by the pad gimbal 540. Therefore, the magnetic head can be contacted with the magnetic card even if each part of the apparatus is not adjusted exactly.

Embodiment 43

Another embodiment will be explained, in which the card holding mechanism with a pressure pad for getting effective contact of the magnetic head and the card.

Figure 64:
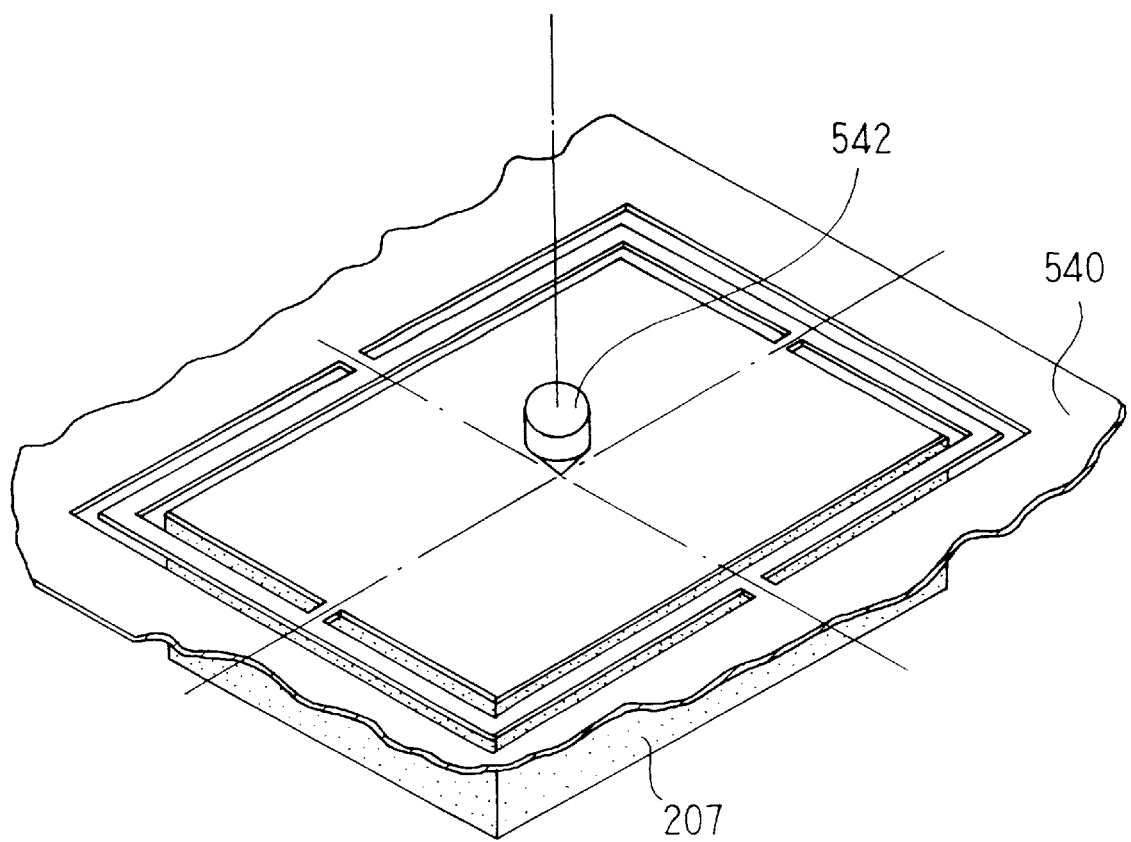
FIG. 64 shows another embodiment using another supporting mechanism for the pressure pad of Embodiments 42, 43.

FIG. 64 shows another configuration related to the supporting mechanism for the pressure pad 207, which is used in Embodiments 39 and 42. A pivot 542 is provided on the back side of the pad gimbal 540. The pivot 542 is provided on the opposite side of the side where the pressure pad is fixed. Even if the pad gimbals, whose vertical rigidity is lower than that of one explained in Embodiment 42, is used, the embodiment brings the same effect as Embodiment 42 by providing the pivot 542.

Embodiment 44

Another embodiment will be explained, in which the card holding mechanism with a pressure pad for getting effective contact of the magnetic head and the card.

Figure 65:
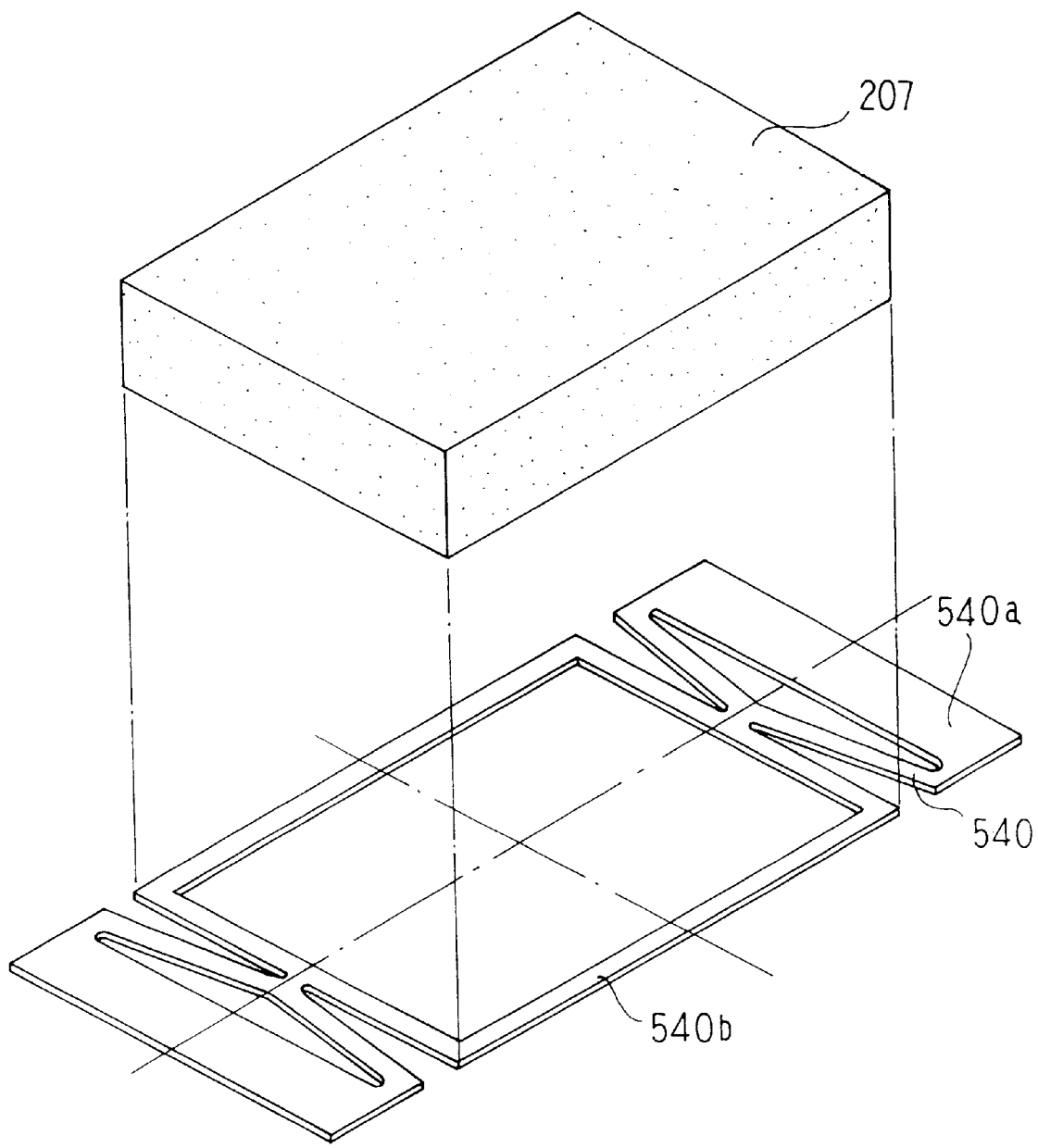
FIG. 65 shows another embodiment using another supporting mechanism for the pressure pad of Embodiment 39.

FIG. 65 shows another configuration related to the supporting mechanism for the pressure pad 207, which is used in Embodiments 42 and 43. In FIG. 65, the pad gimbal has a frame fixing part 540a to be fixed to the pad frame, and a pad fixing part 540b for fixing the pressure pad 207. The pad fixing part 540b has a window in the inside area. The window size should be bigger than the scanning area of the magnetic head. The card is not needed to contact with the pad gimbal 540. In the scanning area of the magnetic head, the magnetic card should be always contacted with and supported by the pressure pad 207 and the magnetic head. In the scanning area of the magnetic head, the pad gimbal 540 should not touch the card. The rotation axis, around which the pressure pad 207 is rotated is existing almost the center of the pad gimbal. Since the magnetic card and the pad gimbal 540 are very thin, the rotation axis of the pressure pad is almost the center of the magnetic card.

In case of using a plurality of the magnetic heads, even if each magnetic head, fixed on the turntable, has an error in adjusting the height, or if the pressure pad 207 is not set exactly on vertical plane with the rotation shaft of the turntable, the pad gimbal rotates and/or inclines in some degree and controls the pressure pad 207 to form a desired plane. The dislocation may occur between the scanning locus of the magnetic head and the information track on the card because of the distance from the rotation axis of the pad gimbal to the magnetic card. In the apparatus described in Embodiment 42 or 43 with the thick pressure pad, the dislocation may occur beyond the allowance limit. In this embodiment, as the magnetic card and the pad gimbal 540 are very thin compared with the thickness of the pressure pad, the dislocation can be minimized.

Embodiment 45

The following explanation will be related to the contact of the magnetic head and the magnetic card.

Figure 66:
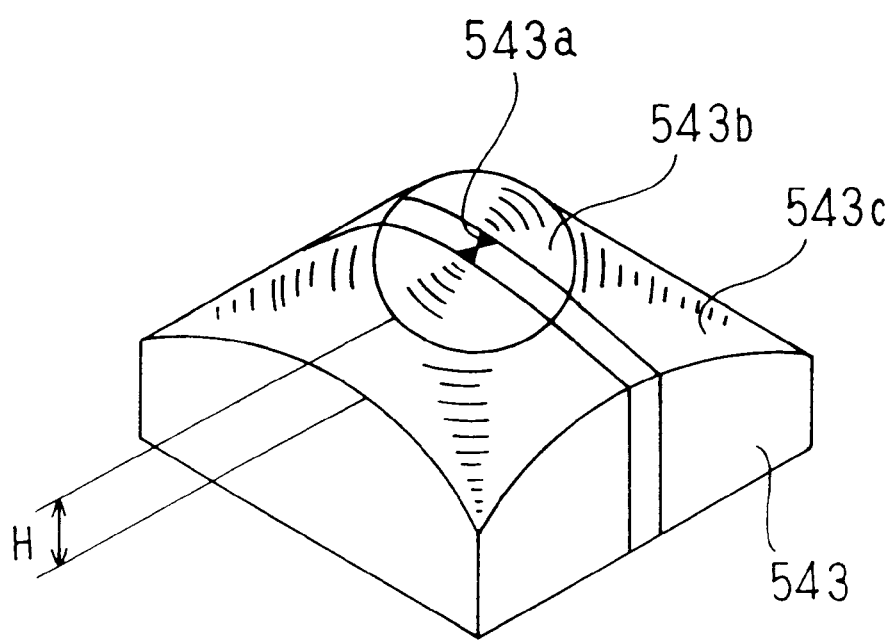
FIG. 66 illustrates the magnetic head having a spherical or projected contacting part.

FIG. 66 illustrates so-called a button-type magnetic head having a spherical or a projected engaging part, which is used in the above embodiment. As shown in FIG. 66, the magnetic head 543 has a head gap 543a, a friction surface 543b, and a taper 543c. The friction surface 543b has a spherical or projected surface, having the head gap 543a as a top part, and the shape of the taper 543c is a part of cone.

The friction surface 543b is continued to the taper 543c smoothly. The height H of the taper 543c is set larger than the thickness of the magnetic card. The height H is determined based on the flatness of the magnetic card or the card feeding mechanism, etc.

Figure 67A:
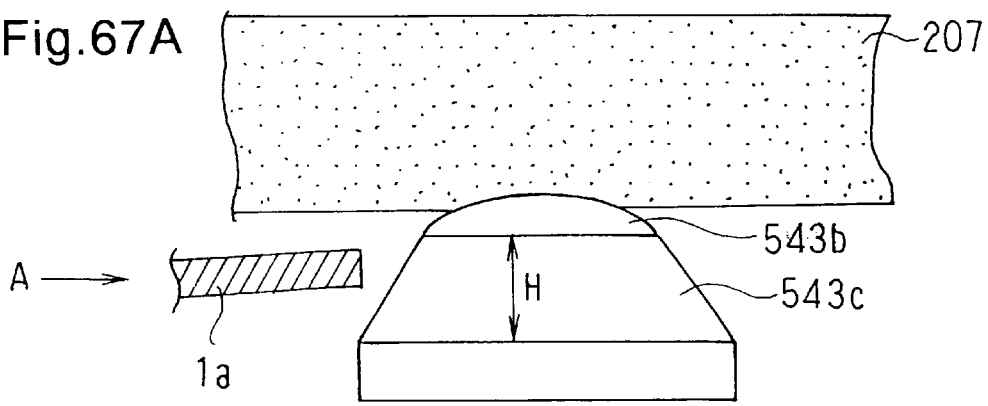
FIGS. 67A–67D show inserting operation of the magnetic card according to one embodiment.
Figure 67B:
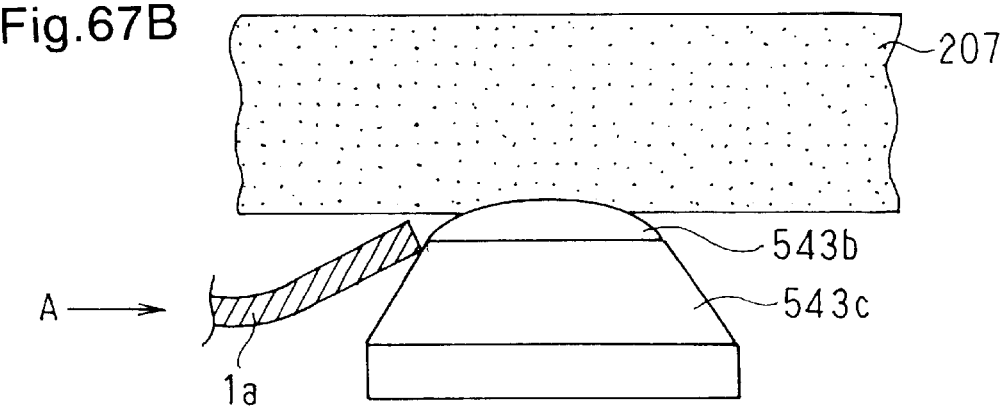
Figure 67C:
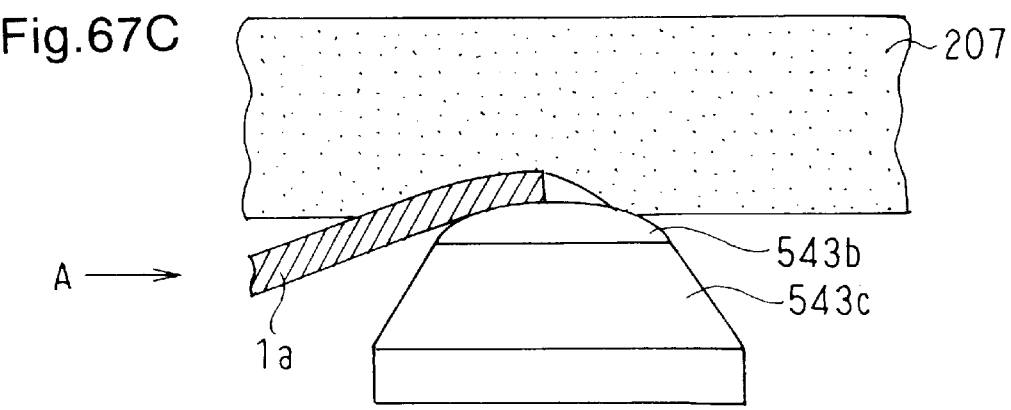
Figure 67D:
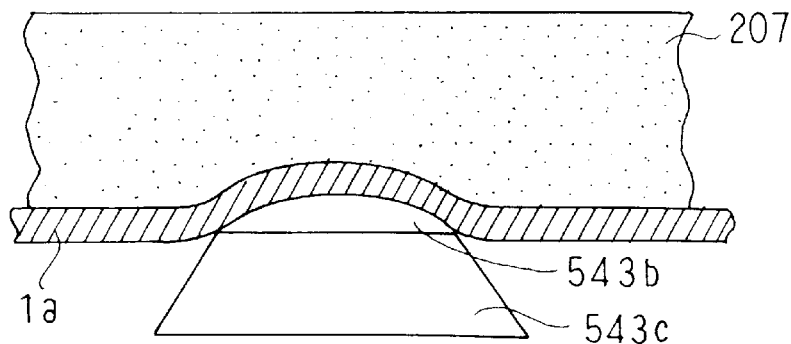

FIGS. 67A to 67D show inserting operation of the magnetic card to the apparatus using the magnetic head 543 according to this embodiment. Before inserting the magnetic card, the magnetic head 543 remain stationary with or without the pressure pad 207 contacted. In this embodiment, the case, in which the magnetic head is contacted with the pressure pad 207 and the magnetic card 1a cannot easily inserted, is explained. The embodiment can be also applied to the case, in which the magnetic head is not contacted with the pressure pad 207. As shown in FIG. 67A, the magnetic card 1a is inserted to the direction shown by an arrow A manually or by the card feeding mechanism. At this time, the edge of the magnetic card 1a is touched the taper 543c of the magnetic head 543. When the magnetic card 1a is inserted deeply, the magnetic card 1a is moved along the surface of the taper 543c to the friction surface 543b and finally contacts the pressure pad 207 as shown in FIG. 67B. The magnetic card 1a is inserted in the wedge-shaped space between the friction surface 543b or the taper 543c and the pressure pad 207, and is moved to the space between the pressure pad 207 and the friction surface 543b of the magnetic head by pushing up the pressure pad 207. The inserting procedure of the magnetic card 1a is finished by adjusting its position as to contact the friction surface 543b with the whole surface, so that the information can be written/read to/from the magnetic card 1a as shown in FIG. 67D.

The magnetic card 1a can be inserted smoothly by providing the taper 543c to the magnetic head 543 without using the special mechanism which makes the space for the card. If the pressure pad 207 is set to be able to contact with the magnetic head 543, dust or contamination stuck on the magnetic head can be removed by the pressure pad by turning the turntable (not shown in the figure) before inserting the magnetic card 1a.

In this embodiment, the magnetic head 543 is fixed on the turntable. The embodiment can be applied to the configuration, in which the magnetic head 543 is fixed on the turntable through the spring,to bring the same effect as the above configuration. In this case, the taper 543c is also provided to the magnetic head 543, and the spring, instead of the pressure pad, can be bent and change its shape to guide the magnetic card smoothly on inserting the magnetic card 1a.

Embodiment 46

In the following, a cleaning mechanism for removing dust or contamination stuck on the magnetic card will be explained.

As an example of the cleaning mechanism for removing dust or contamination on the magnetic recording medium, two kinds of VTR cassette tape cleaners are popularly known; one of which includes polishing sheet in the cassette case instead of the magnetic tape (dry type), and the other includes polishing cloth wet by liquid polisher (wet type). For cleaning a floppy disk, dry type cleaner, which includes polishing sheet instead of the floppy disk in the diskette case, is usually used.

There are some problems on using the above kind of cleaners for removing sticking dust on a magnetic card as follows:

(1) The recording medium for the card reader of the invention is exposed without being included in a cassette, etc. The magnetic card is easy to get dirty by dust in the air, fingerprint, fat and oil, etc.

(2) The card reader of the invention has the driving roller for feeding the card. When the driving roller touches polisher for cleaning, the driving roller cannot feed the card accurately, which reduces write/read performance of the data of the card.

Figure 68:
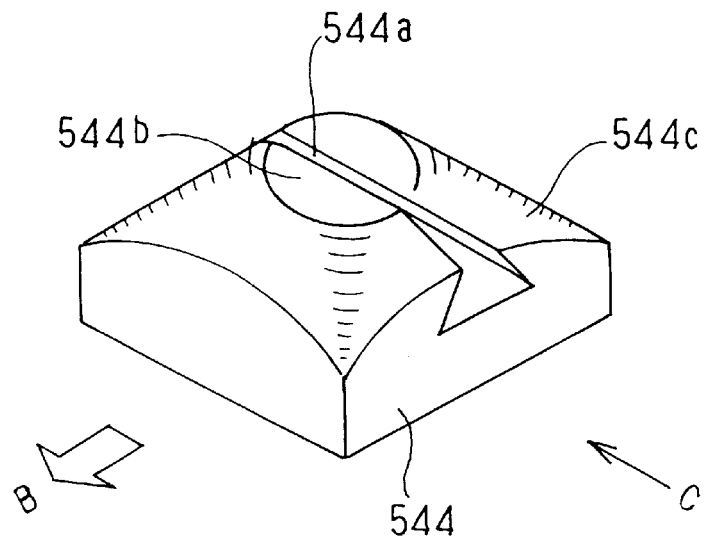
FIG. 68 shows a dust remover according to one embodiment.

FIG. 68 shows a dust remover according to the embodiment. A dust remover 544 has a notch 544a, a friction surface 544b, and a taper 544c. The friction surface 544b has a spherical or projected shape and has the notch 544a as a top part. The shape of the taper 544c is a part of cone. The friction surface 544b is continued to the taper 544c smoothly. Namely, the dust remover is desired to have almost the same shape as the magnetic head shown in FIG. 66. The height H of the taper 544c is set larger than the thickness of the magnetic card to insert the magnetic card smoothly. These elements are made of ceramic materials such as alumina, titanic, or zirconia, which has high abrasion-fastness, high rigidity, and high tenacity.

Figure 69:
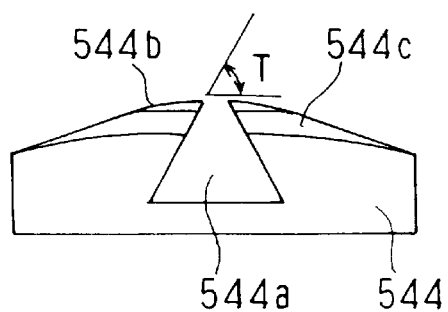
FIGS. 69A and 69B show examples of notches of the dust removers.
Figure 69:
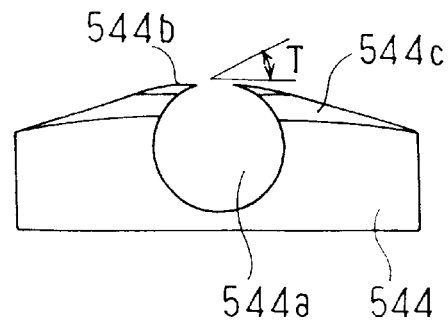

FIGS. 69A, 69B show examples of notch 544a of the dust remover. In FIG. 69A, the notch 544a is shaped almost triangle, and the notch 544a in FIG. 69B is shaped almost circle. The same effect is obtained by using both types of the notches. The notch is required to be shaped so that the angle T with the friction surface as shown in FIGS. 69A, 69B is less than 90 degrees.

Figure 70:
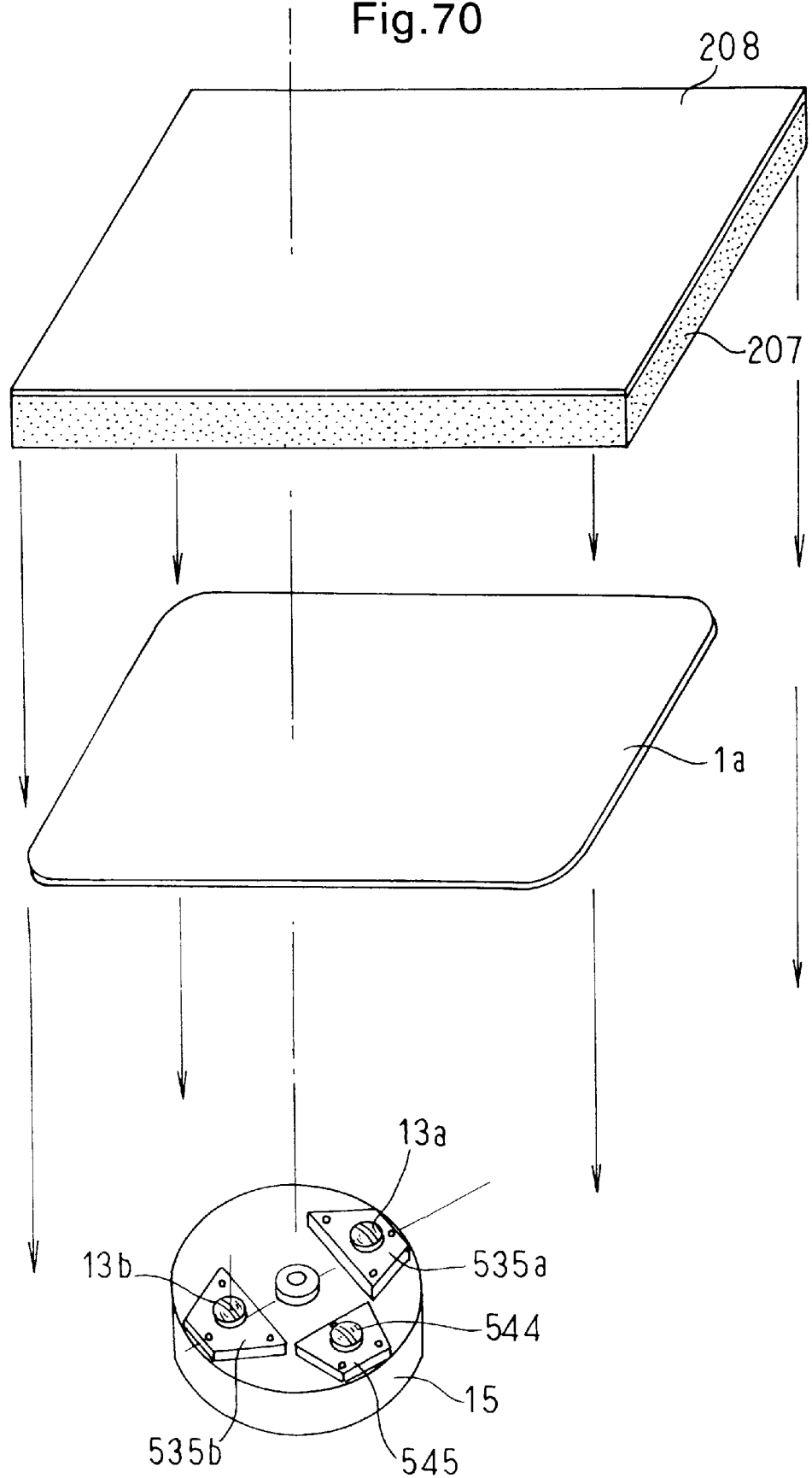
FIG. 70 shows the dust remover provided with the turntable.

FIG. 70 shows the dust remover 544 provided with the turntable 15. The configuration shown in FIG. 70 is the same as the configuration described in Embodiment 39. In addition to the configuration of Embodiment 39, the dust remover 544 is fixed to an adjusting holder 545 for the dust remover and the holder 545 is mounted on the turntable 15. As well as the magnetic heads 13a and 13b, the position of the dust remover can be adjusted with the desired accuracy by the adjusting holder 545 as follows:

1) set the dust remover 544 on a plane, which includes each of the tips of the magnetic heads 13a, 13b and is vertical with the rotation shaft of the turntable 15;

2) also set the dust remover 544 so that the notch 544a is placed on the top; and 3) also set the notch 544a so that the center of the notch is on the center line of the scanning locus of each magnetic head.

Figure 71:
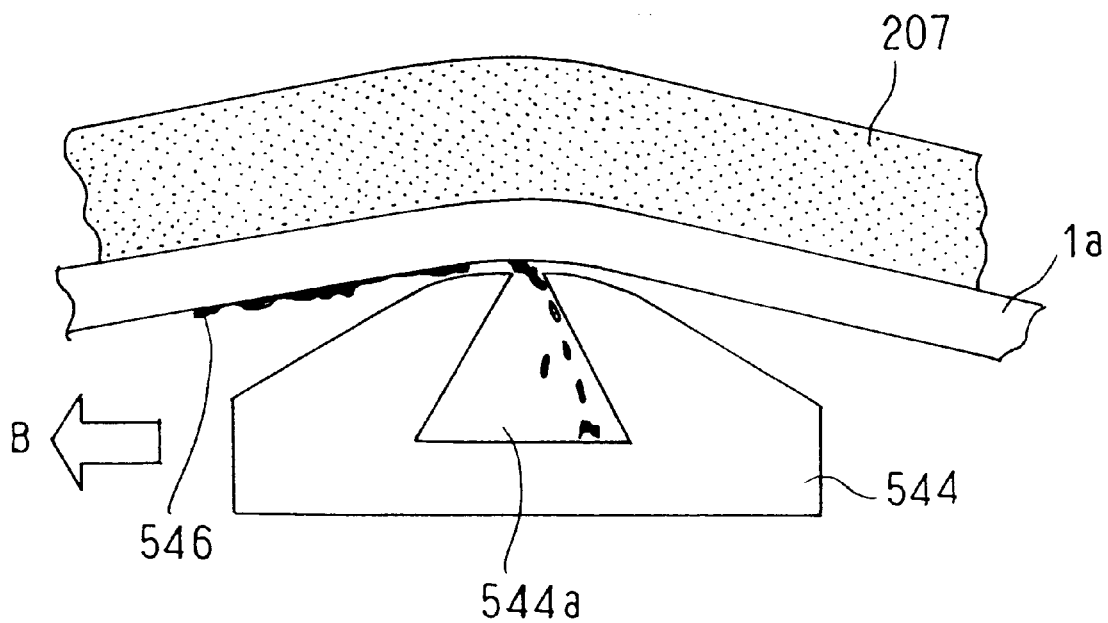
FIG. 71 explains the operation of the dust remover.

In the following, removing operation will be explained. FIG. 71 shows the dust remover 544 for removing sticking dust or contamination. In FIG. 71, contaminations 546 are stuck on the magnetic card. The dust remover 544 mounted on the turntable is moved to the direction shown by an arrow B with the rotation of the turntable. The contaminations 546 are scratched by the upper edge of the notch 544a and piled inside of the notch 544a.

The dust remover of the invention, the contaminations stuck on the magnetic card must be scratched as described above. Even if the contamination on the card produces some error in reading the information of the magnetic head, the dust remover traces the scanning locus and removes the contamination. The normal information can be read by reading with the magnetic head again after removing the contamination. In case of using two magnetic heads and mounting one dust remover, three tips are formed so as to keep the card on the flatter plane, which enables the magnetic head to write/read the information stably.

Embodiment 47

Figure 72:
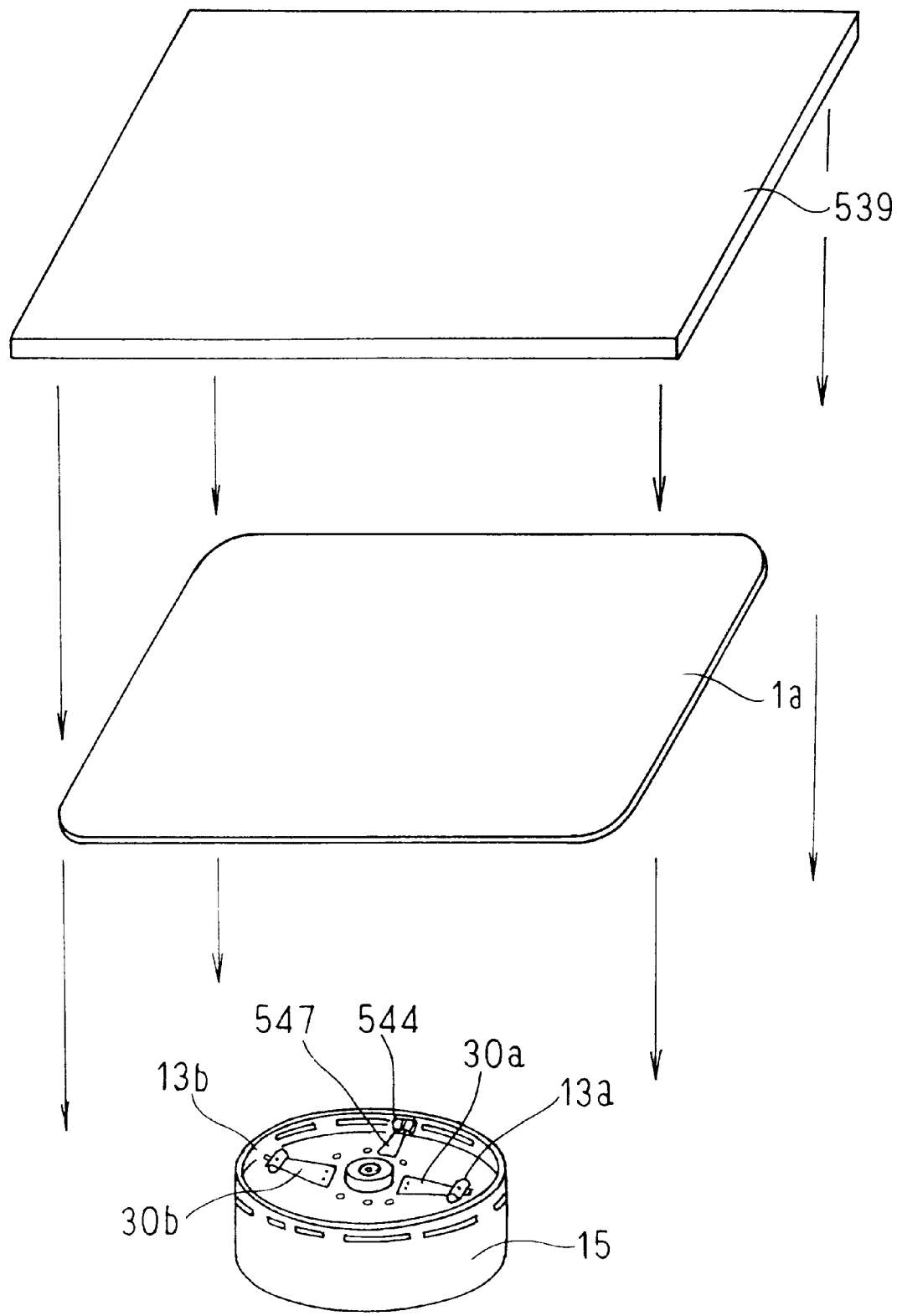
FIG. 72 shows another supporting mechanism of the dust remover according to one embodiment.

FIG. 72 shows another mechanism of the dust remover of the invention. A support spring 547, which has the same shape and the same characteristic as the long arm spring 30 supporting the magnetic heads 13a, 13b, is provided with the dust remover. The same effect can be obtained in removing the contamination by the notch of the dust remover 544 using the configuration, in which the magnetic head is supported by the spring. If the pressure force of the support spring 547 for the dust remover is set larger than the pressure force of the long arm spring supporting the magnetic heads 13a, 13b, the contamination can be removed more effectively.

In this embodiment, the configuration using the long arm springs for supporting the magnetic heads 13a, 13b and the dust remover 544 has been described. The same effect can be obtained by the configuration using two parallel flat springs, which is described in Embodiment 40.

Embodiment 48

Another embodiment will be explained for placing the dust remover.

Figure 73A:
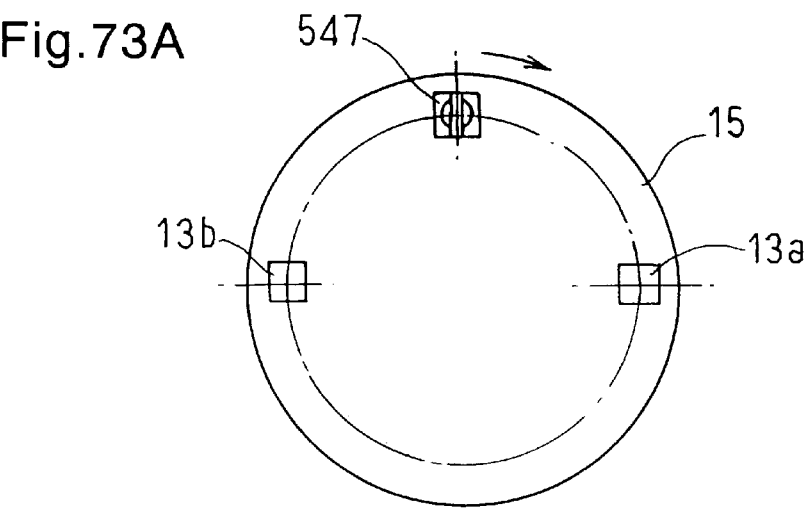
FIGS. 73A–73C show three different examples of placements of the dust removers according to another embodiment.
Figure 73B:
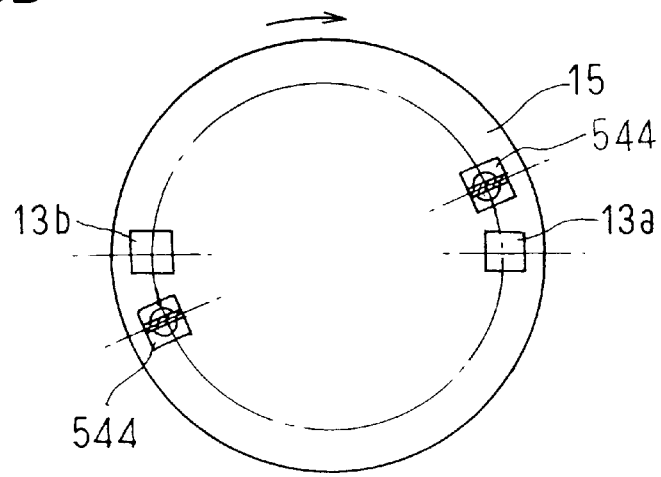
Figure 73C:
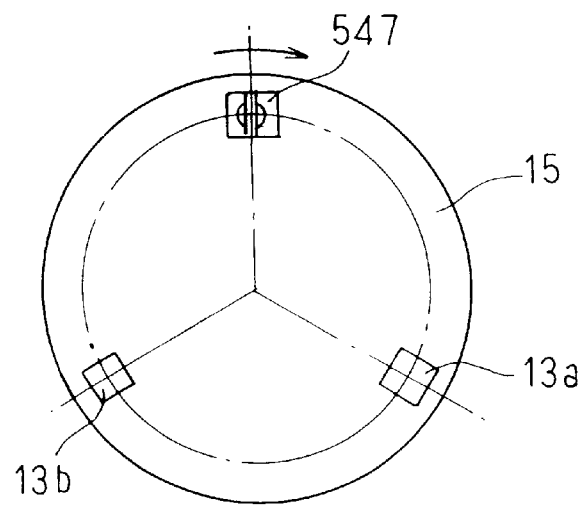

FIGS. 73A, 73B, and 73C show three different examples of placements of the dust removers. The configuration described in the above embodiment is shown in FIG. 73A. In FIG. 73B, two dust removers are placed just before the magnetic heads 13a, 13b respectively. In this configuration, the contamination is removed more effectively than the configuration shown in FIG. 73A. FIG. 73C shows another configuration, in which the magnetic heads 13a, 13b and the dust remover 544 are placed with the same intervals each other. This configuration not only removes the contamination from the magnetic card, but also prevents the card from contacting with the turntable.

Embodiment 49

In the present embodiment, an explanation is made for a detailed configuration of the magnetic head which improves the contact condition to the magnetic card in the magnetic card reader and the gimbal spring to support the head.

In FIG. 1, the magnetic heads 13a and 13b on the turntable 15 was loaded on the gimbal spring 19. In this system in FIG. 1, the magnetic heads 13a and 13b should be light-weight. In addition, it is assumed that the gimbal spring 19 should be capable of moving just up and down and overcome the moment which will incline the magnetic heads 13a and 13b to the outside according to the centrifugal force produced with the rotation of the turntable 15. The gimbal spring 19 should further keep the magnetic heads 13a and 13b in a proper condition. In case that the turntable 15 rotates at a low speed in low recording track density, there causes few problems. However, in case that the turntable 15 rotates at a high speed due to a reduction of the access time and the recording track density substantially increases due to the storage capacity, the inclination of the magnetic heads 13a and 13b causes an improper track positioning and a bad contact condition between the magnetic heads 13a and 13b and the magnetic card 1a.

In this embodiment, there follows a description so as to solve the foregoing problems.

Figure 74:
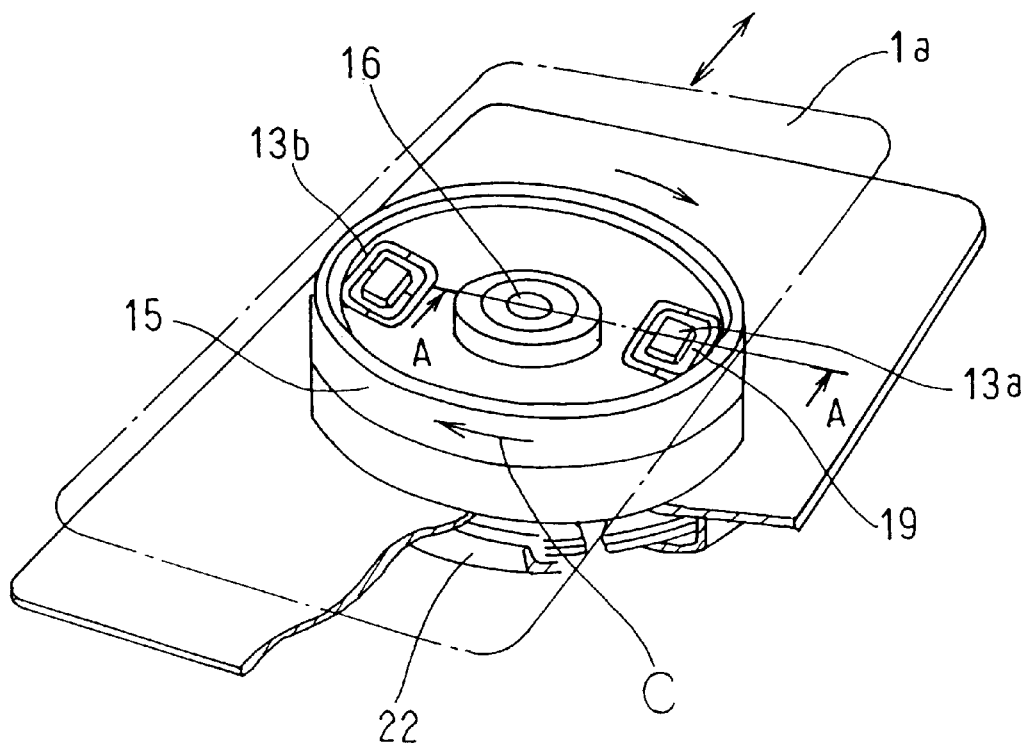
FIG. 74 shows a perspective view of the portion of loading the magnetic head according to the present invention.
Figure 75:
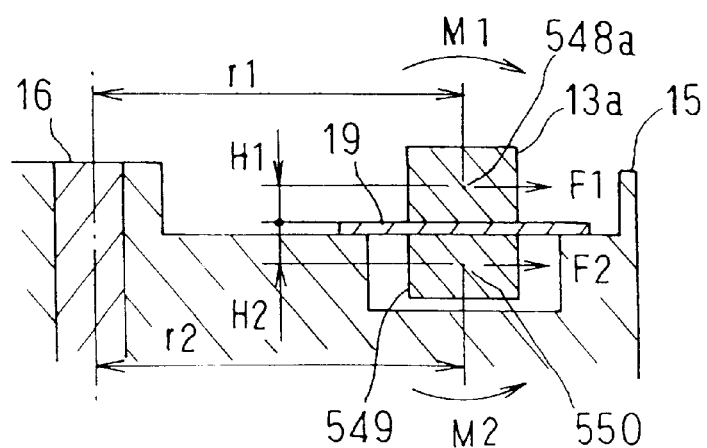
FIG. 75 shows a cross section taken on line A—A of FIG. 74.

FIG. 74 shows a perspective view of the portion of loading the magnetic head in the present invention. FIG. 75 shows a cross section taken on line A—A of FIG. 74. The magnetic heads 13a and 13b are loaded on the gimbal spring 19 and attached to the turntable 15. The magnetic heads 13a and 13b are set up at a height of sticking out a little on the surface of the turntable 15. The centers of gravity 548a and 548b (The center of gravity 548b is not shown in the figure) of the magnetic heads 13a and 13b are located at a distance of H1 from the gimbal spring 19. A balance weight 549 is installed below the gimbal spring 19. The center of gravity 550 is located at a distance of H2 from the gimbal spring 19.

In case that this apparatus reads and writes the information on the magnetic card 1a, the turntable 15 rotates around the rotation shaft 16 in the direction of arrow C at a predefined speed according to the DC motor 22. The magnetic card 1a and the magnetic heads 13a and 13b then cause the friction.

Herein, the centrifugal force F1 applies to the centers of gravity 548a and 548b of the magnetic heads 13a and 13b. The magnetic heads 13a and 13b then tend to incline towards the outskirt of the turntable 15. The moment M1 which will cause the incline is expressed as follows:

$$M1 = F1 \times H1 \quad (16)$$
$$= m1 \times r1 \times \omega1^2 \times H1$$

m1: mass of the magnetic heads 13a, 13b
r1: radius of rotation of the magnetic heads 13a, 13b
ω1: angular velocity of the magnetic heads 13a and 13b Simultaneously, the centrifugal force F2 applies to the center of gravity 550 of the balance weight 549. The balance weight 549 then inclines towards the outskirt of the turntable 15. The moment M2 which will cause the incline is expressed as follows:

$$M2 = F2 \times H2 \quad (17)$$
$$= m2 \times r2 \times \omega2^2 \times H2$$

m2: mass of the balance weight 549
r2: radius of rotation of the balance weight 549
ω2: angular velocity of the balance weight 549 Herein, when the values of the two moments M1 and M2 are equal, they will offset and thus the magnetic heads 13a and 13b don't incline. If each radius of rotation, r1 and r2, is set to be equal, each of the angular velocities ω1 and ω2 is also set to be equal in the above mentioned expressions (16) and (17). Therefore, so as to get the expression M1=M2, the following expression should be made.

$$m1 \times H1 = m2 \times H2 \quad (18)$$

Embodiment 50

Figure 76A:
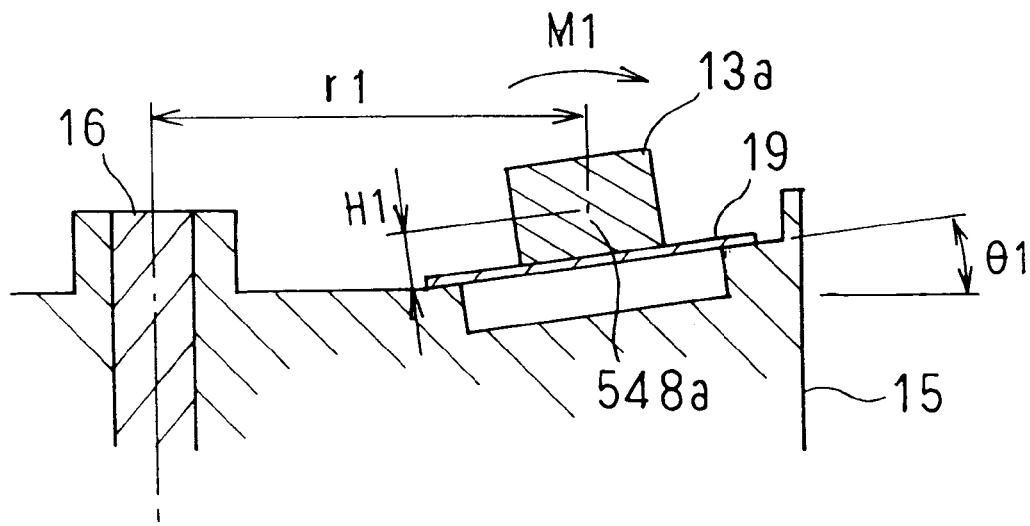
FIG. 76A shows a cross section of a portion of loading the magnetic head according to another embodiment of the present invention.
Figure 77A:
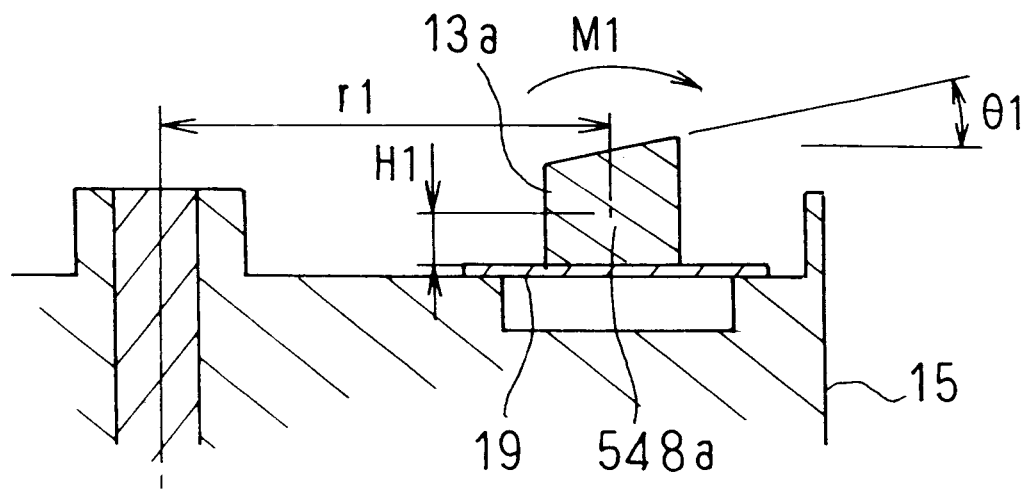
FIG. 77A shows a cross section of a portion of loading the magnetic head according to another embodiment of the present invention.
Figure 77B:
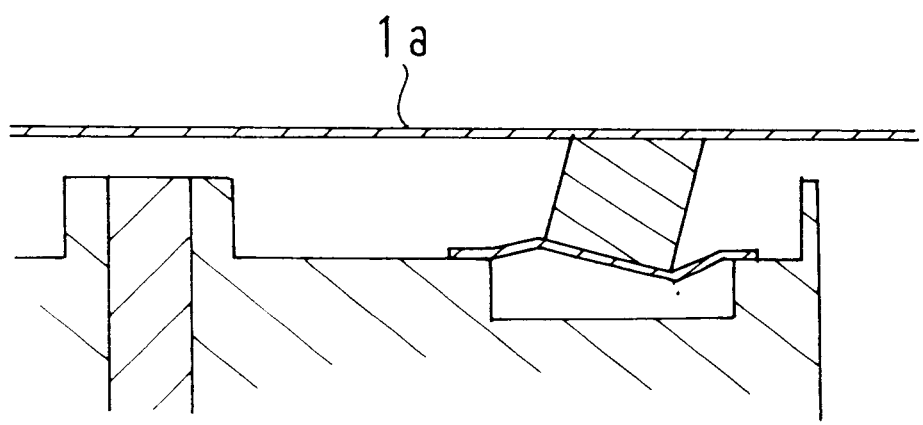
FIG. 77B shows a view of the operation of embodiment of FIG. 77A.

There is shown a case of improving the dynamic contact condition. FIGS. 76A and 77B are cross sections of another embodiment of the magnetic head of the present invention. In FIG. 75, the gimbal spring 19 adhered on the surface of the turntable 15 horizontally. In the present embodiment, the gimbal spring 19 adheres inclined on the side of the rotation shaft 16. The distance of the centers of gravity 548a and 549b from the gimbal spring 19 is assumed here to be Hi as it was in Embodiment 49.

Herein, when the turntable 15 rotates, the centrifugal force applies to the magnetic heads 13a and 13b. Then, the moment M1 which cause to incline the magnetic heads 13a and 13b towards the outskirt of the turntable 15 is produced. The size of M1 is shown according to the expression (16).

In general, the size of the moment M which is applied from the outside to the gimbal spring and the inclined angle θ of the gimbal spring have a proportional relationship in case that the inclined angle is small. The proportional constant is assumed to be k, the following expressions can be made.

$$M = k\theta \quad (19)$$

namely,

θ=M/k (20)

The proportional constant k is decided according to the form and the material of the gimbal spring. When the proportional constant is assumed to be k1, the inclined angle θ1 of the gimbal spring 19 in case of applying the moment M1 is expressed as follows:

$$\theta 1 = M1/k1 \quad (21)$$

Figure 76B:
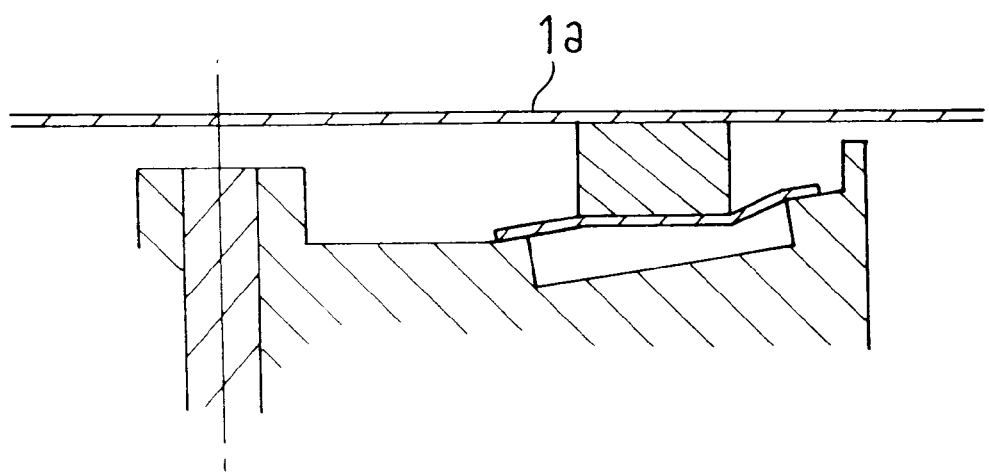
FIG. 76B shows a view of the operation of embodiment of FIG. 76A.

That is, in case that the gimbal spring 19 adheres inclined on the side of the rotation shaft 16 on the turntable 15 with an inclination of θ1, when the turntable 15 rotates and the centrifugal force applies to the magnetic heads 13a and 13b, the magnetic heads 13a and 13b stand in a proper condition as shown in FIG. 76B. Thus, the magnetic heads 13a and 13b have a good contact condition with the magnetic card 1a.

Embodiment 51

Further, there is shown another case of improving the dynamic contact condition. FIGS. 77A and 77B show a cross section of another embodiment of the magnetic head of the present invention. In FIGS. 74 and 75, the top surface planes of the magnetic heads 13a and 13b is in parallel with the plane of the gimbal spring 19. In FIG. 77A, the top surface planes of the magnetic heads 13a and 13b incline on the side of the rotation shaft 16. The distance of centers of gravity 548a and 548b from the gimbal spring 19 is assumed here to be H1 as it was in Embodiment 49.

Herein, when the turntable 15 rotates, the centrifugal force applies to the magnetic heads 13a and 13b as in FIG. 75. Then, the moment M1 which causes to incline the magnetic heads 13a and 13b to the outskirt of the turntable 15 is produced. The size of M1 is shown by the expression (16).

As explained in Embodiment 50, when the proportional constant of the gimbal spring 19 is assumed to be k1, the inclined angle θ1 of the gimbal spring in case of applying the moment M1 is expressed as follows:

$$\theta 1 = M1/k1 \quad (22)$$

That is, in case that the top surface planes of the magnetic heads 13a and 13b incline on the side of the rotation shaft 16 by θ1 in advance, when the turntable 15 rotates and the centrifugal force applies to the magnetic heads 13a and 13b, the top surface planes of the magnetic heads 13a and 13b becomes in the proper condition as shown in FIG. 77B. Thus, the magnetic heads 13a and 13b can have a good contact condition with the magnetic card 1a.

Embodiment 52

The following description deals with a track in case of reading and writing in high density with the magnetic head which rotates with a predefined radius. A prepaid telephone card, a prepaid ticket machine card, a commuter pass or other exchangeable rectangle magnetic card which has no holes can be used for this application.

In order to actualize these cards, the following problems should be solved.

(a) When there is no clearance between the symmetry innermost tracks of the magnetic or optical card, because of the positioning error of the card related to the mechanic accuracy of the card holding mechanism, the recording areas of the innermost tracks overlap. Then, there occurs a cross talk from the adjacent tracks which pick up the leaking signal. In this case, the normal operation of reading and writing cannot be executed.

(b) When the magnetic or optical card is inserted backward, the card reader detects that it is not inserted in a normal way. Then, the card reader ejects the card from the card reader automatically. In this case, the user should manually insert it again in a normal way.

In the present embodiment, there is shown a case of the magnetic card and the magnetic head. However, it is also applicable to the case of the optical card and the optical head.

Figure 78A:
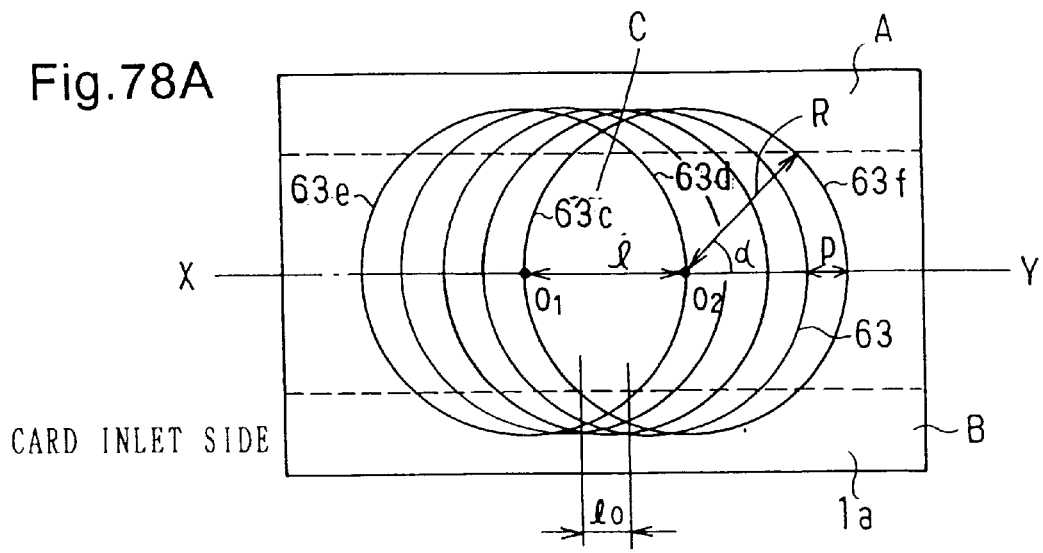
FIGS. 78A–78C show views of a track format on the magnetic card.

FIG. 78A shows the recording tracks as shown in FIGS. 12A to 12C. The head assembly 280 which loads the magnetic heads 13a and 13b relatively moves on the center line X-Y in the horizontal direction of the magnetic card 1a by an equal pitch (the length P corresponds to a track pitch). A plurality of recording tracks 63 have radius R. In FIG. 78A, a clearance $l_0$ at the closest position between the innermost track 63c and the other innermost track 63d is set according to the recording angle α and the expression (23) below in case that the total track number is assumed to be N. Further, $O_1$ and $O_2$ show the center of the circle which forms the front track 63e and the rear track 63f. As described in Embodiment 10, areas A, B, and C show unusable area which crosses with the circles of other recording tracks and unused areas. (same for FIGS. 78B and 78C). The distance between $O_1$ and $O_2$ is assumed to be 1.

$$l = (N/2-1)P$$

$$l^0 = 2R\cos \alpha - (N/2-1)p \quad (23)$$

Figure 78B:
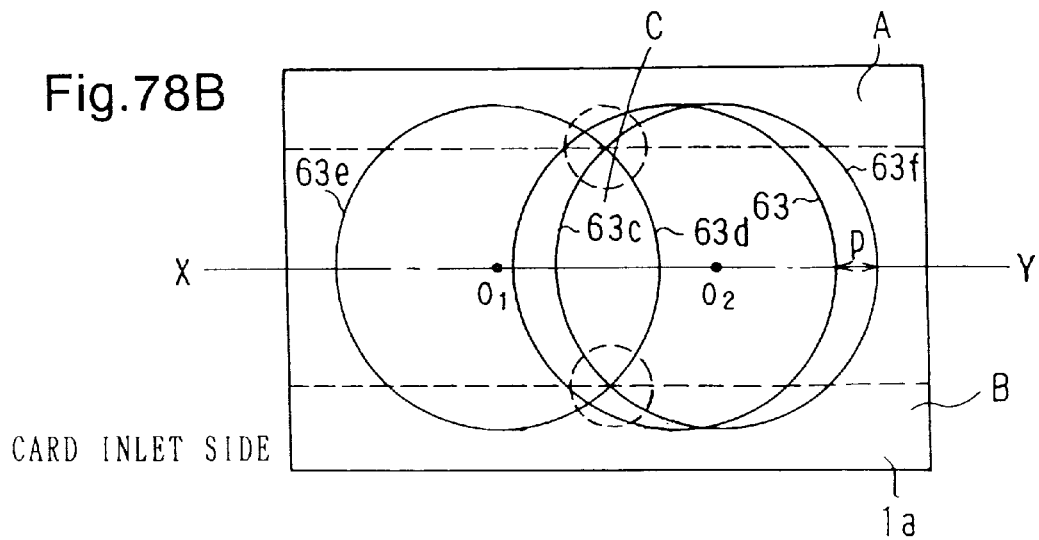

For an extreme example, in case that the above mentioned $l_0$ is smaller than the track pitch P, FIG. 78B shows the recording track when $l_0=0$. In FIG. 78B, at the record beginning portion and the ending portion of the innermost tracks 63c, 63d surrounded by the dotting circle, according to the mechanic accuracy of the feeding mechanism 186 as in FIG. 27 which is a card holding mechanism, a signal overlaps and is written on the record ending portion and the beginning portion of the other innermost track 63d. In case that the written signal is read or written again after the above mentioned magnetic card 1a is inserted, it is impossible to execute the normal reading and writing process.

Figure 78C:
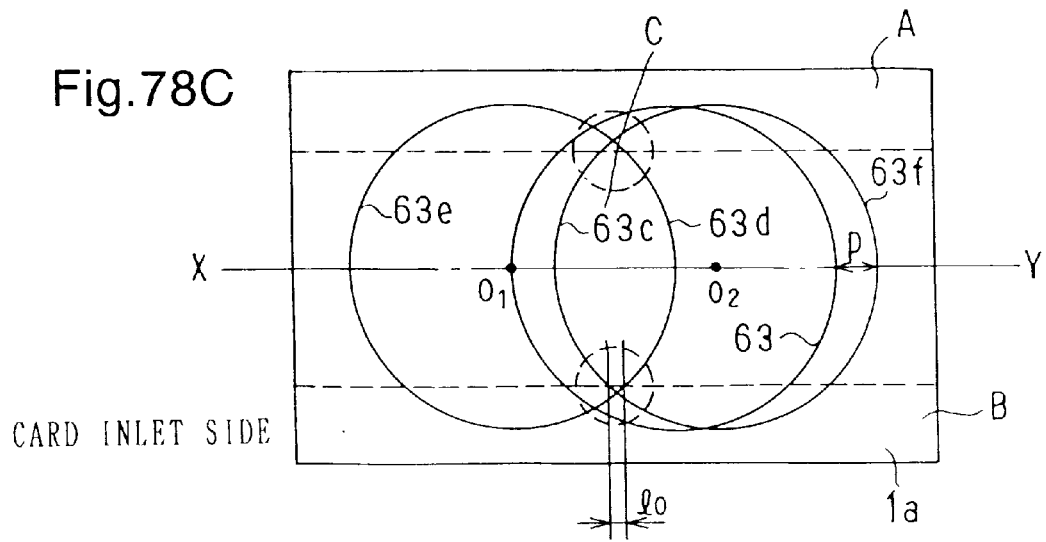

Furthermore, in FIG. 78C, unless the recording beginning portion and the ending portion of the encountering innermost tracks 63c and 63d overlap, there is shown a recording track in case that the $l_0$, which is the closest distance, is shorter than the track pitch P. In FIG. 78C, at the encoutting record beginning portion and the ending portion of the innermost track 63c and 63d surrounded by the dotting circle, there occurs a cross talk between the adjacent tracks which pick up signal from the encountering recording track according to the magnetic interference. Thus, it is difficult to get the proper output signal. In the present invention, a clearance $l_0$ at the adjacent position of the innermost tracks 63c and 63d as shown in the expression (23) is set to have more than the track pitch. Further, the relationship of the expression (24) and the recording angle α having the total extension of the track M as shown in embodiment 10 are set. As a result, it is possible to realize the recording track format of the magnetic card which makes the steady write and read process possible with achieving the maximum efficiency.

$$l_0=2R\cos \alpha-(N/2-1)P >=P \therefore \cos \alpha >=NP/4R \quad (24)$$

Embodiment 53

The following description deals with an effective usage of areas other than the data recording area in the card. In the present embodiment, the magnetic card and the magnetic head are used. However, it is also applicable to the case of the optical card and the optical head.

Figure 79:
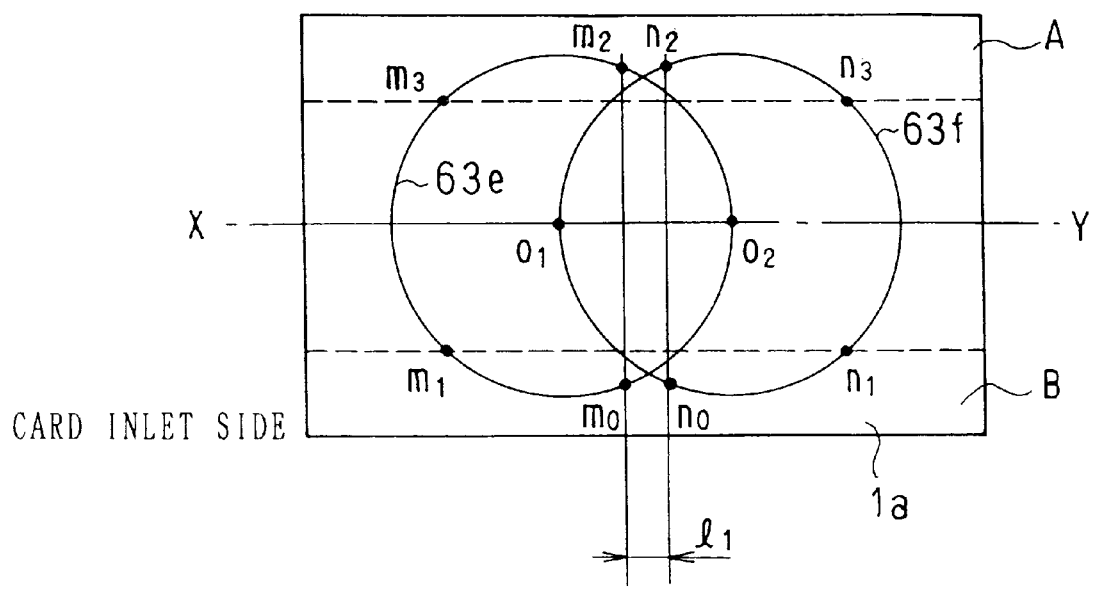
FIG. 79 shows a view of the track format of the front and rear tracks on the magnetic card.

FIG. 79 shows the magnetic card 1*a* equivalent to that in Embodiment 52. Further, FIG. 79 shows a recording track which uses a part of areas of A and B. Areas A and B are unusable area which crosses with another recording track, in this embodiment a part of area A and B is used as a recording area of the front track 63*e* and the rear track 63*f*. In FIG. 79, $l_1$ shows the closest distance between the record beginning portion and the ending portion of the front track 63*e* and the rear track 63*f*. As described in Embodiment 52, the length of $l_0$ is assumed to be more than track pitch P. $O_1$ and $O_2$ show the centers of the circle which form the front track 63*e* and the rear track 63*f*. $m_0$ and $n_0$ on each circle are the points in the area B having the distance $l_1$. $m_1$ and $n_1$ are the intersections with the dotted line which shows the area B. $m_2$ and $n_2$, $m_3$ and $n_3$ on the area A are the points equivalent to the $m_0$ and $n_0$, $m_1$ and $n_1$. The address mark which shows a track address or the front track 63*e* or the rear track 63*f* is recorded on the recording track of the arcs between the points $m_0$ and $n_0$ and the points $m_1$ and $n_1$. The same process is carried out on the recording track of the arcs between the points $m_2$ and $n_2$ and the points $m_3$ $_{and}$ $_{n3}$. Further, as in Embodiment 10, the areas A and B have a high frequency of causing flaw and spots by the hands in its use. Therefore, in this area, a simple pattern is recorded. The simple pattern are data which are incapable of causing error in this area (for example, '00', 'AA', or 'FF' in case of the MFM recording).

Figure 80A:
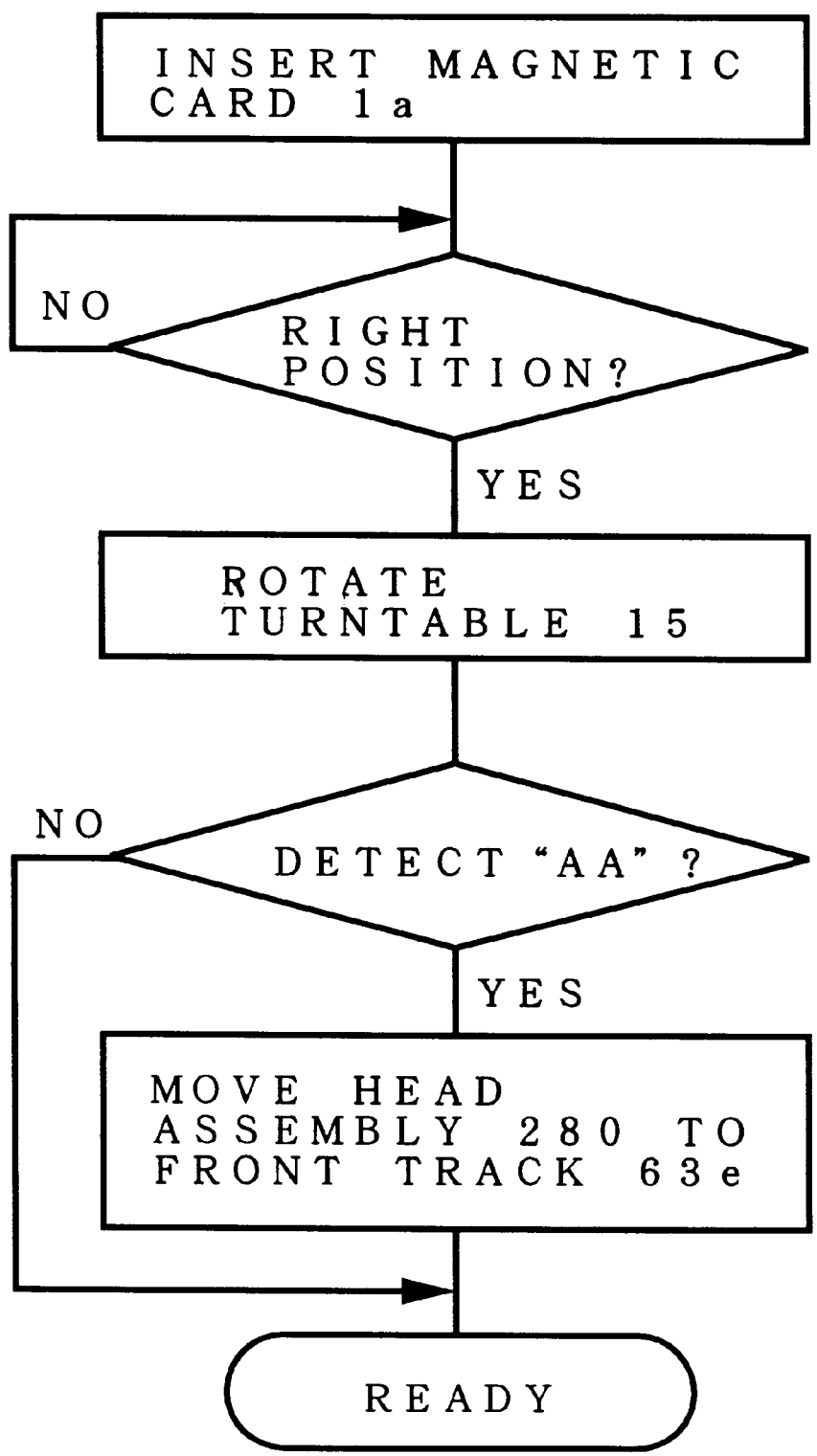
FIGS. 80A–80D show flow-charts of sequence until the magnetic head determines its position at the front track.

The operation of the card reader 160 will now be described. FIG. 80A shows a flow chart of sequence until the magnetic card 1*a* is inserted to the card reader 160 and the magnetic heads 13*a* and 13*b* loaded on the head assembly 280 as shown in FIG. 12A then determines position at the front track 63*e*. Herein, the address marks of the front track 63*e* and the rear track 63*f* is referred to as '00' and 'AA ', respectively. The magnetic card 1*a* is inserted as described in Embodiments 18, 19 and 20. The optical sensor 192 is mounted at the edge of the card end guide 190. The optical sensor 192 detects that the card reaches to a fixed position of the card holding mechanism 186. When the detection signal is output, the turntable 15 starts to rotate. The address mark is then read according to the magnetic heads 13*a* or 13*b*. Herein, when the 'AA' pattern is detected, the magnetic head 13*a* or 13*b* is in the rear track 63*f*. Therefore, the head assembly 280 is moved to the front track 63*e*. When '00' pattern is detected, the head assembly 280 stays there and becomes ready to operate. The head assembly 280 waits for the indication signal of the outside controller not shown in the figure.

Figure 80B:
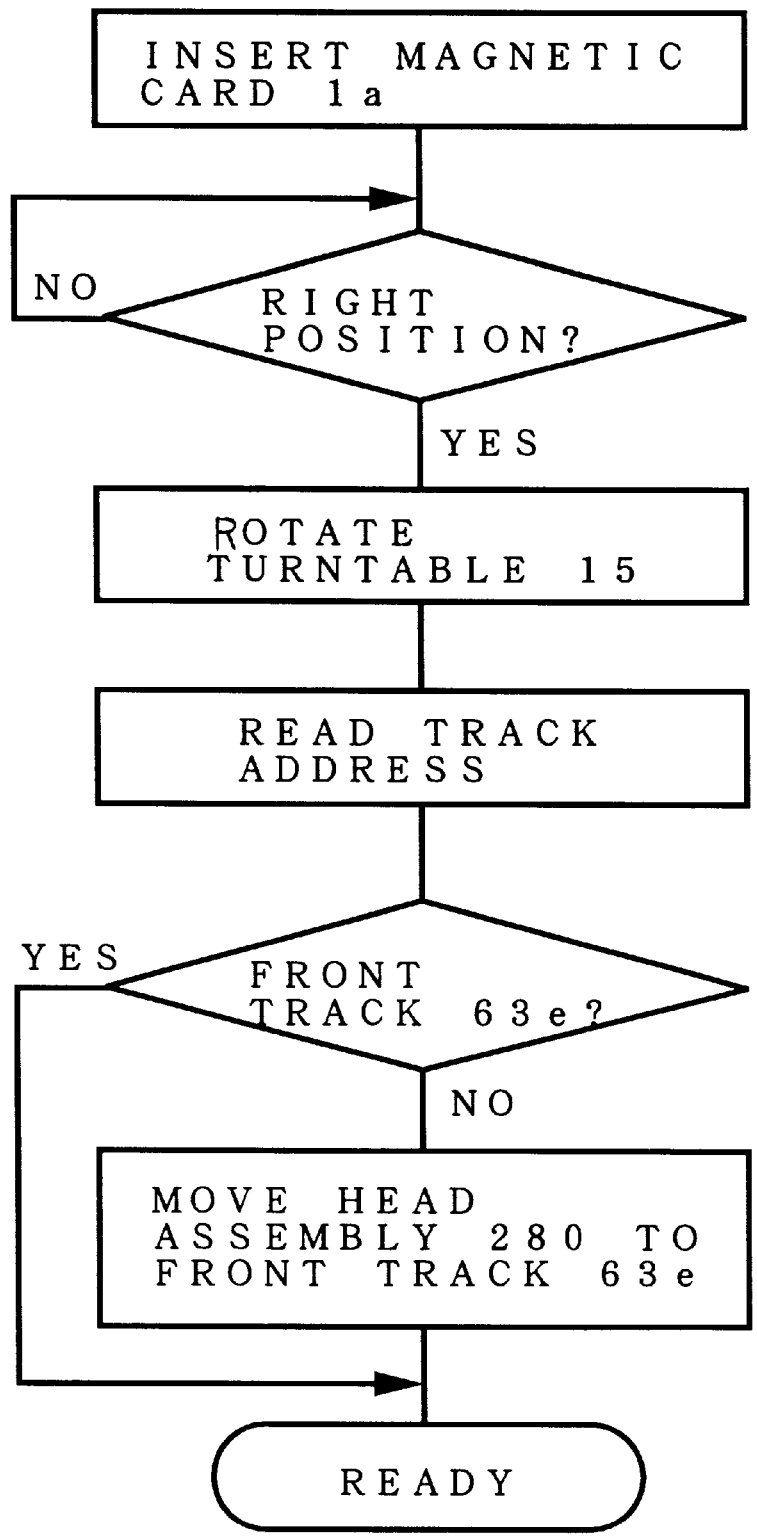

FIG. 80B shows another flow chart for positioning the magnetic heads 13*a*, 13*b* at the front track 63*e*. As described in Embodiment 28, it is possible to read addresses recorded on the recording tracks 63 and/or track information on the outermost tracks (the front track 63*e* and/or the rear track 63*f*). By reading the track addresses and/or the track information, the magnetic heads 13*a*, 13*b* can be positioned at the front track 63*e*.

It has been described that the head assembly 280 relatively moves against the magnetic card 1*a* in the carriage. On the other hand, it is also possible that the carriage loaded the magnetic card 1*a* relatively moves against the head assembly 280.

Figure 80C:
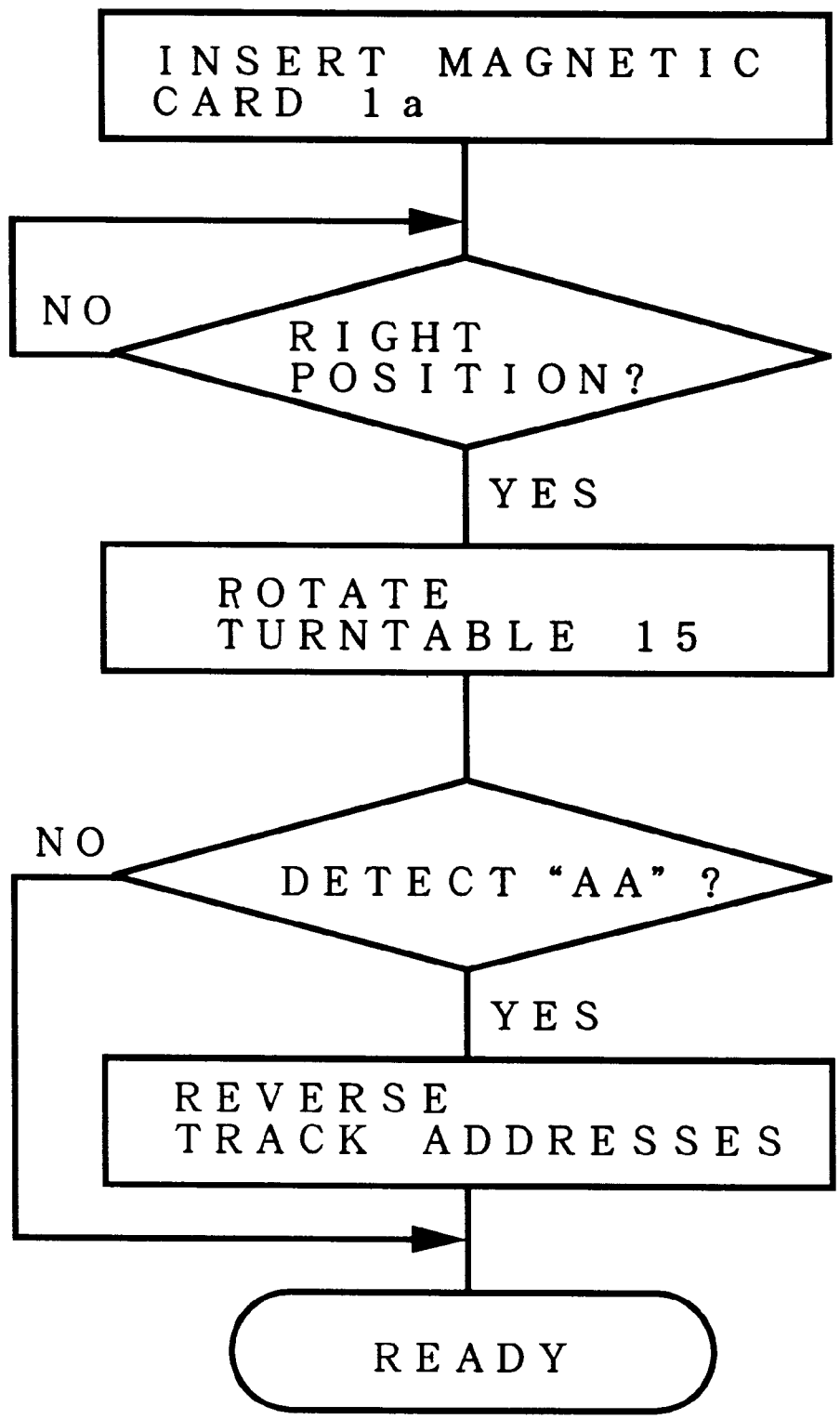
Figure 80D:
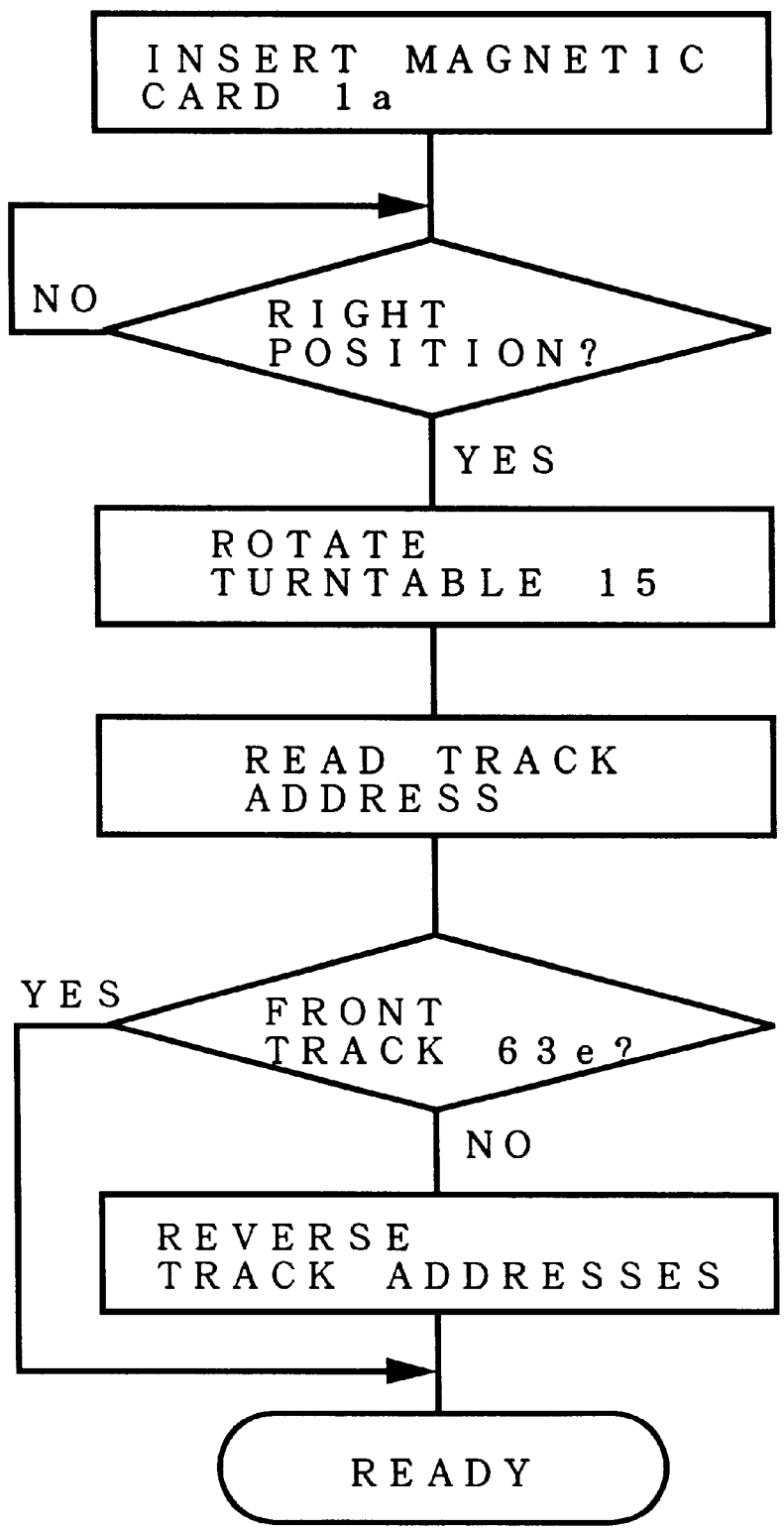

FIGS. 80C and 80D show flow charts for positioning the magnetic heads 13*a*, 13*b* at the front track 63*e*. As described in Embodiment 28, it is possible to provide a procedure having track address information of the magnetic card 1*a*. The procedure can convert the track address reversely front to rear and rear to front. The track address received from the outside controller (not shown) for track detection operation can be converted reversely by the procedure. In this case it is not needed to move the head assembly 280 or the carriage when either 'AA' pattern or '00' pattern is detected. When 'AA' pattern is detected, the track address is reversed by the procedure before the positioning the magnetic head.

As described before, the card reader will be ready when the magnetic heads 13*a*, 13*b* are positioned at the front track 63*e* which is the closest track to the card inlet 170. It is also possible that the card reader will be ready when the magnetic heads 13*a*, 13*b* are positioned at the rear track 63*f* which is the farthest track to the card inlet 170. Even for the later case, any one of the four sequences shown in FIGS. 80A to 80D can be applied if the detection step of 'AA' pattern is replaced by the detection step of '00' pattern, and "front track 63*e*" is replaced by "rear track 63*f*" in the flow charts.

The card reader of the present invention sets the clearance between the innermost tracks of the magnetic card or the optical card to have distance of more than the track pitch. As a result, it is possible to slack the mechanic accuracy of the holding mechanism of the magnetic card or the optical card. Further, it is possible to read and write effectively without influenced by the cross talk between the adjacent tracks.

Furthermore, in the track format, both or either of the front track and the rear track in the magnetic card or the optical card are set to be longer than the other track. Then, the address mark which shows the track address or the front track or the rear track is recorded. As a result, it enables the card reader to detect that the magnetic card or the optical card is inserted backward. Thus, the read and write process can be executed even if the backward insertion occurs. That is, the proper insertion need not be carried out again.

Embodiment 54

There follows a description of a configuration, which reduces access time and improves reliability, mounting plural heads on the single circumference. Conventionally, in case that the recording area on the card is limited, the above mentioned case has not been taken account of.

In the present embodiment, there is shown a case of the magnetic card and the magnetic head. However, it is applicable to the case of the optical card and the optical head.

Figure 81A:
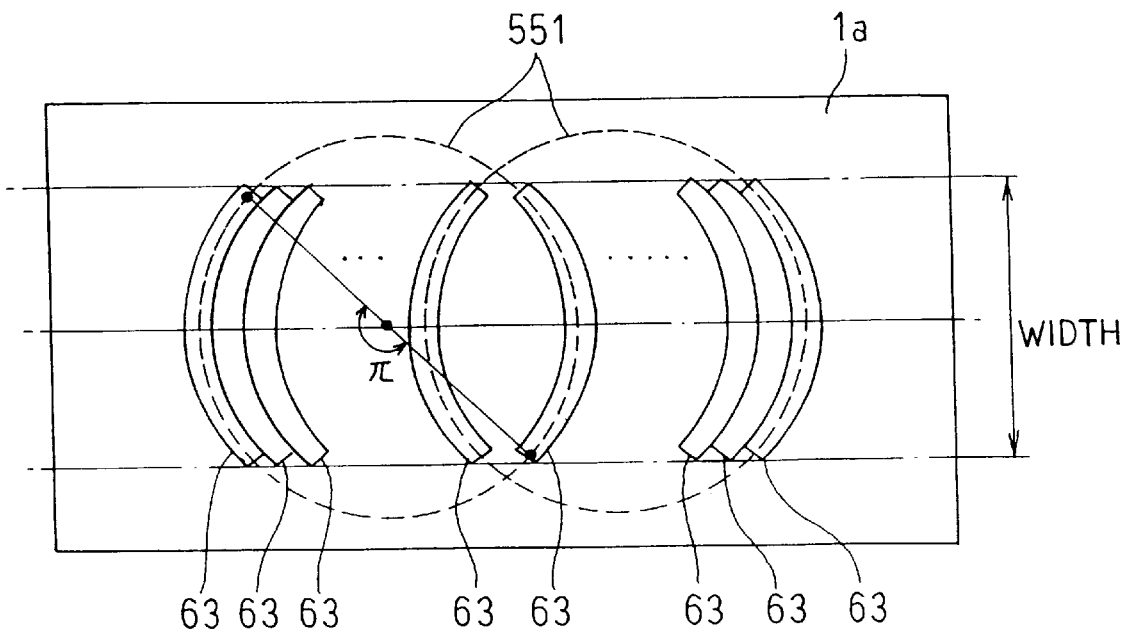
FIG. 81A shows an arrangement of the recording track on the magnetic head.
Figure 81B:
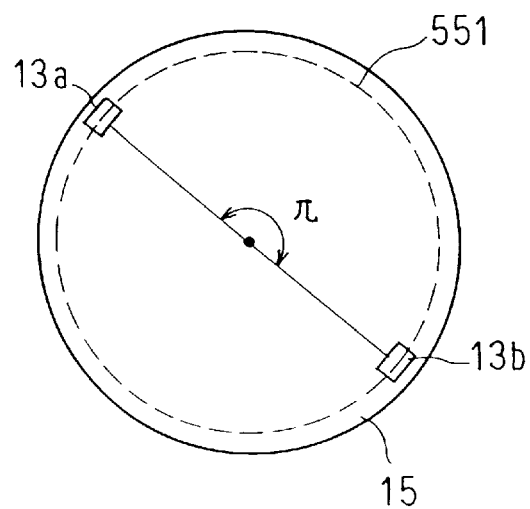
FIG. 81B shows an arrangement of the magnetic head on the turn table.

FIG. 81A shows an arrangement of the recording tracks 63 on the magnetic card 1*a*. FIG. 81B shows an arrangement of the magnetic heads 13*a* and 13*b* on the turntable 15. Doted lines show loci 551 of the magnetic heads 13*a* and 13*b*.

In FIGS. 81A and 81B, in case of arranging the recording tracks 63 in a shape of the arc on the magnetic card 1*a*, two recording tracks 63 are arranged symmetrically on the locus 551 of the magnetic heads 13*a* and 13*b*. In order to correspond to two recording tracks 63, the magnetic heads 13*a* and 13*b* are also arranged symmetrically. Herein, when the recording electric current of the same wave form is simultaneously applied to the magnetic heads 13*a* and 13*b*, the same data can be recorded on the two recording tracks 63 on the locus 551.

Herein, by thus recording, all the recording data on the magnetic card 1a are recorded at two tracks. Therefore, even though the readout from one track is failed, the data recorded at another track can be read out. Accordingly, the reliability of the magnetic card improves. Further, since data is recorded on two recording tracks 63 simultaneously in case of recording data, the time for responding at the time of recording will not increase. Since two recording tracks 63 are recorded in one recording electric current wave form, the operation at the time of recording can be simplified.

Embodiment 55

In the above embodiment, two heads encountered each other by the angle of 180 degree. That is, there was shown a case of reading and writing symmetrically to the center of the circle. In the present embodiment, there is shown a case that this angle is assumed to be below 90 degrees, for example.

In Embodiment 55, the magnetic cards and the magnetic heads can be used. However, it is applicable to the case of the optical card and the optical head.

Figure 82A:
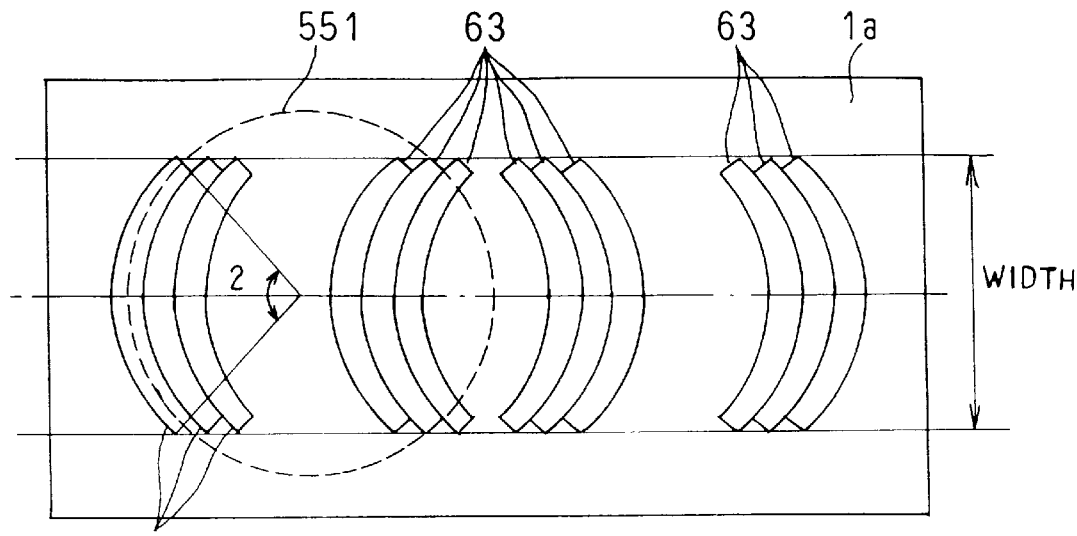
FIG. 82A shows an arrangement of the recording track on the magnetic card.
Figure 82B:
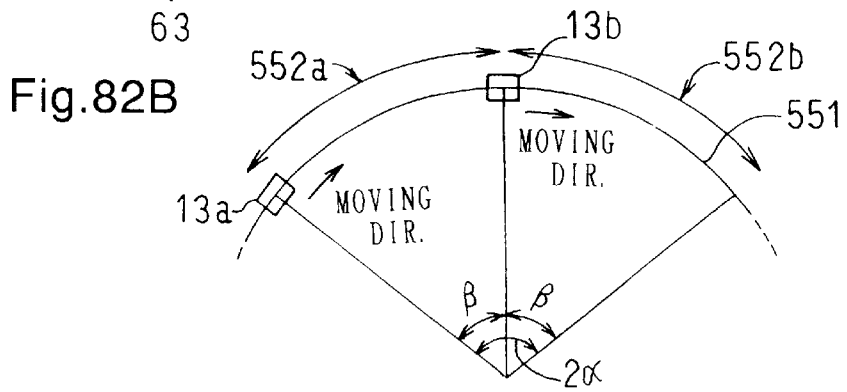
FIGS. 82B and 82C show arrangements of the magnetic head on the turn table.
Figure 82C:
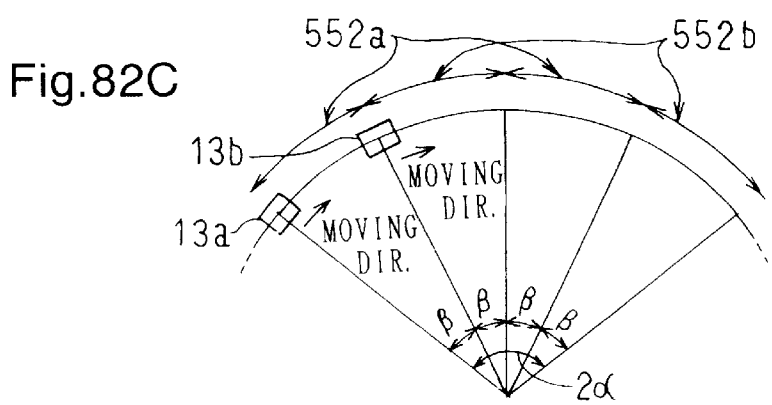
Figure 82D:
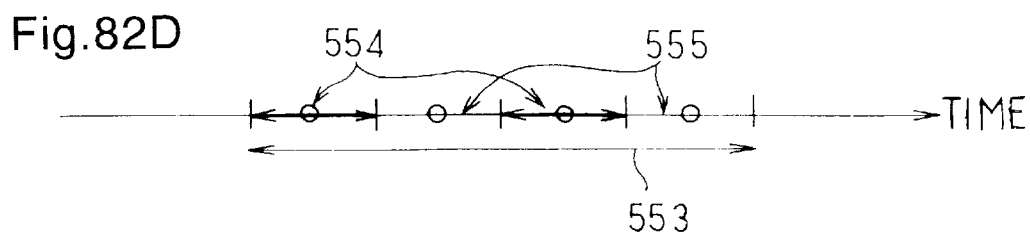
FIG. 82D shows an explanatory view of a period for the magnetic head recording.
Figure 83:
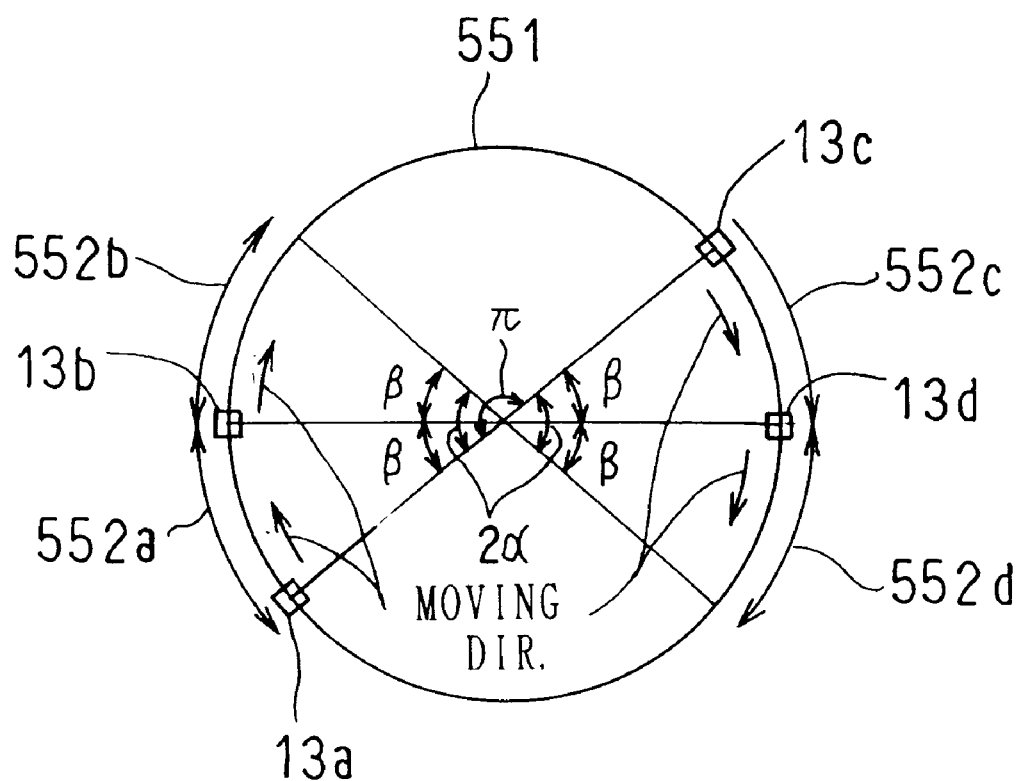
FIG. 83 shows an arrangement of the recording track on the magnetic card and the magnetic head on the turntable.

FIG. 82A shows an arrangement of the recording tracks 63 on the magnetic card 1a. FIGS. 82B and 82C show an arrangement of the magnetic heads 13a and 13b on the turntable 15 not shown in the figure. FIG. 82D shows a time chart when the magnetic heads 13a and 13b record data. In the figure, the loci 551 of the magnetic heads 13a and 13b, a recording area 552a of the magnetic head 13a, and a recording area 552b of the magnetic head 13b are shown. Period 553 shows a time in which the magnetic head 13a moves on the recording track 63. Period 554 shows a recording time in which the magnetic heads 13a and 13b record data. Period 555 is a time in which the magnetic heads 13a and 13b moves without recording. $2\alpha$ is a center angle of the recording track 63. $\beta$ is a center angle between the magnetic heads 13a and 13b. FIG. 83 shows an arrangement of the magnetic heads 13a, 13b, 13c, and 13d on the turntable 15 in case that the recording track 63 is arranged as in Embodiment 54. The magnetic head 13c records data in the recording area 552c, and the magnetic head 13d records data in the recording area 552d.

In FIG. 82A, two recording tracks 63 are not arranged on one locus 551 of the magnetic heads 13a and 13b in case of arranging the recording tracks 63 in the shape of the arc. Under such arrangement, data cannot be recorded simultaneously in two recording tracks 63 with the arrangement of the magnetic heads 13a and 13b as in Embodiment 54. Therefore, as shown in FIGS. 82B and 82C. the magnetic heads 13a and 13b are arranged. In the figure, $2\alpha$ is a center angle of the recording track 63. The center angle of the magnetic heads 13a and 13b is assumed to be $\beta$. Herein, $\beta$ is determined so as to get the expression of $2\alpha=(\beta\cdot 2)\cdot k$. Herein, k is an integer. FIG. 82B shows an arrangement when k=1. FIG. 82C shows an arrangement when k=2. A moving direction of the magnetic heads 13a and 13b used for the explanation is shown in the figure by arrows. FIG. 82D shows a time for recording data in case of arrangement when k=2.

In the arrangement of FIG. 82B in case that k=1, the recording is started when the magnetic head 13a reaches to the beginning of the recording track 63. At this time, the magnetic head 13b is situated in the middle of the recording track 63. It is possible to record until the magnetic head 13a reaches to the middle of the recording track 63. When the magnetic head 13a reaches to the middle of the recording track 63, the magnetic head 13b reaches to the end of the recording track 63. As shown in FIG. 82B, the former part of the recording track is the recording area 552a of the magnetic head 13a and the latter part is the recording area 552b of the magnetic head 13b.

In the arrangement of FIG. 82C in case that k=2, the recording area 552a of the magnetic head 13a is divided into two parts. When the magnetic head reaches to the beginning of the recording track 63, the magnetic head 13b reaches to the point of one fourth of the recording track 63. The recording is started from this point and stops when the magnetic head 13a reaches to the point of one fourth of the recording track 63. Next, when the magnetic head 13a reaches in the middle of the recording track 63, the recording is started. Then, the recording ends when the magnetic head 13a reaches to the point of three fourth of the recording track 63. Herein, the magnetic head 13b records from the point of three fourth of the recording track 63 to the end of the recording track 63. FIG. 82D shows this operation on the time axis. Period 553 shows the time during which the magnetic head 13a moves on the recording track 63. The period 553 is divided equally into the four periods. Data is recorded during the two divided periods 554. Data is not recorded during the two divided periods 555.

Furthermore, it is apparent that the above mentioned system can be adopted in the magnetic card or the optical card which has the arrangement of the recording track 63 of the system provided in Embodiment 54. In this case, the same number of magnetic heads are arranged for each of the two recording tracks 63. The corresponded magnetic heads for recording in the two recording tracks 63 should then be arranged in the position symmetrical to the center of the rotation. In FIG. 83, there is shown a case that two magnetic heads are arranged in each recording track 63. The magnetic heads 13a and 13b are arranged in one recording track 63 and the magnetic heads 13c and 13d are arranged in the other recording track 63. The magnetic head 13c is arranged in the position symmetrical to the magnetic head 13a. Further, the magnetic head 13d is arranged in the position symmetrical to the magnetic head 13b. The recording is started since the magnetic heads 13a and 13c reach to the beginning of the recording track 63. The recording then ends when the magnetic heads 13b and 13d reach to the end of the recording track 63. Thus, it is possible to record the same data simultaneously in each of the four recording area dividing two recording tracks 63 equally into four.

Thus, it has an advantage of reducing the access time for reading and writing.

It is apparent that the above mentioned system can be adopted in case that more than three magnetic heads are used. In order to arrange N number of magnetic heads, the expression $2\alpha=(\beta\cdot N)\cdot k$ should be got. Herein, k is an integer.

Embodiment 56

There follows an explanation of a cleaning card for cleaning the magnetic head in the magnetic card reader. In Embodiment 39, an explanation is made for the conventional cleaning tape or the cleaning sheet. Since the magnetic recording medium is protected by the cassette in the conventional apparatus, the spot or dust of the magnetic head is mainly an adhesive mist collection in the recording medium. Therefore, the head cleaner of these apparatus can easily specify the contamination which adheres to the magnetic head. Cleaning of the head is carried out by using the corresponding one type of abrasive. Herein, it is desirable to use the abrasive whose particle size is very small. Further, it is desirable to use the one for finishing the magnetic head making. However, the concept of these tapes or sheets cannot be used for the magnetic card without hesitation. There are some problems to be solved as described in Embodiment 39. In the present embodiment, an explanation is made for the new cleaning card corresponding to the magnetic card in the present invention.

There follows an explanation of the head cleaning card of the present invention, more specifically, the configuration of the cleaning portion of the magnetic head.

Figure 84A:
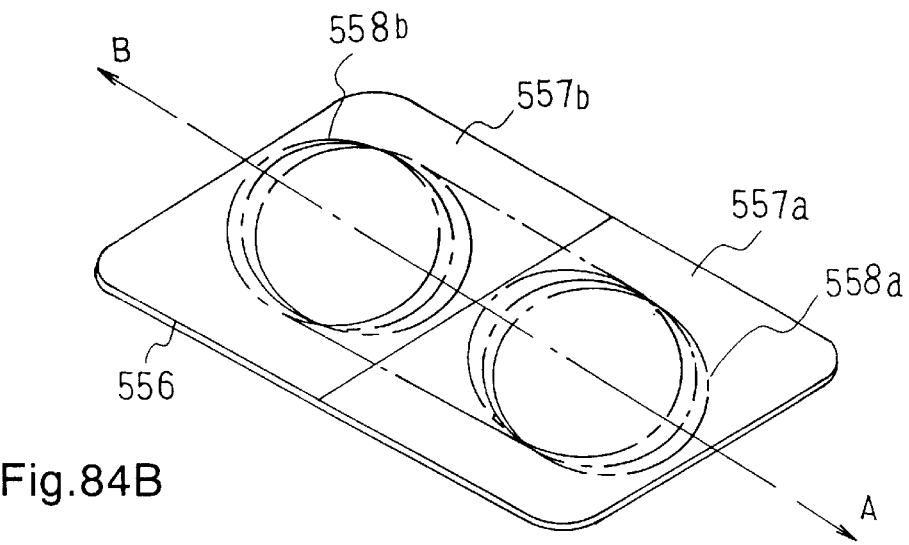
FIGS. 84A–84C show embodiments of the head cleaning card.

FIG. 84A shows a view of one embodiment of the head cleaning card. A base film 556 is composed of such as a polyethylene terephtalate (PET). The outside form, such as the width, the length, and the thickness almost equal to that of the card reader. Abrasives 557*a* and 557*b* are varnished on this base film 556. The abrasive 557*a* whose particle size is under 1 micron is for finishing with a high precision. The abrasive 557*b* whose particle size is above 1 micron is for finishing with a middle precision. The materials of these abrasive are alumina, oxidation chrome, oxidation cerium, silicon carbide, silicon boron, boron nitride, oxidation iron, diamond and other mixtures. For an abrasive, adhesive materials are mixed so as to varnish these particles on the sheet without being removed.

The operation will now be described. The head cleaning card is inserted to the card reader in the direction of the arrow A. In FIG. 84A, a locus 558*a* is for the magnetic head (not shown in the figure) after the head cleaning card is inserted. A locus 558*b* is for the magnetic head when the head cleaning card is carried or positioned to rear end in the card reader.

After the head cleaning card is inserted, the order of polishing would be reversed by contacting the abrasive 557*a* first whose particle size is small, then the abrasive 557*b* second whose particle size is large. To prevent the reverse order, the card moves at a high speed so that the magnetic head reaches to the locus 558*b* which is starting point of cleaning. When the card moves to position the magnetic head at the locus 558*b*, the magnetic head does not need to rotate actually. After positioning to the locus 558*b*, the magnetic head starts the rotation and the head cleaning card moves in the direction of arrow B for cleaning operation from the locus 558*b* to the locus 558*a* orderly. Here, the card removes the contamination which is adhered to the magnetic head by a rubbing contact.

In the present embodiment, when the magnetic head contacts rubbing to the abrasive 557*b*, there is an effect of removing the contamination having a relatively large volume such as a fixed oils and fats like fingerprints. Further, there is an effect of finishing and removing the adhesive materials according to a mechanomical reaction from the magnetic card and so forth in case that the abrasive 557*a* contacts for rubbing. Thus, there is an advantage of preventing the abrasive 557*a* from being choked and actuating the effective cleaning of the magnetic head.

Embodiment 57

Figure 84B:
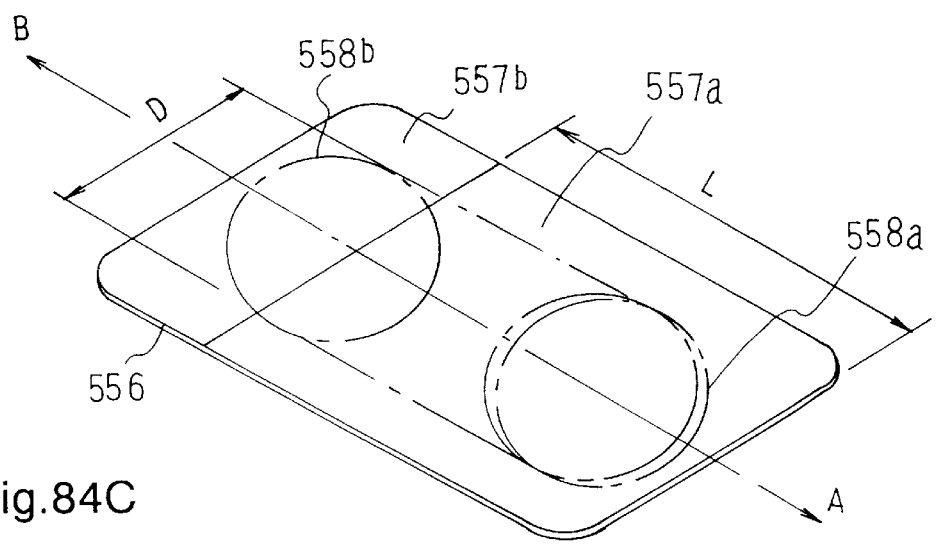

There is shown another example of the cleaning card. In FIG. 84B, the length L of the abrasive 557*a* is set to be larger than a diameter D of the locus 558*a* or 558*b* of the magnetic head. At the stage of finishing with the abrasive 557*a*, there is an advantage of avoiding damage on the surface of the magnetic head with the abrasive 557*b*. Further, in the abrasive 557*b*, since its particle size is large, the magnetic head is easy to be cracked. When the relative speed of the head cleaning card is finite and the length L of the abrasive 557*a* is extended, it is possible to control the time for polishing with abrasive 557*b* and to gain the proper head cleaning effect.

Embodiment 58

Figure 84C:
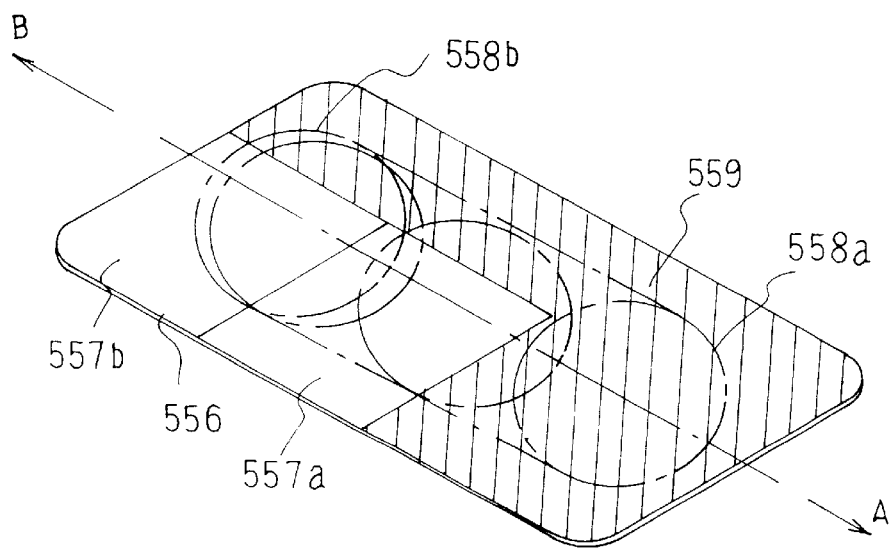

FIG. 84C shows further another embodiment. In this embodiment, a nonwoven fabric 559 in almost L shape is arranged on the cleaning card provided in Embodiment 56 or 57. The nonwoven fabric 559 has an effect of catching the contamination and particles caused in case of removing the contamination by using abrasive 557*a* and 557*b*. Further, an ultimate effect of finishing can be attained on the locus 558*a* of the magnetic head. Further, in the preceding embodiments, the dry abrasive is shown. However, it is applicable to the case of the wet abrasive by wetting the nonwoven fabric with such as water. Further, the better cleaning effect can be attained by wetting the nonwoven fabric with an organic solvent, such as alcohols, benzine, acetone and so forth.

Embodiment 59

There is shown a case of the cleaning card when the card driving roller of the card feeding mechanism is applied. FIG. 85A is a drawing of one of embodiment. In FIG. 85A, a contacting part 560 is installed for the cleaning card in the configuration of Embodiments 56 to 58 to contact the driving roller. The contacting part 560 is installed in the direction of the longer part of the head cleaning card at a fixed distance. The distance is composed so as to be wider than the diameter D of the locus 558*b* of the magnetic head. The thickness is configurated so as to get higher in a few 10 to 100 microns than the surface composed of the abrasive 557*a*, 557*b* and the nonwoven fabric 559. The material of the contacting part 560 is synthetic rubber such as neo-plain rubber or polymeric resin such as urethane.

Figure 86A:
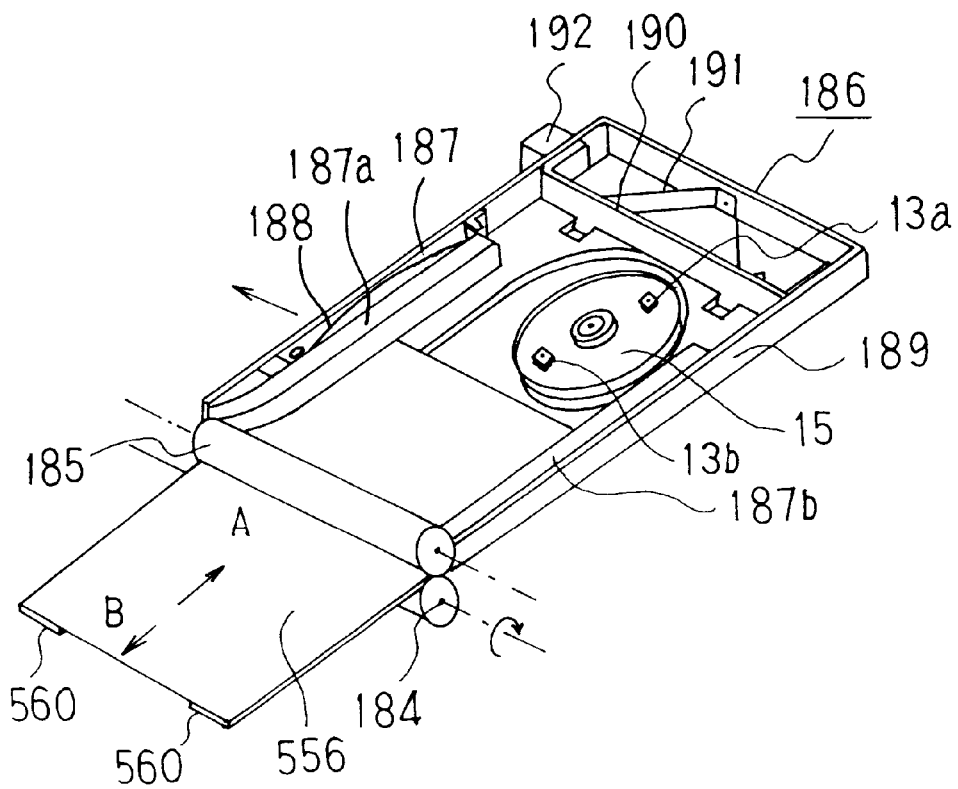
FIGS. 86A and 86B show views of feeding the head cleaning card.
Figure 86B:
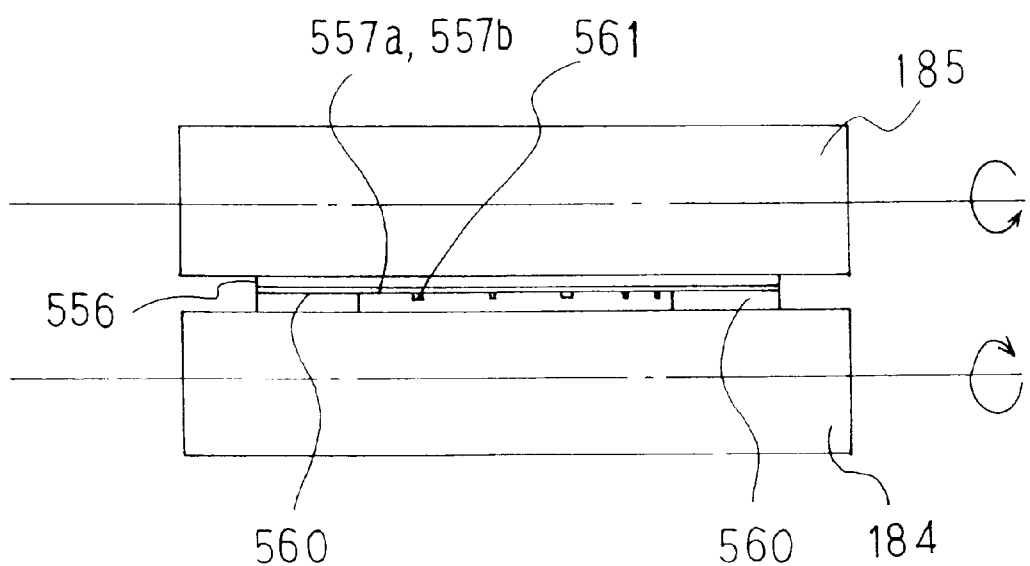

FIGS. 86A and 86B are the view for explaining the operation of the present embodiment. FIG. 86A shows an example of the card feeding mechanism of the card reader. When the head cleaning card is inserted to the card reader, the head cleaning card is held by the driving roller 184 and the guide roller 185. The head cleaning card is fed in the direction of arrow A and B with the turn of the driving roller 184. The contacting part 560 installed at the head cleaning card contacts with the driving roller 184.

The operation will now be described. FIG. 86B shows an elevational view in case that the head cleaning card is held by the driving roller 184 and the guide roller 185. In FIG. 86B, black spots shows dust and polishing powder 561 which is produced during the cleaning of the magnetic head. As shown in the figure, since the thickness of the contacting part 560 is thick, the abrasives 557*a*, 557*b*, the dust and the polishing powder 561 produced during the head cleaning do not touch the driving roller 184. Therefore, the abrasive 557*a* and 557*b* do not rub the driving roller 184 and the surface of the driving roller 184 is not damaged. Accordingly, this method will substantially reduce a danger of changing the friction coefficient of the driving roller 184 largely from the original design value and worsening the feeding precision sharply when the magnetic card operated after the cleaning. In addition, it will prevent the dust and the polishing powder 561 from adhering on the driving roller 184 and transcribing on the magnetic card again. Furthermore, since a part of the abrasive 557*a* and 557*b* which contact with the magnetic head is configurated as a concave by the contacting part 560, it is possible to lessen chances for contacting with contamination on a daily life when the head cleaning card is kept or transmitted outside of the card reader.

Embodiment 60

FIG. 85B shows another embodiment of the cleaning card. The contacting part 560 is configured in U shape. As the material of the contacting part, nonwoven fabric is used. The width and thickness of a notch of the contacting part 560 are set almost equivalent to these in Embodiment 59. Herein, the cleaning card can remove the dust or mists adhered on the driving roller 184 since the contacting part 560 contact the surface of the driving roller 184.

Embodiment 61

In FIG. 85C, there is shown another embodiment of the cleaning card. In the figure, the contacting part 560 is configured in the frame shape which has a small square room inside. The same effects as described in the preceding embodiments can be achieved.

The cleaning card provided in each of the above mentioned embodiments has an effect of avoiding the inferiority of the read/write ability of recording data according to the contamination because it is possible to remove the contamination on a daily life adhering on the magnetic head such as dust or mists in the air, finger prints, oil, and so on. Further, the cleaning card according to the present invention has an effect of preventing the life cycle of the magnetic head from being reduced by polishing the magnetic head unnecessarily.

Embodiment 62

In this embodiment, another feeding mechanism which alters the feeding mechanism 186 having the driving roller 184 and the guide roller 185 stated in Embodiment 20, will be described.

In the card reader 160 of FIG. 24, since the distance between the front panel 169 and the driving roller 184 is long, so the depth of the card reader 160 is long. A coil spring for pressing the guide roller 185 onto the driving roller 184 is installed. Space for this coil is needed.

Mechanism in this embodiment is for downsizing the apparatus, making the action of the insertion of the card into the card reader smooth and giving enough pressure for feeding the card to the feeding mechanism.

Figure 87:
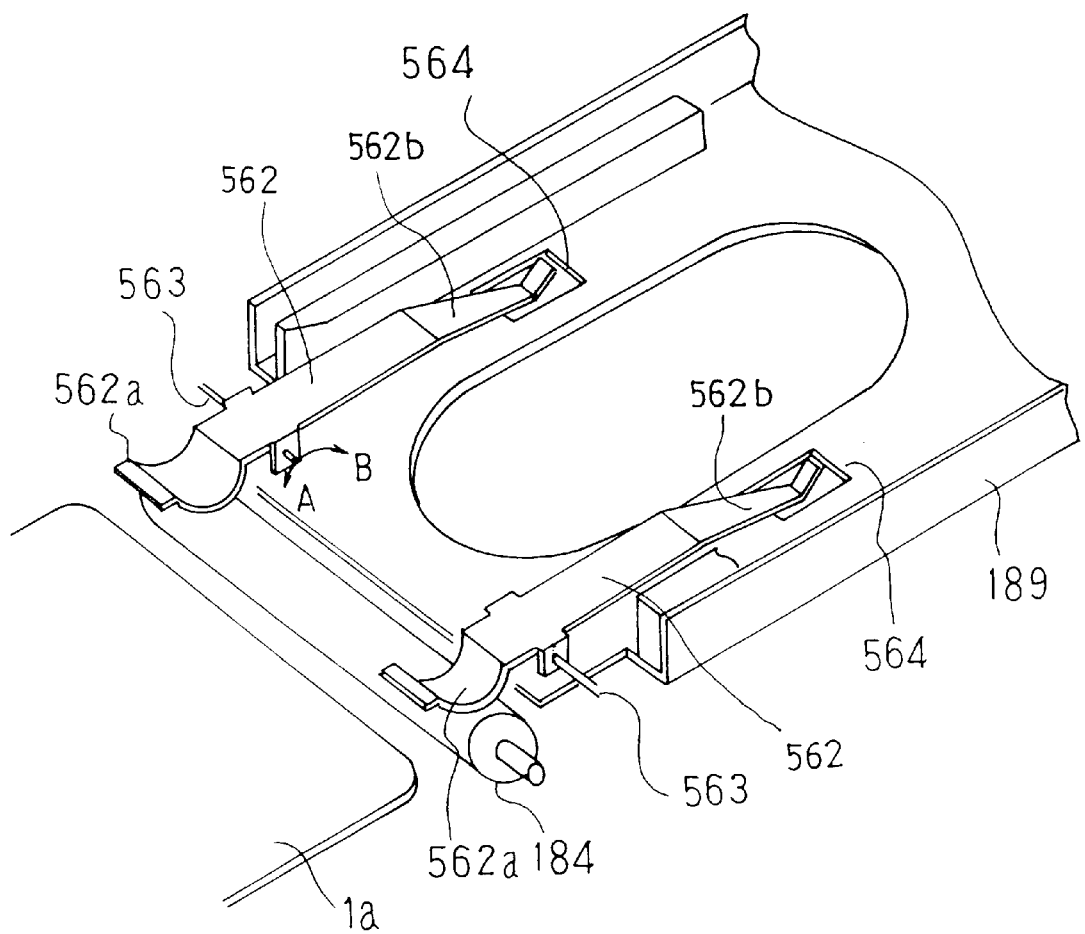
FIG. 87 shows a perspective view of a card feeding mechanism of the present invention.
Figure 88A:
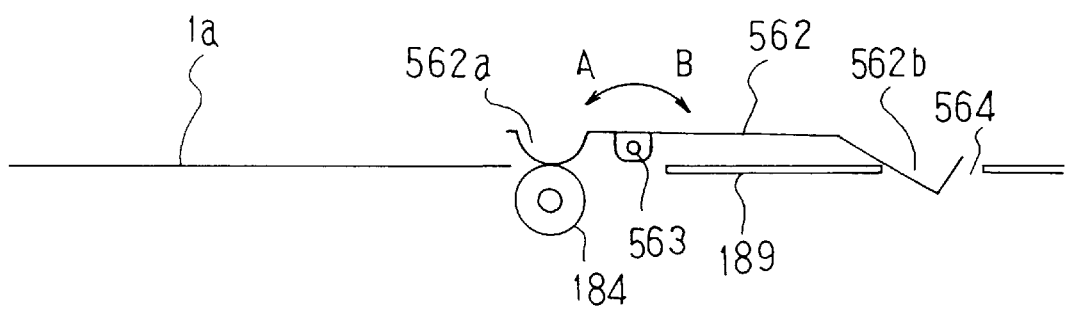
FIGS. 88A–88C show sections of a moving card feeding mechanism of the present invention.
Figure 88B:
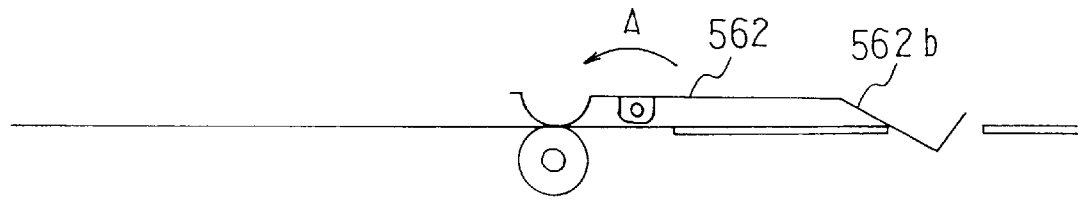
Figure 88C:
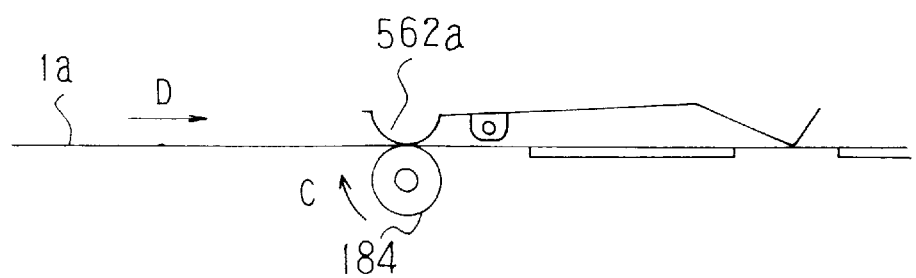

FIG. 87 shows a perspective view of another card feeding mechanism of the present invention. FIGS. 88A, 88B and 88C show partial sectional views of it.

In FIG. 87 and FIGS. 88A to 88C, pressure springs 562 are installed at the both sides of the insertion part. The pressure springs 562 can be turned in the direction of arrow A or arrow B by a pin 563 fixed to the carriage base 189. Front edges 562a of the pressure springs 562 are curved and they are against the driving roller 184. Back edges 562b at the opposite side of the pressure springs 562 are curved into holes 564 of the carriage base 189. Usually, the pressure springs 562 are turned in the direction of arrow B as shown in FIG. 88A by the weight balance and the back edges 562b contact the holes 564. In this case, the front edges 562a do not contact the driving roller 184 or contact only a little.

When the magnetic card 1a is inserted and the edge of the magnetic card 1a contacts the back edges 562b of the pressure springs 562, the pressure springs 562 turn in the direction of arrow A as shown in FIG. 88B. When the magnetic card 1a is inserted deeply as shown in FIG. 88C, the front edges 562a are pushed towards the driving roller 184 strongly and then a friction is generated. The magnetic card 1a can be fed into the apparatus without slipping from the driving roller 184 because of this friction. If a sensor (not shown) detects that the magnetic card 1a is enough inserted, the driving roller 184 starts rotating in the direction of arrow C and the magnetic card 1a is moved towards arrow D, that is inside of the apparatus. In this way, the apparatus can be downsized and the card can be fed smoothly without being pushed too much.

Embodiment 63

Figure 89A:
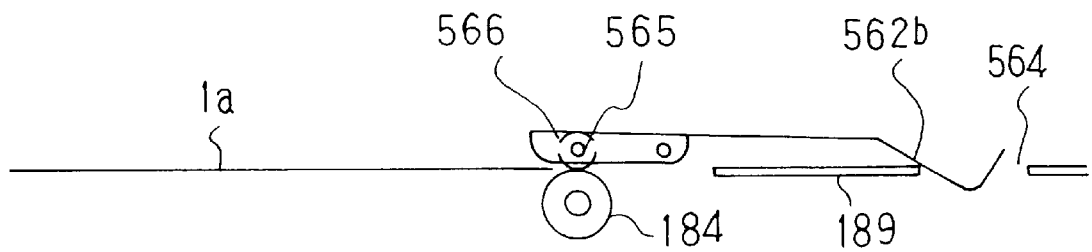
FIGS. 89A–89C show sections of a moving card feeding mechanism of another embodiment of the present invention.
Figure 89B:
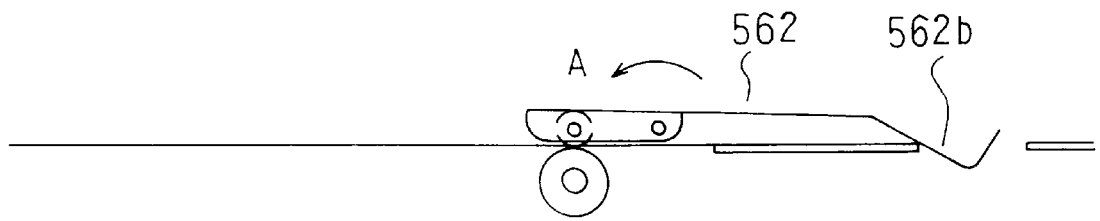
Figure 89C:
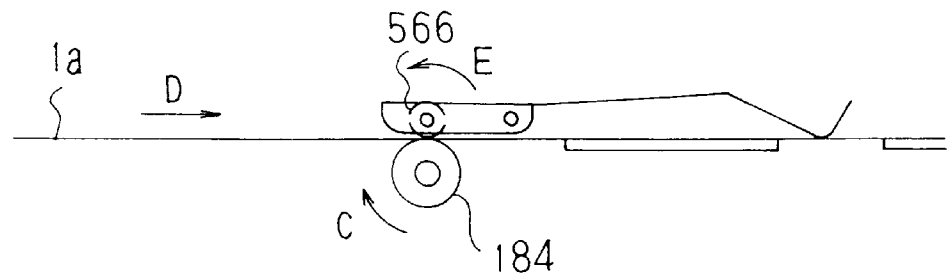

FIGS. 89A to 89C show sections of another embodiment of the feeding mechanism.

Although the front edges 562a of the pressure springs 562 are curved in FIG. 87, the front edges of the pressure springs 562 are bent towards downside in this embodiment. A pin 565 supports a pressure roller 566 to rotate toward both directions. Other structures are the same as those in FIG. 87. Usually, the pressure roller 566 does not contact the driving roller 184 or contacts only a little. When the magnetic card 1a is inserted and the edge of the card contacts the back edges 562b of the pressure spring 562, the pressure spring 562 rotates in the direction of arrow A as shown in FIG. 89B. When the magnetic card 1a is inserted deeply as shown in FIG. 89C, the pressure roller 566 is pushed towards the driving roller 184 strongly and then a friction is generated. The magnetic card 1a can be fed into the apparatus without slipping from the driving roller 184 because of this friction. If a card sensor (not shown) detects that the magnetic card 1a is enough inserted, the driving roller 184 starts rotating in the direction of arrow C and the magnetic card 1a is moved towards arrow D, that is inside of the apparatus. The pressure roller 566 rotates in the direction of arrow E.

Since the pressure roller 566 rotates at the same time of the feeding the magnetic card 1a in this embodiment, load for feeding the magnetic card 1a can be lessened. Accordingly, power for driving motor can be small and the magnetic card 1a does not get damage, which is an effect of the present invention. Since the pressure roller 566 rotates when the magnetic card 1a is inserted, only small power is needed for insertion, which brings another effect that the operation can be smoothly.

It is also acceptable to install a roller like the pressure roller 566 at the back edge 562b of the pressure spring 562. By installing the above roller, load of movement of the magnetic card 1a can be further lessened and a possibility of the magnetic card 1a getting damage can be further lessened, which is another effect of the present invention.

Embodiment 64

When the distance between the pin 563 which is the center of the rotation and the front edge 562a, or the distance between the pin 563 and the pressure roller 566 is shorter than the distance between the pin 563 and the back edge 562b, power caused by the magnetic card 1a for lifting the back edge 562b is multiplied. Then the multiplied power is conveyed to the front edge 562a or the pressure roller 566. Namely, there is an effect that a large power for feeding the magnetic card can be obtained.

Embodiment 65

Figure 90:
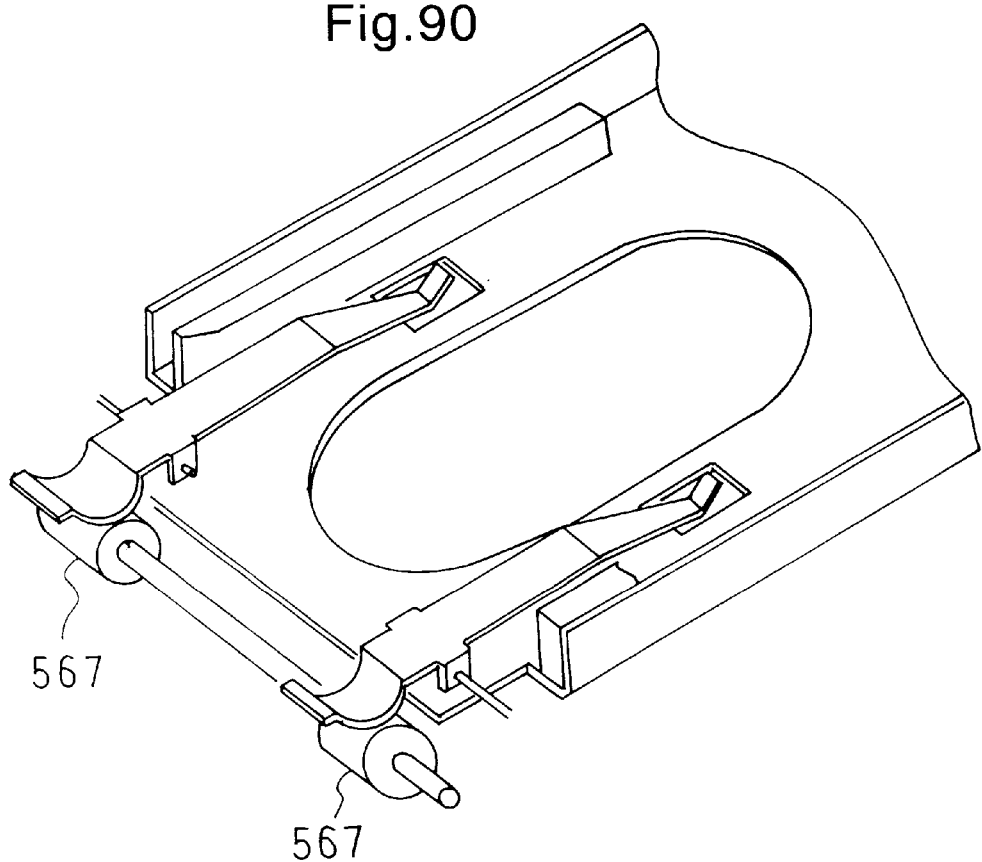
FIG. 90 shows a perspective view of the card feeding mechanism of another embodiment of the present invention.

Although the driving roller 184 contacts the card from the side to side in FIG. 87, it is also acceptable for a driving roller 567 to contact only the both edges of the card as shown in FIG. 90.

Figure 91:
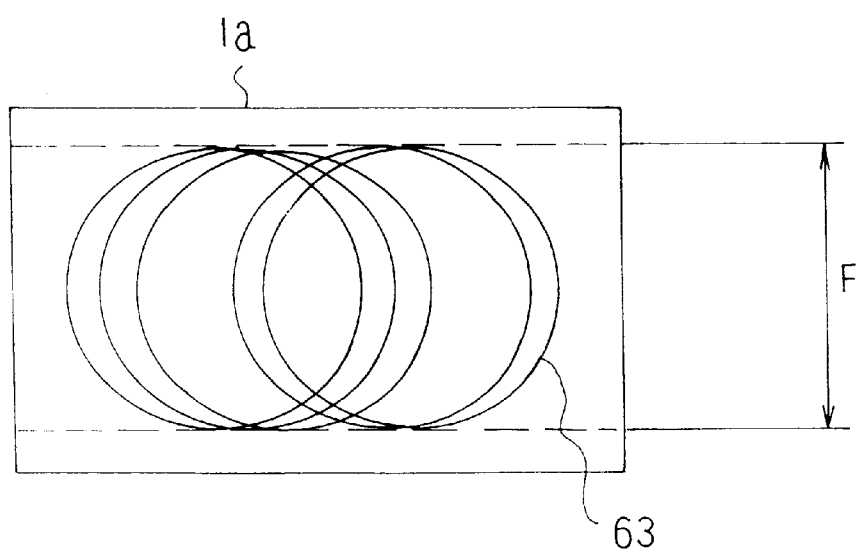
FIG. 91 shows a recording track pattern of the present invention.

The recording track 63 on the magnetic card of the present invention is shown in FIG. 91. Since the driving roller 567 and the magnetic card 1a contact each other only at the out of a range F, it is possible to prevent the dust and stain which would be conveyed by the magnetic card from the driving roller 567 to the magnetic head. It is also possible to protect the recording track 63 by the driving roller 567 from getting damage or stain, which means that data can be protected.

Regarding material of the driving roller 567, it is acceptable to use a material which gives a slight convex and concave to the surface of the magnetic card as well as not slippery material, such as rubber. For example, metal material whose surface is sprayed with ceramic, metal material whose surface has a slight concave and convex made by etching or form rolling, metal material whose surface has very fine needles and metal material whose surface has a sawtooth waveform are acceptable.

Embodiment 66

Other embodiments of the card support mechanism which has the card positioning mechanism where less parts are used, and which has a high accuracy in positioning the card, will now be explained.

When a card stores a large amount of data, its data recording density is very high. In order to perform a random access to the above card, it is important to keep the same condition in a relative positional relation between the card and the head. In the feeding mechanism of FIG. 27 stated the above, the following method was used to keep the same condition in the positional relation. The card 161 is received by the card end guide 190 on the carriage base 189 and fixed by the pad frame 208. Then, the optical sensor 258 detects a positioning error of the card by using the positioning mark 260 on the card 161 and corrects the positioning error. In this method, it is needed to use the stepping motor 221, to perform a servo control for positioning the card. The stepping motor of expensive and great precision should be used in this method. Besides, hardware amount used in this method is large.

In the card reader of this embodiment, the card is moved with being caught between the carriage base and the card holder which faces the carriage base. The carriage base is restricted to move only in specific directions by the guide mechanism.

More than two holes for positioning the card are on the card. There are pins at the place corresponding to the holes on the carriage base. The card is fed with the pins put into the holes. The accurate positional relation between the card and the carriage base can be kept by the above method. To insert the positioning pins into the card, the card holder is moved with the movement of the carriage base towards the carriage base. With this movement of the carriage base and the card holder, the card caught between the carriage base and the card holder is also moved towards the carriage base. Further, the positioning pins can move upward and downward with respect to the carriage base.

Figure 92:
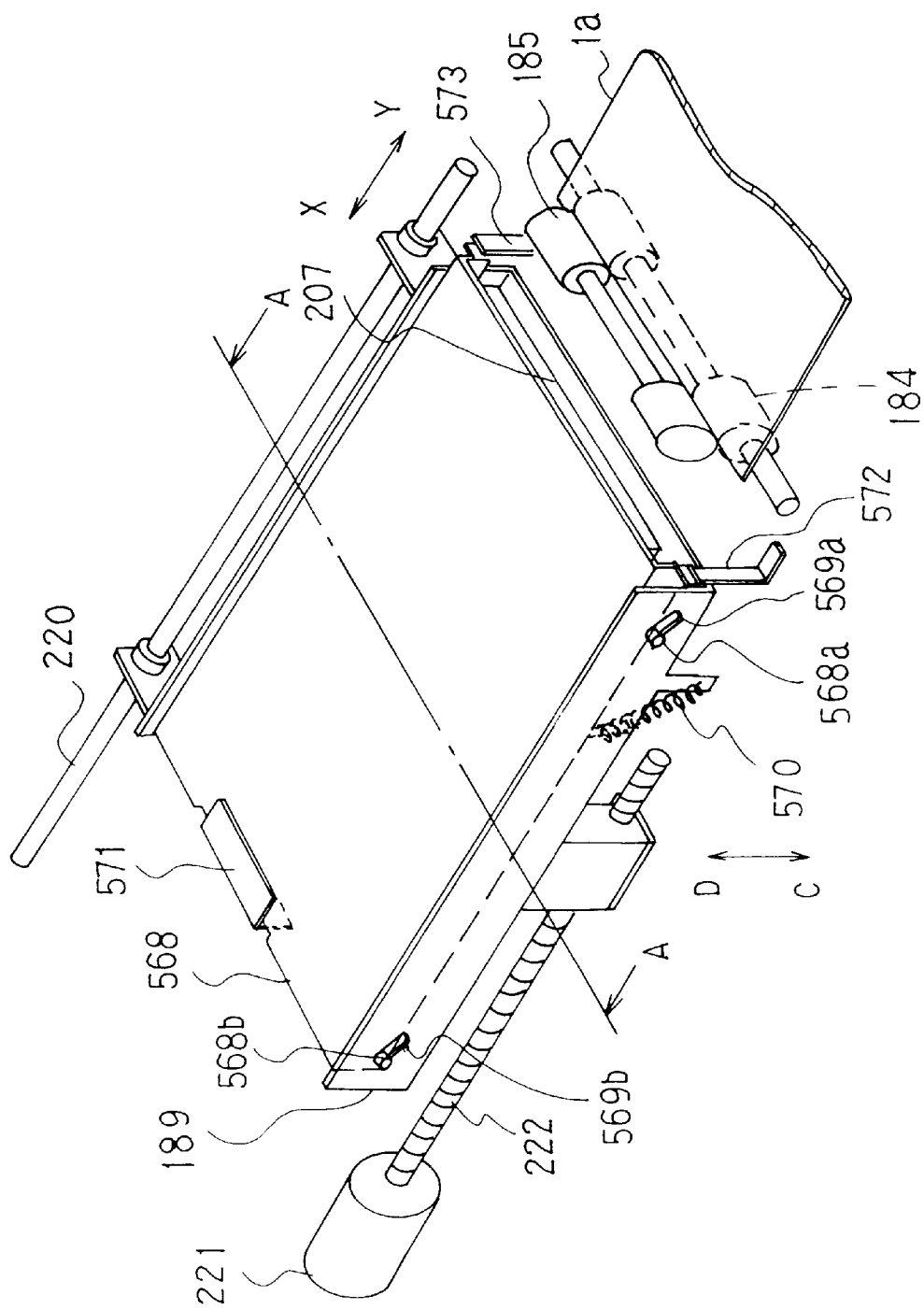
FIG. 92 shows a perspective view of the card feeding mechanism of another embodiment of the present invention.
Figure 93A:
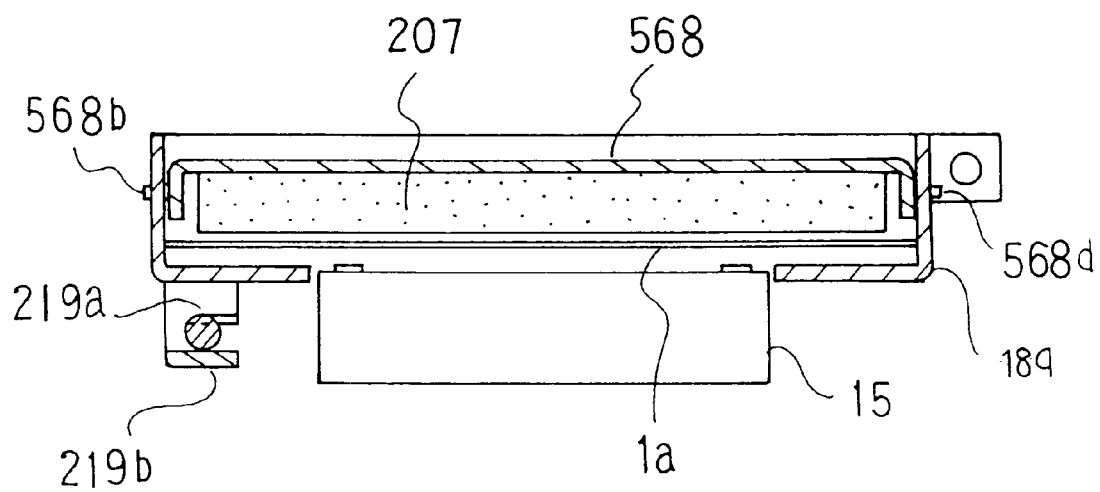
FIG. 93A shows a sectional view at the line A—A of FIG. 92 and shows a condition that the card can be inserted and extracted.
Figure 93B:
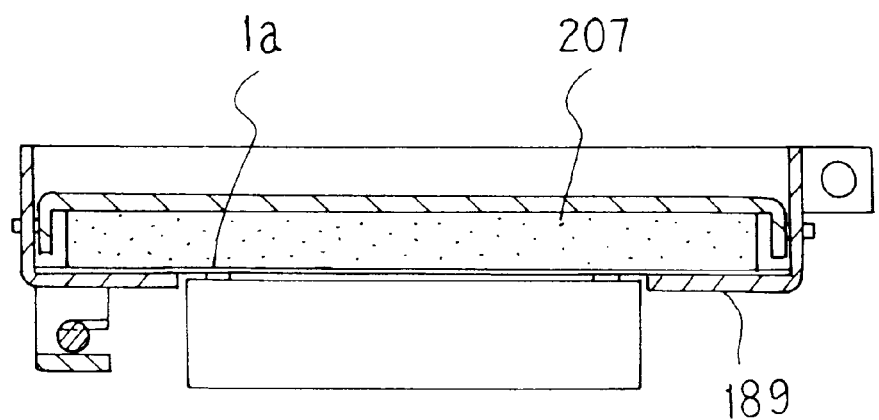
FIG. 93B shows a sectional view at the line A—A of FIG. 92 and shows a condition that the card is applied on the carriage base.
Figure 94:
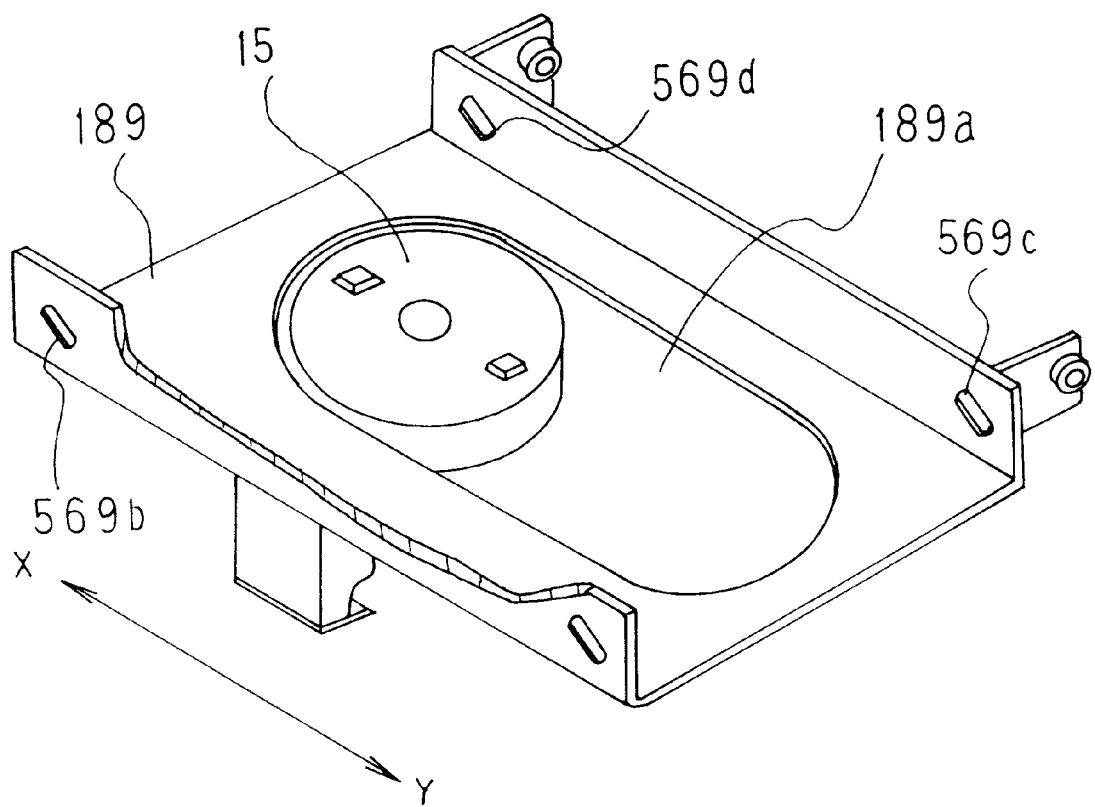
FIG. 94 shows a perspective view of the carriage base shown in FIG. 92.

FIG. 92 shows a perspective view of the card holder of the card reader of this embodiment. FIGS. 93A and 93B show a section of the card holder seen at a line A—A in FIG. 92. FIG. 94 shows a perspective view of the carriage base 189 stated later.

The magnetic card 1*a*, the driving roller 184 for feeding the card 1*a*, the guide roller 185 placed against the driving roller 184, the carriage base 189 having a guide rod 220 at the side and moving in the direction of X-Y, the stepping motor 221 and the lead screw 222 which is combined with the shaft of the stepping motor 221 are shown in FIG. 92.

The needle 219*a* and the pre-load spring leaf 219*b* are installed at the edge of the carriage base 189 as shown in FIG. 93A. The lead screw 222 is connected with the needle 219*a*. The pre-load spring leaf 219*b* gives pressure to the connection of the lead screw 222 and the needle 219*a* in order not to come off each other. Four pins 568*a*, 568*b*, 568*c* and 568*d* are installed on a card holder 568 and they connected with grooved cams 569*a*, 569*b*, 569*c* and 569*d* (The pin 568*c* is not shown in FIGS. 92 to FIG. 94). One edge of an extension spring 570 is fixed to the side of the carriage base 189 and the other edge of the extension spring 570 is fixed to the side of the card holder 568. The extension spring 570 generates a downward pressure of the pins 568*a* to 568*d* moving downward within the grooved cams 569*a* to 569*d*. A card bias spring 571 is fixed to the end of the card holder 568 and generates a pressure in the direction of Y. Stoppers 572 and 573 are fixed to the apparatus base 21 (not shown). When the card holder 568 which has a role of pad moves in the direction of Y, the card holder 568 touches the stoppers 572 and 573, then the movement toward Y is obstructed. The pressure pad 207 is fixed to the card holder 568. As shown in FIG. 94, there is the access opening 189*a* on the carriage base 189. The access opening 189*a* is provided for the carriage base 189 not to interfere the turntable 15 when the carriage base 189 moves in the direction of X-Y.

Now operation of the card holding mechanism of the card reader of this embodiment will be described.

FIG. 93A shows a sectional view at the line A—A of FIG. 92 and shows a condition that the magnetic card 1*a* can be inserted and extracted. When the magnetic card 1*a* is inserted to a feeding path between the driving roller 184 and the guide roller 185, a card sensor A (not shown) detects the magnetic card 1*a*. Then, the driving roller 184 starts rotating and the magnetic card 1*a* is sent to a feeding path between the carriage base 189 and the pressure pad 207. Then, the card bias spring 571 contacts the magnetic card 1*a* and the magnetic card 1*a* is pressed in the direction of Y. Since feeding power generated by the driving roller 184 is larger than this pressure, the magnetic card 1*a* is never pushed back beyond the driving roller 184 in the direction of Y. That is the magnetic card 1*a* is never pushed back to the front of the apparatus. When a card sensor B (not shown) detects that the magnetic card 1*a* has been moved into the card holder 568 perfectly, the stepping motor rotates to move the carriage base 189 in the direction of X. Then, since the card holder 568 is moved in the direction of C, that is downward, by effects of the grooved cams 569*a* to 569*d* and the pins 568*a* to 568*d*, the card 1*a* is caught between the pressure pad 207 and the carriage base 189. When the card holder 568 comes down, the card holder 568 is not moved in the direction X nor Y. When the pressure pad 207 has finished coming down and the magnetic card la is pushed enough by the pressure pad, the magnetic card 1*a* and the card holder 568 move in the direction of X with the carriage base 189. Accordingly, it is possible to perform a random access to the magnetic card 1*a* without generating a slip to the carriage base 189.

A starting point sensor (not shown), which is used for detecting the magnetic card 1*a* or the carriage base 189, detects one end of a range of the random access. When the carriage base 189 applied with the magnetic card 1*a* moves in the direction of X as stated the above, and when the magnetic head 13*a* or 13*b* is positioned at a rear track 63*f* as described in Embodiment 53, the starting point sensor detects the magnetic card 1*a* or the carriage base 189. In this case, the magnetic card 1*a* or the carriage base 189 is at the one end of the range of the random access. It is also acceptable to install an end point sensor (not shown) to detect the other end of the range of the random access. This end point sensor is for detecting the magnetic card 1*a* or the carriage base 189 when the magnetic head 13*a* or 13*b* is positioned at a front track 63*e*.

It is also acceptable that the starting point sensor detects the magnetic card 1*a* or the carriage base 189 when the magnetic head 13*a* or 13*b* is positioned at the front track 63*e*, and that the end point sensor detects the magnetic card 1*a* or the carriage base 189 when the magnetic head 13*a* or 13*b* is positioned at the rear track 63*f*.

A reflection type photoelectric switch or a light shield type photoelectric switch can be used for the starting point and end point sensors.

In the case of extracting the magnetic card 1*a*, the carriage base 189 is moved in the direction of Y by motion of the stepping motor 221 and the lead screw 222. At this time, the card holder 568 moves simultaneously. When the front edge of the card holder 568 contacts the stoppers 572 and 573, the movement of the card holder 568 in the direction of Y is obstructed. However, when the carriage base 189 continues to move further, the card holder 568 goes up to the location shown in FIG. 93A by motion of the grooved cams 569*a* to 569*d* and the pins 568*a* to 568*d* of the card holder 568. Then, since the pressure of the pressure pad 207 on the magnetic card 1*a* is removed, the magnetic card 1*a* is pushed back to be between the driving roller 184 and the guide roller 185 by the pressure toward Y of the card bias spring 571. The magnetic card 1*a* is extracted out of the apparatus when the driving roller 184 starts rotating.

Figure 95A:
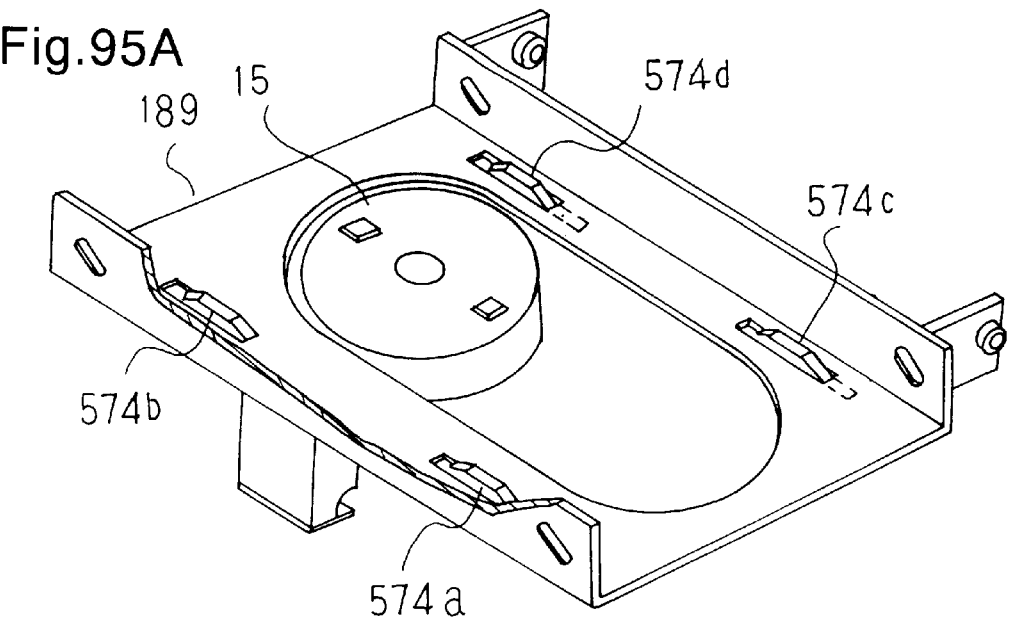
FIG. 95A shows a perspective view of the carriage base applied with a card lifter.
Figure 95B:
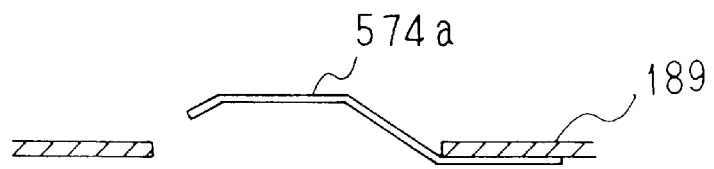
FIG. 95B shows how the card lifter is installed with the carriage base.

In FIGS. 95A and 95B, card lifters 574*a* to 574*d* made of elastic material, such as plastic, are installed at the four edges of the carriage base 189 described in Embodiment 65.

Figure 95C:
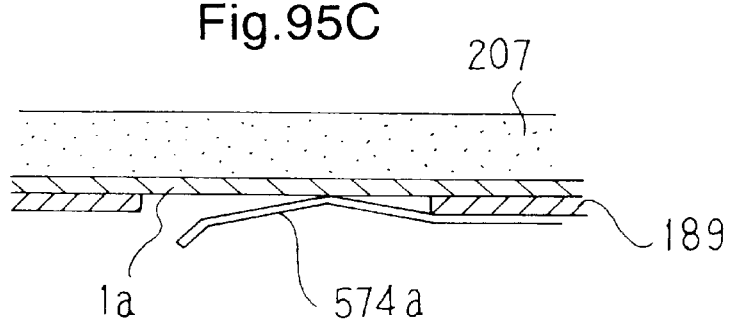
FIG. 95C shows a condition that a magnetic card is applied on the card lifter.
Figure 95D:
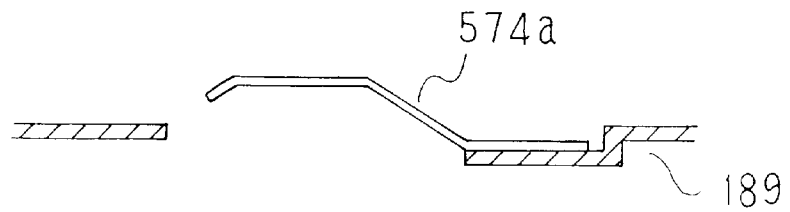
FIG. 95D shows another condition of the card lifter being installed with the carriage base.

These card lifters 574*a* to 574*d* lift the magnetic card 1*a* above the carriage base 189 not to interfere the turntable 15 when the magnetic card 1*a* comes into the carriage base 189. The card lifters 574*a* to 574*d* are fixed to the carriage base 189 to be projecting upward from the base surface of the carriage base 189. When the magnetic card 1*a* is pushed down to the carriage base 189 by the pressure pad 207, the card lifters are not projecting upward as shown in FIG. 95C. To install the card lifters 574*a* to 574*d* on the upper side of the carriage base 189, it is necessary to make the carriage base 189 hollow as shown in FIG. 95D.

Embodiment 67

Figure 96:
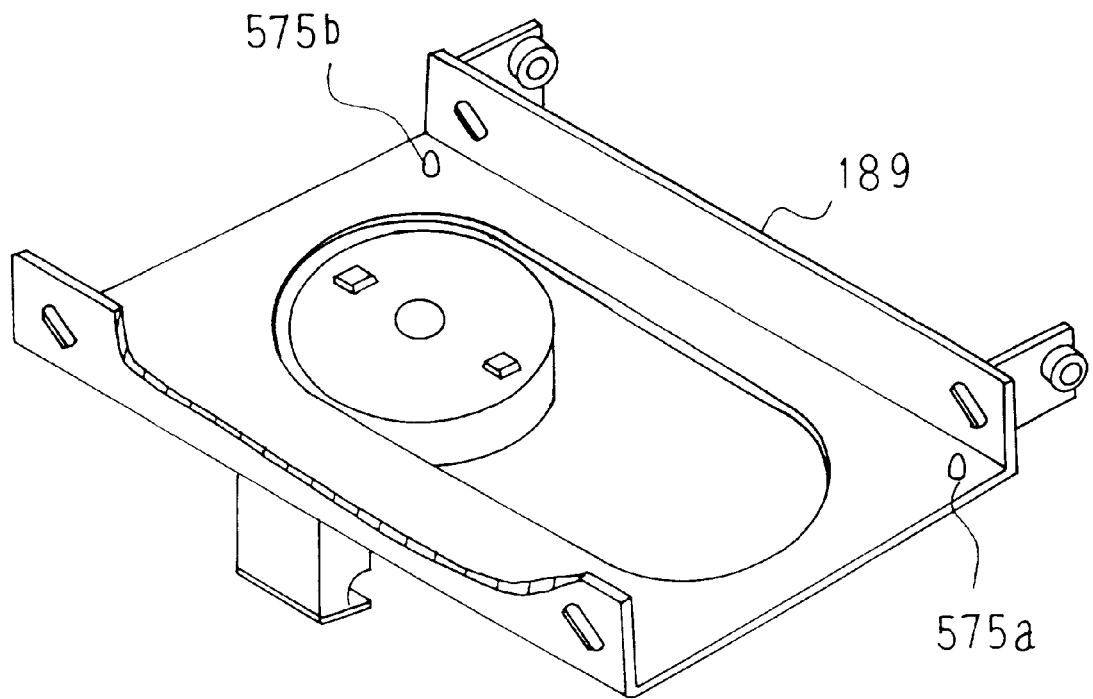
FIG. 96 shows a perspective view of the carriage base applied with positioning pins.

FIG. 96 shows a situation that two positioning pins 575*a* and 575*b* are fixed to the carriage base 189 described in Embodiment 65.

Figure 97A:
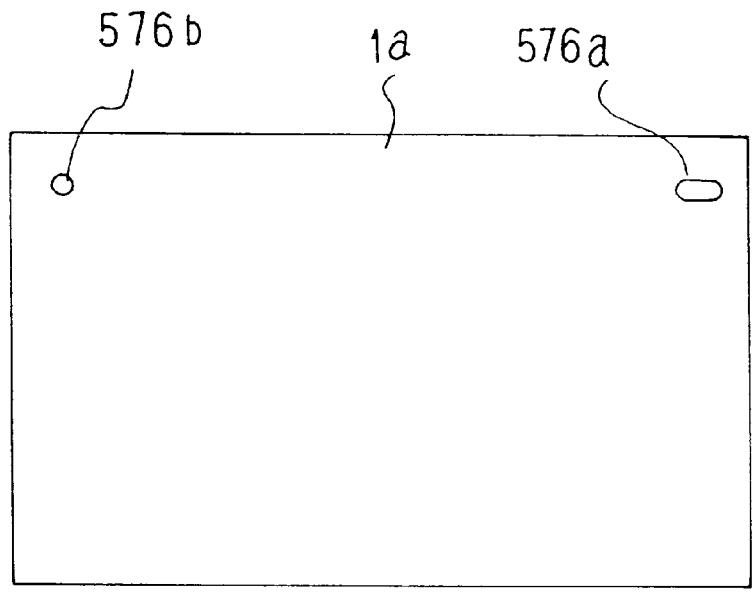
FIG. 97A shows a card wherein positioning holes are made.

The magnetic card 1*a* used in this case has positioning holes 576*a* and 576*b* for positioning as shown in FIG. 97A. One of the two positioning holes 576*a* and 576*b* can be a circle or an oval.

Figure 97B:
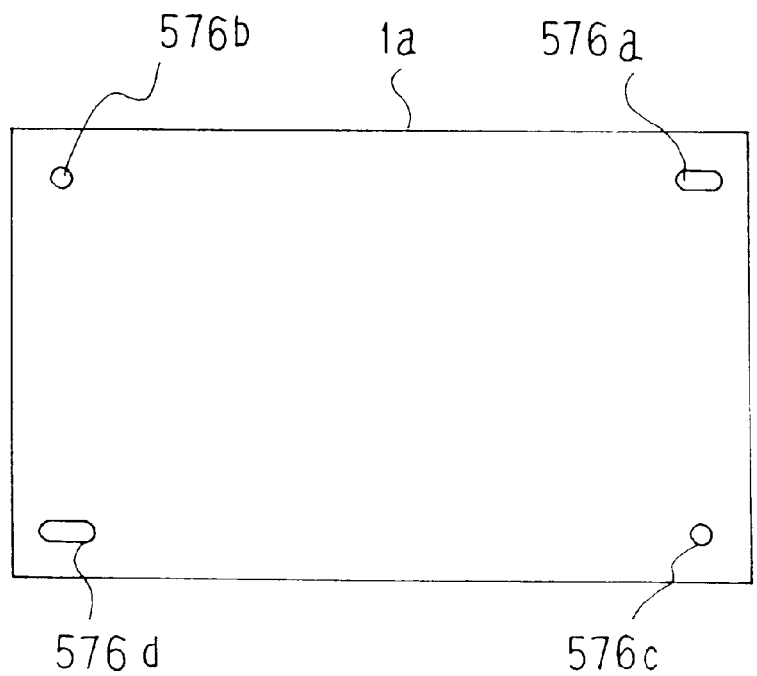
FIG. 97B shows a card wherein positioning holes are made to be symmetric with respect to a center point of the card shown in FIG. 97B.

If positioning holes 576*c* and 576*d* are made to be symmetric with respect to a center point of the card against the positioning holes 576*a* and 576*b* as shown in FIG. 97B, the magnetic card 1*a* can be inserted oppositely into the apparatus with respect to front and rear.

Figure 98A:
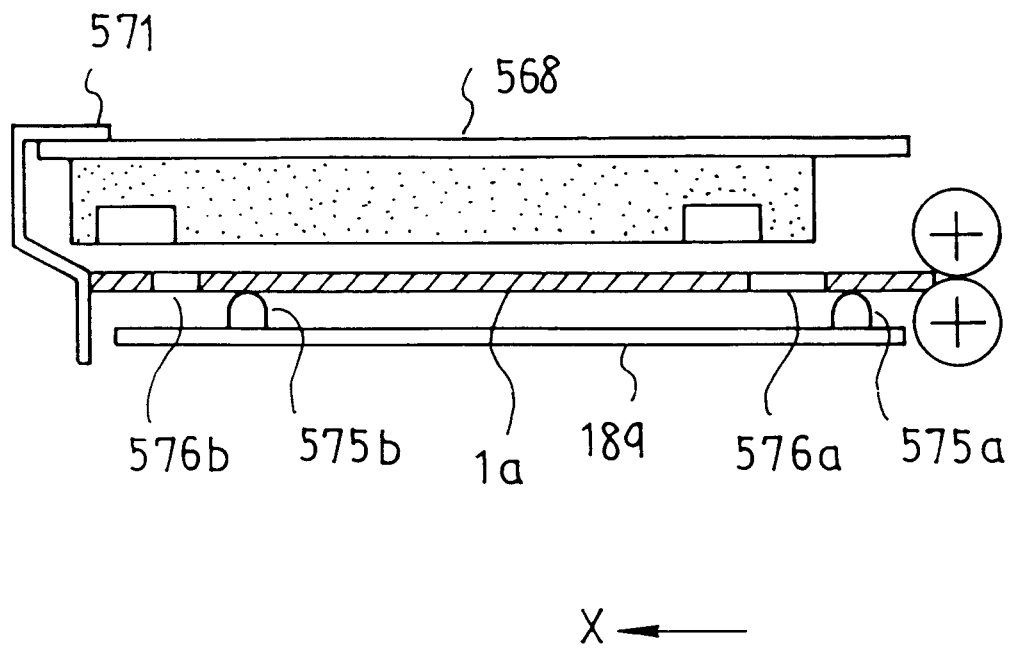
FIG. 98A shows a condition that the card has been inserted into the carriage base perfectly.
Figure 98B:
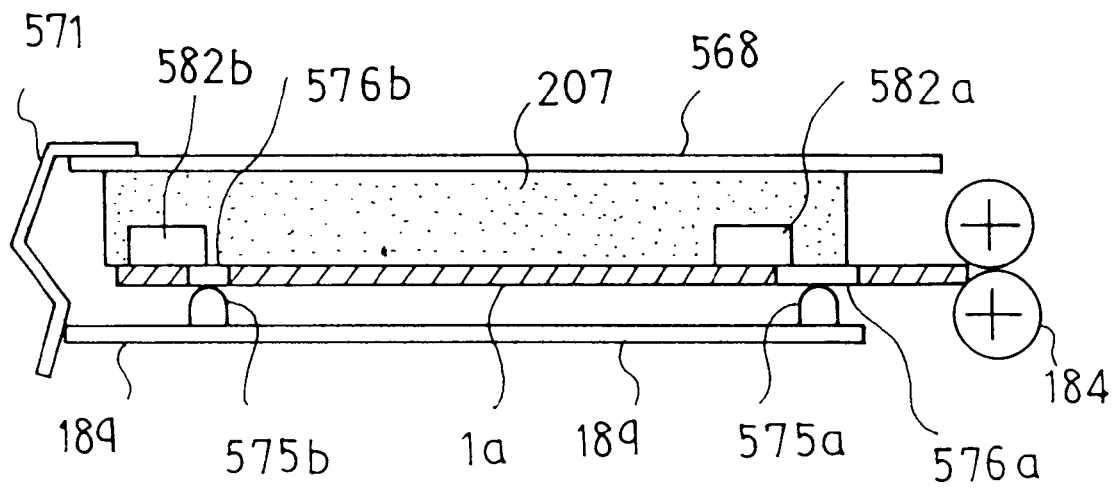
FIG. 98B shows a condition that positioning pins come just under the positioning holes.

Operation of putting the magnetic card 1*a* on the carriage base 189 will now be explained. When the magnetic card 1*a* has been fed into the carriage base 189 perfectly and the carriage base 189 starts moving in the direction of X, the positioning pins 575*a* and 575*b* should be forward of the apparatus than the location of the positioning holes 576*a* and 576*b* as shown in FIG. 98A. The card holder 568 and the magnetic card 1*a* do not move in the direction of X at the first time of the carriage base 189 moving towards X. When the positioning pins 575*a* and 575*b* come just under the positioning holes 576*a* and 576*b*, the pressure pad 207 starts pushing the magnetic card 1*a* from the upper as shown in FIG. 98B. Then, the front edge of the card bias spring 571 contacts the carriage base 189. The pressure toward Y to the magnetic card 1*a* by the card bias spring 571 is removed. Therefore, the magnetic card 1*a* slides down the outer of the driving roller 184 with being pulled toward X. There are holes 582*a* and 582*b* on the pressure pad 207 not to interfere the positioning pins 575*a* and 575*b*. In the situation of FIG. 98B, the pressure pad 207 moves downward to push the magnetic card 1*a* and toward Y with respect to the magnetic card 1*a*. Therefore, the location of the holes 582*a* and 582*b* deviates toward X from the location of the positioning pins 575*a* and 575*b* as shown in FIG. 98B.

Embodiment 68

Figure 99:
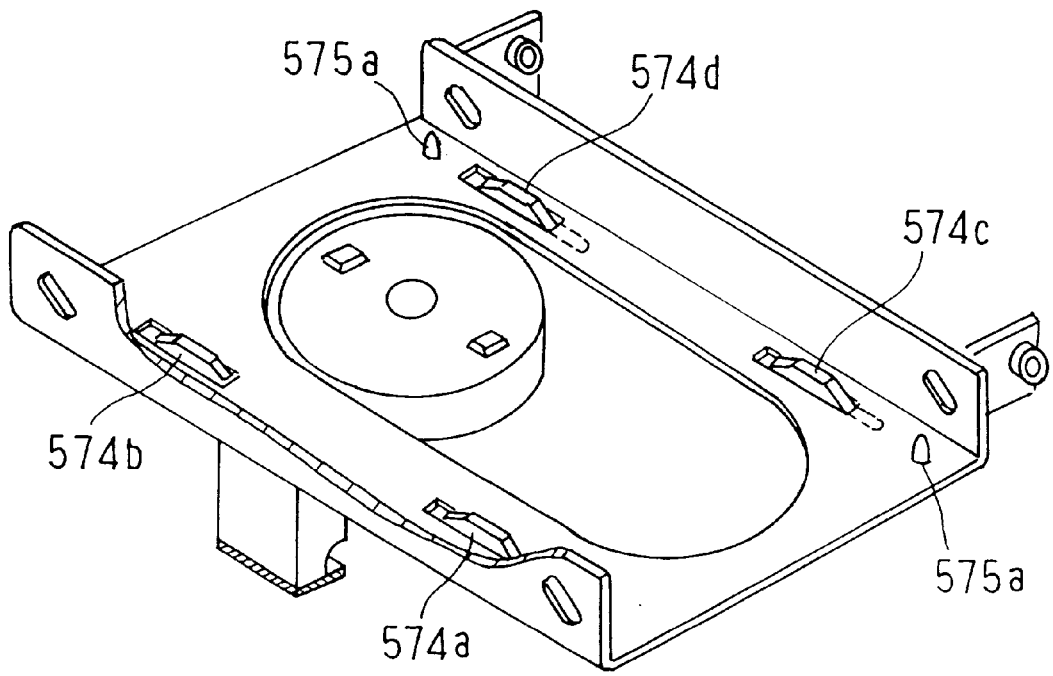
FIG. 99 shows a perspective view of the carriage base applied with the positioning pins and the lifters.

FIG. 99 shows that the card lifters 574*a* to 574*d* are installed on the carriage base 189 described in Embodiment 67.

Since the magnetic card 1*a* is lifted by the card lifters 574*a* to 574*d*, the magnetic card 1*a* does not contact with the positioning pins 575*a* and 575*b* or contacts only a little to get very small shock when the magnetic card 1*a* comes into the carriage base 189. The magnetic card 1*a* can be lifted up from the positioning pins 575*a* and 575*b* by the card lifters 574*a* to 574*d* in extracting the magnetic card 1*a*.

Embodiment 69

Figure 100A:
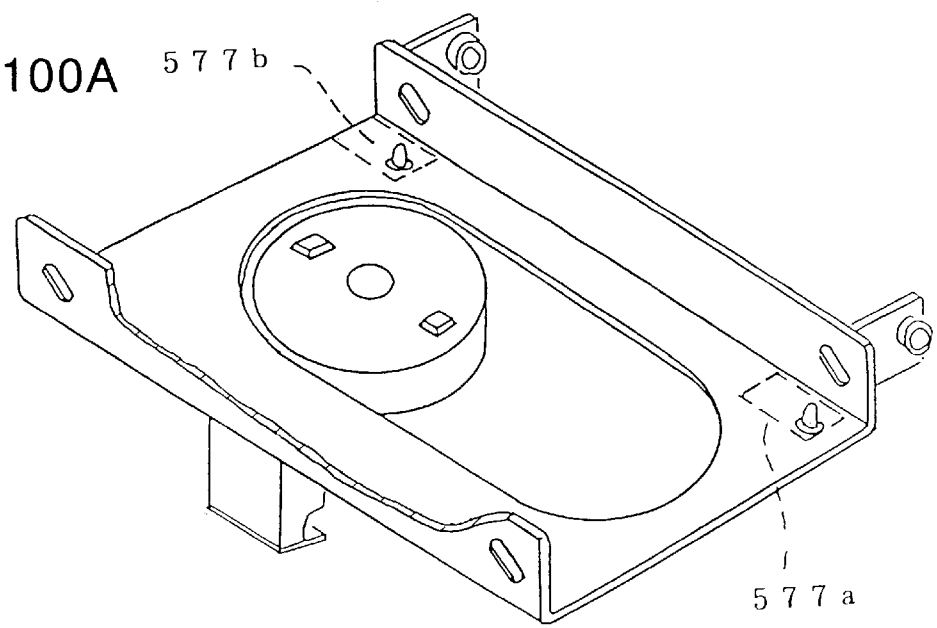
FIG. 100A shows a condition that positioning pins are supported by flat springs fixed to the back side of the carriage base.

In FIG. 100A, the positioning pins 575*a* and 575*b* described in Embodiment 67 are supported elastically by flat springs 577*a* and 577*b* fixed to the back side of the carriage base 189.

Since the positioning pins 575*a* and 575*b* move downward even when the magnetic card 1*a* contacts with the positioning pins 575*a* and 575*b*, the magnetic card 1*a* gets only a little damage in being inserted and extracted. It is also acceptable to install the card lifters 574*a* to 574*d* described in Embodiment 68.

Figure 100B:
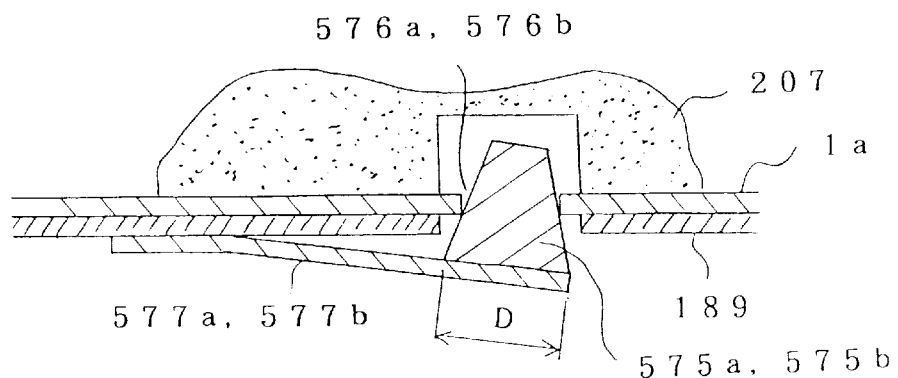

The shapes of the positioning pins 575*a* and 575*b* can have a taper as shown in FIG. 100B. In Embodiment 67, it is described that one of the positioning holes 576*a* and 576*b* can be oval. Diameter D at the foot of the positioning pin corresponding to the circular positioning hole is longer than diameter of the circular positioning hole. Diameter D at the foot of the positioning pin corresponding to the oval positioning hole is longer than minor axis of the oval positioning hole. By defining the size of the positioning holes as the above, the positioning pins 575*a* and 575*b* can be tightly put into the positioning holes 576*a* and 576*b*, which brings an effect of improving the positioning accuracy of the magnetic card 1*a*.

Figure 100C:
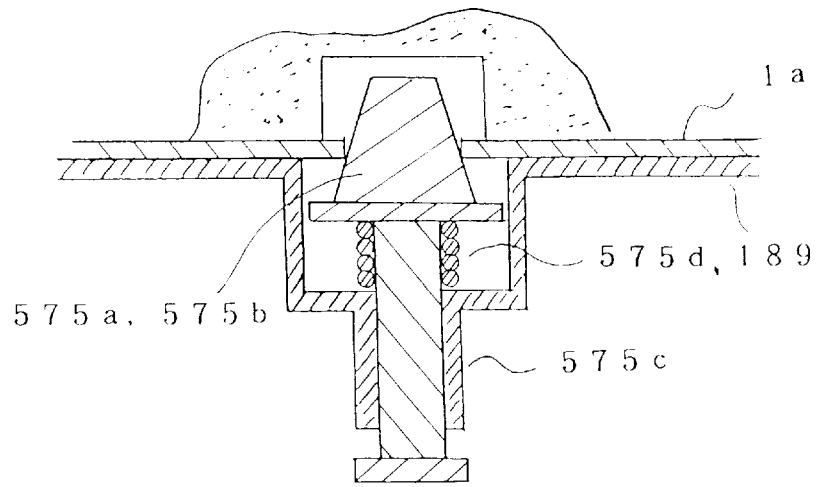

After the positioning pins 575*a* and 575*b* have been put into the positioning holes 576*a* and 576*b*, the magnetic card 1*a* is pushed onto the carriage base 189 by the pressure pad 207. When the magnetic card 1*a* is pushed onto the carriage base 189, the flat springs 577*a* and 577*b* bend downwards as shown in FIG. 100B and then a spring power upwards is generated. As the flat springs 577*a* and 577*b* are cantilever springs, the positioning pins 575*a* and 575*b* are inclined and the positions of the positioning pins 575*a* and 575*b* are deviated with respect to a horizontal direction when the flat springs 577*a* and 577*b* bend. Therefore, in order to improve the positioning accuracy of the magnetic card 1*a*, it is also acceptable to make the structure of the positioning pins 575*a* and 575*b* move upward and downward vertically. Namely, a guide part 575*c* should be installed on the carriage base 189 as shown in FIG. 100C and the positioning pins 575a and 575b pressured upward by a compression spring 575d should be put into the guide part 575c.

Although the flat springs 577a and 577b and the compression spring 575d are used for pressuring the positioning pins 575a and 575b in this embodiment, a gimbal spring or magnetic power can be used instead of the flat springs and the compression spring.

Embodiment 70

The positioning holes 576a and 576b of the magnetic card 1a were on the same line which is parallel to the inserting direction in Embodiments 67 to 69. The positioning pins 575a and 575b are corresponding to the positioning holes 576a and 576b. When the magnetic card 1a contacts the positioning pins 575a and 575b in getting into the carriage base 189, the forward positioning hole 576b contacts with the positioning pin twice. Therefore, the positioning hole 576b gets damage around the hole, then positioning accuracy will be deteriorated. As the positioning pin 575a being put in the forward positioning hole 576b, a trouble may happen in inserting operation.

Figure 101:
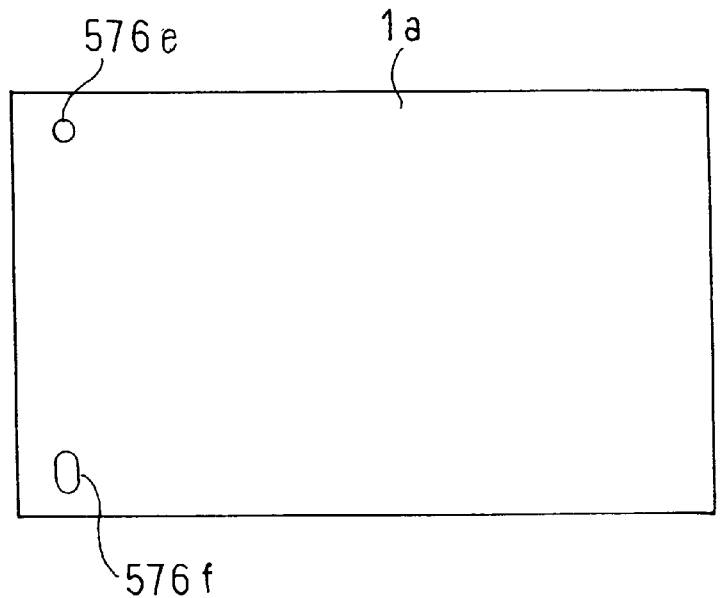
Figure 102:
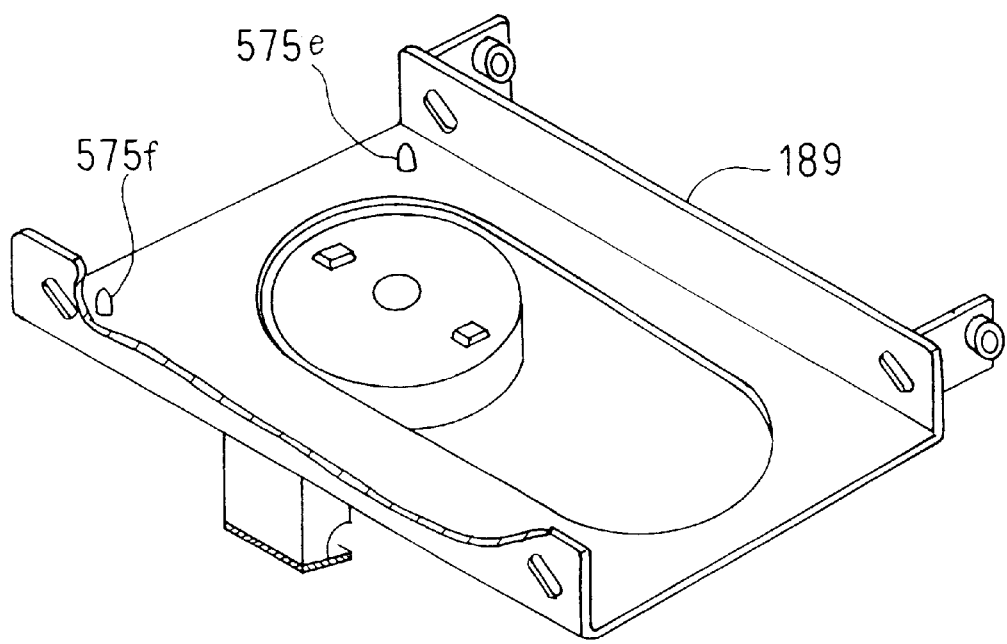
Figure 103:
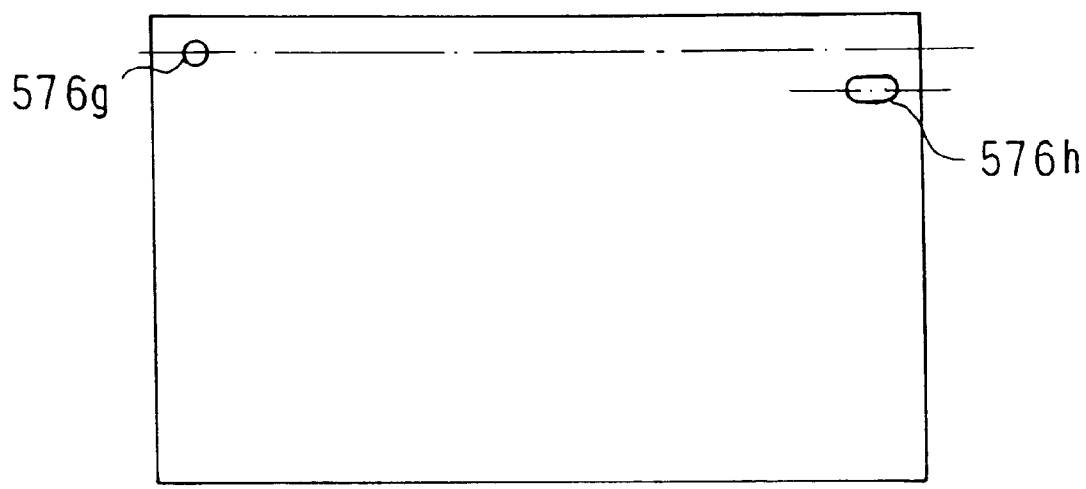

The positioning holes in this embodiment are not aligned on the same line which is parallel to the inserting direction. Two positioning holes 576e and 576f are made sideward at the front of the magnetic card 1a as shown in FIG. 101. The positioning pins 575e and 575f of the carriage base 189 are also aligned sideward corresponding to the positioning holes 576e and 576f as shown in FIG. 102. It is also acceptable to make two holes 576g and 576h not to be on the same line, namely deviated a little one another, as shown in FIG. 103 and install positioning pins corresponding to the two holes.

Embodiment 71

Figure 104A:
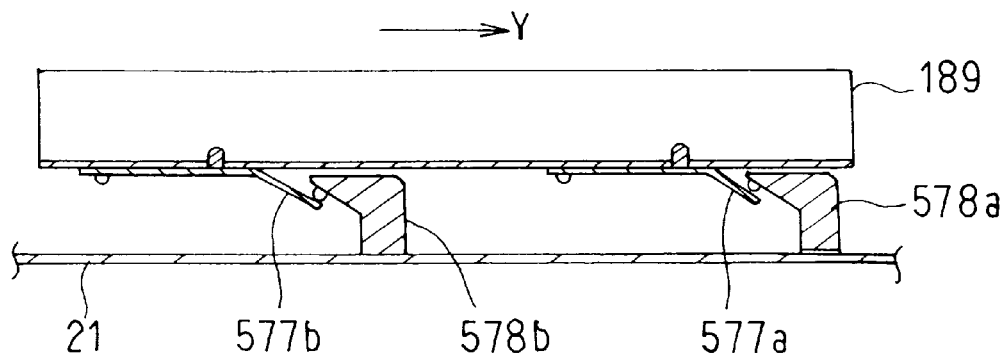
Figure 104B:
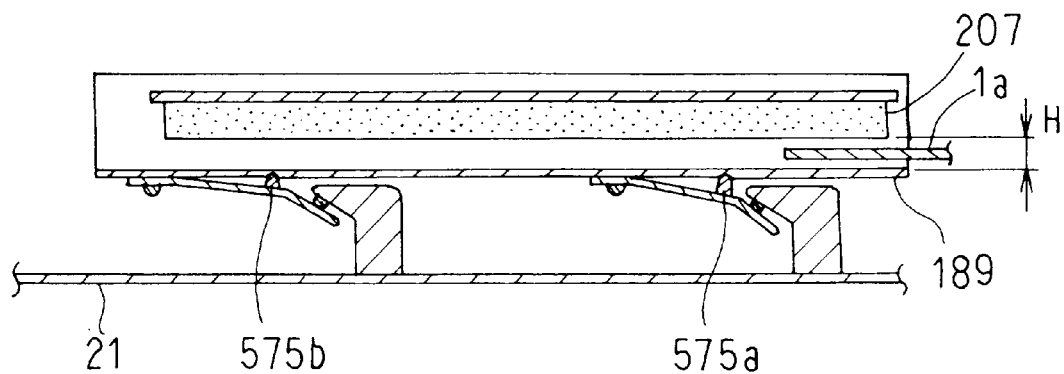

The positioning pins 575a and 575b are projecting from the base surface of the carriage base 189 in Embodiment 69. Front edges of the flat springs 577a and 577b are bent in this embodiment as shown in FIG. 104A. As the carriage base 189 moves in the direction of Y, the front edges of the flat springs 577a and 577b are pushed down by arms 578a and 578b fixed to the apparatus base 21 as shown in FIG. 104B. By this method, the magnetic card 1a can avoid interfering the positioning pins 575a and 575b when the magnetic card 1a is inserted. Accordingly, space H of the feeding path between the carriage base 189 and the pressure pad 207 can be lessened, which has an effect of downsizing the apparatus.

In this embodiment, it is also acceptable to have a taper as the shape of the positioning pins 575a and 575b as mentioned, in Embodiment 69.

Embodiment 72

In the above embodiments 65 to 69, the grooved cams 569a to 569d on the carriage base 189 are used for lifting and lowering the card holder 568. While the carriage base 189 moves in the direction of X or Y, the card holder comes up or down. Namely, the card holder 568 moves diagonally with respect to the carriage base 189.

Figure 105:
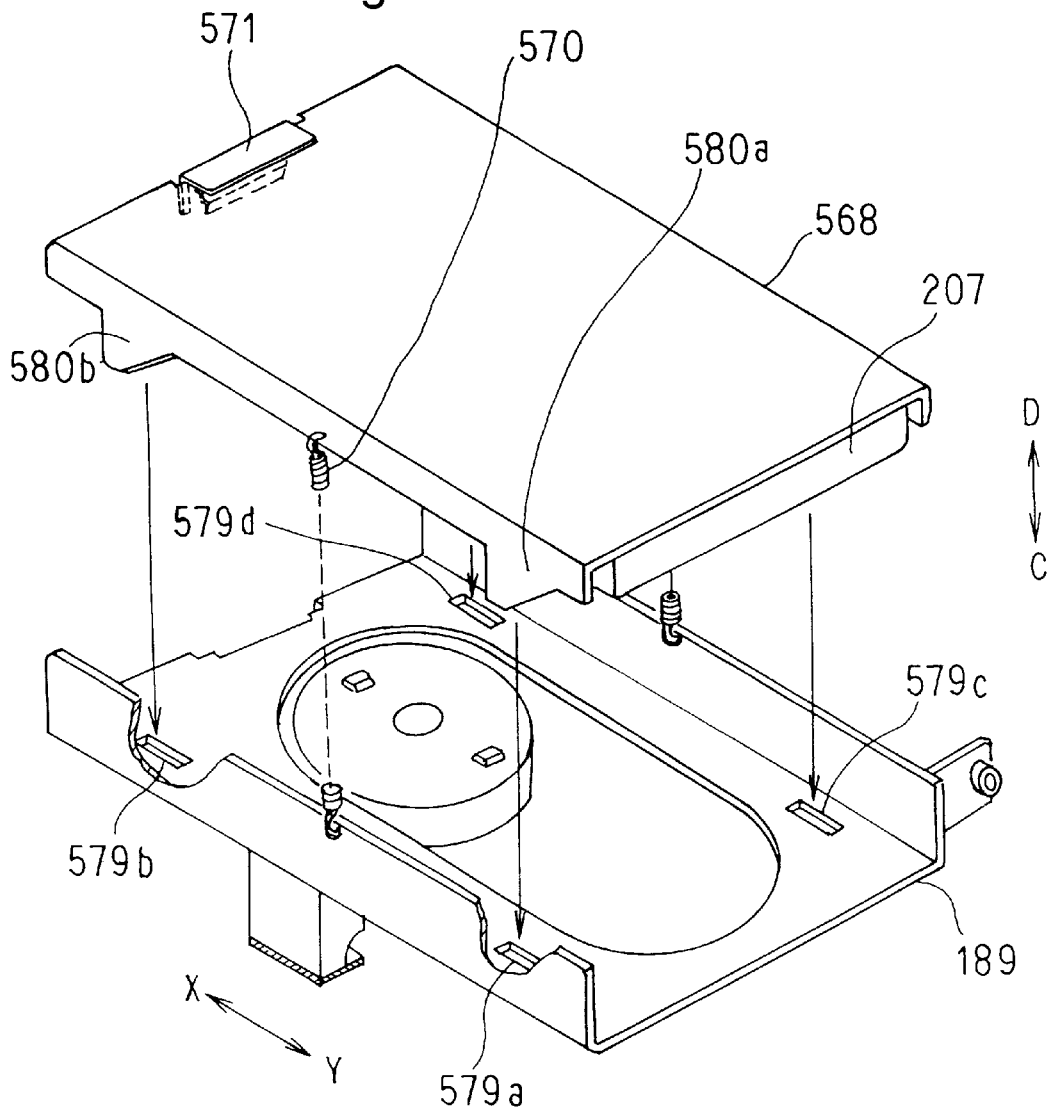

In this embodiment, the card holder goes up and down vertically with respect to the carriage base. FIG. 105 shows the carriage base 189 and the card holder 568 of this embodiment. There are square holes 579a to 579d on the carriage base 189. Foot parts 580a to 580d of the card holder 568 are inserted into the square holes 579a to 579d. In this case, each of the foot parts is inserted into the square hole and can move in the vertical direction of C or D (Foot parts 580c and 580d are not shown). One side of the foot parts 580a to 580d are slanting. One edge of the extension spring 570 is fixed to the carriage base 189 and the other edge is fixed to the card holder 568. The both edges are pressured to be close each other. The pressure pad 207 is the same pad as that of embodiment 1.

Figure 106A:
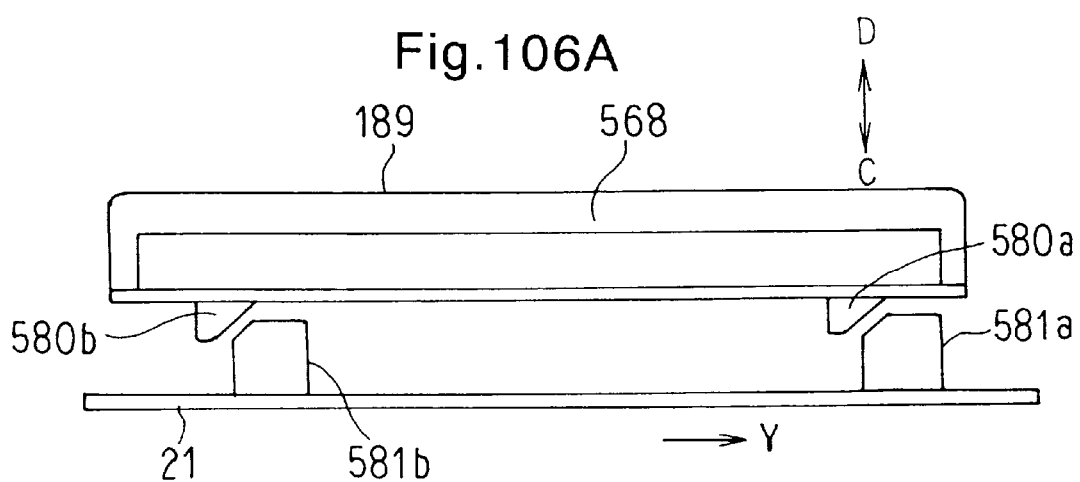
Figure 106B:
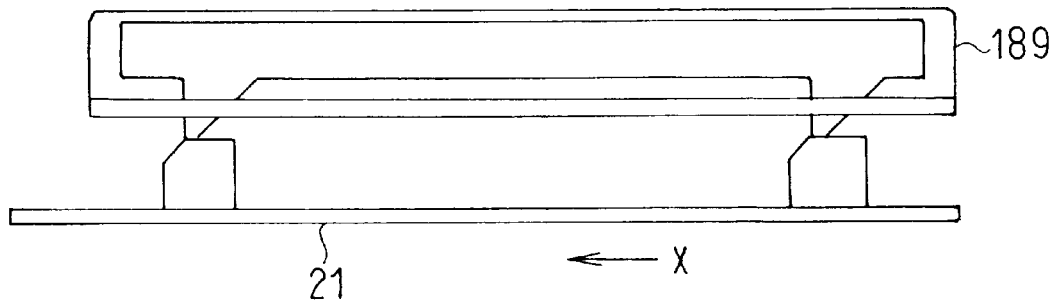

In FIG. 106A, blocks 581a to 581d (blocks 581c and 581d are not shown) are fixed to the apparatus base 21 and they face the foot parts 580a to 580d. When the carriage base 189 and the card holder 568 move in the direction of Y, the foot parts 580a to 580d contact with the blocks 581a to 581d. Then, the card holder 568 is lifted in the direction of D because the slanting sides of the blocks and foot parts perform a role as a cam. It becomes possible to insert and extract the magnetic card 1a. It is needed to move the carriage base 189 in the direction of X in order to lower the card holder 568. By doing this, the magnetic card 1a is caught between the pressure pad 207 and the carriage base 189.

It is also acceptable to use the card lifters 574a to 574d and the positioning pins 575a to 575d stated in the above embodiments, for the structure of this embodiment. Using flat springs 577a and 577b for the positioning pins 575a and 575b, and using arms 578a and 578b for lifting and lowering the flat springs 577a and 577b are also acceptable.

Figure 107:
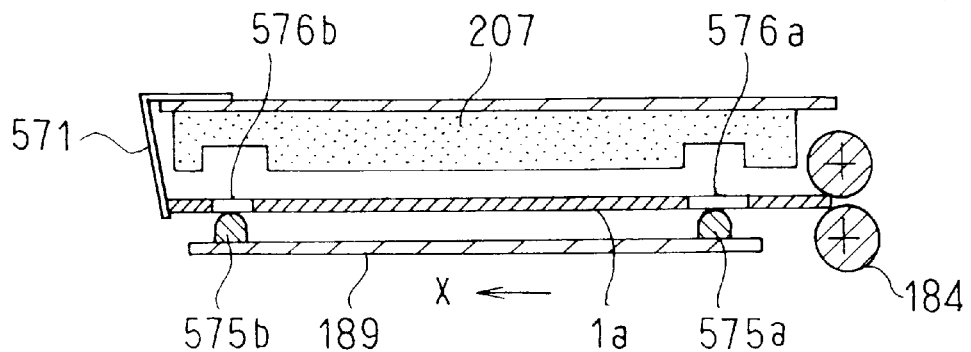

Operation of putting the magnetic card 1a having the positioning holes 576a and 576b, on the carriage base 189 will now be stated. When feeding the magnetic card 1a into the carriage base 189 is finished and the carriage base 189 starts moving toward X, the positioning pins 575a and 575b should be Just under the location of the positioning holes 576a and 576b as shown in FIG. 107. Then, the carriage base 189 starts moving in the direction of X, and the pressure pad 207 comes down vertically to push the magnetic card 1a.

If pressure of the card bias spring 571 against the magnetic card 1a is removed, the front edge of the magnetic card 1a comes away from the driving roller 184. It becomes possible for the magnetic card 1a to get together the positioning pins 575a and 575b smoothly.

The following structure is also acceptable. FIG. 108 shows an enlargement of the carriage base 189 and the card holder 568 in this case. Especially, the enlargement of edge with respect to the direction X is shown. The card bias spring 571 is fixed to the edge of the card holder 568. The card bias spring 571 includes a card bias part 571a being center of the card bias spring 571 and tongues 571b and 571c (the tongue 571c is not shown) being both edges of the card bias spring 571. A notch 584 is made at the location corresponding to the card bias spring 571, on the carriage base 189. The notch 584 includes a side 584a corresponding to the card bias part 571a, and sides 584b and 584c corresponding to the tongues 571b and 571c. When the magnetic card 1a is not between the carriage base 189 and the card holder 568, the card bias part 571a contacts with the side 584a. If the magnetic card 1a is inserted between the carriage base 189 and the card holder 568, the magnetic card 1a contacts the card bias part 571a and gets pressure toward Y as shown in FIG. 109B. When the card holder 568 comes down to the carriage base 189, the tongues 571b and 571c contact the sides 584b and 584c as shown in FIG. 109C. Then, the card bias spring 571 rotates in the direction of Z, so horizontal pressure to the magnetic card 1a is removed. If it is operated in order of FIG. 109C to FIG. 109B, the magnetic card 1a is pushed in the direction of the driving roller 184 and the magnetic card 1a is extracted along the rotation of the driving roller 184.

Embodiment 73

In Embodiment 72, cams are used for lifting and lowering the card holder 586 with respect to the carriage base 189. Method of using a link will be described in this embodiment.

FIGS. 110A and 110B show section of the device of this embodiment. The carriage base 189 and the card holder 568 are pressured in the direction of their mutual approaching, by the extension spring 570. Bases 585a and 585b are fixed to the apparatus base 21. Links 586a and 586b are fixed to the bases 585a and 585b and can rotate in the direction of E or F. The links 586a and 586b are pressured to rotate in the direction of E by the extension springs 587a and 587b. When the carriage base 189 moves toward Y and contacts the edge of the links 586a and 586b, the links 586a and 586b rotate in the direction of F. Then, the other edges of the links 586a and 586b lift the foot parts 580a and 580b as shown in FIG. 110B and it becomes possible to insert or extract the magnetic card 1a.

In the above embodiments 65 to 73, the pressure pad 207 is used as the pad. The support pad 539 stated in Embodiment 40 or one side of the card holder 568 can be also used as the pad.

Embodiment 74

In the embodiments 65 to 73, the turntable 15 does not move and the magnetic card 1a moves with the movement of the carriage base 189 when random access is performed.

In this embodiment, the turntable 15 moves along the long side of the magnetic card 1a when the random access is performed.

This embodiment will now be explained in reference to FIGS. 111 to 113. In FIGS. 112, a carrier 588 applied with the turntable 15 is connected to the guide rod 220. A needle 589 and a pressure spring 590 are fixed to the carrier 588. This needle 589 is connected with the lead screw 222. The pressure spring 590 pressures the connection between the lead screw 222 and the needle 589 from the opposite side in order not to come off.

The carriage base 189 is fixed to the apparatus base 21 by a fixing part (not shown). Width P in inside measurement of the card holder 568 is longer than the width Q in outside measurement of the carriage base 189.

As shown In FIG. 111, there is a hole 591 on the side of the carriage base 189. Holders 592 and 593 are fixed to the apparatus base 21. There is an oval hole 594 on the holder 593.

One end of an arm 595 is fixed to the holder 592 and this end can rotate. The other end of the arm 595 engages with the hole 591. One end of an arm 596 can be put in the hole 594 of the holder 593. The other end of the arm 596 is fixed to the card holder 568 and this end can rotate. The arms 595 and 596 are connected one another rotatively at each center and they form a parallel link. As shown in FIG. 113, one end of a wire 597 is fixed to the carrier 588 and the other end of the wire 597 is fixed to the arm 596.

When the carrier 588 moves in the direction of X and the magnetic head 13a or 13b moves toward X farther than the rear track 63f of the magnetic card 1a stated in Embodiment 53, the wire 597 strains and draws the wire fixed to the end of the arm 596 in the direction of X. Then, the card holder 568 goes up and the conditions of feeding the magnetic card 1a in and out become prepared. When the carrier 588 moves toward Y after the magnetic card 1a being inserted, the wire 597 gets loose and the card holder 568 goes down, then the condition of reading/writing becomes prepared.

In the case that the driving roller 184 is used for feeding the magnetic card 1a in and out as shown in FIG. 92 for this embodiment in which the magnetic card 1a does not move in the direction of X, it is acceptable that the driving roller 184 is moved downward by an avoiding mechanism (not shown) not to interfere with the magnetic card 1a when the magnetic card 1a is pushed onto the carriage base 189.

One end of a range of the random access can be detected by the starting point sensor (not shown) which detects the carrier 588. When the carrier 588 moves toward X and the magnetic head 13a or 13b is positioned at the rear track 63f as described in Embodiment 53, the carrier 588 is detected by this starting point sensor. In this case, the carrier 588 is at one end of the range of the random access.

It is acceptable to install the end point sensor (not shown) to detect the other end of the range of the random access. The end point sensor detects the carrier 588 when the magnetic head 13a or 13b is positioned at the front track 63e. It is also acceptable that the starting point sensor detects the carrier 588 when the magnetic head 13a or 13b is positioned at the front track 63e, and the end point sensor detects the carrier 588 when the magnetic head 13a or 13b is positioned at the rear track 63f. A light shield type or a reflection type photoelectric switch can be used as the starting point and end point sensors.

In the apparatus in which the magnetic card 1a moves, it is necessary to keep a specific room to move the carriage for the random access in the apparatus. The specific room is the same length as the total of the length of the magnetic card 1a and the length of the movement of the magnetic card 1a. On the other hand, in the apparatus in which the turntable 15 moves as this embodiment, it is necessary to keep the room the same as the length of the magnetic card 1a, which brings an effect of making the length of the apparatus short.

The card reader of the present invention has the above structures. Since the magnetic card is caught between the carriage base and the card holder, it has an effect that positioning accuracy is improved. As the positioning pins are used for positioning the card, it also has the effect that positioning accuracy becomes better.

It is general that the apparatus, such as the apparatus above stated, is expected to be small size and to memorize large amount of data. Accordingly, it is necessary to clarify the relation between the elements of the apparatus and the data amount. The relation between the angle $\alpha$ and the total track length M obtained by adding each track length have been computed in expressions (10) to (15). The range of the angle $\alpha$ has been defined in the expression (24). These expressions are in the case that two tracks necessarily correspond to a head rotation center. There is a possibility that one track corresponds to the head rotation center depending upon a shape of the card and so on. Though no practical big problem comes about, the above computations are performed approximately. The expression (10) "X=P·cos $\alpha$" is not correct strictly, for example. Although the number of the tracks N should be an integer, N in the expression (13) does not necessarily become an integer.

More general computation method for the angle $\alpha$ and the track pitch P which make the total track length M maximum will now be stated as follows. To tell the following expressions from the above expressions, variables different from the variables used in the above expressions are used even when the both variables mean the same.

The followings are defined as known variables in advance for the calculation (refer to FIG. 114).

| | |
|---|---|
| Length of recording region | Lr |
| Radius of track | Rt |
| Tolerable minimum space between neighboring tracks | Tpmin |

Lr and Rt are defined by the size of the magnetic card 1a, parts allocation in the apparatus and so on. Tpmin is defined by width of the track and characteristics of the magnetic head. Locus of the head rotation should be within Lr.

The followings are calculated from the above known variables with a track pitch Tp.

| | |
|---|---|
| Recording angle | θ |
| Length of one track | Lt1 |
| Number of tracks | Nt |
| Total length of tracks | Lt |

It is necessary to repeat calculations with changing Tp to decide a track pattern. The track pattern is decided based on Tp which makes Lt maximum and θ corresponding to the Tp.

Procedure of the computation will be explained as follows.

Procedure 1. Assume temporary pitch Tp

Procedure 2. Based on the Tp, calculate the recording angle θ (degree) which makes the space between two neighboring tracks be Tpmin.

Now, the calculation will be explained in reference to FIG. 115. A circle whose center is the origin is defined as circle C1. A circle whose center is (Tp, O) is defined as circle C2. An intersection between a line which passes the center of the origin and has an angle θ, and the circle Cl is defined as a point A (xa, ya). Another intersection between the line which passes the center of the origin and has an angle θ, and the circle C2 is defined as a point B (xb, yb). xa is x-coordinate of A and ya is y-coordinate of the point A. xb is x-coordinate of B and yb is y-coordinate of the point B. Supposing that distance AB between the points A and B is defined as distance between the circles C1 and C2 at the point A, the following calculation can be settled.

$$AB = (xb - xa)/\cos\theta$$

This expression can be expressed as follows.

$$AB = Tp \times \cos\theta + \{\sqrt{(Rt^2 - Tp^2 \times \sin^2\theta)}\} - Rt$$

Angle θ which makes this AB be the same as Tpmin is the recording angle. To calculate this recording angle θ, the following function F (θ) is defined.

$$F(\theta) = Tp \times \cos\theta + \{\sqrt{(Rt^2 - Tp^2 \times \sin^2\theta)}\} - Rt - Tpmin$$

By solving F (θ)=0 with respect to θ, the recording angle can be obtained. Newton method using an approximate solution to solve a subject is noted. Procedure 3. Calculate Lt1 which is length of one track.

$$Lt1 = \pi \times Rt \times \theta/90$$

θ has been already calculated in the procedure 2. Procedure 4. Calculate Ls which is length of range of tracks being written. This calculation method will now be explained in reference to FIGS. 116 to 118. Ls is a sum of "a" and "b" shown in FIG. 117 or 118. In FIGS. 117 and 118, a solid line indicates a track and a dotted line indicates a locus of the head. Arcs 598 and 599, each of whose central angles is 2θ, are written facing oppositely. In this case, length of the central blank part is defined as L0 and distance between two edges of extended locus of the arcs is defined as L1.

$$L0 = 2 \times Rt \times (1 - \cos\theta)$$

$$L1 = 4 \times Rt - L0 = 2 \times Rt \times (1 + \cos\theta)$$

(1) Case of Lr>L1

Right and left most inner tracks 600 and 601 can approach until they contact each other as shown in FIG. 117. Even when the tracks 600 and 601 contact, the head locus does not come out of the recording region.

$$Ls = a + b$$
$$= Lr - L0$$

(2) Case of Lr=<L1

Right and left most inner tracks 602 and 603 can not approach as close as they contact each other as shown in FIG. 118. When the tracks 600 and 601 approach as close as they contact, the head locus comes out of the recording region.

$$Ls = a + b$$
$$= Lr - L0 - (L1 - Lr)$$
$$= 2 \times (Lr - 2 \times Rt)$$

Procedure 5. Calculate the number of tracks Nt Assuming that the tracks are arranged symmetrically with respect to right and left, Nt is an even number.

$$Nt = INT(Ls/2/Tp+1) \times 2$$

INT amounts an integer in value in the above parentheses.
Procedure 6. Calculate length of total tracks Lt.

$$Lt = Lt1 \times Nt$$

The above procedures are repeated with changing Tp to figure out the pitch Tp which makes Lt maximum and the recording angle θ corresponding to this pitch Tp. Then, an outline of the track pattern will be decided.

When Lr>L1 as stated in the procedure 4, only one track can be provided for a head rotation center at the part out of the recording region L1. For example, track 605 can not have a facing track having a same rotation center 604 as shown in FIG. 117. It happens that the facing track for the track 605 crosses other tracks if the facing track is written symmetrically against the rotation center 604. On the other hand, in the case of L1>=Lr as stated in FIG. 118 or in region involved in L1 shown in FIG. 117, two facing tracks placed symmetrically can be provided for one rotation center. Tracks 600 and 607 for the rotation center 606 in FIG. 117 and tracks 602 and 609 for the rotation center 608 in FIG. 118 are examples of the above.

In the case of Lr>L1, normal writing/reading operation can not be performed practically when the right and left most inner tracks 600, 601 contact one another as shown in FIG. 117. Namely, it is necessary to keep space between the innermost tracks, for example by deleting the two right and left innermost tracks 600, 601.

FIG. 119 shows an example of the above calculation results. Relation between Tp and Lt is described regarding Rt as a parameter. In this case, Lr=80 (mm), Tpmin=0.12 (mm). When Rt=25 (mm), Tp becomes 0.18 (mm) and the total track length Lt becomes around 14,000 (mm) which is the maximum. The recording angle θ is around 48 degrees at this time. When Tp is between 0.16 (mm) and 0.21 (mm), the total track length becomes more than around 13,300 (mm) which is 95% of the maximum. In this range, the recording angle θ is around 41 degrees to 54 degrees.

What is claimed is:

1. A card drive apparatus for accessing recording tracks on a card, comprising:
    a head assembly having at least one access head for accessing a plurality of sets recording tracks on the card, wherein each set of the plurality of sets of recording tracks includes two arc tracks located at different places on one circumference on the card, wherein the recording tracks have equal diameters and wherein centers of circumferences of the sets of recording tracks are located at different positions along a common linear axis, a turntable for mounting the at least one access head, and a shaft for rotating the turntable there around so that said at least one access head passes around a circumference to access a set of two recording tracks during rotation of said turntable;
    a carriage for steadily holding the card therein and providing an access opening for accessing the card there through; and
    a carriage positioning mechanism for positioning the carriage against the head assembly through the access opening at one of a plurality of positions that respectively correspond to the plurality of sets of two recording tracks, so that the access head accesses a selected set of the plurality of sets of two recording tracks on the card.

2. The card drive apparatus of claim 1, wherein the head assembly includes a motor for rotating the shaft.

3. The card drive apparatus of claim 1, wherein the turntable mounts a first and a second access heads.

4. The card drive apparatus of claim 3, wherein the first and the second access heads are symmetrically placed against the shaft.

5. The card drive apparatus of claim 1, wherein the turntable includes a table edge there around for contacting the card.

6. The card drive apparatus of claim 1, wherein the card is a magnetic card for recording data, and wherein the access head is a magnetic head.

7. The card drive apparatus of claim 6, wherein the head assembly further includes a slider having the magnetic head, a spring, attached to the turntable, for mounting the slider.

8. The card drive apparatus of claim 2, wherein the head assembly further includes a rotary transformer and a transformer holder for holding the rotary transformer.

9. A card access method for a card drive apparatus having a carriage, and a head assembly having a turntable and an access head mounted on the turntable, the method comprising the steps of:
    steadily holding the card into the carriage;
    rotating the turntable so that the access head moves in a circumference;
    selectively positioning the head assembly to a desired position relative to the carriage and against the card, said position selected from a plurality of positions that respectively correspond to a plurality of sets of two recording tracks having equal diameters so as to align said access head with a selected set of two recording tracks from said plurality of sets of two recording tracks on the card, wherein the two recording tracks of each set are arcs located on one circumference on the card and wherein centers of circumferences of the sets of recording tracks are located at different positions along a common linear axis;
    accessing the two recording tracks of the selected set on the card by the access head, during a rotation of said turntable.

10. An apparatus for accessing data on a card having a plurality of sets of arced data tracks of equal diameter, each set of tracks including two arced data tracks on a circumference of a circle, the apparatus comprising:
    a head assembly including a turntable, at least one access head disposed on said turntable, and a shaft about which said turntable rotates;
    a carriage for holding and positioning the card at a position selected from a plurality of positions that respectively correspond to said plurality of sets of data tracks, so as to align the at least one access head, as it rotates on said turntable, with a selected one of the plurality of sets of arced data tracks, wherein centers of circumferences of the sets of data tracks are located at different positions along a common linear axis.

11. The apparatus of claim 10, further comprising a motor coupled to the shaft for rotating the turntable.

12. The apparatus of claim 11, wherein the head assembly further includes a rotary transformer and a transformer holder for holding the transformer.

13. The apparatus of claim 10, wherein the turntable mounts first and second access heads.

14. The apparatus of claim 12 wherein said first and second access heads are mounted symmetrically about the shaft.

15. The apparatus of claim 10, wherein the at least one access head is a magnetic head.

* * * * *